(12) United States Patent
Uno

(10) Patent No.: US 6,412,183 B1
(45) Date of Patent: Jul. 2, 2002

(54) WHEEL ALIGNMENT MEASURING INSTRUMENT AND WHEEL ALIGNMENT MEASURING

(75) Inventor: Hiroshi Uno, Saitama (JP)

(73) Assignee: Kabushiki Kaisha Saginomiya Seisakusho (JP)

(*) Notice: Subject to any disclaimer, the term of this patent is extended or adjusted under 35 U.S.C. 154(b) by 0 days.

(21) Appl. No.: 09/194,761

(22) PCT Filed: Jun. 13, 1997

(86) PCT No.: PCT/JP97/02043

§ 371 (c)(1),
(2), (4) Date: Dec. 3, 1998

(87) PCT Pub. No.: WO97/47943

PCT Pub. Date: Dec. 18, 1997

(30) Foreign Application Priority Data

| Jun. 14, 1996 | (JP) | ............................................. 8-154134 |
| Aug. 5, 1996 | (JP) | ............................................. 8-206140 |
| Aug. 29, 1996 | (JP) | ............................................. 8-228638 |
| Sep. 2, 1996 | (JP) | ............................................. 8-231887 |
| Sep. 2, 1996 | (JP) | ............................................. 8-231888 |
| Dec. 18, 1996 | (JP) | ............................................. 8-338475 |
| Jan. 30, 1997 | (JP) | ............................................. 9-017184 |
| Jan. 30, 1997 | (JP) | ............................................. 9-017185 |

(51) Int. Cl.$^7$ ........................................... G01B 11/275
(52) U.S. Cl. ............................... 33/203.12; 33/203.18; 356/139.09
(58) Field of Search ........................ 33/203.11, 203.12, 33/203.13, 203.14, 203.15, 203.16, 203.17, 203.18, 203.19, 203.2, 203.21, 286, 288, DIG. 21; 356/155, 139.09, 141.2, 152.1

(56) References Cited

U.S. PATENT DOCUMENTS

| 3,630,623 | A | * | 12/1971 | Schirmer | ..................... 356/155 |
| 3,756,724 | A | * | 9/1973 | Schirmer | ..................... 356/155 |
| 4,113,393 | A | * | 9/1978 | Kiefer et al. | ................. 356/155 |
| 4,186,489 | A | * | 2/1980 | Vigilante et al. | ............. 33/2 H |
| 4,244,113 | A | * | 1/1981 | Hirmann | ................... 33/203.18 |
| 4,779,346 | A | * | 10/1988 | Schafer | ........................ 33/1 B |
| 4,856,199 | A | * | 8/1989 | Merrill et al. | ............ 33/203.17 |
| 5,268,731 | A | * | 12/1993 | Fuchiwaki et al. | ..... 356/139.09 |
| 5,532,816 | A | * | 7/1996 | Spann et al. | ............ 356/139.09 |
| 5,535,522 | A | * | 7/1996 | Jackson | ........................ 33/288 |
| 5,600,435 | A | * | 2/1997 | Bartko et al. | ............ 356/139.09 |
| 5,731,870 | A | * | 3/1998 | Bartko et al. | ............ 356/139.09 |
| 5,969,246 | A | * | 10/1999 | Jackson et al. | ................. 73/459 |
| 5,978,077 | A | * | 11/1999 | Koerner et al. | ......... 356/139.09 |
| 5,995,214 | A | * | 11/1999 | Bruckstein et al. | ....... 356/152.1 |
| 6,064,750 | A | * | 5/2000 | January et al. | .............. 382/103 |

FOREIGN PATENT DOCUMENTS

| JP | 62-63805 | 3/1987 |
| JP | 63-11807 | 1/1988 |
| JP | 63-172938 | 7/1988 |
| JP | 5-63805 | 3/1993 |

* cited by examiner

*Primary Examiner*—Diego Gutierrez
*Assistant Examiner*—R Alexander Smith
(74) *Attorney, Agent, or Firm*—Baker & Daniels

(57) ABSTRACT

A wheel alignment method and device that includes an image pick-up unit that picks up an image of the measuring surface of a measuring plate so that at least a part of measuring marks drawn on the measuring plate are included in the picked-up image. A judging unit judges which measuring mark is included in the image picked up by the image pick-up unit. Based upon the relationship between the selected measuring mark and a measuring object position in the image picked up by the image pick-up unit, the position on the measuring plate corresponding to the measuring object position is calculated, thereby quickly determining the position of the measuring plate corresponding to the measuring object in a non-contact manner.

40 Claims, 67 Drawing Sheets

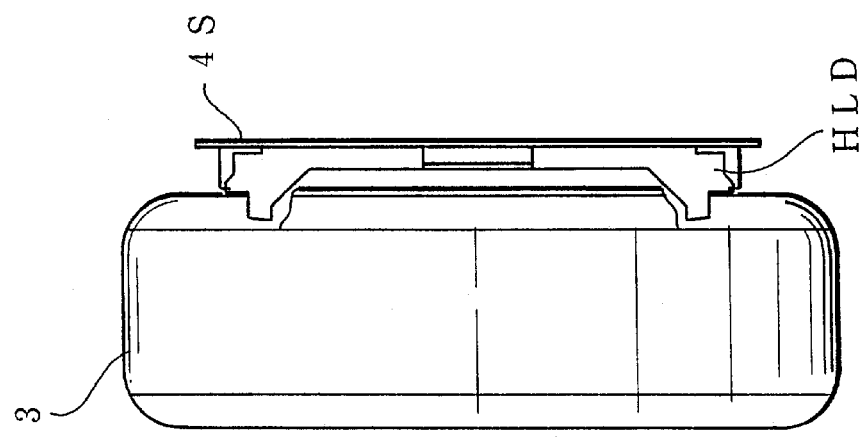
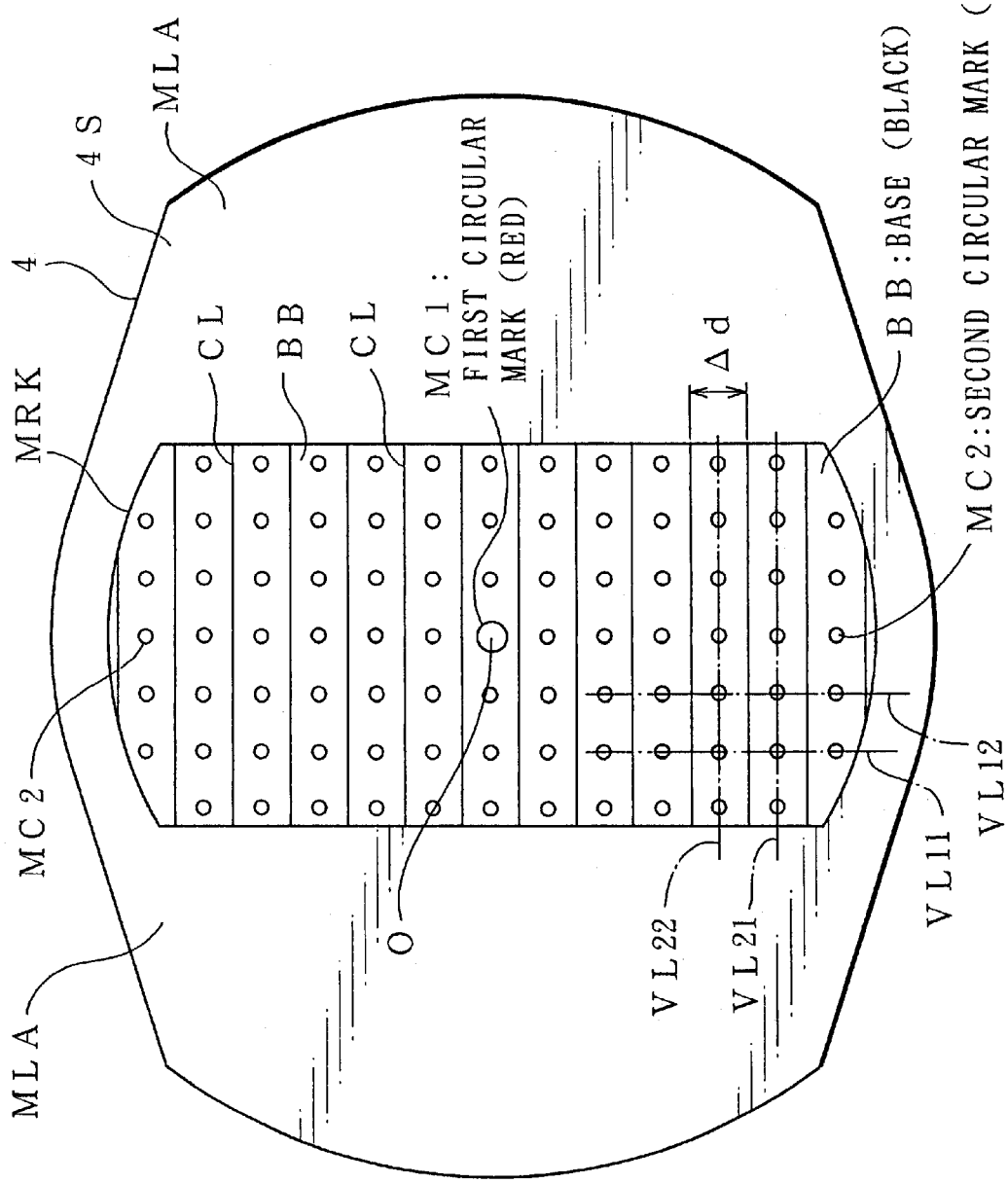

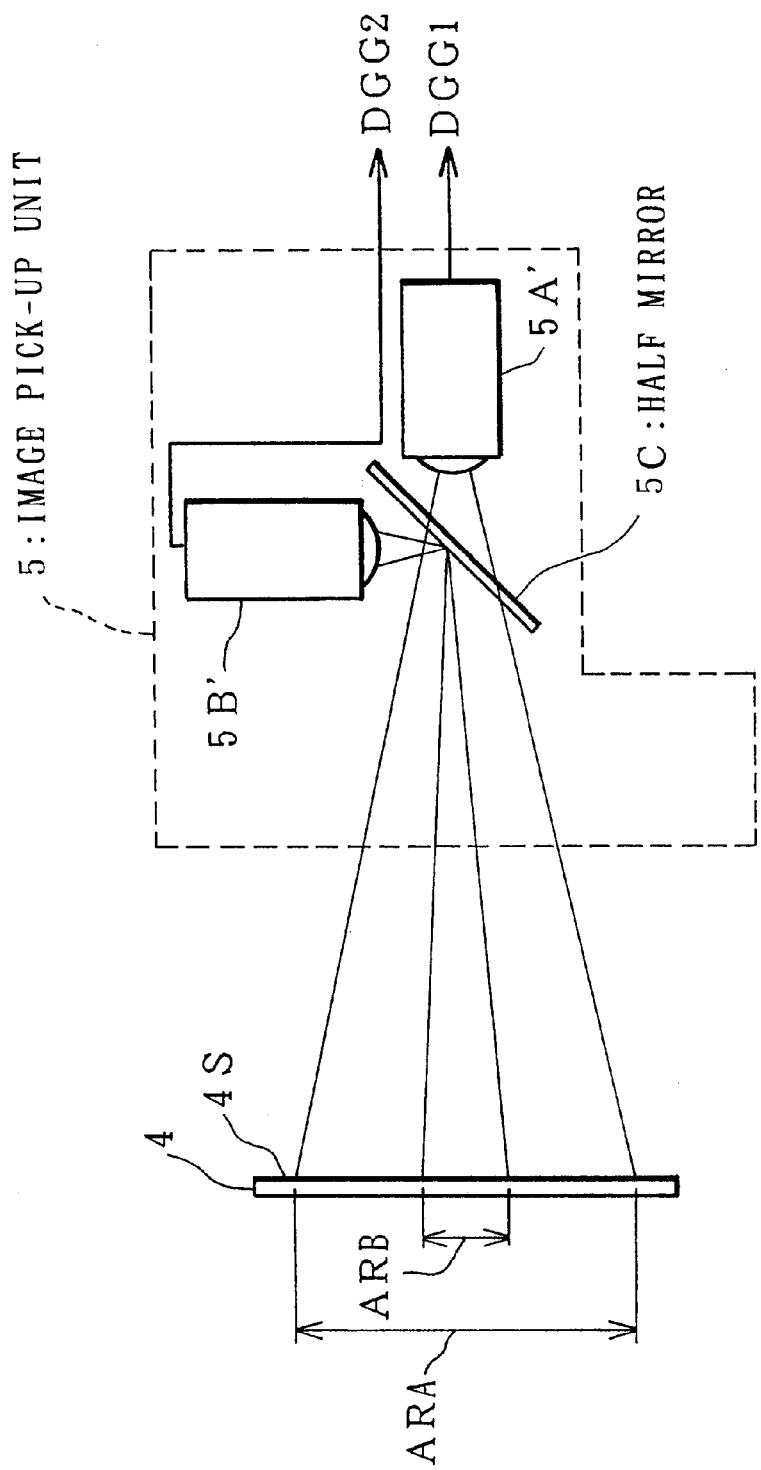

5C: HALF MIRROR

FIG. 16
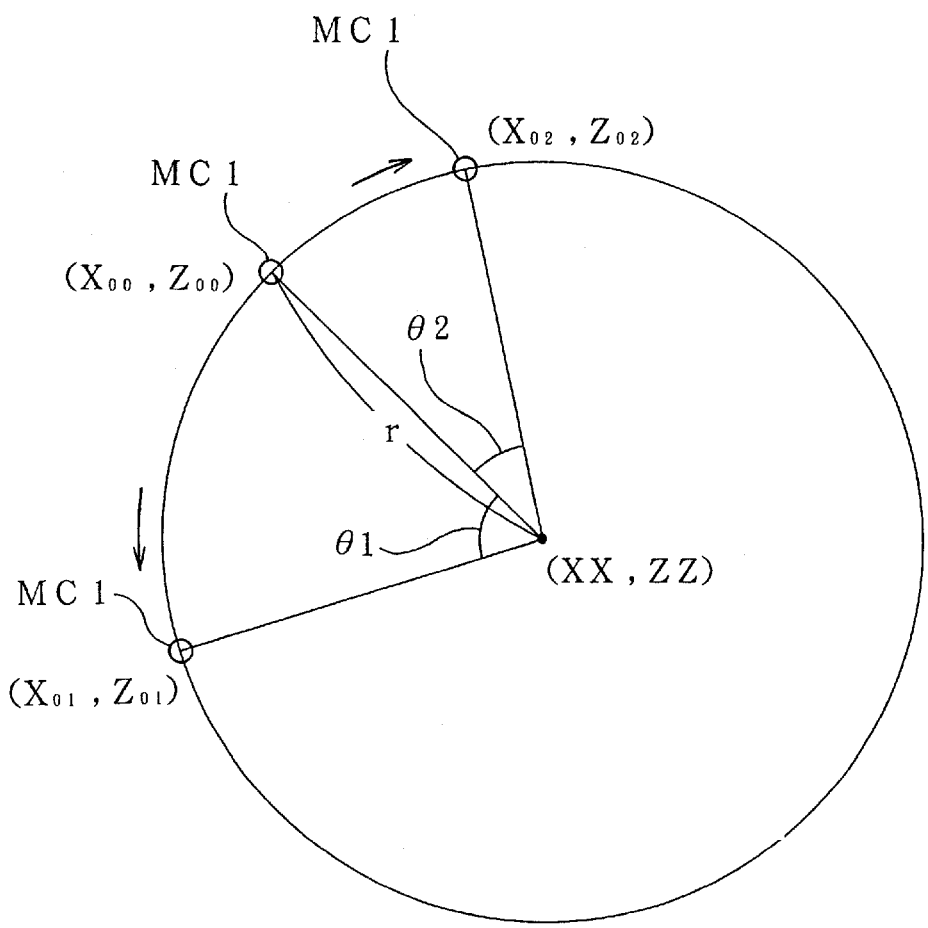
$(X-XX)^2 + (Z-ZZ)^2 = r^2$
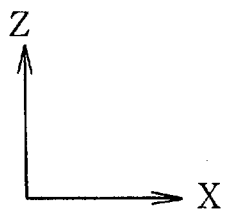

F I G. 21A
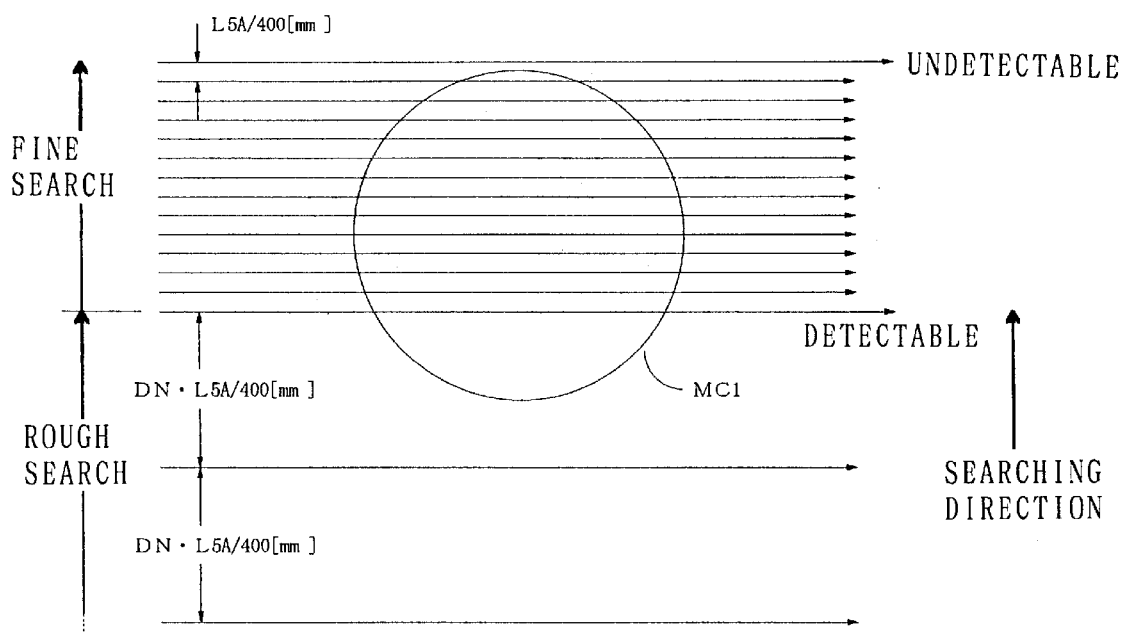
F I G. 21B
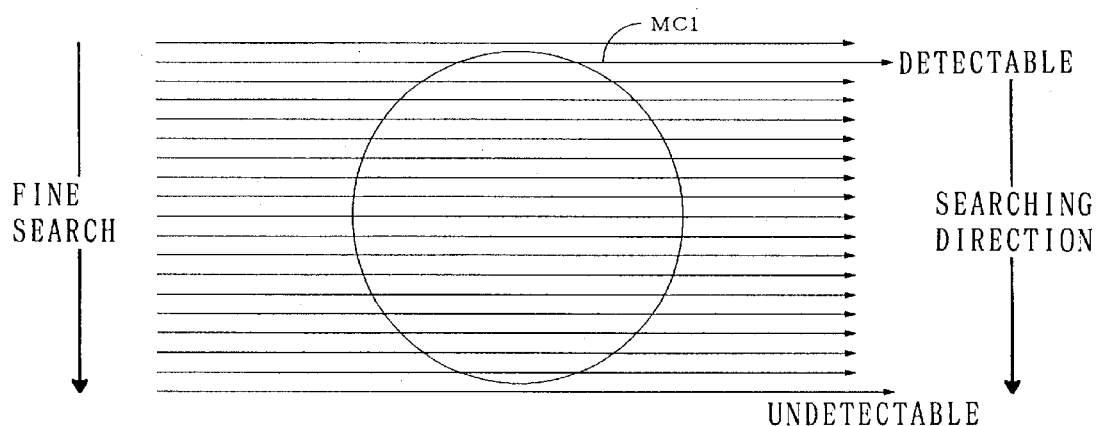

SHOWN IN PARENTHESES ARE LENGTHS

F I G. 57
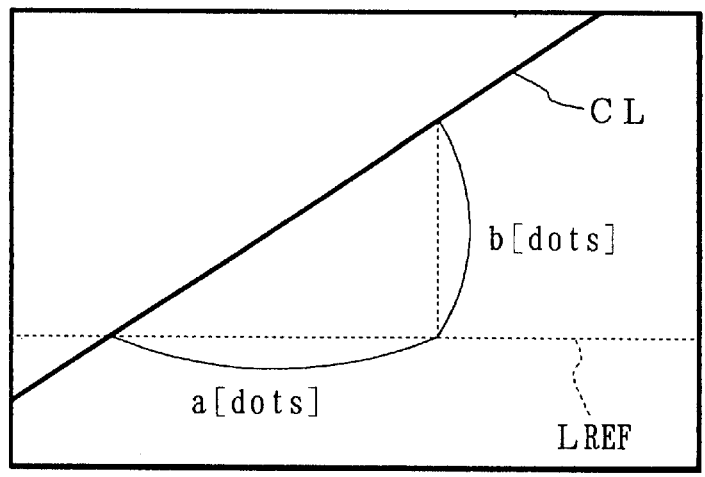
F I G. 58
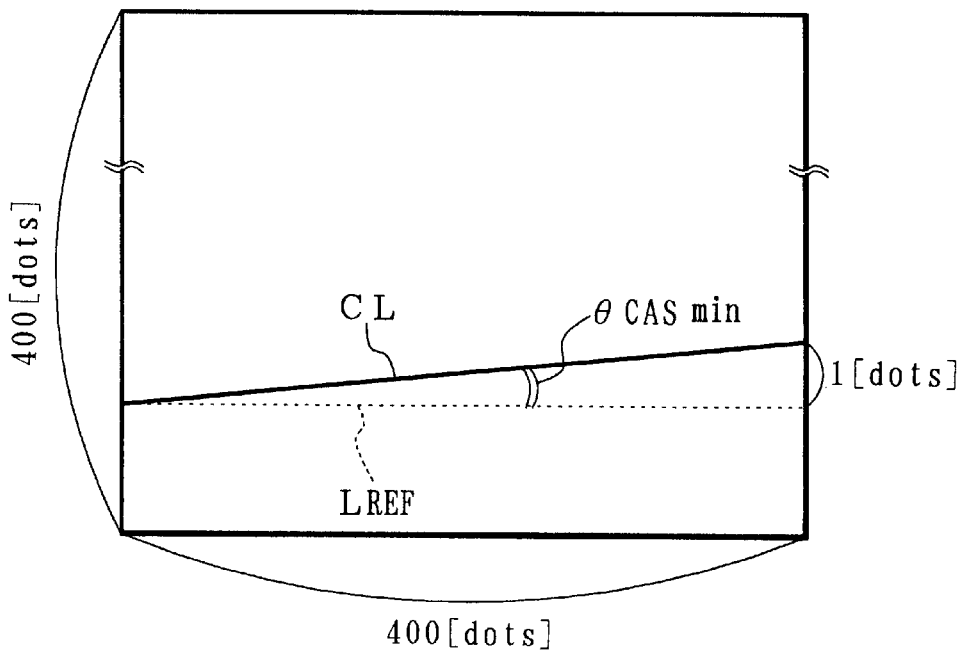

F I G. 59A
ACTUAL CASTER
ANGLE VARIATION
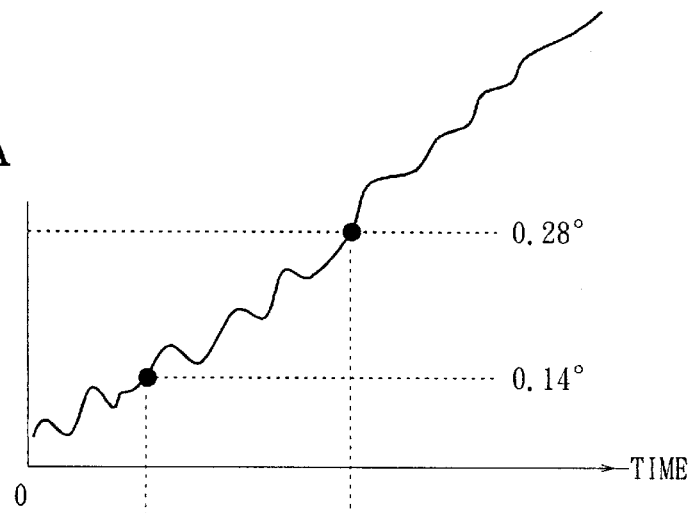
F I G. 59B
CASTER ANGLE
DATA θ CAS
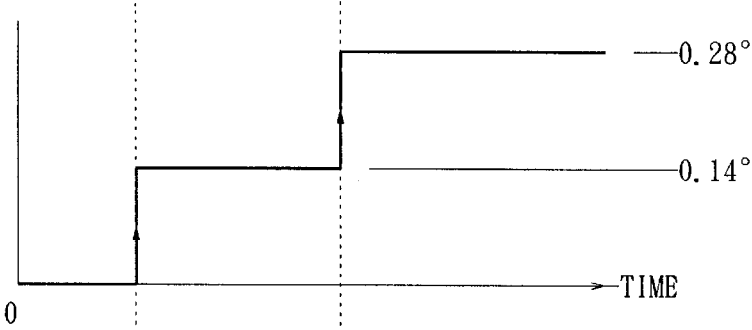
F I G. 59C
DATA OF
OTHER DIMENSIONS
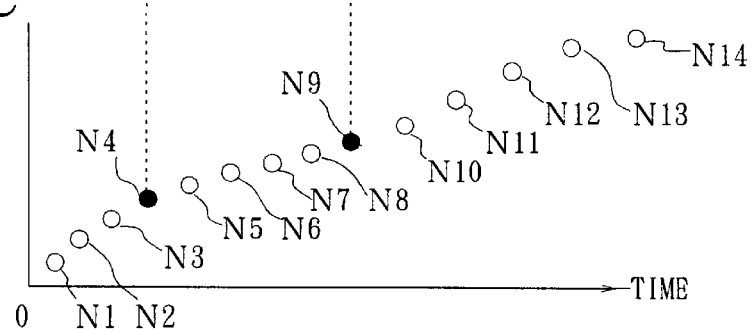

F I G. 60

| SAMPLING POINT n | DATA OF OTHER DIMENSIONS | θ CAS |
|---|---|---|
| 1 | N 1 | 0° |
| 2 | N 2 | 0° |
| 3 | N 3 | 0° |
| 4 | N 4 | 0° |
| 5 | N 5 | 0.14° |
| 6 | N 6 | 0.14° |
| 7 | N 7 | 0.14° |
| 8 | N 8 | 0.14° |
| 9 | N 9 | 0.28° |
| 10 | N 10 | 0.28° |
| 11 | N 11 | 0.28° |
| 12 | N 12 | 0.28° |
| 13 | N 13 | 0.28° |
| 14 | N 14 | 0.28° |
| 15 | N 15 | 0.42° |
| 16 | ⋮ | ⋮ |

⇐ (θ E CAS) — at row 5

⇐ (θ E CAS) — at row 9

⇐ (θ E CAS) — at row 15

$(XC, ZC) = (R-\Delta X, R-\Delta Z)$ $$(XC, ZC) = (R-\Delta X, R-\Delta Z)$$
$$= (R-\Delta X1, \ (\frac{R}{\Delta X1} - 1) Z1)$$

WHEEL ALIGNMENT MEASURING INSTRUMENT AND WHEEL ALIGNMENT MEASURING

BACKGROUND OF THE INVENTION

1. Field of the Invention

The present invention relates to a wheel alignment measuring device and wheel alignment measuring method for measuring wheel alignment to three-dimensionally detect displacement and inclination of a wheel of a driven vehicle with a vehicle basic characteristics detecting device.

2. Related Art

A vehicle basic characteristics detecting device is known as a test device for measuring the basic characteristics of a vehicle, such as suspension characteristics or steering characteristics, in a test chamber.

In such a vehicle basic characteristics detecting device, the vehicle to be measured is fixed in a predetermined position, and rotational force, horizontal force, and vertical force are applied to the wheels. By processing the measurement data obtained from the reaction force, the basic characteristics can be detected.

As a part of the vehicle basic characteristics detecting device, there is a wheel alignment measuring device for measuring wheel alignment, such as spin angle, camber angle, and toe angle, based on the distance from a reference position to the side surface of the wheel.

A conventional wheel alignment measuring device is fixed onto a platform which supports the wheel and is driven by an actuator. Being connected to the wheel, it generally detects movement of the wheel. The problem with this type of mechanical wheel alignment measuring device is that measurements cannot be made at high speed because of a decrease in measuring accuracy caused by friction of the moving parts and restrictions due to the inertial mass of the components or the like.

First Embodiment of the Prior Art

To solve the problem, a non-contact type wheel alignment measuring device provided with a non-contact type distance sensors such as laser beam sensors and ultrasonic sensors.

More specifically, a conventional optical wheel alignment measuring device comprises a measuring unit provided with a plurality of optical sensors (laser displacement gauges, for instance). This measuring unit is disposed on the platform on the side of a wheel. The distance from a predetermined reference position to the measuring plate attached to the side surface of the wheel is optically measured by moving the measuring unit in the longitudinal direction of the vehicle. Based on the obtained measurement data, the camber angle and toe angle are determined.

In the optical wheel alignment measuring device of the first example, the measuring plate is attached to the wheel with a jig which is provided to the wheel beforehand. An adjuster of the attachment jig adjusts the center of the attachment jig to the center of the wheel. A fitting provided to the measuring plate for restricting the attachment position is then connected to the attachment jig by a magnet provided to the attachment jig.

With the wheel alignment measuring device of the first example, the position of the measuring plate needs to be adjusted by the adjuster of the attachment jig, which is time-consuming.

Due to the attachment jig, the distance from the center of the width of the wheel to the measuring surface of the target plate becomes longer, i.e., the radius of the rotational axis of the measuring surface becomes larger. So, if the wheel inclines at a large angle, or if the camber angle greatly varies during the measurement, the amount of movement of the measuring surface becomes large. This results in a problem that the area of the limited measuring surface cannot be effectively utilized.

Also, the laser displacement gauges of the first example of the prior art are driven in a two-dimensional stage based on the origin of the measuring plate, so that the laser displacement gauges follow the movement of the measuring plate, and that the laser beam is always emitted onto the measuring plate.

As a result, the structure of the device becomes complicated, and the manufacturing cost becomes high.

Also, the two-dimensional driving control operation for driving the laser displacement gauges becomes complicated, so does the adjustment operation of the laser displacement gauges for improving the measuring accuracy.

Second Embodiment of the Prior Art

In an optical wheel alignment measuring device of the second example of the prior art, three laser displacement gauges are employed for measuring the camber angle and toe angle. Two of the laser displacement gauges are a first laser displacement gauge and a second laser displacement gauge. The first laser displacement gauge irradiates measuring light onto a position at a first predetermined distance from the rotational center of the wheel in a first horizontal direction on the measuring plate. The second laser displacement gauge irradiates the measuring light onto a position at a second predetermined distance in the vertical direction. The remaining third laser displacement gauge irradiates the measuring light onto a position at a third predetermined distance from the rotational center in a second horizontal direction opposite from the first horizontal direction. The position irradiated by the third laser displacement gauge is situated on a line perpendicular to the vertical line extending through the rotational center.

In such a case, the camber angle is calculated from the displacement difference between the distance from the measuring plate measured by the first laser displacement gauge and the distance from the measuring plate measured by the second laser displacement gauge, and the distance LZ' between the laser beam irradiation point of the first laser displacement gauge and the laser beam irradiation point of the second laser displacement gauge.

More specifically, the camber angle $\theta CAM$ can be calculated by the following formula:

$$\theta CAM = \tan^{-1}(|L1-L2|)/LZ'$$

where the distance from the measuring plate measured by the first laser displacement gauge is L1, and the distance from the measuring plate measured by the second laser displacement gauge is L2.

The toe angle is calculated from the displacement difference between the distance from the measuring plate measured by the third laser displacement gauge and the distance from the measuring plate measured by the first (or second) laser displacement gauge, and the distance LX between the laser beam irradiation point of the third laser displacement gauge and a line in parallel with the Z-direction (vertical direction) including the laser beam irradiation point on a plane containing the laser beam irradiation point of the first (or second) laser displacement gauge.

More specifically, the camber angle θCAM can be calculated by the following formula:

$$\theta CAM = \tan^{-1}(|L3-L1|)/LX$$

where the distance from the measuring plate measured by the third laser displacement gauge is L3, and the distance from the measuring plate measured by the first laser displacement gauge is L1.

In this case, even if the amount of movement in the Z direction is large, the distance LZ' between the first laser displacement gauge and the second laser displacement gauge cannot be made long.

This is because the laser beam emitted from all the laser displacement gauges is required to irradiate the measuring plate in the camber angle and toe angle measurement, in both cases where the measuring plate is situated in the highest possible position in the Z direction and where the measuring plate is situated in the lowest possible position in the Z direction.

In other words, the laser beam irradiation points of all the laser displacement gauges should exist within an area surrounded by the highest possible position and the lowest possible position that the measuring light from the laser displacement gauges can be emitted onto the measuring plate.

As a result, the measuring accuracy of the camber angle θCAM cannot be ensured.

On the other hand, if the measuring accuracy of the camber angle θCAM is increased, the distance LZ' between the laser beam irradiation point of the first laser displacement gauge and the laser beam irradiation point of the second displacement gauge needs to be long. As a result, the measurable range, which is the difference between the highest possible position and the lowest possible position, cannot be made wide.

Third Embodiment of the Prior Art

A ultrasonic wheel alignment measuring device of the third embodiment of the prior art is provided with a plurality of ultrasonic sensors in predetermined positions on the side of the wheel. The ultrasonic sensors measure the distance from a predetermined reference position to the measuring plate attached to the side surface of the wheel. Based on the obtained measurement data, the camber angle and toe angle are determined. Japanese Utility Model Laid-Open No. 63-44107 discloses more details.

Fourth Embodiment of the Prior Art

An optical wheel alignment measuring device of the fourth embodiment of the prior art is provided, on a platform on the side of a wheel, with a measuring unit comprising a plurality of optical sensors (laser displacement gauges, for instance). The measuring unit moves in the longitudinal direction of the vehicle so as to optically measure the distance from a predetermined reference position to the measuring plate attached to the side surface of the wheel. Based on the obtained measurement data, the camber angle and toe angle are determined. Japanese Patent Laid-Open No. 63-94103 discloses more details.

The ultrasonic wheel alignment measuring device of the third embodiment of the prior art is capable of measuring a large amount of displacement, but the allowable range of the inclination of the sensor axis of each ultrasonic sensor is ±7° from the limit of the reflection angle. Also, the ultrasonic wheel alignment measuring device cannot be used in wheel alignment measurement whose inclination range is wide.

In the case of the optical wheel alignment measuring device with the laser displacement gauges of the fourth embodiment of the prior art, it is difficult to have a measurable displacement range (measurable distance range) of ±100 mm, with a reference distance set between the measuring surface of the measuring plate and the laser displacement gauges. Setting such a measuring displacement range will result in low accuracy and high cost. For this reason, an optical wheel alignment measuring device in practical use is fixed onto a platform, so that laser displacement gauges of small measurable displacement range can be used in measurement.

In such a case, the wheel alignment to be actually measured is the alignment with respect to the vehicle body.

With the vehicle body being fixed onto a predetermined reference position, even if the platform is displaced with respect to the reference position by starting the actuator, the relative positional relationship between the platform and the wheel alignment measuring device will not change, and the wheel alignment measurement data should include the amount of displacement of the platform.

However, the amount of displacement of the platform contains errors caused by rigid deformation of the platform, and such errors cannot be excluded from the measurement data. This results in inaccurate wheel alignment measurement, with the measurement data containing measurement errors.

To exclude the measurement errors, data correction can be performed. However, error causing conditions greatly vary, and appropriate correction cannot always be performed, which results in poor measuring accuracy, reliability, and reproducibility.

Since the amount of platform displacement cannot be excluded from the measurement data, the measurement data end up including measurement errors, which hinders accurate wheel alignment measurement.

To exclude the measurement errors, data correction can be performed. However, measuring conditions greatly vary, and appropriate correction cannot always be performed, which results in poor measuring accuracy, reliability, and reproducibility.

SUMMARY OF THE INVENTION

To solve the above problems, a first object of the present invention is to provide a wheel alignment measuring device and a wheel alignment measuring method which can make a wheel alignment measurement with a simpler structure at a lower manufacturing cost. By this device and method, the adjustment of the measuring plate becomes simpler, and the rotational radius of the measuring surface is minimized so that the area of the measuring surface can be effectively utilized.

A second object of the present invention is to provide a wheel alignment measuring device and a wheel alignment measuring method with a simpler structure at a lower manufacturing cost. By this device and method, control and adjustment operations become easier.

A third object of the present invention is to provide a wheel alignment measuring device and a wheel alignment measuring method with a simpler structure and a simpler control procedure. By this device and method, wheel alignment measurements can be taken at high speed, and the measuring accuracy of the camber angle θCAM is maintained.

A fourth object of the present invention is to provide a caster angle measuring device, a wheel alignment measuring device, a caster angle measuring method, and a wheel alignment measuring method. By these devices and methods, a non-contact caster angle can be measured with a desired accuracy.

A fifth object of the present invention is to provide a measuring plate, a wheel alignment measuring device, and a wheel alignment measuring method, by which the positional relationship between the measuring plate and the wheel alignment measuring device can be constantly and quickly detected. Thus, accuracy, reliability, and reproducibility in wheel alignment measurement can be improved.

A sixth object of the present invention is to provide a measuring plate, a wheel alignment measuring device, and a wheel alignment measuring method, by which the positional relationship between the measuring plate and the wheel alignment measuring device can be surely and quickly detected. Thus, accuracy, reliability, and reproducibility in alignment measurement can be improved.

To achieve the first object, the present invention provides a wheel alignment measuring device which measures wheel alignment using a measuring plate provided with a rotational center specifying mark on the measuring surface thereof and attached to a wheel of a vehicle being measured. This wheel alignment measuring device comprises: a caster angle detecting unit for detecting a caster angle of the measuring plate; a mark coordinate detecting unit for detecting mark coordinates which are the coordinates in an absolute space of the rotational center specifying mark; and a rotational center coordinate calculating unit for calculating current rotational center coordinates which are the coordinates of a current rotational center of the measuring surface of the measuring plate in the absolute space.

According to this embodiment, the rotational center coordinate calculating unit calculates the current rotational center coordinates in the absolute space of the measuring surface of the measuring plate based on the caster angle detected by the caster angle detecting unit and the mark coordinates detected by the mark coordinate detecting unit. Thus, accurate wheel alignment measurements can be taken by detecting the rotational center position of the wheel, without attaching the measuring plate in line with the rotational center in advance.

Also, there is no need to provide the measuring plate with a jig for adjusting the rotational center position. This reduces the thickness of the measuring plate in the transverse direction of the vehicle being measured. Thus, the rotational radius of the wheel at the time of a toe angle change can be made smaller, so that the area of the measuring surface of the measuring plate can be effectively utilized.

In a preferred embodiment of the present invention the rotational center coordinate calculating unit comprises: a real mark coordinate calculating unit for calculating reference mark coordinates which are current initial mark coordinates corresponding to the coordinates of the rotational center specifying mark with the origin being initial rotational coordinates corresponding to the initial values of the rotational center coordinates, based on the caster angle and the mark coordinates; and a current center coordinate calculating unit for calculating the current rotational center coordinates based on the reference mark coordinates.

According to this embodiment, the real mark coordinate calculating unit of the rotational center coordinate calculating unit calculates the reference mark coordinates, which are the current coordinates of the initial mark coordinates that are the coordinates of the rotational center specifying mark predetermined as the origin, and the current center coordinate calculating unit calculate the current rotational center coordinates based on the reference mark coordinates determined by the real mark coordinate calculating unit. Thus, the rotational center position of the wheel can be calculated from only a small amount of data.

In a preferred embodiment of the present invention the real mark coordinate calculating unit calculates the reference mark coordinates using formulas (1) and (2):

$$X0''=X0' \cos(\theta CAS)+Z0' \sin(\theta CAS) \quad (1)$$

$$Z0''=-X0' \sin(\theta CAS)+Z0' \cos(\theta CAS) \quad (2)$$

and the current center coordinate calculating unit calculates the current rotational center coordinates (X0, Z0) using formulas (3) and (4):

$$X0=X0'-X00+XX \quad (3)$$

$$Z0=Z0''-Z00+ZZ \quad (4)$$

where the caster angle measured counterclockwise is $\theta CAS$, the mark coordinates are (X0', Z0'), the reference mark coordinates are (X0'', Z0''), the initial mark coordinates are (X00, Z00), and the initial rotational center coordinates are (XX, ZZ).

According to this embodiment, the real mark coordinate calculating unit calculates the reference mark coordinates using the formulas (1) and (2), and the current center coordinate calculating unit calculates the current rotational center coordinates (X0, Z0) using the formulas (3) and (4). Thus, the rotational center position can be given by simple formulas, and real time processing can be performed without complicating the control operation of the arithmetic operation unit.

In a preferred embodiment of the present invention measuring wheel alignment is performed using a measuring plate provided with a rotational center specifying mark on its measuring surface and attached to a wheel of a vehicle being measured. This method comprises: a caster angle detecting step of detecting the caster angle of the measuring plate; a mark coordinate detecting step of detecting mark coordinates which are the coordinates of the rotational center specifying mark in an absolute space; and a rotational center coordinate calculating step of calculating current rotational center coordinates which are the rotational center coordinates of the measuring surface of the measuring plate in the absolute space at present, based on the detected caster angle and the mark coordinates.

According to this embodiment, in the rotational center coordinate calculating step, the current rotational center coordinates that are the rotational center coordinates of the measuring surface of the measuring plate in the absolute space at present is calculated based on the caster angle detected in the caster angle detecting step and the mark coordinates detected in the mark coordinate detecting step. Thus, the rotational center position of the wheel can be detected real time without adjusting the rotational center of the measuring plate beforehand, and accurate wheel alignment measurements can be taken.

Also, there is no need to provide the measuring plate with a jig for adjusting the rotational center. This reduces the thickness of the measuring plate in the transverse direction of the vehicle being measured. Thus, the rotational radius at the time of a two angle change of the wheel can be reduced, and the area of the measuring surface of the measuring plate can be effectively utilized.

In a preferred embodiment of the present invention the rotational center coordinate calculating step comprises: a real mark coordinate calculating step of calculating reference mark coordinates which are the current coordinates of an initial mark coordinate, i.e., the coordinates of the rotational center specifying mark predetermined with the origin being initial rotational center coordinates corresponding to the initial values of the rotational center coordinates, based on the caster angle and the mark coordinates; and a current center coordinate calculating step of calculating the current rotational center coordinates.

According to this embodiment, in the real mark coordinate calculating step, the reference mark coordinates that are the current coordinates of the initial mark coordinates as the coordinates of the rotational center specifying mark predetermined with the origin being the initial rotational center coordinates, which are the initial value of the rotational center coordinates, are calculated based on the caster angle and the mark coordinates. In the current center coordinate calculating step, the current rotational center coordinates are calculated based on the reference mark coordinates obtained in the real mark coordinate calculating step. Thus, the rotational center position of the wheel can be quickly calculated from only a small amount of data.

In a preferred embodiment of the present invention the reference mark coordinates are calculated in the real mark coordinate calculating step using formulas (1) and (2):

$$X0''=X0' \cos(\theta CAS)+Z0' \sin(\theta CAS) \quad (1)$$

$$Z0''=-X0' \sin(\theta CAS)+Z0' \cos(\theta CAS) \quad (2)$$

and the current rotational center coordinates (X0, Z0) are calculated in the current center coordinate calculating step using formulas (3) and (4):

$$X0=X0'-X00+XX \quad (3)$$

$$Z0=Z0''-Z00+ZZ \quad (4)$$

where the caster angle measured counterclockwise is θCAS, the mark coordinates are (X0', Z0'), the reference mark coordinates are (X0'', Z0''), the initial mark coordinates are (X00, Z00), and the initial rotational center coordinates are (XX, ZZ).

According to this embodiment, the reference mark coordinates are calculated using the formulas (1) and (2) in the real mark coordinate calculating step, and the current center coordinates (X0, Z0) are calculated using the formulas (3) and (4) in the current center coordinate calculating step . Thus, the rotational center position can be calculated by simple arithmetic operations, and real time processing can be performed without complicating the control operation by the arithmetic operation unit.

To achieve the second object, the present invention provides a measuring plate attached to a wheel of a vehicle being measured so that the origin corresponds to the rotational center of the wheel. This measuring plate comprises: a measuring mark area which formed in an area surrounding and containing the origin, and provided with various types of measuring marks; and a distance measuring area which is optically uniform and exposed to distance measuring light from the outside, and extends in the longitudinal direction of the vehicle being measured.

According to this embodiment, the measuring plate is provided with the optically uniform distance measuring area in the longitudinal direction of the vehicle being measured. Thus, by emitting the distance measuring light onto the distance measuring area, the distance from the measuring plate can be accurately measured, thereby improving the accuracy in wheel alignment measurement.

Since the distance measuring area can be large, an external distance measuring light emitting unit can be used on a fixed state. Thus, the structure of the wheel alignment measuring device can be simplified without reducing the measuring accuracy.

In a preferred embodiment of the present invention the distance measuring area extends in the longitudinal direction of the wheel of the vehicle being measured.

According to this embodiment, as the distance measuring area is formed in the longitudinal direction of the wheel of the vehicle being measured, two rays of the distance measuring light can be emitted onto two positions further apart in the longitudinal direction of the wheel. Thus, the angle measurement of the measuring plate can be made with high precision by calculating the difference between the lengths from the irradiation points of the two rays of the distance measuring light, and the accuracy in wheel alignment measurement can be further improved.

In a preferred embodiment of the present invention the measuring mark area contains: a first reference mark whose center coordinates are the origin of the measuring plate; a plurality of second reference marks whose center coordinates are at the intersections of first virtual lines and second virtual lines, the first virtual lines being in parallel with each other, and the second virtual lines being in parallel with each other and perpendicular to the first virtual lines; and a plurality of correction lines which are in parallel with either the first virtual lines or the second virtual lines, and are situated at fixed intervals.

According to this embodiment, since the first reference mark, the second reference marks, and the correction lines are drawn in the distance measuring mark area. Thus, various types of wheel alignment measurements can be taken speedily and accurately by picking up an image of the distance measuring mark area and performing image processing.

In a preferred embodiment of the present invention the wheel alignment measuring device comprises: at least two distance measuring units which are fixed in predetermined reference positions at a predetermined distance from each other, and emit the distance measuring light to output distance measuring signals corresponding to the distances from the measuring plate; and a distance calculating unit for calculating the distance from a predetermined position on the measuring plate corresponding to a predetermined reference position, based on the distance measuring signals.

According to this embodiment, the distance measuring units are fixed in the predetermined reference positions, emit the distance measuring light, and output the distance measuring signals corresponding to the distances from the measuring plate. The distance calculating unit calculates the distance from the predetermined position on the measuring plate corresponding to the reference position based on the distance measuring signals. In this embodiment, there is no need to employ a driving mechanism for driving the distance calculating unit, which simplifies the structure of the wheel alignment measuring device. Thus, the distance measuring accuracy, as well as the measuring plate angle measuring accuracy, can be maintained high.

To achieve the third object, the present invention provides a wheel alignment measuring device for measuring the distance from and the inclination of the measuring surface of a measuring plate which is attached to a wheel of a vehicle being measured so that the origin thereof corresponds to the center of the rotational axis of the wheel. This wheel alignment measuring device comprises four or more (number N) distance measuring light emitting and receiving units which emit distance measuring light onto the measuring surface, receive the distance measuring light reflected by the measuring surface, and output distance measuring signals. Emitters of the distance measuring light are arranged on the same virtual plate at fixed intervals, so that the distance measuring light of at least three of the N distance measuring light emitting and receiving units can be emitted onto the measuring surface under predetermined measuring conditions.

According to this embodiment, the distance measuring light is emitted onto the measuring surface by at least three distance measuring light emitting and receiving units under the predetermined measuring conditions, and the N distance measuring light emitting and receiving units receive the distance measuring light reflected by the distance measuring surface, thereby outputting the distance measuring signals. In this embodiment, measurements can be taken, with the distance measuring light emitting and receiving units being fixed, and there is no need to employ with a driving mechanism for driving the distance measuring light emitting and receiving units. Thus, the structure and the control operation can be simplified, and the device manufacturing cost can be reduced accordingly.

In a preferred embodiment of the present invention the virtual plane contains a straight line substantially in parallel with the vertical direction of the vehicle being measured, and a virtual parallelogram is arranged on the virtual plane so that the straight line includes one of the diagonal lines of the virtual parallelogram. The emitters of four of the distance measuring light emitting and receiving units are arranged at the corners of the virtual parallelogram, and the virtual parallelogram is arranged so that the distance measuring light is emitted from the emitters on the diagonal line not included in the straight line within the common area between a first measuring surface corresponding to the measuring surface moved the longest possible distance in a first direction along the straight line, and a second measuring surface corresponding to the measuring surface moved the longest possible distance in a second direction opposite from the first direction.

According to this embodiment, the distance measuring light is emitted on the measuring surface by at least three distance measuring light emitting units, which include one of the distance measuring light emitting unit on the diagonal line included in the straight line and the two distance measuring light emitting units on the other diagonal line. With the three distance measuring light emitters, accurate wheel alignment measurements can be constantly taken.

In a preferred embodiment of the present invention the wheel alignment measuring device further comprises: a choosing unit for choosing the distance measuring signal of the distance measuring light emitting and receiving unit corresponding to the emitter, which emits the distance measuring light upon the measuring surface, between the two emitters on the diagonal line included in the straight line; and a camber angle calculating unit for calculating the camber angle of the measuring surface based on the distance measuring signal chosen by the choosing unit, and distance measuring signals of the distance measuring light emitting and receiving units corresponding to the two emitters on the diagonal line not included in the straight line.

According to this embodiment, the choosing unit chooses the distance measuring signal of a distance measuring light emitting and receiving unit corresponding to the emitter, which emits the distance measuring light upon the measuring surface, between the two emitters on the diagonal line included in the straight line. The camber angle calculating unit calculates the camber angle of the measuring surface based on the distance measuring signal chosen by the choosing unit and the distance measuring signals of the distance measuring light emitting and receiving units corresponding to the emitters on the other diagonal line not included in the straight line. Thus, the camber angle can be accurately calculated along with displacement of the measuring plate, without a driving mechanism for driving the distance measuring light emitting and receiving units. Also, the distance between the distance measuring light emitting and receiving units included in the straight line and the other distance measuring light emitting and receiving units not included in the straight line can be made longer, thereby improving the accuracy of the camber angle measurement.

The camber angle calculating unit calculates the camber angle of the measuring surface based on the distance measuring signal chosen by the choosing unit and the distance measuring signals of the distance measuring light emitting and receiving units corresponding to the two emitters on the other diagonal line not included in the straight line.

In a preferred embodiment of the present invention the choosing unit comprises a judging unit for judging whether the intersection of the two diagonal lines is situated in the first direction or in the second direction with respect to the origin of the measuring surface, thereby choosing the corresponding distance measuring light emitting and receiving unit.

According to this embodiment, the judging unit of the choosing unit judges whether the intersection of the two diagonal lines is situated in the first direction or in the second direction with respect to the origin of the measuring surface, thereby choosing the corresponding distance measuring light emitting and receiving unit. Thus, the distance measuring light emitting and receiving unit to be used in the camber angle calculation can be quickly selected, and the camber angle can be calculated speedily and accurately.

In a preferred embodiment of the present invention the wheel alignment measuring method comprising: a distance measuring light emitting and receiving step in which at least three rays of distance measuring light among N (N=4 or larger) rays of distance measuring light are emitted onto the measuring surface at predetermined intervals; and a camber angle calculating step of calculating the camber angle of the measuring surface based on the received distance measuring light.

According to this embodiment, in the distance measuring light emitting and receiving step, at least three rays of distance measuring light among N (N=4 or larger) rays of distance measuring light are emitted onto the measuring surface at predetermined intervals. In the camber angle calculating step, the camber angle of the measuring surface is calculated based on the receiving distance measuring light. Since no driving control needs to be performed to conform to the displacement of the measuring surface, the control procedure can be simplified, and the cost for control system development can be lowered.

In a preferred embodiment of the present invention a virtual plane contains a straight line substantially in parallel with the vertical direction of the vehicle being measured. Also, a virtual parallelogram is arranged on the virtual plane so that the straight line contains one of the diagonal lines of the virtual parallelogram, and the distance measuring light is emitted from each corner of the virtual parallelogram and the distance measuring light reflected by the measuring surface is received in the distance measuring light emitting and receiving step. The distance measuring light emitted from two corners on the diagonal line not included in the straight line and from one of the corners on the diagonal line included in the straight line is received in the common area between a first measuring surface corresponding to the measuring surface moved the longest possible distance in a first direction along the straight line, and a second measuring surface corresponding to the measuring surface moved the longest possible distance in a second direction opposite from the first direction, thereby calculating the camber angle in the camber angle calculating step.

According to this embodiment, in the distance measuring light emitting and receiving step, the distance measuring light is emitted from each corner of the virtual parallelogram, and the distance measuring light reflected by the measuring surface is received. In the camber angle calculating step, the camber angle is calculated based on the received distance measuring light emitted from the two corners on the diagonal line not included in the straight lint included in the common area between the first measuring surface and the second measuring surface, and the received distance measuring light emitted from one of the corners on the other diagonal line. Thus, the camber angle can be accurately calculated in accordance with displacement of the measuring surface.

In a preferred embodiment of the present invention the camber angle calculating step comprises: a choosing step of choosing a ray of distance measuring light irradiating the measuring surface between the two rays of distance measuring light emitted from the corners included in the straight line; and a camber angle operation step of calculating the camber angle of the measuring surface based on the distance measuring light chosen in the choosing step and the two rays of distance measuring light emitted from the corners not included in the straight line.

According to this embodiment, in the choosing step, a ray of distance measuring light irradiating the measuring surface is chosen between the two rays of distance measuring light emitted from the corners included in the straight line. In the camber angle operation step, the camber angle of the measuring surface is calculated based on the distance measuring light chosen in the choosing step and the two rays of distance measuring light emitted from the corners not included in the straight line. In this embodiment, the camber angle can be accurately calculated in accordance with displacement of the measuring plate, and the length of the measuring light emitted from the two corners not included in the straight line can be made longer with respect to the distance measuring light emitted from one of the corners included in the straight line. Thus, the accuracy in the camber angle calculation can be improved.

In a preferred embodiment of the present invention the choosing step comprises a judging step of judging whether the intersection of the two diagonal lines is situated in the first direction or in the second direction with respect to the origin of the measuring surface, thereby choosing the corresponding distance measuring light.

According to this embodiment, in the judging step, the distance measuring light is chosen by judging whether the intersection of the two diagonal lines is situated in the first direction or in the second direction with respect to the origin of the measuring surface. Thus, the distance measuring light can be chosen quickly, and the camber angle can be calculated speedily and accurately.

To achieve the fourth object, the present invention provides a caster angle measuring device for outputting effective caster angle data θECAS having a desired measuring accuracy based on image data obtained through image pick-up, by an external CCD camera, of a caster angle measuring object line drawn on a wheel alignment measuring target plate provided to a vehicle. This caster angle measuring device comprises: an original caster angle data calculating unit for calculating original caster angle data θCAS by quantizing the caster angle formed by the measuring object line with respect to a predetermined reference line based on the image data; and an effective data output unit for outputting the original caster angle data θCAS as the effective caster angle data θECAS when the original caster angle data θCAS change in value.

According to this embodiment, the original caster angle data calculating unit calculates the original caster angle data θCAS by quantizing the caster angle formed by the measuring object line with respect to the predetermined reference line based on the image data outputted by the external CCD camera. The effective data output unit outputs the original caster angle data θCAS as the effective caster angle data θECAS when the original caster angle data θCAS change in value. Although the caster angle is optically calculated in a non-contact manner using the image data outputted by the CCD camera, the measuring accuracy in measuring the caster angle can be maintained at a desired level. Thus, with the effective caster angle data θECAS, the wheel alignment can be quickly measured with a desired accuracy.

In a preferred embodiment of the present invention a caster angle measuring device is provided for outputting effective caster angle data θECAS having a desired measuring accuracy based on image data obtained through image pick-up, by an external CCD camera, of a caster angle measuring object line drawn on a wheel alignment measuring target plate provided to a vehicle. This caster angle measuring device comprises: an original caster angle data calculating unit for calculating original caster angle data θCAS based on the image data when the caster angle formed by the measuring object line with respect to a predetermined reference line constantly increases or decreases; a comparator comparing original caster angle data θCAS(n−1) in the previous measurement with original caster angle data θCAS (n) in the current measurement; and an effective data output unit for outputting the original caster angle data θCAS(n) of the current measurement as the effective caster angle data θECAS when the previous original caster angle data θCAS (n−1) is not equal to the current original caster angle data θCAS(n) as a result of the comparison.

According to this embodiment, the original caster angle data calculating unit calculates the original caster angle data θCAS based on the image data when the caster angle formed by the measuring object line with respect to the predetermined reference line constantly increases or decreases. The comparator compares the original caster angle data θCAS (n−1) in the previous measurement with the original caster angle data θCAS(n) in the current measurement. The effective data output unit outputs the original caster angle data θCAS(n) of the current measurement as the effective caster angle data θECAS when the previous original caster angle data θCAS(n−1) is not equal to the current original caster angle data θCAS(n) as a result of the comparison. Although the caster angle is calculated in a non-contact manner using the image data outputted by the CCD camera, the measuring accuracy in measuring the caster angle can be maintained at a desired level. Thus, with the effective caster angle data θECAS, the wheel alignment can be quickly measured with a desired accuracy.

In a preferred embodiment of the present invention the original caster angle data calculating unit comprises: a line extracting unit for extracting the measuring object line based on the image data; and an inclination calculating unit for calculating the inclination of the extracted measuring object line by the method of least squares.

According to this embodiment, the line extracting unit extracts the measuring object line based on the image data, and the inclination calculating unit calculates the inclination of the extracted measuring object line by the method of least squares. Thus, the effective caster angle data θECAS can be calculated speedily and accurately.

In a preferred embodiment of the present invention the original caster angle data calculating unit comprises: a line extracting unit for extracting the measuring object line based on the image data; and an inclination calculating unit for calculating the inclination of the extracted measuring object line by the method of least squares.

According to this embodiment, the line extracting unit extracts the measuring object line based on the image data, and the inclination calculating unit calculates the inclination of the extracted measuring object line by the method of least squares. Thus, the effective caster angle data θECAS can be calculated speedily and accurately.

In a preferred embodiment of the present invention the wheel alignment measuring device comprises: a CCD camera for outputting image data by picking up an image of a caster angle measuring object line drawn on a wheel alignment measuring target plate attached to a vehicle; the caster angle measuring device; and a data comparing unit for comparing the effective caster angle data θECAS with measuring data of another dimension measured at substantially the same time that a change occurs to the original caster angle data θCAS.

According to this embodiment, the CCD camera picks up an image of the caster angle measuring object line drawn on the wheel alignment measuring target plate attached to the vehicle, and outputs the image data to the caster angle measuring device. The caster angle measuring device outputs the effective caster angle data θECAS to the data comparing unit. The data comparing unit compares the effective caster angle data θECAS with measuring data of another dimension measured at substantially the same time that a change occurs to the original caster angle data θCAS. Thus, various data in wheel alignment measurement can be compared with the caster angle data with a desired accuracy.

In a preferred embodiment of the present invention the wheel alignment measuring device comprises: a CCD camera for outputting image data by picking up an image of a caster angle measuring object line drawn on a wheel alignment measuring target plate attached to a vehicle; the caster angle measuring device; and a data comparing unit for comparing the current original caster angle data θCAS(n) with measuring data of another dimension measured at substantially the same time as the measurement of the current original caster angle data θCAS(n).

According to this embodiment, the CCD camera picks up an image of the caster angle measuring object line drawn on the wheel alignment measuring target plate attached to the vehicle, and outputs the image data to the caster angle measuring device. The caster angle measuring device outputs the current original caster angle data θCAS(n) as the effective caster angle data θECAS to the data comparing unit. The data comparing unit compares the current original caster angle data θCAS(n) with measuring data of another dimension measured at substantially the same time as the measurement of the current original caster angle data θCAS(n). Thus, various data in wheel alignment measurement can be compared with the caster angle data with a desired accuracy.

In a preferred embodiment of the present invention the caster angle measuring method for calculating an effective caster angle θECAS having a desired measuring accuracy based on image data is obtained through image pick-up, by an external CCD camera, of a caster angle measuring object line drawn on a wheel alignment measuring target plate attached to a vehicle. This caster angle measuring method comprises: an original caster angle calculating step of calculating an original caster angle θCAS by quantizing the caster angle formed by the measuring object line with respect to a predetermined reference line based on the image data; and an effective data judging step for judging the original caster angle θCAS at the time of a change in value thereof to be the effective caster angle θECAS.

According to this embodiment, in the original caster angle calculating step, the original caster angle θCAS is calculated by quantizing the caster angle formed by the measuring object line with respect to the predetermined reference line based on the image data. In the effective data judging step, the original caster angle θCAS at the time of a change in value thereof is judged to be the effective caster angle θECAS. Although the caster angle is calculated in a non-contact manner using the image data outputted by the CCD camera, the measuring accuracy in measuring the caster angle can be maintained at a desired level. Thus, with the effective caster angle data θECAS, the wheel alignment can be quickly measured with a desired accuracy.

In a preferred embodiment of the present invention the caster angle measuring method for calculating an effective caster angle θECAS having a desired measuring accuracy based on image data is obtained through image pick-up, by an external CCD camera, of a caster angle measuring object line drawn on a wheel alignment measuring target plate attached to a vehicle. This caster angle measuring method comprises: an original caster angle calculating step of calculating an original caster angle θCAS based on the image data when the caster angle formed by the measuring object line with respect to a predetermined reference line constantly increases or decreases; a comparing step of comparing an original caster angle θCAS(n−1) in the previous measurement with an original caster angle θCAS(n) in the current measurement; and an effective data judging step of judging the current original caster angle θCAS(n) to be the effective caster angle θECAS when the previous original caster angle θCAS(n−1) is not equal to the current original caster angle θCAS(n) as a result of the comparison.

According to this embodiment, in the original caster angle calculating step, the original caster angle θCAS is calculated based on the image data when the caster angle formed by the measuring object line with respect to the predetermined reference line constantly increases or decreases. In the comparing step, the original caster angle θCAS(n−1) in the previous measurement is compared with the original caster angle θCAS(n) in the current measurement. In the effective data judging step, the current original caster angle θCAS(n) is judged to be the effective caster angle θECAS when the previous original caster angle θCAS(n−1) is not equal to the current original caster angle θCAS(n) as a result of the comparison. Although the caster angle is calculated in a non-contact manner using the image data outputted by the CCD camera, the measuring accuracy in measuring the caster angle can be maintained at a desired level. Thus, with the effective caster angle data θECAS, the wheel alignment can be quickly measured with a desired accuracy.

In a preferred embodiment of the present invention the original caster angle calculating step comprises: a line extracting step of extracting the measuring object line based on the image data; and an inclination calculating step of calculating the inclination of the measuring object line extracted by the method of least squares.

According to this embodiment, in the line extracting step, the measuring object line is extracted based on the image data. In the inclination calculating step, the inclination of the extracted measuring object line is calculated by the method of least squares. Thus, the effective caster angle data θECAS can be calculated speedily and accurately.

In a preferred embodiment of the present invention the original caster angle calculating step comprises: a line extracting step of extracting the measuring object line based on the image data; and an inclination calculating step of calculating the inclination of the measuring object line extracted by the method of least squares.

According to this embodiment, in the line extracting step, the measuring object line is extracted based on the image data. In the inclination calculating step, the inclination of the extracted measuring object line is calculated by the method of least squares. Thus, the effective caster angle data θECAS can be calculated speedily and accurately.

In a preferred embodiment of the present invention the wheel alignment measuring method comprises: an image pick-up step of picking up an image of a caster angle measuring object line drawn on a wheel alignment measuring target plate attached to a vehicle; an original caster angle calculating step of calculating an original caster angle θCAS by quantizing the caster angle formed by the picked-up measuring object line with respect to a predetermined reference line; an effective data judging step of judging the original caster angle θCAS at the time of a change in value thereof to be effective caster angle θECAS; and a data comparing step of comparing the effective caster angle θECAS with measuring data of another dimension at substantially the same time that there is a change in the original caster angle θCAS.

According to this embodiment, in the image pick-up step, an image of the caster angel measuring object line drawn on the wheel alignment measuring target plate attached to the vehicle is picked up. In the original caster angle calculating step, the original caster angle θCAS is calculated by quantizing the caster angle formed by the picked-up measuring object line with respect to the predetermined reference line. In the effective data judging step, the original caster angle θCAS at the time of a change in value thereof is judged to be the effective caster angle θECAS. In the data comparing step, the effective caster angle θECAS is compared with the measuring data of another dimension at substantially the same time that there is a change in the original caster angle θCAS. Thus, various data in wheel alignment measurement can be compared with the caster angle data with a desired accuracy.

In a preferred embodiment of the present invention the wheel alignment measuring method comprises: an image pick-up step of picking up an image of a caster angle measuring object line drawn on a wheel alignment measuring target plate attached to a vehicle; an original caster angle calculating step of calculating an original caster angle when the caster angle formed by the picked-up measuring object line with respect to a predetermined reference line constantly increases or decreases; a comparing step of comparing an original caster angle θCAS(n−1) in the previous measurement with an original caster angle θCAS(n) in the current measurement; an effective data judging step of judging the current original caster angle θCAS(n) to be effective caster angle θECAS when the previous original caster angle θCAS(n−1) is not equal to the current original caster angle θCAS(n) as a result of the comparison; and a data comparing step of comparing the current original caster angle θCAS(n) with measuring data of another dimension measured at substantially the same time as the measurement of the current original caster angle θCAS(n).

According to this embodiment, in the image pick-up step, an image of the caster angle measuring object line drawn on the wheel alignment measuring target plate attached to the vehicle is picked up. In the original caster angle calculating step, the original caster angle is calculated when the caster angle formed by the picked-up measuring object line with respect to the predetermined reference line constantly increases or decreases. In the comparing step, the original caster angle θCAS(n−1) in the previous measurement is compared with the original caster angle θCAS(n) in the current measurement. In the effective data judging step, the current original caster angle θCAS(n) is judged to be the effective caster angle θECAS when the previous original caster angle θCAS(n−1) is not equal to the current original caster angle θCAS(n) as a result of the comparison. In the data comparing step, the current original caster angle θCAS(n) is compared with the measuring data of another dimension measured at substantially the same time as the measurement of the current original caster angle θCAS(n). Thus, various data in wheel alignment measurement can be compared with the caster angle data with a desired accuracy.

To achieve the fifth object, the present invention provides a measuring plate characterized by a measuring surface on which are drawn: a first reference mark whose center coordinates are situated at a predetermined origin; a plurality of second reference marks each having center coordinates situated at the intersections of first virtual lines and second virtual lines; and a plurality of correction lines which are in parallel with either the first virtual lines or the second virtual lines and situated at fixed intervals. The first virtual lines are in parallel with each other, and the second virtual lines are perpendicular to the first virtual lines and in parallel with each other. The predetermined origin corresponds to the center of the rotational axis of a wheel of a vehicle being measured.

According to this embodiment, the first reference mark, the second reference marks, and the correction lines are drawn on the measuring surface of the measuring plate. The center coordinates of the first reference mark are situated at the predetermined origin. The center coordinates of each second reference mark are situated at the intersection of a first virtual line and a second virtual line. The measuring plate is attached to the wheel of the vehicle so that the origin corresponds to the center of the rotational axis of the wheel. Any position on the picked-up image can be easily detected in the relative positional relationship with the center of the rotational axis of the wheel of the measured vehicle, and displacement (suspension properties or wheel alignment properties) of the rotational axis of the wheel can be measured at high speed in a large area of a three dimensional space in a constant and non-contact manner. Also, the position coordinates can be calculated with accuracy based on the second pick-up signal, regardless of the position of the measuring plate.

In a preferred embodiment of the measuring plate the first reference mark, the second reference marks, and the correction lines are in different colors from each other.

In this embodiment, the first reference mark, the second reference marks, and the correction lines are in different colors from each other. Thus, they are easily distinguishable in image processing of the picked-up image, and measurements can be taken speedily and accurately.

In a preferred embodiment of the measuring plate the first reference mark and the second reference marks are colored red, green, or blue.

According to this embodiment, the first reference mark and the second reference marks are colored red, green, or blue. By performing color separation in image processing, the reference marks can be easily and quickly distinguished without requiring complicated data processing.

In a preferred embodiment of the measuring plate the remaining area on the measuring surface, except for the first reference mark, the second reference marks, and the correction lines, is a base area which is colored black or white. The correction lines are colored black or white, whichever is different from the base area.

According to this embodiment, the base area is colored black or white, and the correction lines are black or white, whichever is different from the color of the base area. Thus, the correction lines can be easily distinguished by binary processing, and the image processing can be performed at high speed, which enables accurate wheel alignment measurement.

In a preferred embodiment of the measuring plate the first reference mark is painted in a different color from the color of a vehicle being measured.

According to this embodiment, the first reference mark is painted in a different color from the color of the vehicle, so that the color of the vehicle will not be mistaken for the first reference mark. Thus, accurate measurements can be taken.

In a preferred embodiment of the present invention the wheel alignment measuring device for measuring wheel alignment using the measuring plate comprises: a first image pick-up unit for outputting a first picked-up image signal by picking up an image of a first area including the first reference mark and the second reference marks on the measuring surface of the measuring plate; a second image pick-up unit for outputting a second picked-up image signal by picking up an image of a second area smaller than the first area and included in the first area, the second image pick-up unit having an optical axis situated in a position predetermined with respect to the optical axis of the first image pick-up unit; a selecting unit for selecting one of the second reference marks included in the second area based on the second picked-up image signal; a relative reference position calculating unit for calculating the position coordinates of the selected second reference mark as relative reference position coordinates after specifying the selected second reference mark within the first area based on the first picked-up image signal; and a position calculating unit for calculating origin reference position coordinates which are the position coordinates of the origin in a predetermined position within the second area based on the second picked-up image signal and the relative reference position coordinates.

According to this embodiment, the first image pick-up unit outputs the first picked-up image signal to the relative reference position calculating unit by picking up an image of the first area including the first reference mark and the second reference marks on the measuring surface of the measuring plate. The second image pick-up unit outputs the second picked-up image signal to the selecting unit and the position calculating unit by picking up an image of the second area smaller than the first area and included in the first area. The selecting unit selects one of the second reference marks included in the second area based on the second picked-up image signal. The relative reference position calculating unit specifies the selected second reference mark within the first area based on the first picked-up image signal, and calculates the position coordinates of the selected second reference mark as the relative reference position coordinates. The position calculating unit calculates the origin reference position coordinates which are the position coordinates of the origin in the predetermined position within the second area based on the second picked-up image signal and the relative reference position coordinates. Thus, the wheel alignment can be constantly and highly accurately measured in a large area in a three dimensional space in a non-contact manner.

In a preferred embodiment of the present invention the selecting unit selects a second reference mark which is the closest to the predetermined position in the second area.

According to this embodiment, the selecting unit selects a second reference mark which is the closest to the predetermined position in the second area. Thus, the original position reference position coordinates can be calculated with a smaller error, and the wheel alignment can be measured more accurately.

In a preferred embodiment of the present invention the wheel alignment measuring device further comprises a color separation unit which receives the first picked-up image signal and the second picked-up image signal, performs color separation, and outputs a first color separation picked-up image signal consisting of a first red picked-up image signal, a first green picked-up image signal, and a first blue picked-up image signal, and a second color separation picked-up image signal consisting of a second red picked-up image signal, a second green picked-up image signal, and a second blue picked-up image signal. The selecting unit specifies the selected second reference mark based on the second color separation picked-up image signal, and the relative reference position calculating unit calculates the relative reference position coordinates based on the first color separation picked-up image signal.

According to this embodiment, the color separation unit receives the first picked-up image signal and the second picked-up image signal, performs color separation, and then outputs the first color separation picked-up image signal consisting of the first red picked-up image signal, the first green picked-up image signal, and the first blue picked-up image signal, and the second red picked-up image signal, the second green picked-up image signal, and the second blue picked-up image signal. The selecting unit specifies the selected second reference mark based on the second color separation picked-up image signal. The relative reference position calculating unit calculates the relative reference position coordinates based on the first color separation picked-up image signal. Thus, the image processing can be simplified, and the wheel alignment can be measured at high speed.

In a preferred embodiment of the present invention the wheel alignment measuring device further comprises a color separation unit which receives the first picked-up image signal and the second picked-up image signal, performs color separation, and outputs a first color separation picked-up image signal consisting of a first red picked-up image signal, a first green picked-up image signal, and a first blue picked-up image signal, and a second color separation picked-up image signal consisting of a second red picked-up image signal, a second green picked-up image signal, and a second blue picked-up image signal. The selecting unit specifies the selected second reference mark based on the second color separation picked-up image signal, and the relative reference position calculating unit calculates the relative reference position coordinates based on the first color separation picked-up image signal.

According to this embodiment, the color separation unit receives the first picked-up image signal and the second picked-up image signal, and performs color separation. The color separation unit then outputs the first color separation picked-up image signal consisting of the first red picked-up image signal, the first green picked-up image signal, and the first blue picked-up image signal to the relative reference position calculating unit, and the second color separation picked-up image signal consisting of the second red picked-up image signal, the second green picked-up image signal, and the second blue picked-up image signal to the selecting unit.

The selecting unit specifies the selected second reference mark based on the second color separation picked-up image signal, and the relative reference position calculating unit calculates the relative reference position coordinates based on the first color separation picked-up image signal.

In a preferred embodiment of the present invention the relative reference position calculating unit comprises a center position calculating unit which calculates the center position coordinates of the selected second reference mark as the relative reference position coordinates based on the second color separation picked-up image signal. The position calculating unit comprises: a relative position coordinate calculating unit for calculating the relative position coordinates of the predetermined position relative to the relative reference position coordinates; and an origin reference position coordinate calculating unit for calculating the origin position reference position coordinates by adding the relative position coordinates to the center position coordinates of the selected second reference mark.

According to this embodiment, the center position calculating unit of the relative reference position calculating unit calculates the center position coordinates of the selected second reference mark as the relative reference position coordinates based on the second color separation picked-up image signal. The relative position coordinate calculating unit calculates the relative position coordinates of the predetermined position relative to the relative reference position coordinates. The origin reference position coordinate calculating unit calculates the origin position reference position coordinates by adding the relative position coordinates to the center position coordinates of the selected second reference mark. Thus, the center position of the selected second reference mark, i.e., the wheel alignment of the vehicle, can be quickly measured with a high accuracy based on the second picked-up image.

In a preferred embodiment of the present invention the wheel alignment measuring device further comprises: a plurality of distance sensors which measure the distances from different positions on the measuring surface of the measuring plate, and outputs measuring signals; and a distance calculating unit for calculating the distance from the measuring surface and the camber angle based on the measuring signals from the plurality of distance sensors.

According to this embodiment, the distance calculating unit calculates the distance from the measuring surface based on the measuring signals outputted from the plurality of the distance sensors that measure the distances from different positions on the measuring surface of the measuring plate. Thus, the distance from the measuring surface and the camber angle can be calculated speedily and accurately.

In a preferred embodiment of the present invention the wheel alignment measuring method comprises: a first image picked-up step of picking up an image of a first area containing the first reference mark and the second reference marks on the measuring surface of the measuring plate; a second image pick-up step of picking up an image of a second area smaller than the first area and included in the second area; a selecting step of selecting one of the second reference marks included within the second area as a selected second reference mark; a relative reference position calculating step of calculating relative reference position coordinates which are the position coordinates of the selected second reference mark specified in the first area; and a position calculating step of calculating origin position reference position coordinates which are the position coordinates of the origin of a predetermined position in the second area, based on the relative reference position coordinates.

According to this embodiment, in the first image pick-up step, an image of the first area containing the first reference mark and the second reference marks on the measuring surface of the measuring plate is picked up. In the second image pick-up step, an image of the second area smaller than the first area and included in the second area is picked up. In the selecting step, one of the second reference marks included within the second area is selected as the selected second reference mark. In the relative reference position calculating step, the relative reference position coordinates, which are the position coordinates of the selected second reference mark specified in the first area, are calculated. In the position calculating step, the origin position reference position coordinates, which are the position coordinates of the origin of the predetermined position in the second area, are calculated based on the relative reference position coordinates. Thus, the position of any point on the picked-up image can be detected in relation with the center of the rotational axis of the wheel of the vehicle being measured, and displacement (suspension properties or wheel alignment properties) of the rotational axis of the wheel is constantly measured at speed in a large area in a three-dimensional space in a non-contact manner. Also, the position coordinates can be calculated with accuracy based on the second picked-up image signal, regardless of the position of the measuring plate.

In a preferred embodiment of the present invention the selected second reference mark is the second reference mark closest to the predetermined position among the second reference marks in the second area in the selecting step.

According to this embodiment, in the selecting step, the second reference mark closest to the predetermined position is selected as the selected second reference mark among the second reference marks in the second area. Thus, the origin position reference position coordinates can be calculated with a smaller error.

In a preferred embodiment of the present invention the wheel alignment measuring device further comprises a color separation step of performing color separation on the images picked up in the first image pick-up step and the second image pick-up step so as to generate a first color separation picked-up image and a second color separation picked-up image. In the selecting step, the selected second reference mark is specified based on the second color separation picked-up image. In the relative reference position calculating step, the relative reference position coordinates are calculated based on the first color separation picked-up image.

According to this embodiment, in the color separation step, color separation is performed on the images picked up in the first image pick-up step and the second image pick-up step so as to generate the first color separation picked-up image and the second color separation picked-up image. In the selecting step, the selected second reference mark is specified based on the second color separation picked-up image. In the relative reference position calculating step, the relative reference position coordinates are calculated based on the first color separation picked-up image. Thus, the image processing can be simplified, and the wheel alignment can be easily and quickly measured.

In a preferred embodiment of the present invention the relative reference position calculating step comprises a center position calculating step of calculating the relative reference position coordinates, which are the center position coordinates of the selected second reference mark, based on the second color separation picked-up image. Also, the position calculating step comprises: a relative position coordinate calculating step of calculating the relative position coordinates of the predetermined position with respect to the relative reference position coordinates; and an origin reference position coordinate calculating step of calculating the origin position reference position coordinates by adding the relative position coordinates to the center position coordinates of the selected second reference mark.

According to this embodiment, in the center position calculating step, the relative reference position coordinates, which are the center position coordinates of the selected second reference mark, are calculated based on the second color separation picked-up image. In the relative position coordinate calculating step, the relative position coordinates of the predetermined position with respect to the relative reference position coordinates are calculated. In the origin reference position coordinate calculating step, the origin position reference position coordinates are calculated by adding the relative position coordinates to the center position coordinates of the selected second reference mark. Thus, the center position of the selected second reference mark can be detected with a high accuracy based on the second picked-up image signal, and the wheel alignment of the vehicle can be speedily and highly accurately measured.

In a preferred embodiment of the present invention the wheel alignment measuring method further comprises: a distance measuring step of measuring the distances from different positions on the measuring surface of the measuring plate; and a distance calculating step of calculating the distance from the measuring surface and the camber angle based on the distances measured in the distance measuring step.

According to this embodiment, in the distance measuring step, the distances from different positions on the measuring surface of the measuring plate are measured. In the distance calculating step, the distance from the measuring surface and the camber angle are calculated based on the distances measured in the distance measuring step.

To achieve the sixth object, a preferred embodiment of the present invention provides a measuring plate characterized by having a measuring surface on which a plurality of concentric circles having a predetermined origin and grid scale lines are drawn, and being attached to a wheel of a vehicle being measured so that the origin corresponds to the center of the rotational axis of the wheel.

According to this embodiment, a plurality of concentric circles having the predetermined origin and grid scale lines are drawn on the measuring surface, and the position of the origin corresponds to the center of the rotational axis of the vehicle. A concentric circle whose image is picked up with the measuring plate is specified based on its curvature. The measuring object position relative to the rotational axis of the wheel can be speedily and accurately calculated based on the positional relationship between the concentric circle and the grid scale lines. Thus, the wheel alignment can be speedily and accurately measured, and the reproducibility and reliability of the measurement can be improved.

In a preferred embodiment of the present invention the scale lines comprise first scale lines in parallel with each other, and second scale lines perpendicular to the first scale lines and in parallel with each other, and the concentric circles and the first and second scale lines are drawn in different colors.

According to this embodiment, the concentric circles, the first scale lines, and the second scale lines are drawn in different colors, so that each of them can be easily distinguished, and that the measuring object position can be accurately detected.

In a preferred embodiment of the present invention the concentric circles and the first and second scale lines are colored red, green, or blue.

According to this embodiment, the concentric circles and the first and second scale lines are colored red, green, or blue, and color separation by three primary colors is performed to distinguish them. Thus, the positions can be speedily and accurately measured, and the wheel alignment can also be speedily and accurately measured.

In a preferred embodiment of the present invention the wheel alignment measuring device comprises: an image pick-up unit for picking up an image of the measuring surface so that at least a part of at least one of the concentric circles and at least a part of the scale lines are included in the picked-up image; a judging unit for judging which concentric circle is included in the image picked up by the image pick-up unit based on the curvature of the concentric circle in the picked-up image; a scale line specifying unit for specifying the scale lines included in the picked-up image based on the judgrnent made by the judging unit; and an operation unit for calculating the position on the measuring plate corresponding to a measuring object position, based on the positional relationship between the specified scale lines and the measuring object position in the image picked up by the image pick-up unit.

According to this embodiment, the image pick-up unit picks up an image of the measuring surface at least a part of at least one of the concentric circles and at least a part of the scale lines are included in the picked-up image. The judging unit judges which concentric circle is included in the image picked up by the image pick-up unit based on the curvature of the concentric circle in the picked-up image. The scale line specifying unit specifies the scale lines included in the picked-up image based on the judgment made by the judging unit. The operation unit calculates the position of the measuring plate corresponding to the measuring object position, based on the positional relationship between the specified scale lines and the measuring object position in the image picked up by the image pick-up unit. Thus, the position on the measuring plate corresponding to the measuring object position can be accurately calculated, and wheel alignment measurements of high reproducibility and reliability can be accurately taken.

In a preferred embodiment of the present invention the judging unit comprises: a storing unit for storing the curvatures of the concentric circles in advance; a concentric circle extracting unit for extracting a concentric circle contained in the picked-up image based on output signals from the image pick-up unit; a curvature calculating unit for calculating the curvature of the extracted concentric circle; and a concentric circle specifying unit for specifying the concentric circle by comparing the curvature obtained by the curvature calculating unit with the curvatures stored in the storing unit.

According to this embodiment, the storing unit stores the curvatures of the concentric circles, and the concentric circle extracting unit extracts the concentric circle included in the picked-up image based on the curvature of the concentric circle and the output signal of the image pick-up unit. The curvature calculating unit calculates the curvature of the extracted concentric circle, and the concentric circle specifying unit specifies the concentric circle by comparing the curvature obtained by the curvature calculating unit with the curvatures stored in the storing unit. Thus, the concentric circle can be surely and accurately specified, and the measuring object position can be accurately measured.

In a preferred embodiment of the present invention the wheel alignment measuring device comprises: an image pick-up unit for outputting picked-up image data by picking up an image of the measuring surface so that at least a part of at least one of the concentric circles and at least a part of the scale lines are included in the picked-up image; a color separation unit for outputting color separation picked-up image data by performing color separation on the picked-up image data; a judging unit for judging which concentric circle is included in the image picked up by the image pick-up unit based on the color separation picked-up image data and the curvature of the concentric circle in the picked-up image; a scale line specifying unit for specifying the scale lines included in the picked-up image based on the judgment made by the judging unit and the color separation picked-up image data; and an operation unit for calculating the position on the measuring plate corresponding to a measuring object position, based on the positional relationship between the specified scale lines and the measuring object position in the image picked up by the image pick-up unit.

According to this embodiment, the image pick-up unit picks up an image of the measuring surface so that at least a part of at least one of the concentric circles and at least a part of the scale lines are included in the picked-up image, and then outputs picked-up image data to the color separation unit. The color separation unit performs color separation on the picked-up image data, and outputs color separation picked-up image data to the judging unit. The judging unit judges which concentric circle is included in the image picked up by the image pick-up unit based on the color separation picked-up image data and the curvature of the concentric circle in the picked-up image. The scale line specifying unit specifies the scale lines included in the picked-up image based on the judgment made by the judging unit and the color separation picked-up image data. The operation unit calculates the position on the measuring plate corresponding to the measuring object position based on the positional relationship between the specified scale lines and the measuring object position in the image picked up by the image pick-up unit. Thus, the position on the measuring plate corresponding to the measuring object position can be speedily and accurately calculated, and as a result, accurate wheel alignment measurements of high reproducibility and reliability can be accurately taken.

In a preferred embodiment of the present invention the judging unit comprises: a storing unit for storing the curvatures of the concentric circles in advance; a concentric circle extracting unit for extracting a concentric circle included in the picked-up image based on the color separation picked-up image data; a curvature calculating unit for calculating the curvature of the extracted concentric circle; and a concentric circle specifying unit for specifying the concentric circle by comparing the curvature obtained by the curvature calculating unit with the curvatures stored in the storing unit.

According to this embodiment, the storing unit stores the curvatures of the concentric circles in advance, and the concentric extracting unit extracts the concentric circle included in the picked-up image based on the color separation picked-up image data The curvature calculating unit calculates the curvature of the extracted concentric circle, and the concentric circle specifying unit specifies the concentric circle by comparing the curvature obtained by the curvature calculating unit with the curvatures stored in the storing unit. Thus, the concentric circle can be specified speedily and accurately.

In a preferred embodiment of the present invention the wheel alignment measuring device further comprises a spin angle calculating unit for calculating a spin angle by determining the inclination of the scale lines included in the picked-up image with respect to a predetermined reference position.

According to this embodiment, the spin angle calculating unit calculates a spin angle by determining the inclination of the scale lines included in the picked-up image with respect to the predetermined reference position. Thus, the spin angle can be speedily and accurately calculated.

In a preferred embodiment of the present invention the wheel alignment measuring method comprises: an image pick-up step of picking up an image of the measuring surface so that at least a part of at least one concentric circles and at least a part of the scale lines are included in the picked-up image; a judging unit of judging which concentric circle is included in the picked-up image based on the curvature of the concentric circle included in the picked-up image; a scale line specifying step of specifying the scale lines included in the picked-up image based on the judgment made in the judging step; and an operation step of calculating the position on the measuring plate corresponding to a measuring object position, based on the positional relationship between the specified scale lines and the measuring object position in the picked-up image.

According to this embodiment, in the image pick-up step, an image of the measuring surface is picked up so that at least a part of at least one concentric circles and at least a part of the scale lines are included in the picked-up image. In the judging step, which concentric circle is included in the picked-up image is judged based on the curvature of the concentric circle included in the picked-up image. In the scale line specifying step, the scale lines included in the picked-up image are specified based on the judgment made in the judging step. In the operation step, the position on the measuring plate corresponding to the measuring object position is calculated based on the positional relationship between the specified scale lines and the measuring object position in the picked-up image. Thus, the position on the measuring plate corresponding to the measuring object position can be speedily and accurately detected. As a result, the measuring time required for wheel alignment measurement can be shortened, which improves the measuring efficiency and the reliability in measurement.

In a preferred embodiment of the present invention the judging unit comprises: a concentric circle extracting step of extracting a concentric circle included in the picked-up image based on the picked-up image data; a curvature calculating step of calculating the curvature of the extracted concentric circle; and a concentric specifying step of specifying the concentric circle by comparing the curvature obtained in the curvature calculating step with the curvatures stored in advance.

According to this embodiment, in the concentric circle extracting step, the concentric circle included in the picked-up image is extracted based on the picked-up image data. In the curvature calculating step, the curvature of the extracted concentric circle is calculated. In the concentric circle specifying step, the concentric circle is specified by comparing the curvature obtained in the curvature calculating step with the curvatures stored in advance. Thus, the concentric circle included in the picked-up image can be surely specified, and the position can be accurately specified. As a result, the wheel alignment can be accurately measured.

In a preferred embodiment of the present invention the wheel alignment measuring method comprises: an image pick-up step of generating picked-up image data by picking up an image of the measuring surface so that at least a part of at least one of the concentric circles and at least a part of the scale lines are included in the picked-up image; a color separation step of generating color separation picked-up image data by performing color separation on the picked-up image data; a judging step of judging which concentric circle is included in the image picked up in the image pick-up step based on the color separation picked-up image data and the curvature of the concentric circle in the picked-up image; a scale line specifying step of specifying the scale lines included in the picked-up image based on the judgment made in the judging step and the color separation picked-up image data; and an operation step of calculating the position on the measuring plate corresponding to a measuring object position, based on the relationship between the specified scale lines and the measuring object position in the image picked up in the image pick-up step.

According to this embodiment, in the image pick-up step, an image of the measuring surface is picked up so that at least a part of at least one of the concentric circles and at least a part of the scale lines are included in the picked-up image, and picked-up image data are then generated. In the color separation step, color separation is performed on the picked-up image data so as to generate color separation picked-up image data. In the judging step, which concentric circle is included in the image picked up by the image pick-up unit is judged based on the color separation picked-up image data and the curvature of the concentric circle in the picked-up image. In the scale line specifying step, the scale lines included in the picked-up image are specified based on the judgment made in the judging step and the color separation picked-up image data. In the operation step, the position on the measuring plate corresponding to the measuring object position is calculated based on the relationship between the specified scale lines and the measuring object position in the image picked up in the image pick-up step. Thus, the position on the measuring plate corresponding to the measuring object position can be speedily and accurately calculated through image processing. This improves the measuring efficiency and reliability in the wheel alignment measurement.

In a preferred embodiment of the present invention the wheel alignment measuring method further comprises a spin angle calculating step of calculating a spin angle by determining the inclination of the scale lines in the picked-up image with respect to a predetermined reference position.

According to this embodiment, in the spin angle calculating step, a spin angle is calculated by determining the inclination of the scale lines in the picked-up image with respect to the predetermined reference position. Thus, the spin angle can be speedily and accurately calculated in a simple manner.

BRIEF DESCRIPTION OF THE DRAWINGS

FIGS. 2A and 2B illustrate the measuring plate;

FIG. 11 is a block diagram illustrating the structure of another image pick-up unit;

FIG. 16 illustrates the operation of the preprocessing;

FIGS. 21A and 21B illustrate the scanning of the first circular mark;

FIG. 57 illustrates the inclination detection of the caster angle detecting line;

FIG. 58 illustrates the smallest caster angle;

FIGS. 59A to 59C illustrate the relationship between the variation of the caster angle data and the data of another dimension;

FIG. 60 illustrates the relationship between the effective caster angle data and the data of another dimension;

DETAILED DESCRIPTION OF THE INVENTION

Figure 1:
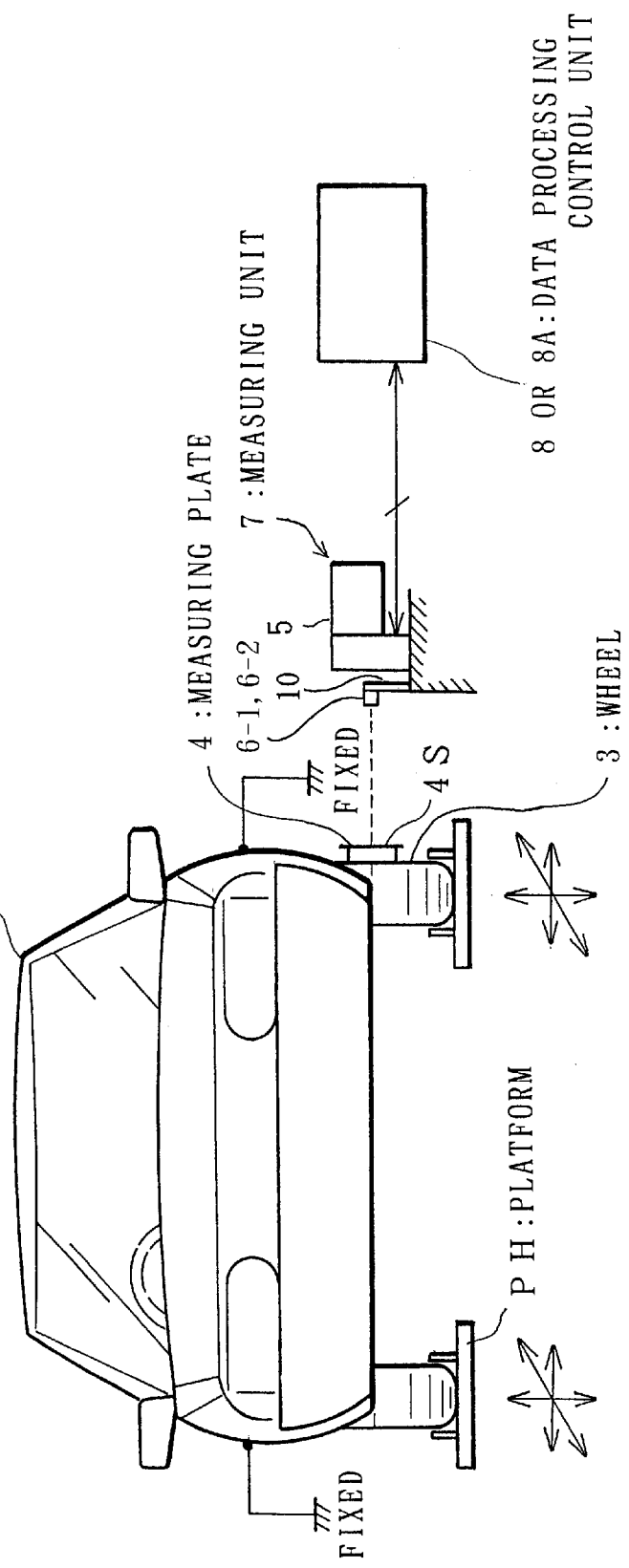
FIG. 1 is a block diagram illustrating the structure of a wheel alignment measuring device.

The following is a description of the preferred embodiments of the present invention, with reference to the accompanying drawings.

A: First Embodiment

Referring to the drawings, a first preferred embodiment of the present invention is as follows.

Structure of the Alignment Measuring Device

FIG. 1 is a block diagram outlining the structure of the wheel alignment measuring device.

The wheel alignment measuring device 1 comprises: a measuring plate 4 to be attached to a wheel 3 of a measured vehicle 2; a measuring unit 7 which picks up the image of the measuring surface 4S of the measuring plate 4 with an image pick-up unit 5 equipped with two CCD cameras capable of picking up color images, and measures the distance from the measuring surface 4S of the measuring plate 4 with two laser displacement gauges 6-1 and 6-2; and a data processing control unit 8 which performs alignment operations based on output signals from the measuring unit 7, and controls the measuring unit 7.

Structure of the Measuring Plate

FIGS. 2A and 2B show the measuring plate. FIG. 2A is a front view of the measuring plate, and FIG. 2B is a side view of the measuring plate.

The measuring surface 4S of the measuring plate 4 is flat, and as shown in FIGS. 2A and 2B, it consists of a measuring mark area MRK on which various measuring marks are drawn, and a distance measuring area MLA which extends in the longitudinal direction of the measured vehicle 2 with respect to the origin O of the measuring mark area MRK, and is optically uniform (i.e., uniform in reflectance) to measure the distance from the measuring surface 4S. Measuring light emitted from the laser displacement gauges 6-1 and 6-2 irradiates the distance measuring area MLA.

The measuring mark area MRK consists of: a base BB which is colored black; a first circular mark MC1 which is colored red and serves as a reference mark with the origin O of the measuring surface 4S at its center; a plurality of second circular marks MC2 which are colored blue; and a plurality of correction lines CL which are colored white. The plurality of second circular marks MC2 have their center coordinates at the intersections of first parallel virtual lines (only two first virtual lines VL11 and VL12 are shown in FIG. 2A) and second parallel virtual lines (only two second virtual lines VL21 and VL22 are shown in FIG. 2A). The plurality of correction lines CL are in parallel with either the first virtual lines or the second virtual lines (they are in parallel with the second virtual lines VL21 and VL22 in FIG. 2A), and their interval distances Δd are uniform.

As the circular marks MC1 and MC2, and the correction lines CL serve as measuring scales, they should be drawn with a certain precision so that desired accuracy can be achieved in measurement.

Figure 3:
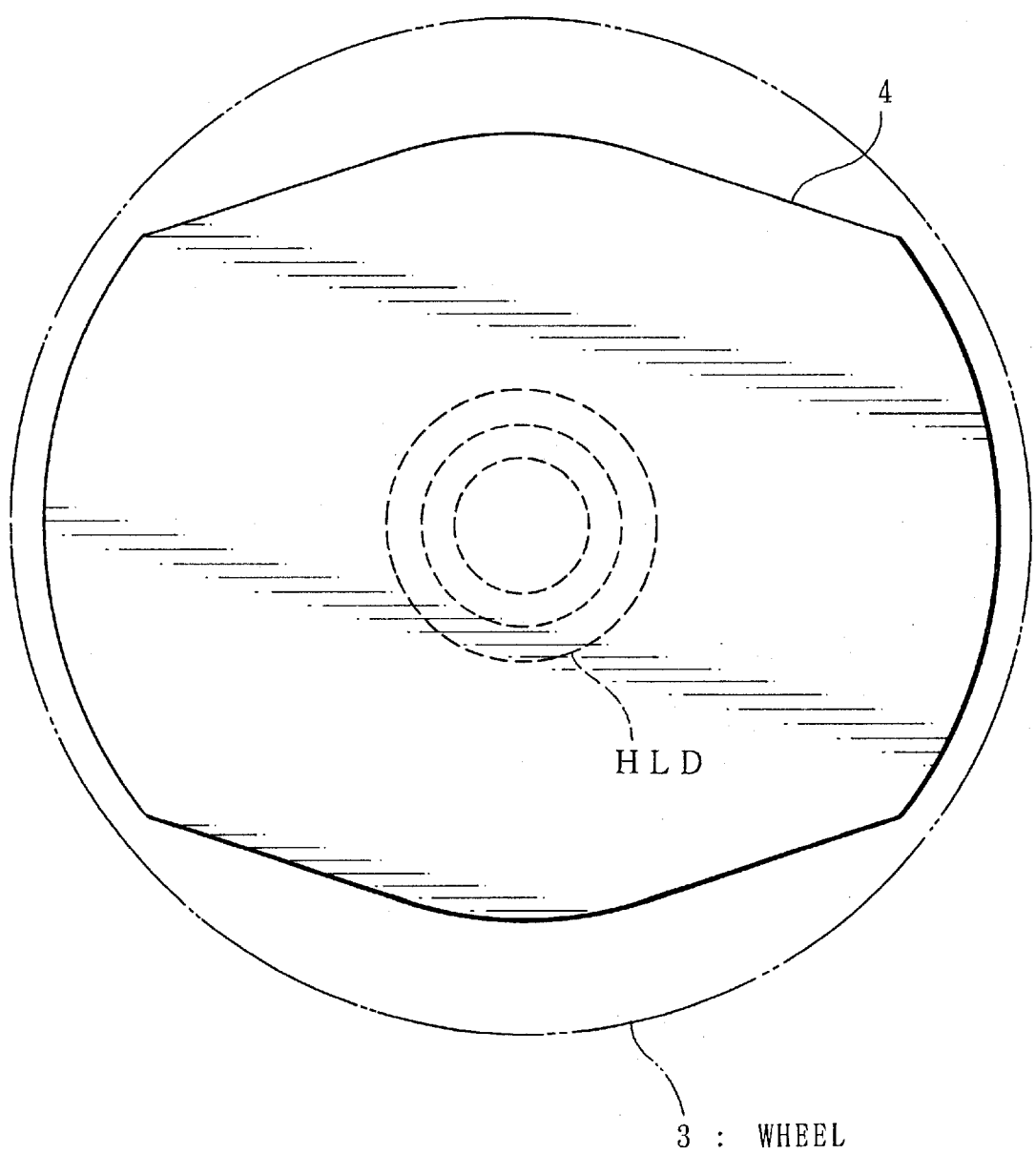
FIG. 3 is a perspective front view of the measuring plate.

On the back of the measuring plate, as shown in FIG. 2B and the perspective front view of FIG. 3, a bracket HLD for attaching the measuring plate 4 to the wheel 3 of the measured vehicle 2 is disposed.

Figure 4:
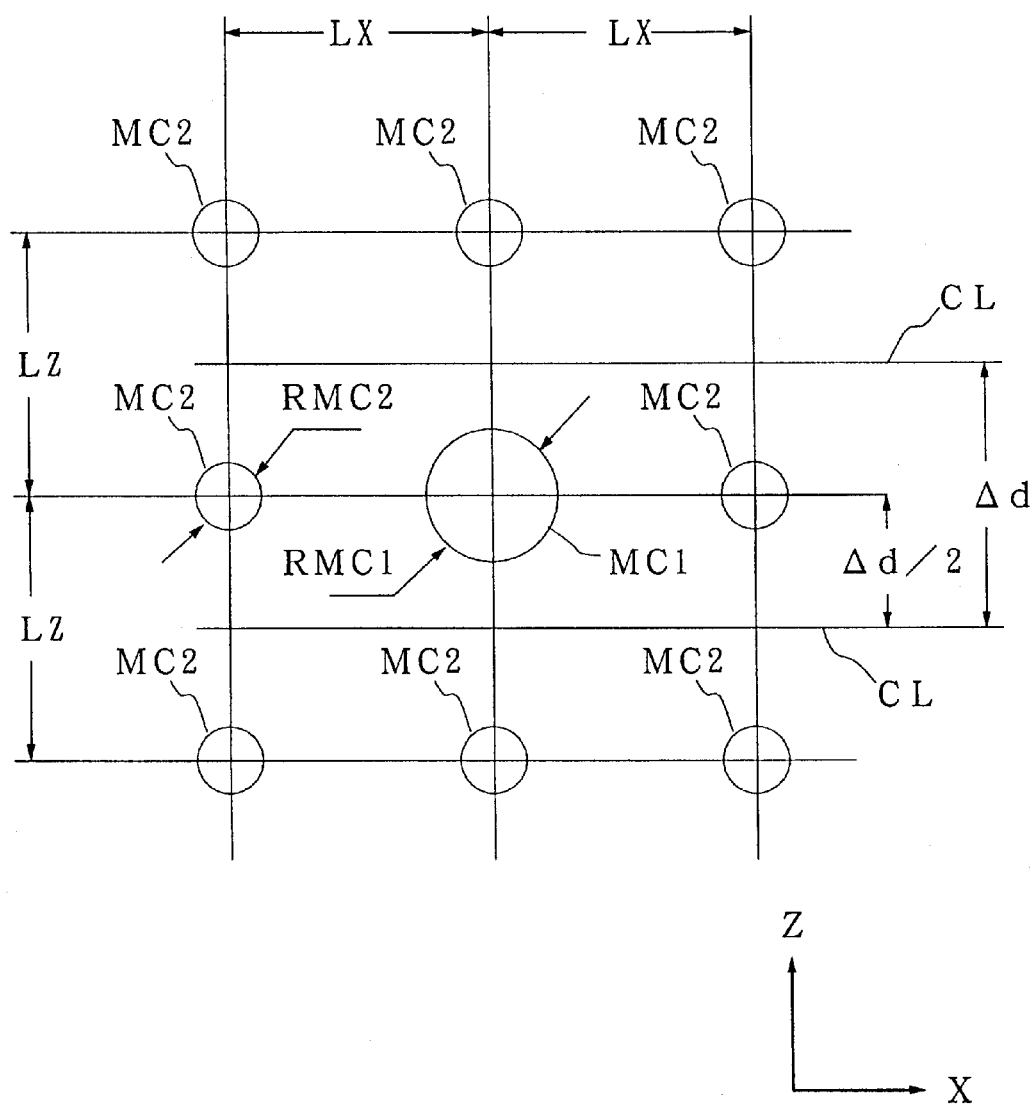
FIG. 4 illustrates the measuring mark area of the measuring plate.

FIG. 4 illustrates the measuring mark area MRK of the measuring plate 4 in detail.

In the measuring mark area MRK, a distance Lx is invariably maintained between the center of the first circular mark MC1 and the center of the nearest second circular mark MC2 in the direction of the arrow X, and between the center of one second circular mark MC2 and the center of the nearest second circular mark MC2 in the direction of the arrow X.

Also, a distance Lz is invariably maintained between the center of the first circular mark MC1 and the center of the nearest second circular mark MC2 in the direction of the arrow Z, and between the center of one second circular mark MC2 and the center of the nearest second circular mark MC2 in the direction of the arrow Z.

Here, the distances Lx and Lz are not necessarily equal. However, for ease of arithmetic operations, it is preferable to set them equal (Lx=Lz).

A distance Δd is maintained between one correction line CL and the nearest correction line CL. Here, for ease of image processing, the distance Δd is preferably equal to the distance Lz (Δd=Lz), and the distance between one correction line CL and the center of the nearest second circular mark MC2 is preferably set at Δd/2(=Lz/2), so as to prevent the correction lines CL from overlapping with the first circular mark MC1 and the second circular marks MC2.

The first circular mark MC1 is used in roughness measurement, while the second circular marks MC2 are used in precision measurement. In view of this, the relationship between the diameter RMC1 of the first circular mark MC1 and the diameter RMC2 of each second circular mark MC2 is preferably defined as $$RMC1 \approx 2 \times RMC2$$

wherein the size of the second circular mark MC2 is preferably 1 cm.

If the ultimate target precision is hundreds of microns, the dimensional tolerance is preferably smaller than tens of microns.

Although the first circular mark MC1 is red, and the second circular makes MC2 are blue in the above explanation, any of the three primary colors, red, green, and blue, can be used in the processes described later.

To prevent errors in data processing, the first circular mark MC1 preferably has a color which is not included in the picked-up image of the measured vehicle 2. More specifically, if the measured vehicle 2 is red, the first circular mark MC1 should be green, for instance.

Likewise, although the base BB is black, and the correction lines CL are white, the colors may be other way around in the image processing described later.

In this embodiment, the first virtual lines VL11 and VL12 are perpendicular to the second virtual lines VL21 and VL22. However, they may cross each other at a predetermined angle, though this makes the arithmetic operations more complicated.

Structure of the Measuring Unit

Figure 5:
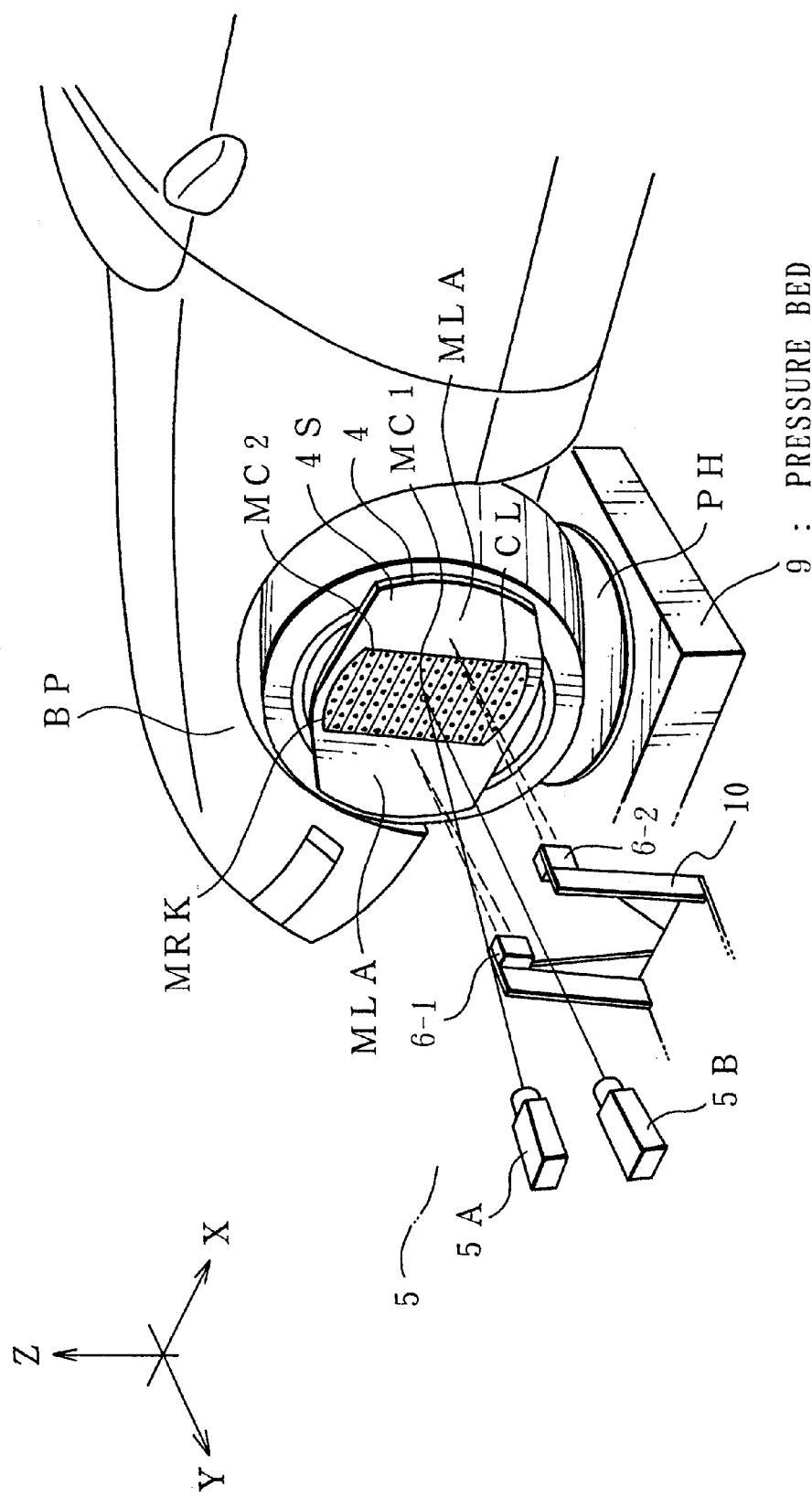
FIG. 5 is a perspective view illustrating the arrangement of the measuring unit.
Figure 6:
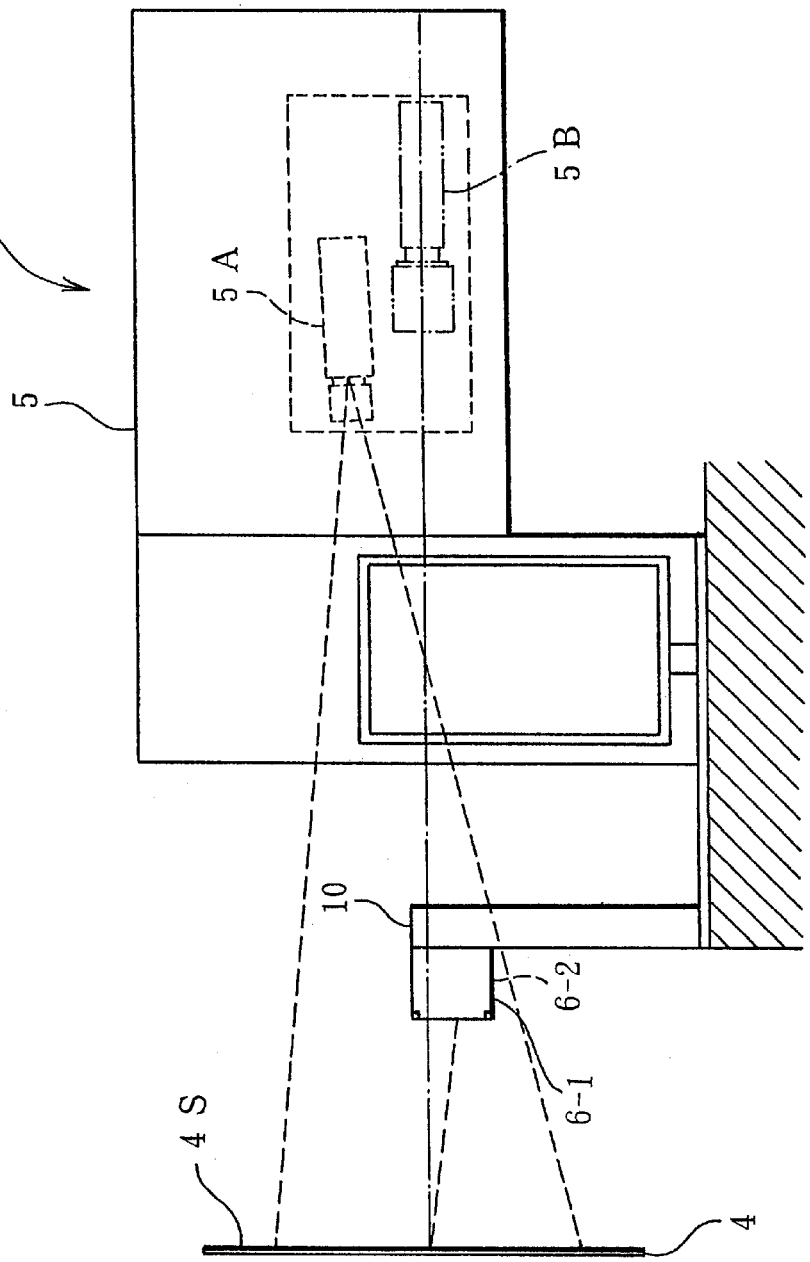
FIG. 6 is a side view of the measuring unit.
Figure 7:
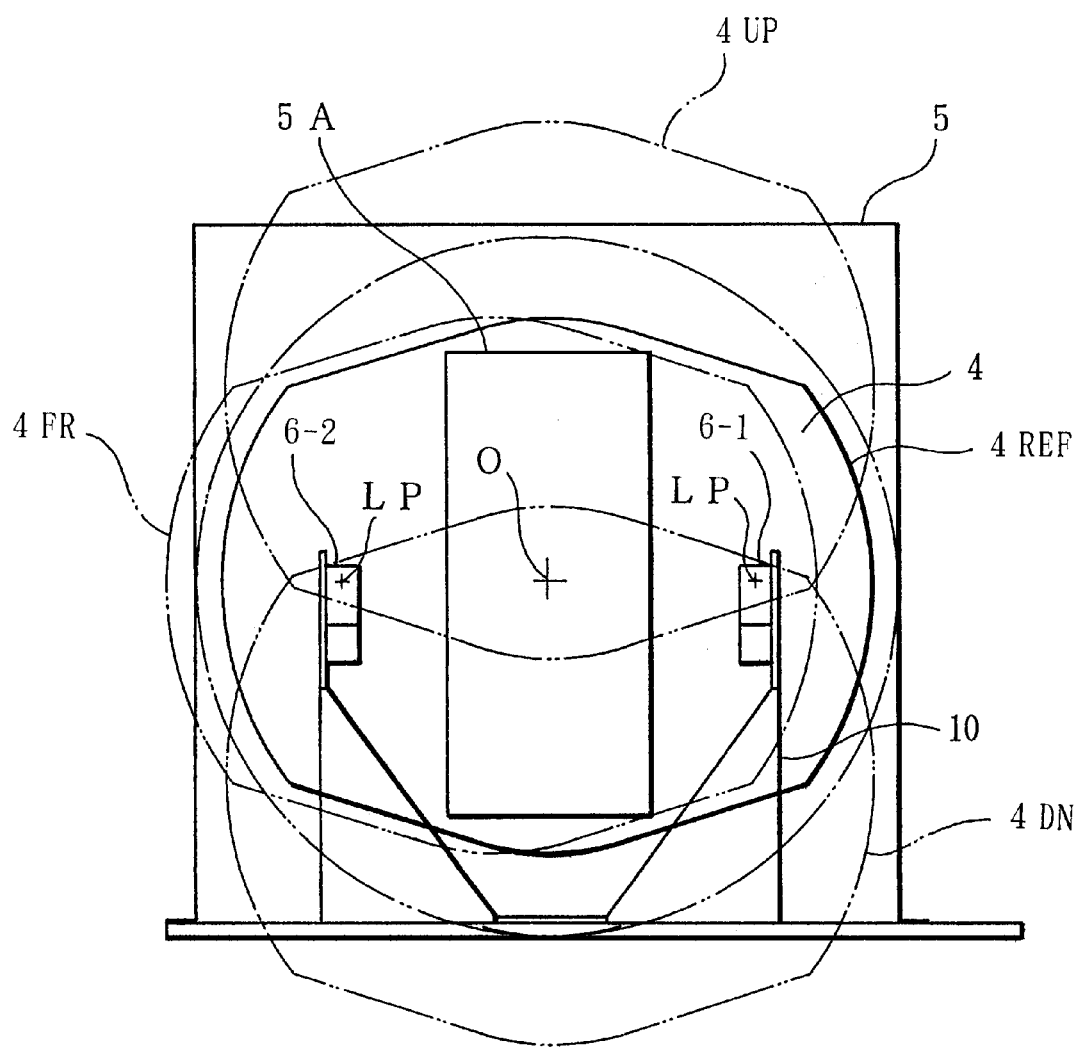
FIG. 7 is a front view of the measuring unit.

FIG. 5 is a partial perspective view of the measuring unit, FIG. 6 is a side view of the measuring unit, and FIG. 7 is a front view of the measuring unit.

The measuring unit 7 comprises: a holding plate 10 which is rectangular and holds the two laser displacement gauges 6-1 and 6-2; and the image pick-up unit 5 which is provided on the rear side of the measuring plate 10 and picks up images of the measuring plate 4 through an opening 5A (shown in FIG. 7).

With the measuring plate 4 within the measurable area, the holding plate 10 holds the laser irradiation surface LP of the laser displacement gauges 6-1 and 6-2 in such a position that measuring light can irradiate the distance measuring area MLA of the measuring plate 4, even if the measuring plate 4 is in a measuring plate position 4UP which is the uppermost position for the measuring plate 4, in a measuring plate position 4DN which is the lowermost position for the measuring plate 4, in a measuring plate position 4FR which is the furthest front position for the measuring plate 4, or in a measuring plate position (not shown) which is the furthest rear position for the measuring plate 4.

Structure of the Data Processing Control Unit

Figure 8:
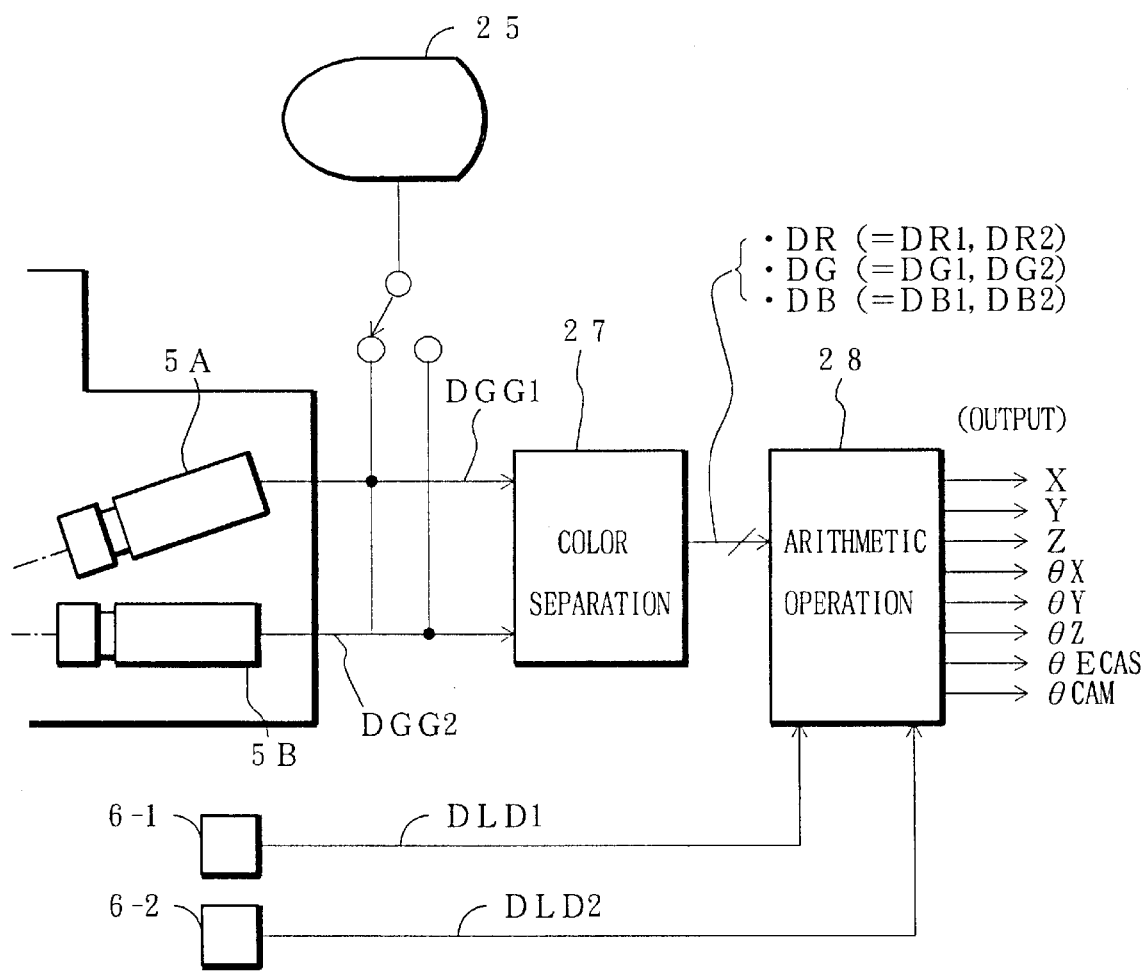
FIG. 8 is a block diagram illustrating the structure of the data processing control unit.

FIG. 8 is a block diagram illustrating the structure of the data processing control unit 8.

The data processing control unit 8 comprises a display 25, a color separating circuit 27, and an arithmetic operation unit 28. The display 25 displays an image based on first picked-up image data DGG1 outputted from a color CCD camera 5A (mentioned later) or second picked-up image data DGG2 outputted from a color CCD camera 5B. The color separation circuit 27 performs color separation based on the first picked-up image data DGG1 and the second picked-up image data DGG2 outputted from the image pick-up unit 5, and outputs red picked-up image data DR corresponding to red, green picked-up image data DG corresponding to green, and blue picked-up image data DB corresponding to blue. The arithmetic operation unit 28 outputs: X-coordinate data X on the measuring surface 4S of the measuring plate 4 in a predetermined position in a high-resolution picked-up image (for instance, the center of the picked-up image); Y-coordinate data Y of the measuring surface 4S; Z-coordinate data Z on the measuring surface 4S of the measuring plate 4 in a predetermined position in a high-solution picked-up image; an inclination θx with respect to the X-axis on the measuring surface 4S; an inclination θy with respect to the Y-axis on the measuring surface 4S; and an inclination θz with respect to the Z-axis on the measuring surface 4S (these inclination data are used as a basis in spin angle data DSP operations), based on output signals DLD1 and DLD2 from the two laser displacement gauges 6-1 and 6-2, the red picked-up image data DR, the green picked-up image data DG, and the blue picked-up image data DB.

Here, the red picked-up image data DR include first red picked-up image data DR1 corresponding to the first picked-up image data DGG1 and second red picked-up image data DR2 corresponding to the second picked-up image data DGG2; the green picked-up image data DG include first green picked-up image data DG1 corresponding to the first picked-up image data DGG1 and second green picked-up image data DG2 corresponding to the second picked-up image data DGG2; and the blue picked-up image data DB include first blue picked-up image data DB1 corresponding to the first picked-up image data DGG1 and second blue picked-up image data DB2 corresponding to the second picked-up image data DGG2.

Structure of the Image Pick-up Unit

Figure 9:
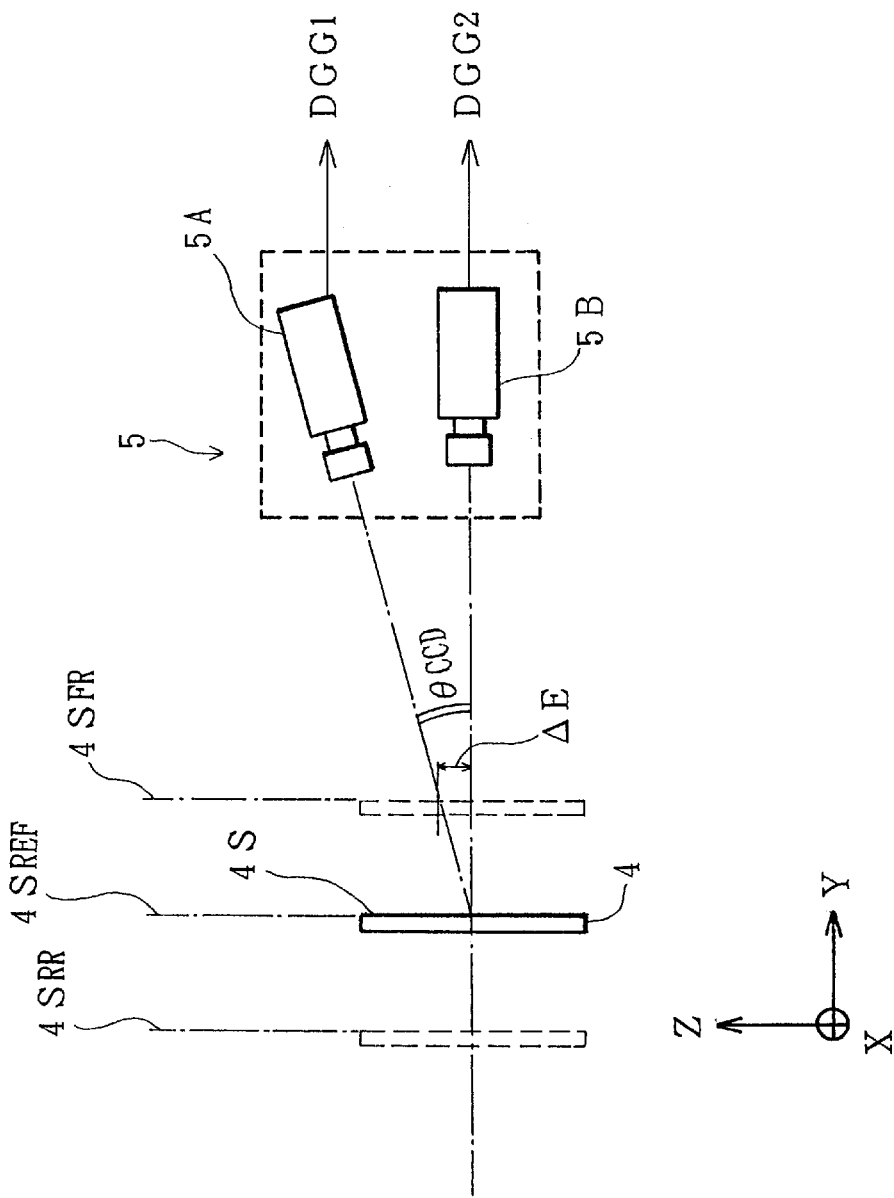
FIG. 9 is a block diagram of the structure of the image pick-up unit.

FIG. 9 shows the structure of the image pick-up unit.

The image pick-up unit 5 comprises: a low-resolution color CCD camera 5A which has an optical axis inclined at a predetermined angle θCCD of from the optical axis of a color CCD camera 5B (described later), has a visual field AR$_A$ (shown in FIG. 10) on the measuring surface 4S of the measuring plate 4, and outputs the first picked-up image data DGG1; and a high-resolution color CCD camera 5B which has an optical axis perpendicular to the measuring surface 4S of the measuring plate 4 in the initial state, has a visual field AR$_B$ (shown in FIG. 10) on the measuring surface 4S of the measuring plate 4, and outputs the second picked-up image data DGG2.

Here, the predetermined angle θCCD is set so that the Z-axis direction difference ΔE between the optical axis of the color CCD camera 5A and the optical axis of the color CCD camera 5B on the measuring surface 4S can be within a predetermined error allowable range between the Y-axis furthest front position 4SFR and the Y-axis furthest rear position 4SRR of the measuring surface 4S with respect to an initial reference position 4SREF in the Y-axis direction of the measuring surface 4S.

Figure 10A:
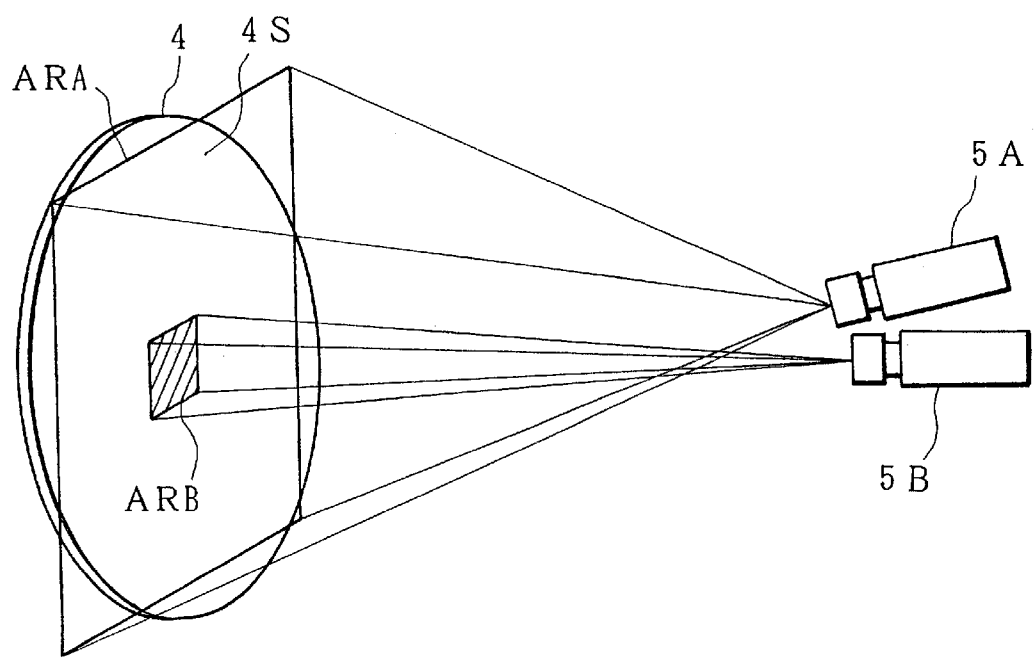
FIGS. 10A and 10B illustrate the visual field of the color CCD camera of the image pick-up unit of FIG. 9.
Figure 10B:
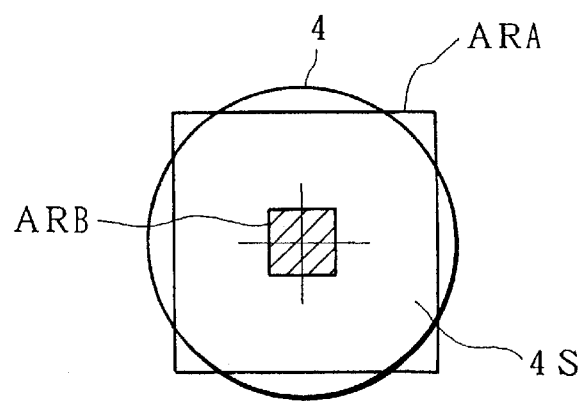

As can be seen from the perspective view of FIG. 10A and the front view of FIG. 10B, the visual field AR$_B$ of the color CCD camera 5B is included in the visual field ARA of the color CCD camera 5A, and the visual field of the color CCD camera 5A includes almost the entire measuring surface 4S of the measuring plate 4.

Accordingly, if the color CCD cameras 5A and 5B both have the same number of pixels, the color CCD camera 5A picks up an image of a large area, which results in a low-resolution image and position detection with low accuracy. On the other hand, the color CCD camera 5B picks up an image of a very small area, which leads to a high-resolution image and accurate position detection.

Since the real distance from the measuring plate varies for each CCD camera, it is necessary to perform distance correction for more accurate measurement.

Although a multiple optical axis system in which the optical axes of the two color CCD cameras 5A and 5B are not identical is employed in this embodiment, a single optical axis system in which the optical axes of color CCD cameras 5A' and 5B' are identical, as shown in FIG. 11, may also be employed.

More specifically, a half mirror 5C is disposed in the optical paths of the color CCD cameras 5A' and 5b' so that the optical axes of them become identical.

Figure 12A:
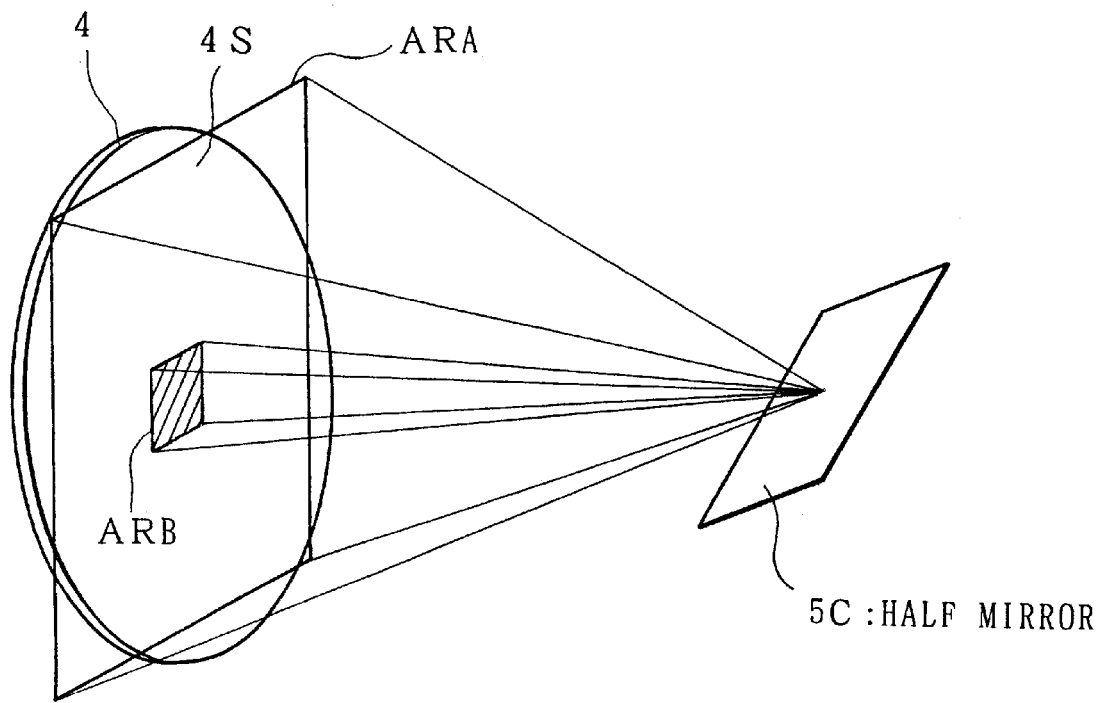
FIGS. 12A and 12B illustrate the visual field of the color CCD camera of the image pick-up unit of FIG. 10.
Figure 12B:
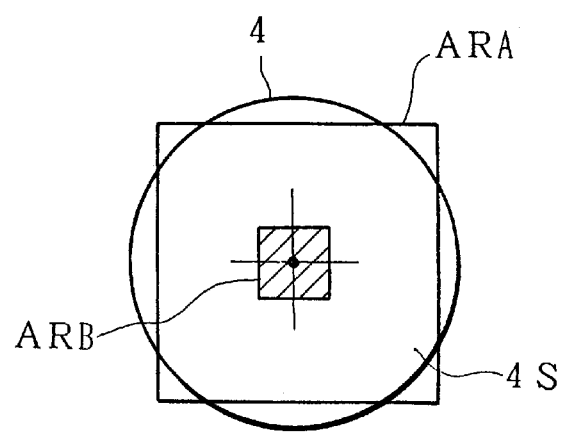

As can be seen from the perspective view of FIG. 12A and the front view of FIG. 12B, the visual field ARB of the color CCD camera 5B' is included in the visual field ARA of the color CCD camera 5A', and the visual field ARA of the color CCD camera 5A' includes almost the entire measuring surface 4S of the measuring plate 4.

Accordingly, no distance correction is necessary even for accurate measurement.

Whether in the multiple optical axis system or in the single optical axis system, an absolute relationship should be maintained between the positions of the two color CCD cameras 5A' and 5B', and the relationship never change during measurement.

Arrangements of the Laser Displacement Gauges

Figure 13A:
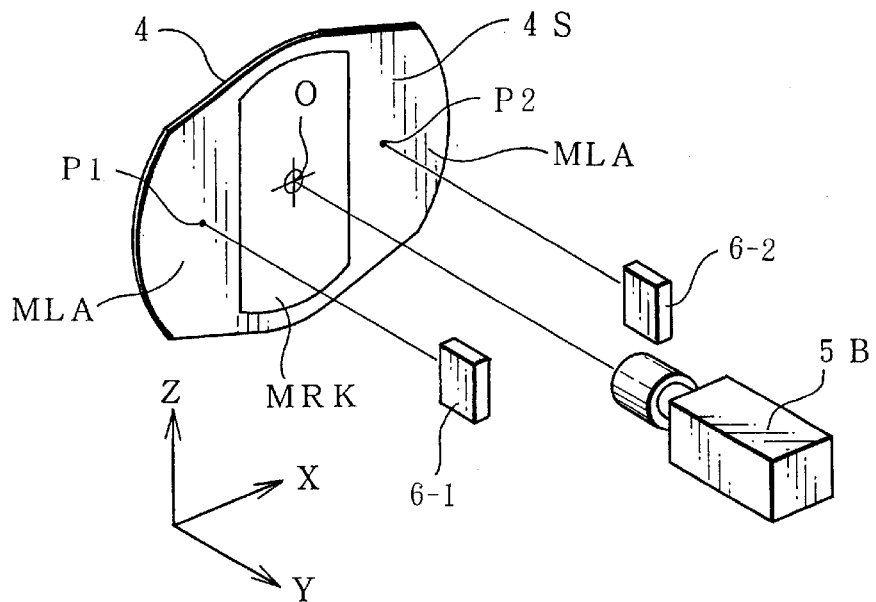
FIGS. 13A to 13C illustrate the arrangements of the laser displacement gauges.
Figure 13B:
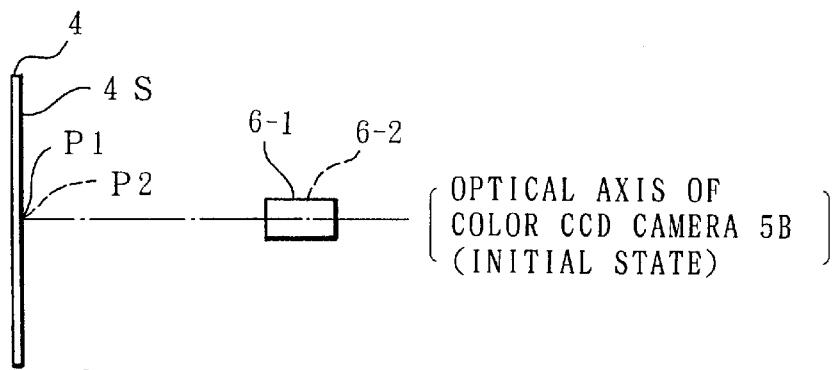
Figure 13C:
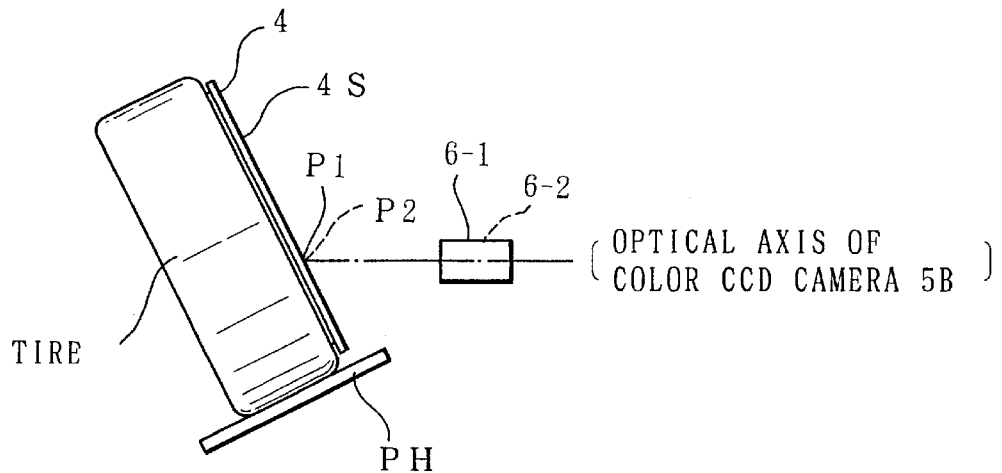

FIG. 13 shows the arrangements of the laser displacement gauges. FIG. 13A is a perspective view illustrating the arrangements of the laser displacement gauges, FIG. 13B is a side view of the laser displacement gauges in the initial state, and FIG. 13C is a side view illustrating the laser displacement gauges in a measuring state.

As shown in FIGS. 13A and 13B, the laser displacement gauges 6-1 and 6-2 are disposed so that the virtual line connecting the measuring light irradiation point P1 of the laser displacement gauge 6-1 and the measuring light irradiation point P2 of the laser displacement gauge 6-2 includes the origin O, which is the center point of the first circular mark MC1.

Measuring Operation

The following is a description of measuring operations, with reference to FIGS. 14 to 26.

Figure 14:
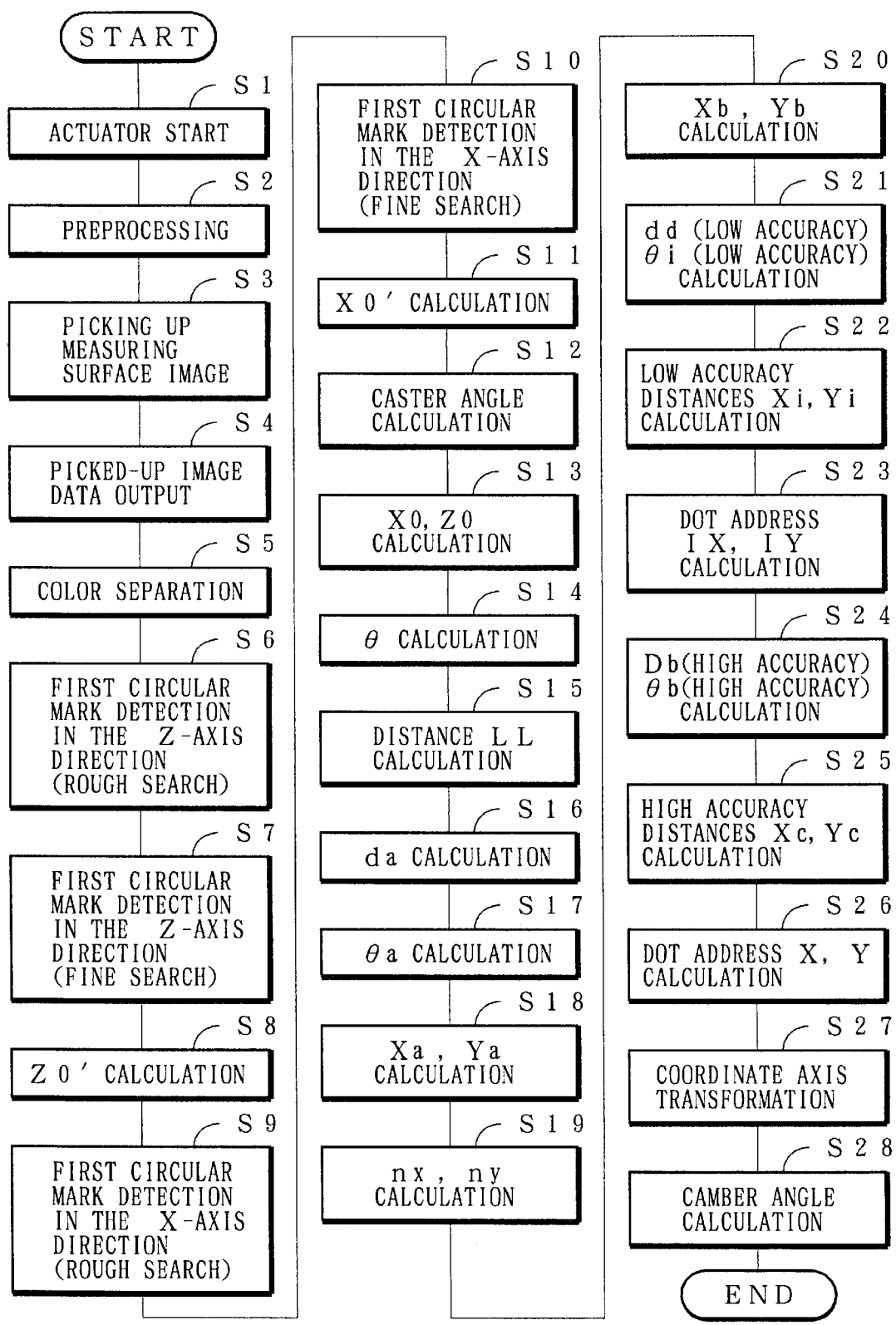
FIG. 14 is a flowchart of the measuring operations.

FIG. 14 is a flowchart of measuring operations.

First, the wheel 3 of the measured vehicle 2 is first driven upward or downward by an actuator (not shown), independently of other wheels. The actuator is then stopped at the empty vehicle weight to maintain a stopped state (step S1).

Next, preprocessing is performed as follows. The holding plate 10 and the image pick-up unit 5 are driven in the Z-axis direction so that they face to the measuring surface 4S of the measuring plate 4. The image pick-up regions of the color CCD cameras 5A and 5B, which constitute the image pick-up unit 5, are arranged to include the first circular mark MC1. Also, the measuring surface 4S of the measuring plate is disposed in such a position that it is perpendicular to the optical axis of the color CCD camera 5B (step S2).

Figure 15:
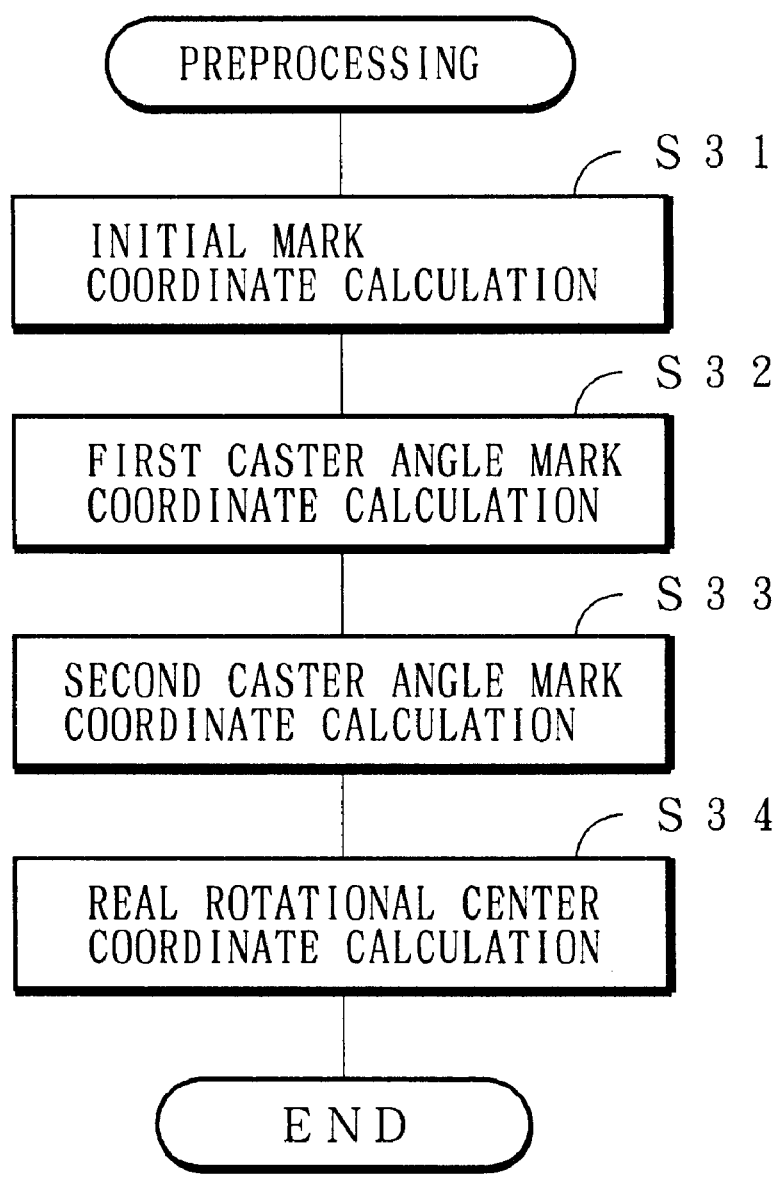
FIG. 15 is a flowchart of the preprocessing.

FIG. 15 is a flowchart of the preprocessing.

In the preprocessing, the center coordinates of the first circular mark MC1 in the stopped state are calculated (the calculation method used here will be later described), and the calculated center coordinates are set as the initial mark coordinates (X00, Z00), which are the center coordinates when the caster angle θCAS is 0°, as shown in FIG. 16 (step S31).

The caster angle θCAS of the wheel is changed by rotating the wheel by hand in a first direction. The center coordinates of the first circular mark MC1 are again calculated with the caster angle θCAS being θ1, and the calculated coordinates are set as first caster angle mark coordinates (X01, Z01) (step S32).

The wheel is then rotated by hand in a second direction, opposite to the first direction, and moved past the center coordinates of the first circular mark calculated as the initial mark coordinates (X00, Z00). The center coordinates of the first circular mark MC1 are again calculated with the caster angle θCAS being θ2, and the calculated coordinates are set as a second caster angle mark coordinates (X02, Z02) (step S33).

The arithmetic operation unit 28 determines the equation of the circle that includes the three points: the initial mark coordinates (X00, Z00); the first caster angle mark coordinates (X01, Z01); and the second caster angle mark coordinates (X02, Z02). Using the equation, the arithmetic operation unit 28 calculates the coordinates of the rotation axis of the wheel (XX, ZZ) (step S34).

More specifically, the equation that includes the three points is given as:

$$(X-XX)^2+(Z-ZZ)^2=r^2 \tag{1}$$

The radius r of the circle (r is a constant corresponding to deviation of the center point), and the X-coordinate XX and the Z-coordinate ZZ of the rotation axis of the wheel can be obtained by substituting the initial mark coordinate (X00, Z00), the first caster angle mark coordinate (X01, Z01), and the second caster angle mark coordinate (X02, Z02) for the variables X and Z.

The middle point MP of the viral line connecting the measuring laser irradiation points P1 and P2 of the laser displacement gauges 6-1 and 6-2 coincides with the optical axis of the color CCD camera 5B. The arithmetic operation circuit 2 calculates the mean distance from the color CCD camera 5A to the measuring plate 4 based on the output signals DLD1 and DLD2 of the laser displacement gauges 6-1 and 6-2, and it also calculates the toe angel θTOE of the measuring plate 4 based on the distances to the irradiation points P1 and P2.

Figure 17:
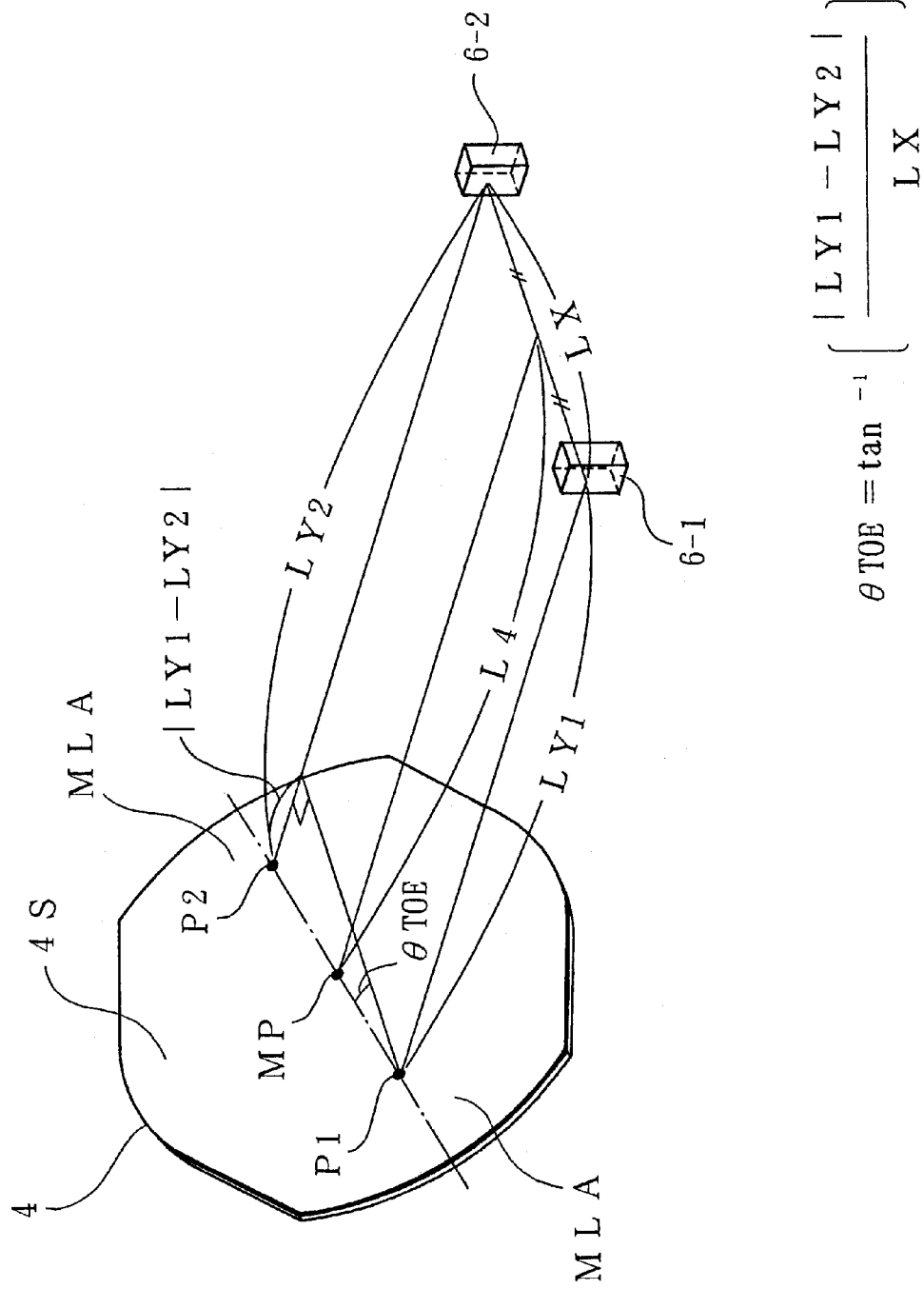
FIG. 17 illustrates the operation of the preprocessing.

More specifically, as shown in FIG. 17, the distance from the middle point MP. that is, the mean distance L4 to the measuring plate 4 is expressed as:

$$L4=(LY1+LY2)/2$$

wherein the distance from the distance measuring area MLA of the measuring plate 4 corresponding to the output signal DLD1 of the laser displacement gauge 6-1 is LY1, and the distance from the distance measuring area MLA of the measuring plate 4 corresponding to the output signal DLD2 is LY2.

Figure 18:
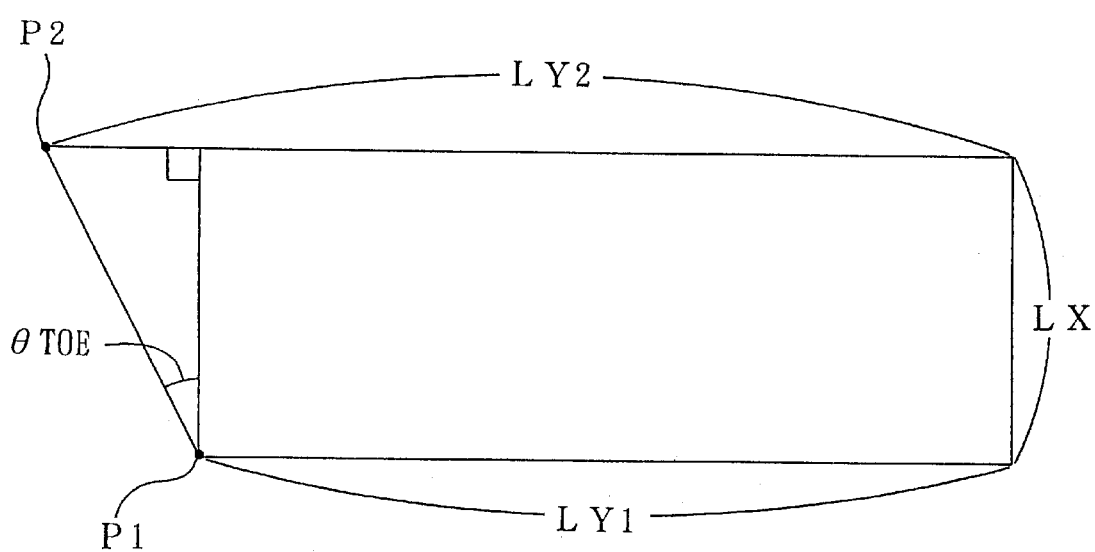
FIG. 18 illustrates the operation of the preprocessing.

As shown in FIG. 18, the toe angle θTOE of the measuring plate 4 is expressed as:

$$\theta TOE = \tan^{-1}(|LY1-LY2|/LX)$$

In this situation, the relationship between the visual field ARA of the color CCD camera 5A and the visual field ARB of the color CCD camera 5B is as in FIG. 10A or FIG. 12. The image pick-up unit 5 picks up an image of the measuring surface 4S of the measuring plate 4 (step S3) and outputs the first picked-up image data DGG1 and the second picked-up image data DGG2 to the color separation circuit 27 of the processor main body 8A (step S4).

The color separation circuit 27 performs color separation respectively on the first picked-up image data DGG1 and the second picked-up image data DGG2 outputted from the image pick-up unit 5 under the control of a controller 25, and then outputs the red picked-up image data DR corresponding to red, the green picked-up image data DG corresponding to green, and the blue picked-up image data DB corresponding to blue, to the arithmetic operation unit 28 (step S5).

The following is a detailed description of the arithmetic operation, with reference to FIGS. 19 to 26.

Figure 19:
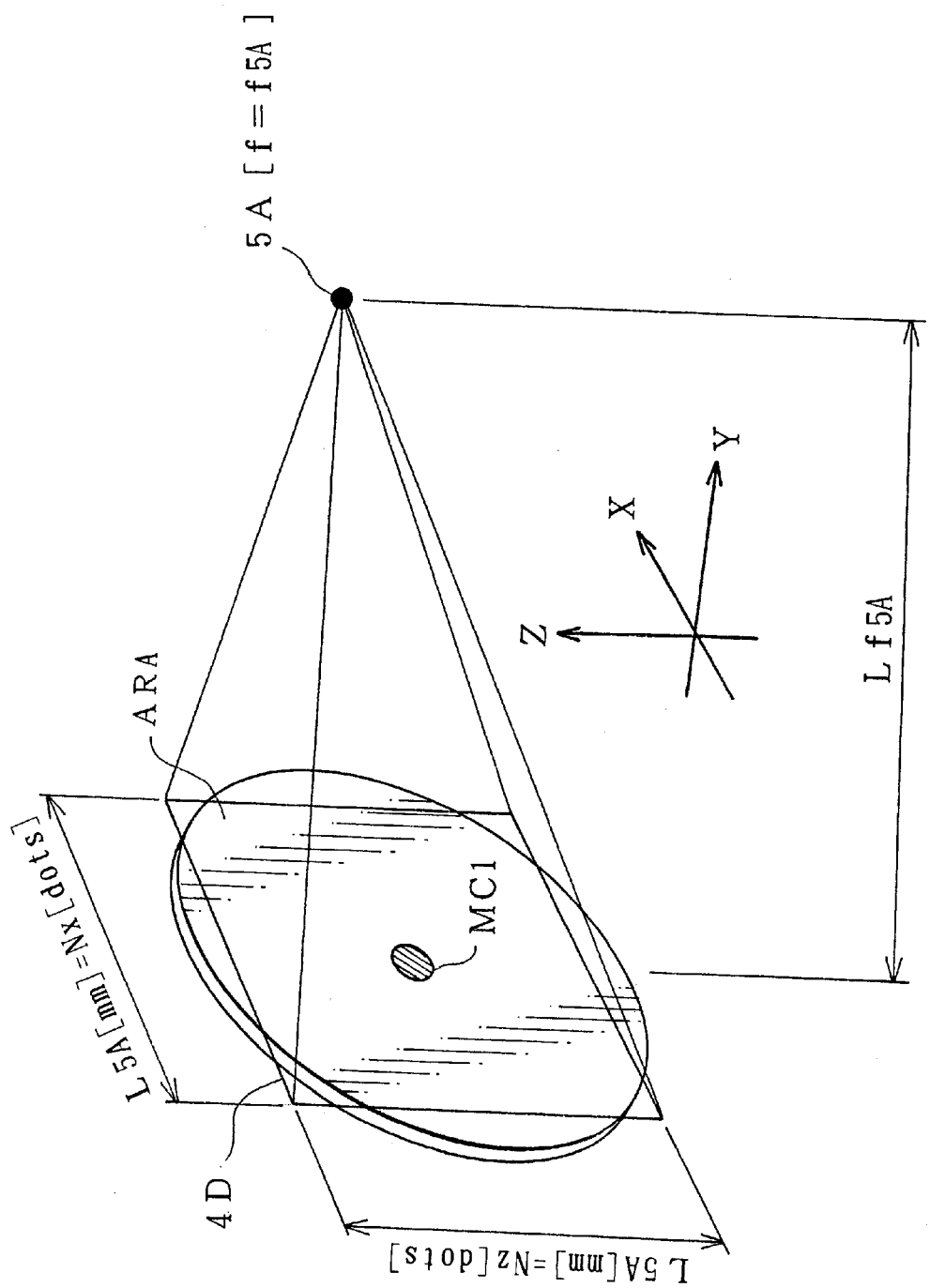
FIG. 19 illustrates the image pick-up area of the color CCD camera 5A.

In FIG. 19, the focal length of the lens of the color CCD camera 5A is f=f5A [mm], the number of pixels of the color CCD camera 5A is Nx×Nz [dots] (Nx and Nz are natural numbers. For instance, Nx=400, Nz=400). The color CCD camera 5A is disposed at a distance of Lf5A, which corresponds to the focal length f5A, from the measuring surface 4S, so that the visual field ARA covers the region of L5A×L5A [mm]. According to an equation Nx=Nz=NN (NN is a natural number), one pixel corresponds to L5A/NN [mm].

Figure 20:
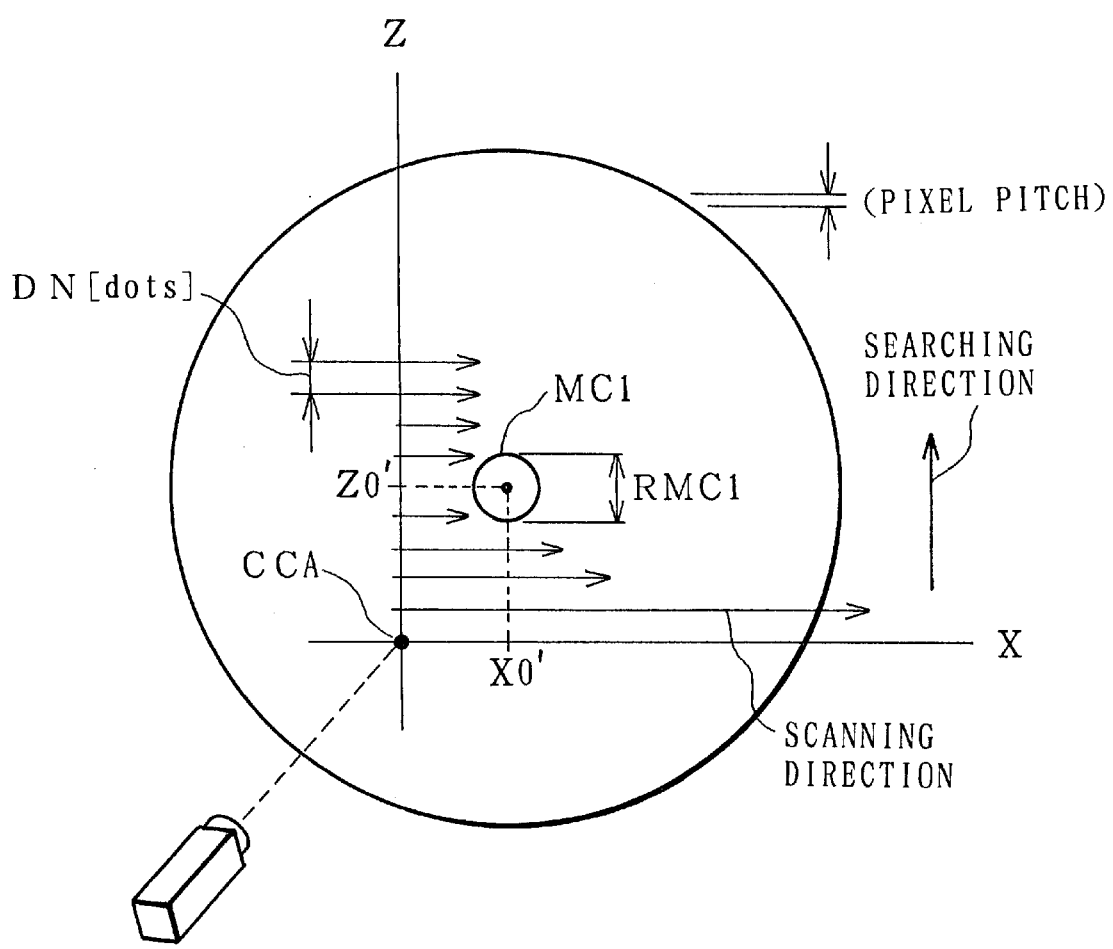
FIG. 20 illustrates the scanning of the first circular mark.
Figure 22:
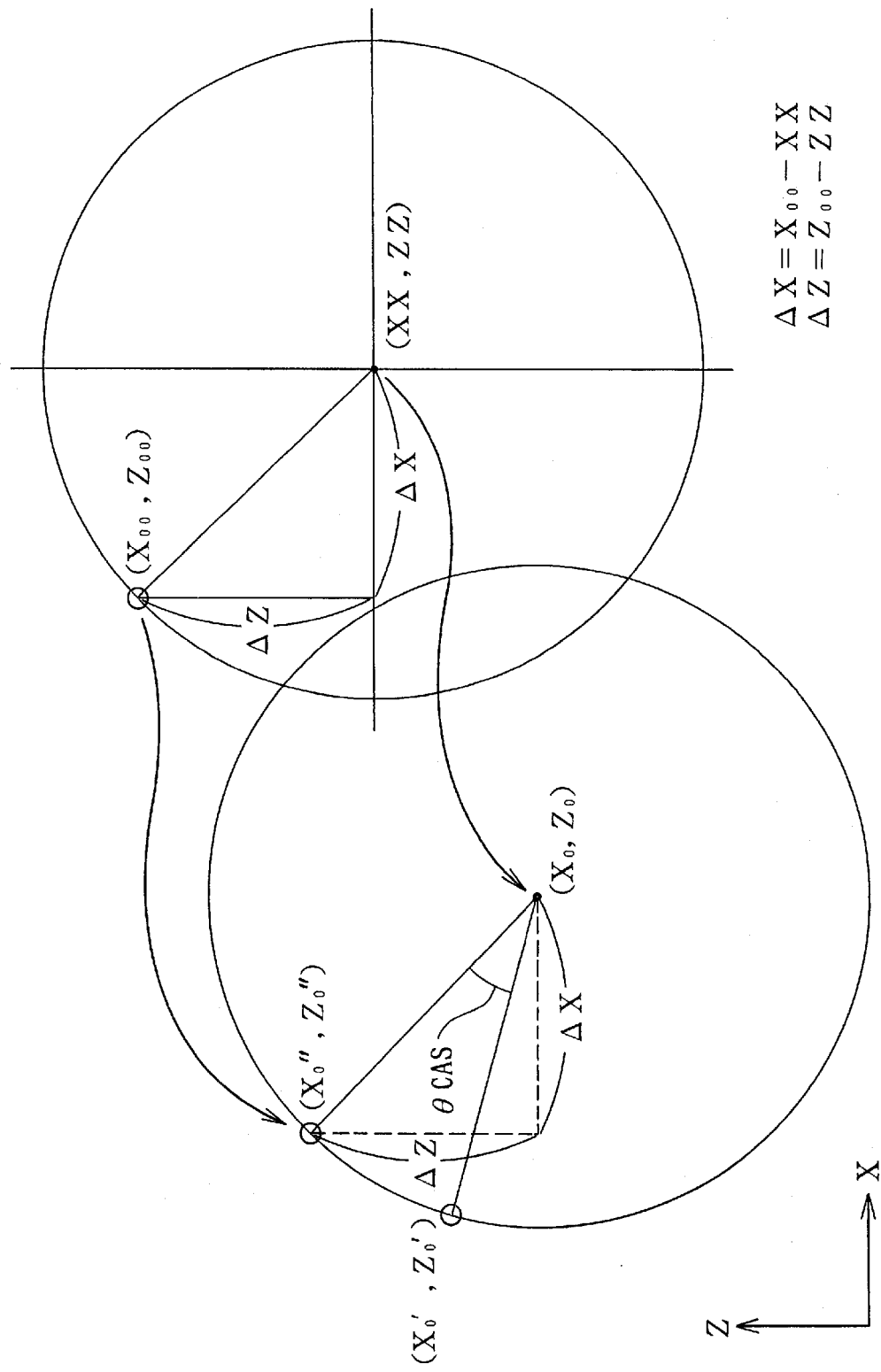
FIG. 22 illustrates the calculation of the rotational center coordinates of the wheel.

To determine the center coordinates of the Z-axis, as shown in FIG. 20, the first circular mark MC1 is detected by scanning in the positive direction of the X-axis based on the first red picked-up image data DR1 to conduct a rough search, starting from the center coordinates CCA of the color CCD camera 5A, in a first predetermined direction (for instance, the positive direction of the Z-axis; upward in FIG. 20) at DN-dot intervals (equivalent to intervals of DN·L5A/NN [mm] in this case) (step S6). Here, the relationship between DN and the diameter RMC1 of the first circular mark MC1 should be expressed as:

$$DN \cdot L5A/NN \leq RMC1$$

After the detection of the first circular mark MC1 by the rough search in step S6, a fine search is next conducted by scanning in a first predetermined direction (for instance, the positive direction of the X-axis; upward in FIG. 21A) at 1-dot intervals (equivalent to intervals of L5A/NN[mm] in this case), as shown in FIG. 21A. This fine search is continued until the first circular mark MC1 becomes undetectable, and the pixel number (dot number N1; N1=1 to NN) in the Z-axis direction is stored when the first circular mark MC1 is detected for the last time.

As shown in FIG. 21B, a fine search is then conducted in the opposite direction from the first predetermined direction (for instance, in the Z-axis direction; downward in FIG. 21B) (step S7).

In step S7, when the first circular mark MC1 is no longer detected, the Z-axis center coordinate Z0' is determined based on the pixel number (dot number N2; N2=1 to NN) in the Z-axis direction at the time of last detection of the first circular mark MC1 (step S8). The Z-axis center coordinate Z0' is given by an expression:

$$Z0'=(N1+N2)/2$$

Here, the Z-axis center coordinate Z0' is almost equal to the Z-coordinate of the center coordinates of the first circular mark MC1, and the accuracy of the Z-axis center coordinate Z0' is ±L5A/NN [mm].

Likewise, in order to determine the X-axis center coordinate X0', the first circular mark MC1 is detected by scanning in the positive direction of the Z-axis based on the first red picked-up image data DR1 so as to conduct a rough search in a third predetermined direction (for instance, in the positive direction of the X-axis; rightward in FIG. 20), starting from the center coordinates CCA of the color CCD camera 5A, at DN-dot intervals (equivalent to intervals of DN·L5A/NN [mm]) (step S9).

After the detection of the first circular mark MC1 by the rough search in step S9, a fine search is conducted at 1-dot intervals (equivalent to intervals of L5A/NN [mm]), and it is continued until the first circular mark MC1 is no longer detected. The pixel number (dot number M1; M1=1 to NN) in the X-axis direction is stored when the first circular mark MC1 is detected for the last time, and a fine search in the negative direction of the X-axis is then conducted (step S10).

In step S10, when the first circular mark MC1 is no longer detected again, the X-axis center coordinate X0' is determined based on the pixel number (dot number M2; M2=1 to NN) in the X-axis direction at the last detection of the first circular mark MC1 (step S11). The X-axis center coordinate X0' is given by an expression:

$$X0'=(M1+M2)/2$$

Here, the accuracy of the X-axis center coordinate X0' is ±L5A/NN [mm].

Calculation of the Rotational Center Coordinates of the Wheel

The arithmetic operation unit 28 calculates the caster angle θCAS based on second inclination data DSL2 outputted from a caster angle measuring inclination gauge SCAS (step S12), and then calculates the rotational center coordinates (X0, Z0) of the wheel from the Z-axis center coordinate Z0' determined in step S8 and the X-axis center coordinate X0' determined in step S11 (step S13).

In this example, the rotational center coordinates of the wheel moves from the initial rotational center coordinates (XX, ZZ) to (X0, Z0), and the center coordinates of the first circular mark MC1 are (X0', Z0').

As the caster angle θCAS has already been calculated in step S12, the center coordinates (Z0", Z0") of the first circular mark MC1 when the wheel is not rotating are calculated by the following formulas:

$$X0''=X0' \cos \theta CAS + Z0' \sin \theta CAS$$

$$Z0''=-X0' \sin \theta CAS + Z0' \cos \theta CAS$$

When ΔX=X00−XX and ΔZ=Z00−ZZ, the rotational center coordinates (X0, Z0) of the wheel can be calculated by the following formulas:

$$X0=X0''-\Delta X=X0''-X00+XX$$

$$Z0=Z0''-\Delta Z=Z0''-Z00+ZZ$$

Since the rotational center coordinates can be calculated by simple formulas as above, real time processing can be performed without complicating the control operations of the arithmetic operation unit 28 in the data processing control unit 28.

Figure 23:
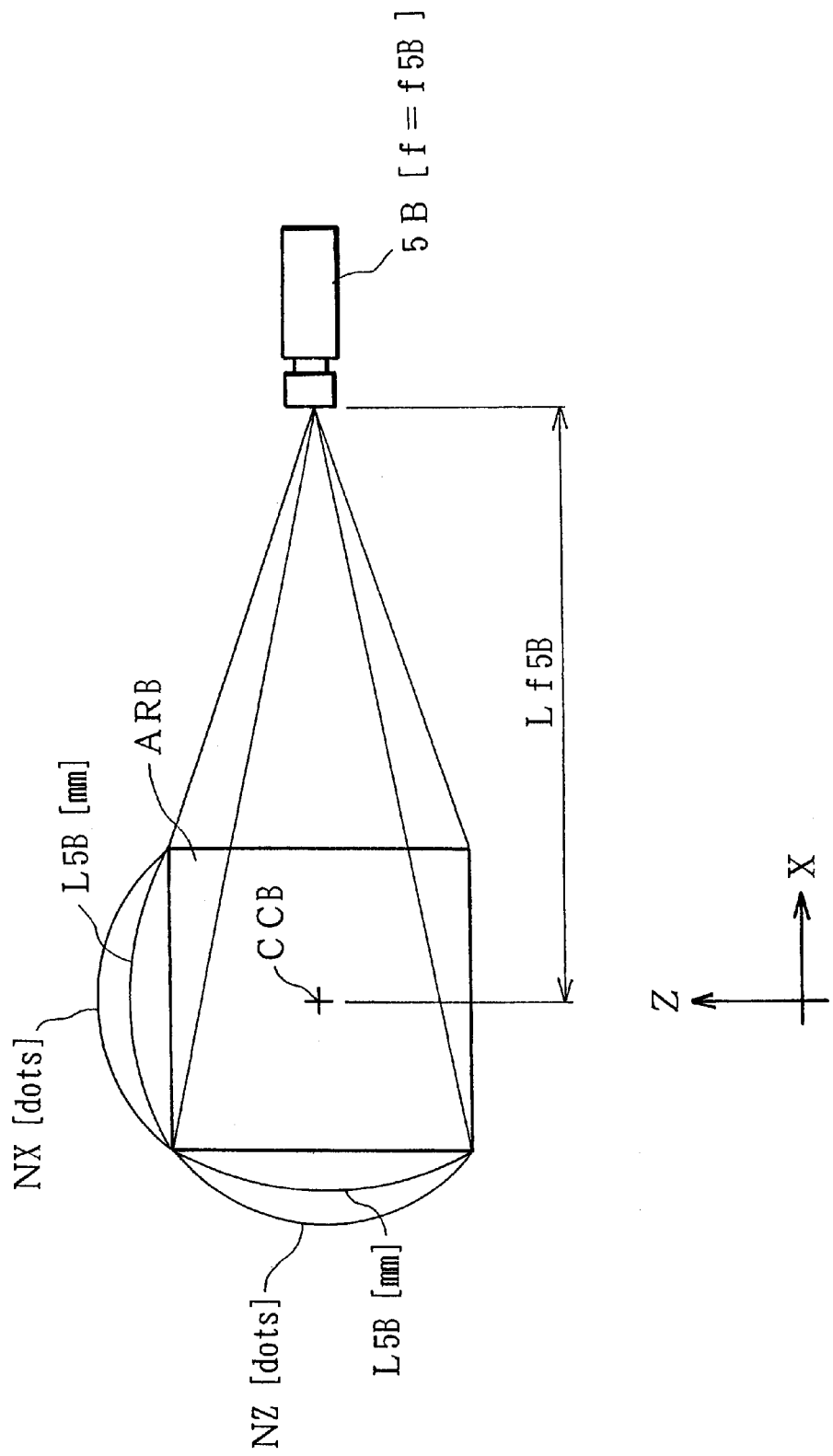
FIG. 23 illustrates the image pick-up area of the color CCD camera 5B.

Referring now to FIG. 23, the focal length of the lens of the color CCD camera 5B is shown as f=f5B [mm], and the number of pixels of the color CCD camera 5B is Nx×Nz [dots], which is the same as that of the color CCD camera 5A. The color CCD camera 5B is disposed at a distance of Lf5B, corresponding to the focal length f5B, from the measuring surface 4S, so that the visual field ARB can cover the area of L5B×L5B [mm]. According to an equation Nx=Nz=NN (NN is a natural number), one pixel corresponds to L5B/NN [mm] pitch.

Figure 24:
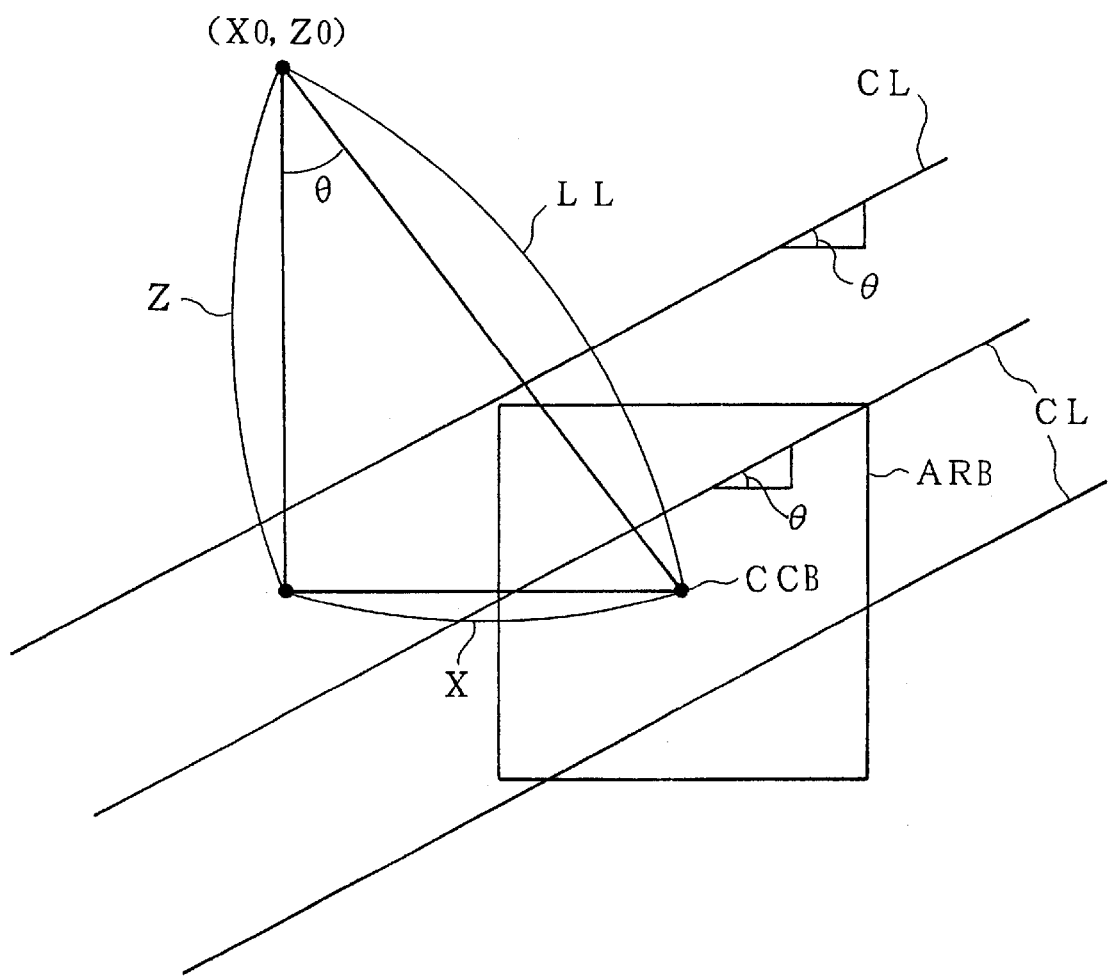
FIG. 24 illustrates the wheel alignment measurement.

Next, as shown in FIG. 24, the correction lines CL are subjected to sampling based on a white image obtained by adding the second red picked-up image data DR2, the second green picked-up image data DG2, and the second blue picked-up image data DB2 outputted from the color CCD camera 5B. The inclination θ of the correction lines L is determined by the method of least squares using the position data (step S14).

Based on the image picked up by the color CCD camera 5A, the distance LL between the current rotational center coordinates (X0, Z0) of the wheel determined in steps S8 and S11, and the center coordinates CCB of the visual field ARB of the color CCD camera 5B is determined (step S15).

By doing so, the correction lines CL surrounding the center coordinates of the visual field ARB can be specified, and the approximate position of the visual field ARB can be detected.

Besides the current rotational center coordinates (X0, Z0) of the wheel and the distance LL, the arithmetic operation unit 28 calculates the distance L4 from the middle point between the irradiation point P1 and the irradiation point P2 on the measuring surface 4S of the measuring plate 4, that is, the optical axis of the color CCD camera 5B (see FIG. 17), based on the output signals DLD1 and DLD2 of the laser displacement gauges 6-1 and 6-2.

As a result, the magnification of the picked-up image can be detected depending on the distance between the color CCD camera B and the measuring plate 4, and the real size of the image can be easily detected and corrected in image processing.

Figure 25:
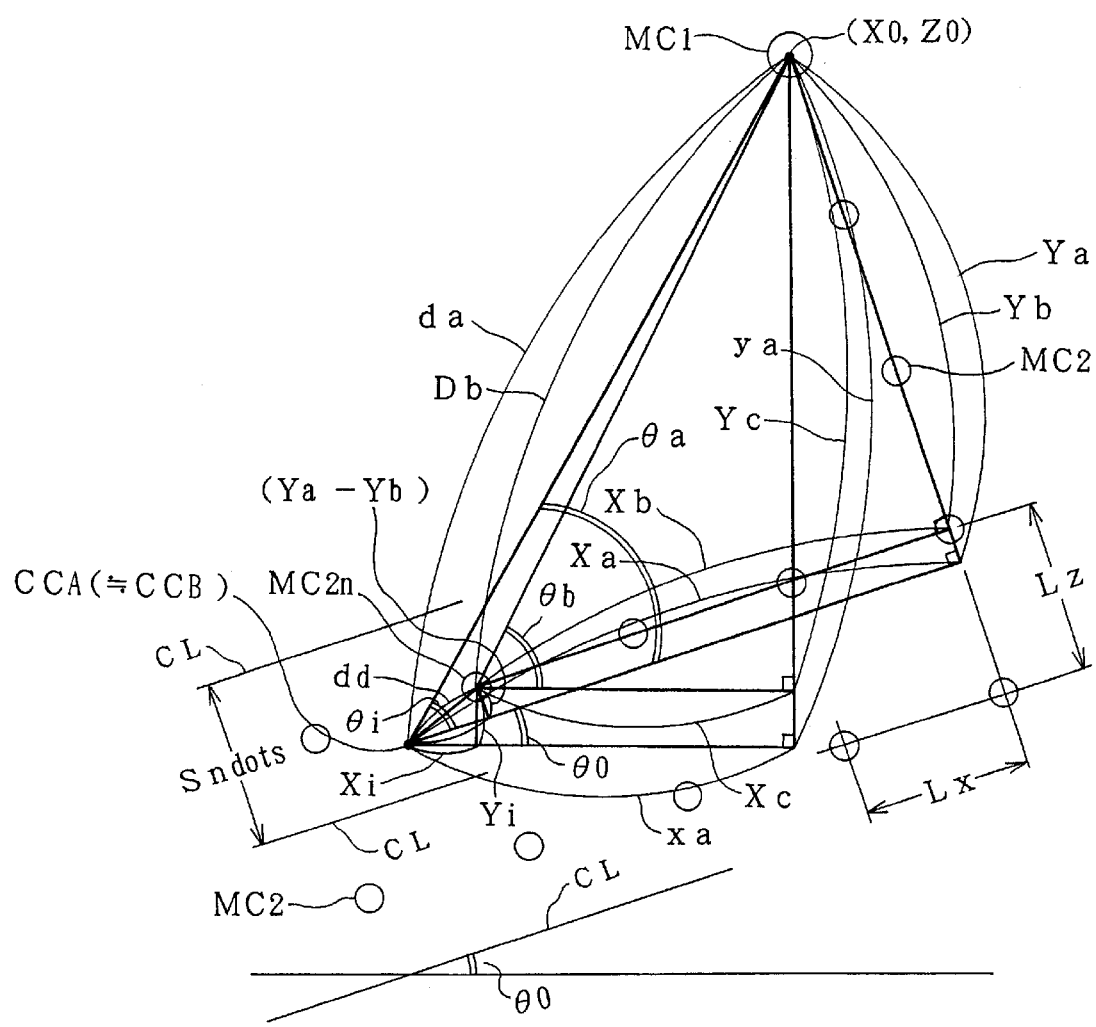
FIG. 25 illustrates the wheel alignment measurement.
Figure 26:
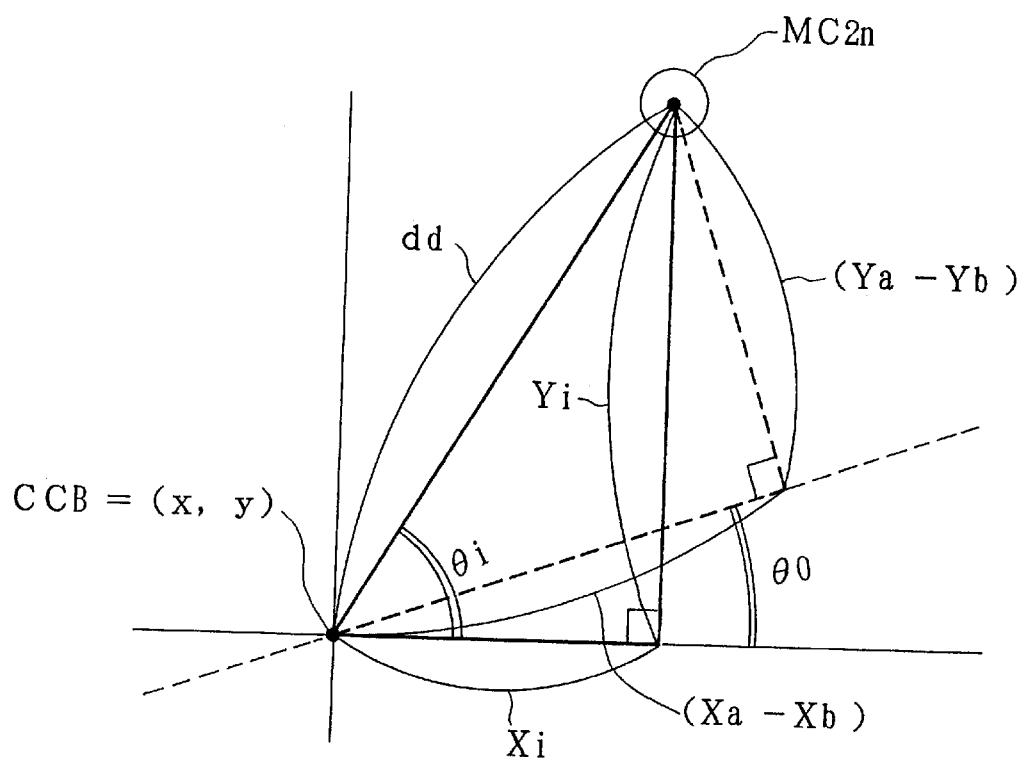
FIG. 26 illustrates the wheel alignment measurement.

Referring to FIGS. 25 and 26, the calculation of the center coordinates of the visual field ARB will be described below.

First, in an image picked up by the color CCD camera 5A, the distance da between the center coordinates CCA of the visual field ARA and the center coordinates (X0, Z0) of the first circular mark MC1 is calculated by the following formula (step S16):

$$da=\sqrt{(xa^2+ya^2)}$$

Assuming a line in parallel with the correction lines CL extending through the center coordinates of the visual field ARA, the angle θa formed by the line, the center coordinates of the visual field ARA, and the center coordinates of the first circular mark MC1 are calculated by the following formula (step S17):

$$\theta a=\tan^{-1}(ya/xa)-\theta 0$$

Based on the distance da and the angle θa, a distance Xa and a distance Ya are calculated by the following formulas (step S18):

$$Xa=da\times\cos(\theta a)$$

$$Ya=da\times\sin(\theta a)$$

Next, based on the distances Xa and Ya, the position of the second circular mark MC2$n$ closest to the center coordinates of the visual field ARA is calculated as follows (step S19):

$$nx=int(Xa/Lx)$$

$$ny=int(Ya/Lz)$$

wherein nx (a natural number) is the number of second circular marks counted from the first circular mark MC1 in the X direction, and ny (a natural number) is the number of second circular marks counted from the first circular mark MC1 in the Z direction. In FIG. 25, the closest second mark MC2$n$ is shown as nx=4 and ny=3. Also, int(R) is an integer which does not exceed R. Lx is the interval distance between second circular marks MC2 in the X-axis direction (see FIG. 4), while Lz is the interval distance between second circular marks MC2 in the Z-axis direction (see FIG. 4).

The distances Xb and Yb from the center coordinates of the second circular mark MC2$n$ closest to the center coordinates of the visual field ARA to the center coordinates (X0, Z0) of the first circular mark MC1 are calculated by the following formulas (step S20):

$$Xb=nx\times Lx$$

$$Yb=ny\times Lz$$

The distances Xb and Yb represent the values of accuracy corresponding to the drawing accuracy of the first circular mark MC1 and the second circular marks MC2.

Referring to FIG. 26, the distance dd (low accuracy) from the center coordinates of the second circular mark MC2$n$ closest to the center coordinates of the visual field ARA to the center coordinates of the visual field ARA, and the angle θi (low accuracy) with respect to the X-axis of the visual field ARA are calculated by the following formulas (step S21):

$$dd=\sqrt{\{(Xa-Xb)^2+(Ya-Yb)^2\}}$$

$$\theta i=\tan^{-1}\{(Ya-Yb)/(Xa-Xb)\}+\theta 0$$

Here, "low accuracy" means the measurable accuracy based on picked-up image data of the color CCD camera 5A (In the above example, the accuracy is ±1 mm).

Based on the distance dd and the angle θi, the low accuracy distances Xi and Yi between the center coordinates of the visual field ARA and the second circular mark MC2$n$ closest to the center coordinates of the visual field ARA are calculated by the following formulas (step S22):

$$Xi=dd\times\cos(\theta i)$$

$$Yi=dd\times\sin(\theta i)$$

Based on the low accuracy distances Xi and Yi, the center coordinates of the second circular mark MC2$n$ closest to the center coordinate of the visual field ARB of the color CCD camera 5B are converted into a dot address (IX, IY) (step S23).

Here, the visual field ARB consists of NN×NN dots as described above. The dot address of the center coordinates of the visual field ARB in the X direction is NN/2, while the dot address in the Y direction is NN/2. Hence, the dot address (IX, IY) is given by the following equations:

$$IX=NN/2+Xi\times Sn/Lx$$

$$IY=NN/2+Yi\times Sn/Lz$$

wherein Sn represents the number of dots a millimeter.

Based on the distances Xb and Yb, the distance Db (high accuracy) between the center coordinates of the visual field ARB and the center coordinates of the closest second circular mark MC2n, and the angle θb (high accuracy) with respect to the X-axis of the visual field ARA are calculated by the following formulas (step S24):

$$Db=\sqrt{(Xb^2+Yb^2)}$$

$$\theta b=\tan^{-1}(nYb/Xb)+\theta 0$$

Here, "high accuracy" means the measurable accuracy based on picked-up image data of the color CCD camera 5B (In the above example, the accuracy is ±L5B/NN mm).

Based on the distance Db and the angle θb, the high accuracy distances Xc and Yc between the center coordinates of the visual field ARB and the center coordinates of the closest second circular mark MC2n are calculated by the following formulas (step S25):

$$Xc=Db\times\cos(\theta b)$$

$$Yc=Db\times\sin(\theta b)$$

Based on the high accuracy distances Xc and Yc and the dot address (IX, IY), the center coordinates of the second circular mark MC2n closest to the center coordinate of the visual field ARB of the color CCD camera 5B are converted into a dot address (X, Y) (step S26).

In this case, the visual field ARB consists of NN×NN dots as described above. The dot address of the center coordinates of the visual field ARB in the X direction is NN/2, while the dot address in the Y direction is NN/2. Hence, the dot address (X, Y) is given by the following equations:

$$X=Xc+(NN/2+IX)\times Lx/Sn$$

$$Y=Yc+(NN/2-IY)\times Lz/Sn$$

The dot address (X, Y) is then transformed to the system of coordinates including the X-axis and Z-axis of the measuring surface 4S of the measuring plate 4, and a dot address (x, y) in the system of coordinates including the X-axis and Z-axis of the measuring surface 4S is calculated (step S27). Here, the relationship between the dot address (X, Y) and the dot address (x, y) can be given by equations:

$$X=x/\cos(\theta x)$$

$$Y=y/\cos(\theta y)$$

From these equations, the dot address (x, y) can be given by equations:

$$x=X\times\cos(\theta x)$$

$$Y=y\times\cos(\theta y)$$

The arithmetic operation unit 28 then calculates the camber angle θCAM based on first inclination data DSL1 outputted from a camber angle measuring inclination gauge SCAM (step S28).

As described so far, according to the present invention, accurate wheel alignment measurements can be taken by real-time detection of the rotational center of the wheel, without attaching the measuring plate in conformity to the rotational center in advance.

It is also unnecessary to attach a jig to the measuring plate to conform to the rotational center, which reduces the thickness of the measuring plate in the transverse direction of the measured vehicle. Thus, the rotational radius of the wheel at the time of a toe angle change can be smaller, and the entire area of the measuring surface of the measuring plate can be effectively utilized.

Although no special skill is necessary in attachment of the measuring plate, accurate wheel alignment measurements can be taken without reducing the measurable area.

B: Second Embodiment

The following is a description of a second embodiment of the present invention, with reference to the accompanying drawings.

Since the main structure of the wheel alignment measuring device of the second embodiment is the same as in the first embodiment shown in FIG. 1, no description of it will be given below.

Structure of the Measuring Plate

Figure 27:
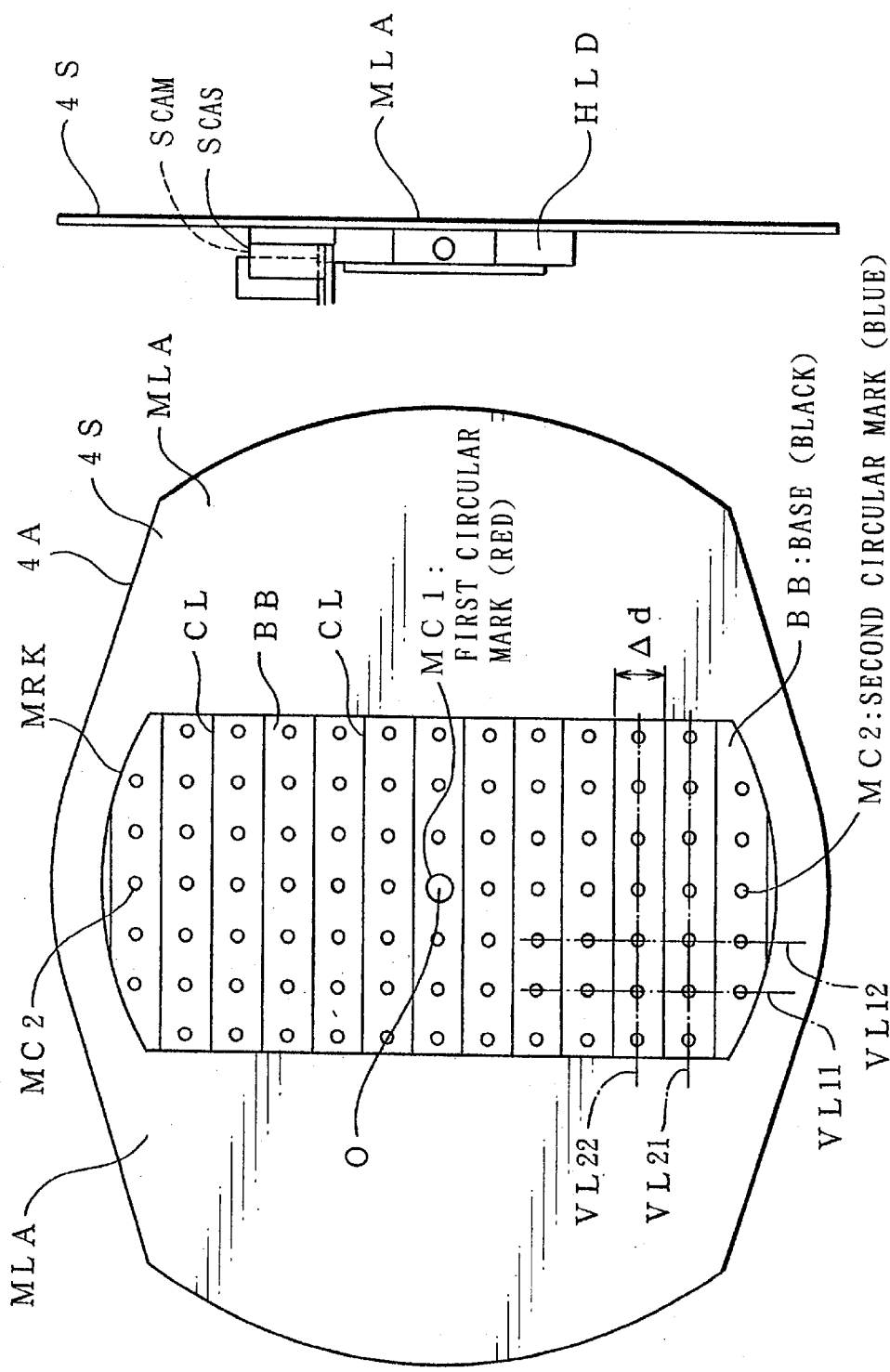
FIGS. 27A and 27B illustrate the measuring plate.

FIGS. 27A and 27B show the measuring plate. FIG. 27A is a front view of the measuring plate, and FIG. 27B is a side view of the measuring plate.

The measuring surface 4S of the measuring plate 4 is flat, and as shown in FIGS. 27A and 27B, it consists of a measuring mark area MRK on which various measuring marks are drawn, and a distance measuring area MLA which extends in the longitudinal direction of the measured vehicle 2 with respect to the origin O of the measuring mark area MRK, and is optically uniform (i.e., uniform in reflectance) to measure the distance from the measuring surface 4S. Measuring light emitted from the laser displacement gauges 6-1 and 6-2 irradiates the distance measuring area MLA.

The measuring mark area MRK consists of: a base BB which is colored black; a first circular mark MC1 which is colored red and serves as a reference mark with the origin O of the measuring surface 4S in the center; a plurality of second circular marks MC2 which are colored blue; and a plurality of correction lines CL which are colored white. The plurality of second circular marks MC2 have center coordinates at the intersections of first parallel virtual lines (only two first virtual lines VL11 and VL12 are shown in FIG. 27A) and second parallel virtual lines (only two second virtual lines VL21 and VL22 are shown in FIG. 27A). The plurality of correction lines CL are in parallel with either of the first virtual lines VL11 and VL12 or the second virtual lines VL21 and VL22 (they are in parallel with the second virtual lines VL21 and VL22 in FIG. 27A), and their interval distances Δd are uniform.

As the circular marks MC1 and MC2, and the correction lines CL serve as measuring scales, they should be drawn with certain precision so that desired accuracy can be achieved in measurement.

Figure 28:
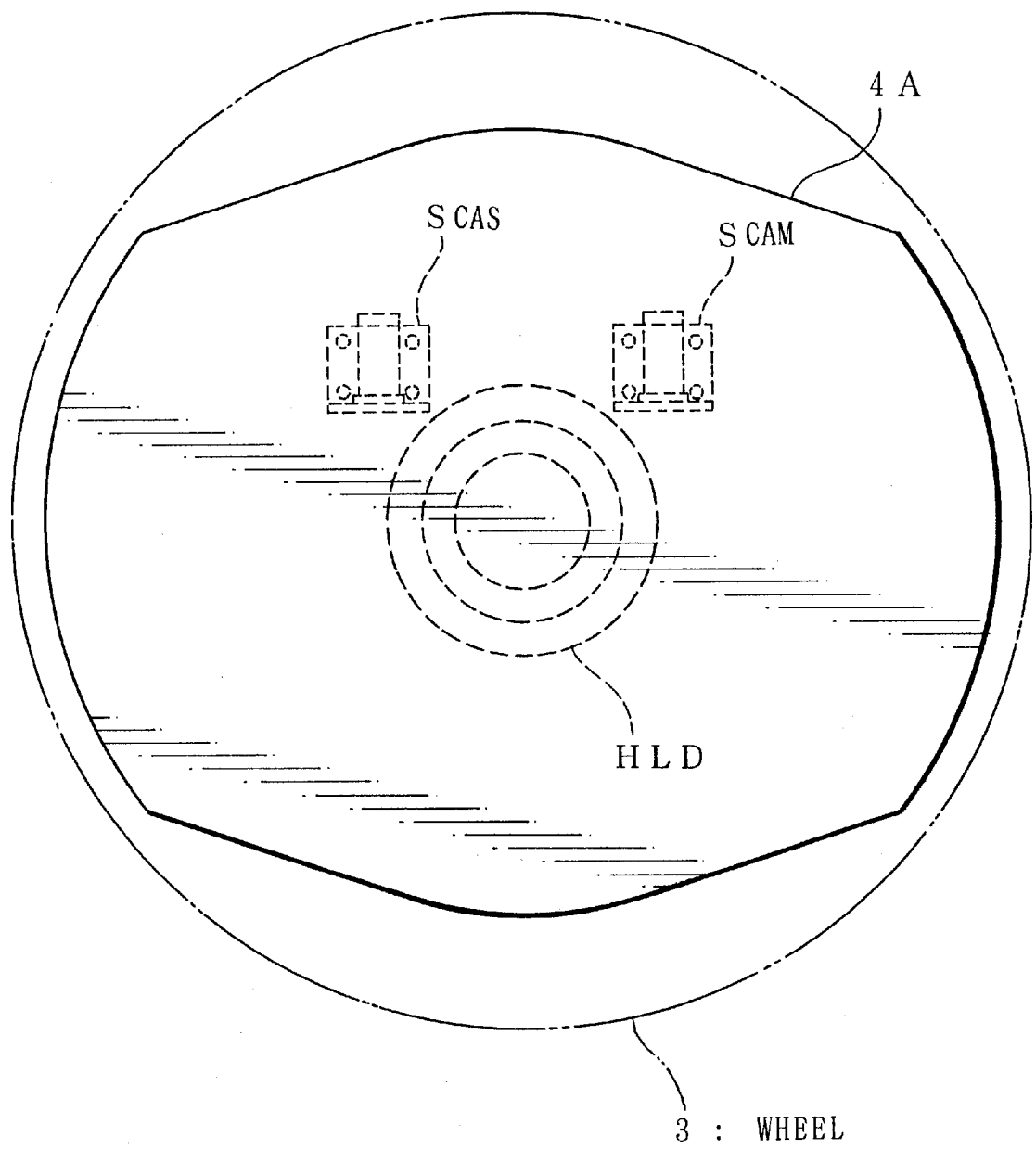
FIG. 28 is a perspective front view of the measuring plate.

As shown in FIG. 27B and the perspective front view of FIG. 28, a bracket HLD for attaching the measuring plate 4 to the wheel 3 of the measured vehicle 2, a camber angle measuring inclination gauge SCAM which outputs first inclination data DSL1 used in measurement of the camber angle of the wheel 3, and a caster angle measuring inclination gauge SCAS which outputs second inclination data DSL2 used in measurement of the caster angle of the wheel 3 are disposed on the back of the measuring plate.

The structure of the measuring mark area MRK of the measuring plate 4 is the same as in the first embodiment shown in FIG. 4, and the structure of the measuring unit is the same as in the first embodiment shown in FIGS. 5 to 7.

Structure of the Data Processing Control Unit

Figure 29:
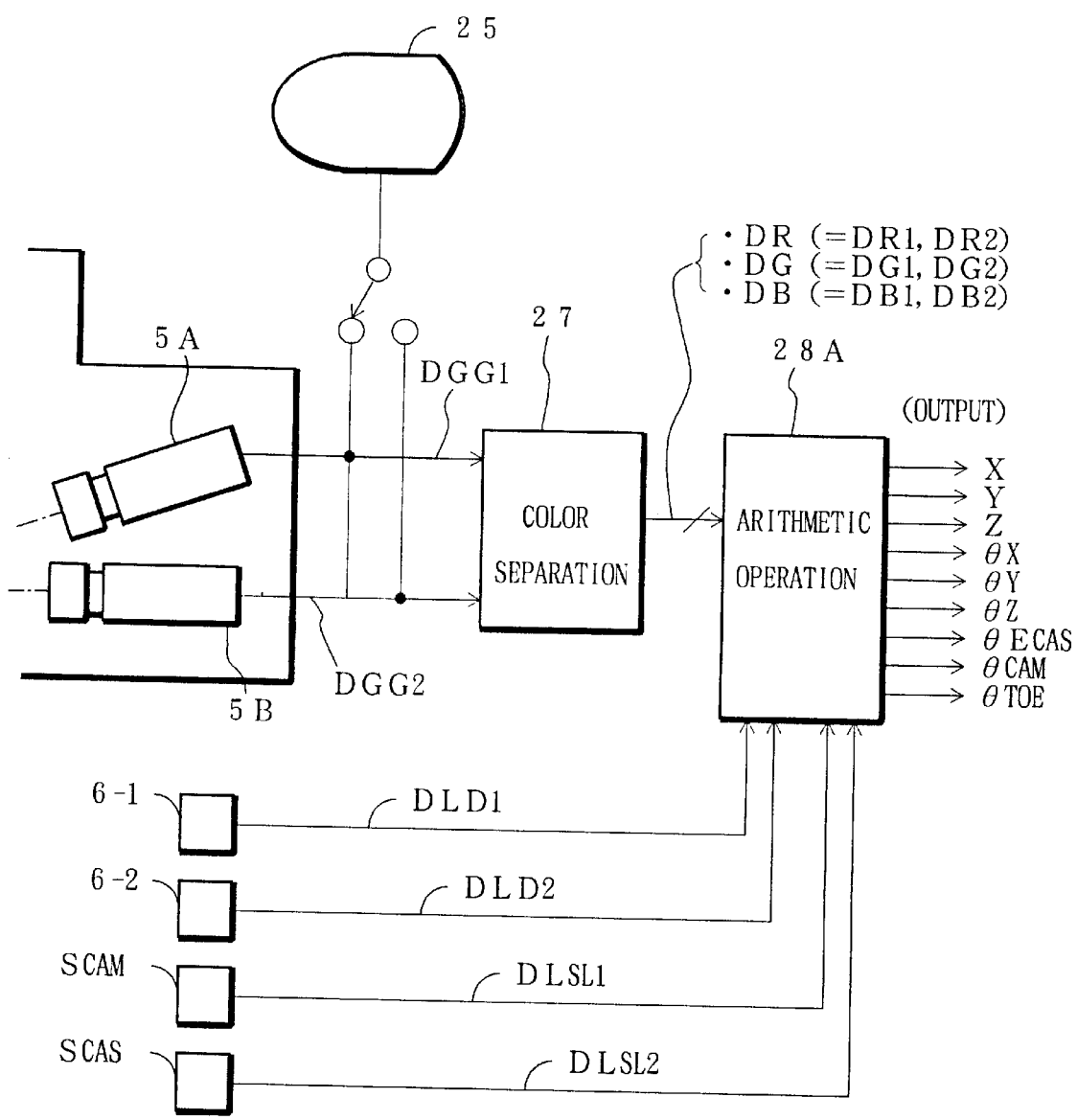
FIG. 29 is a block diagram illustrating the structure of the data processing control unit.

FIG. 29 is a block diagram illustrating the structure of the data processing control unit 8. Like reference numerals are allotted to like components in FIG. 29 and FIG. 8 of the first embodiment.

The data processing control unit 8 comprises a display 25, a color separating circuit 27, and an arithmetic operation unit 28. The display 25 displays an image based on first picked-up image data DGG1 outputted from a color CCD camera 5A (mentioned later) or second picked-up image data DGG2 outputted from a color CCD camera 5B. The color separation circuit 27 performs color separation based on the first picked-up image data DGG1 and the second picked-up image data DGG2 outputted from the image pick-up unit 5, and outputs red picked-up image data DR corresponding to red, green picked-up image data DG corresponding to green, and blue picked-up image data DB corresponding to blue. The arithmetic operation unit 28 outputs: X-coordinate data X on the measuring surface 4S of the measuring plate 4 in a predetermined position in a high-resolution picked-up image (for instance, the center of the picked-up image); Y-coordinate data Y of the measuring surface 4S; Z-coordinate data Z on the measuring surface 4S of the measuring plate 4 in a predetermined position in the a high-solution picked-up image; an inclination $\theta x$ with respect to the X-axis on the measuring surface 4S; an inclination $\theta y$ with respect to the Z-axis on the measuring surface 4S; and an inclination $\theta z$ with respect to the Z-axis on the measuring surface 4S (these inclination data are used as a basis in spin angle data DSP operations), based on output signals DLD1 and DLD2 from the two laser displacement gauges 6-1 and 6-2, the first inclination data $D_{SL1}$ outputted from the camber angle measuring gauge $S_{CAM}$, the second inclination data $D_{SL2}$ outputted from the caster angle inclination gauge $S_{CAS}$, the red picked-up image data DR, the green picked-up image data DG, and the blue picked-up image data DB.

Here, the red picked-up image data DR include first red picked-up image data DR1 corresponding to the first picked-up image data DGG1 and second red picked-up image data DR2 corresponding to the second picked-up image data DGG2; the green picked-up image data DG include first green picked-up image data DG1 corresponding to the first picked-up image data DGG1 and second green picked-up image data DG2 corresponding to the second picked-up image data DGG2; and the blue picked-up image data DB include first blue picked-up image data DB1 corresponding to the first picked-up image data DGG1 and second blue picked-up image data DB2 corresponding to the second picked-up image data DGG2.

The structure of the image pick-up unit is the same as in the first embodiment shown in FIGS. 9 to 12, and the arrangements of the laser displacement gauges are also the same as in the first embodiment shown in FIG. 13.

Measuring Operations

Figure 30:
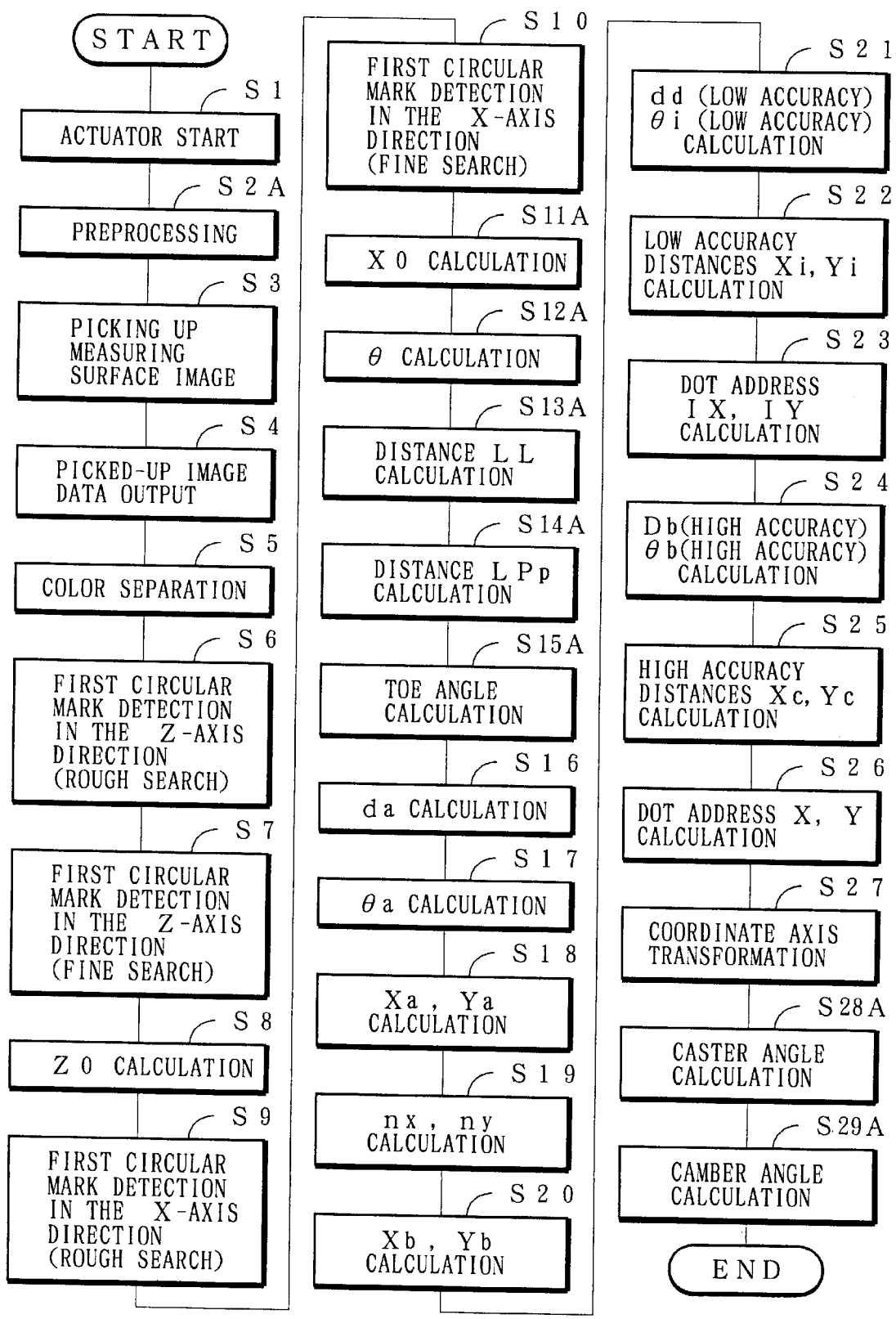
FIG. 30 is a flowchart of the measuring operation.
Figure 31:
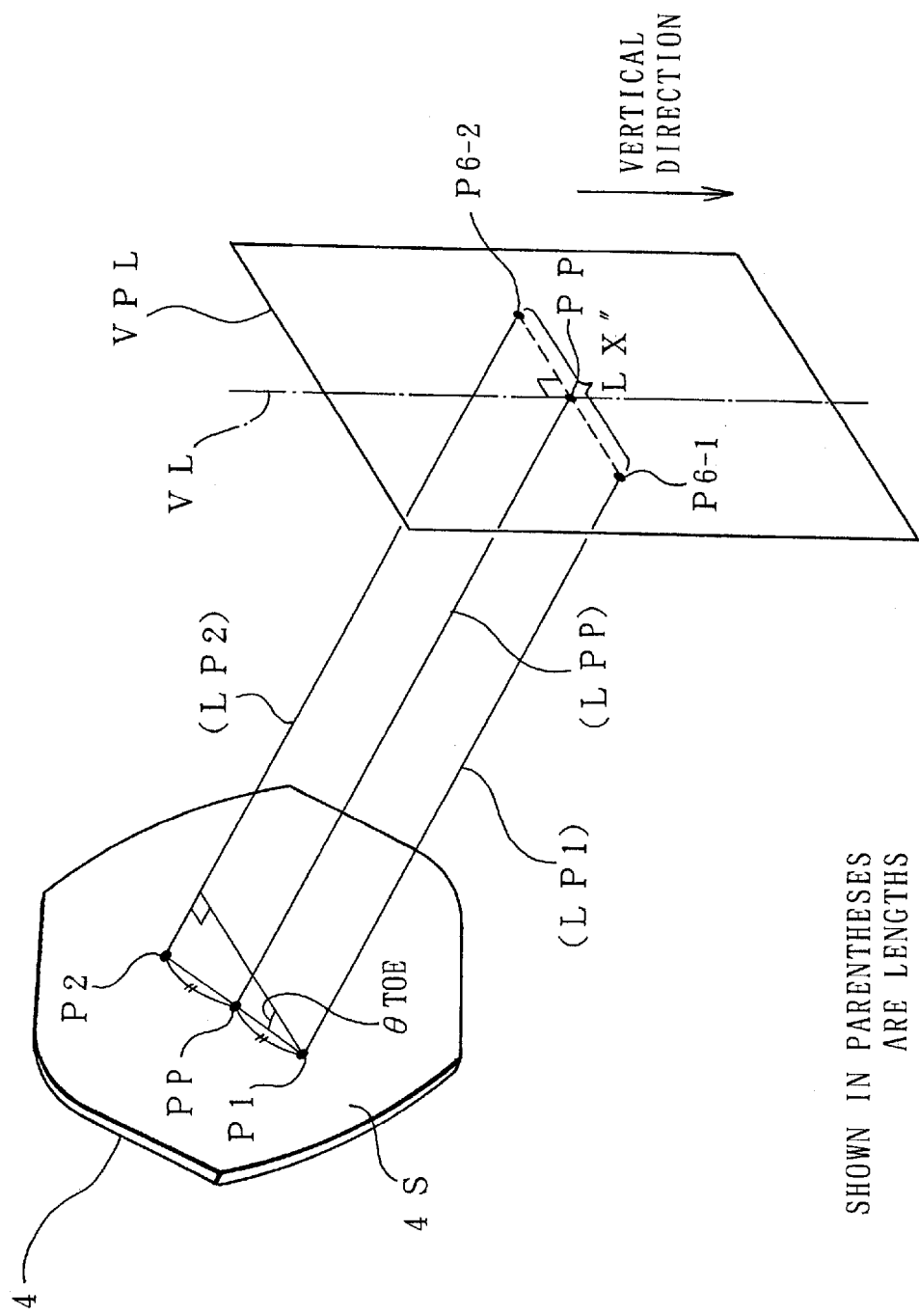
FIG. 31 illustrates the distance measurement.

The following is a description of measuring operations, with reference to FIGS. 30 and 31.

Here, the first circular mark MC1 should be always included in an image picked up by the color CCD camera 5A that constitutes the image pick-up unit 5, and the measuring plate 4 is attached to the wheel 3 of the measured vehicle 2 so that the origin O of the measuring surface 4S corresponds to the rotational center axis of the wheel 3.

FIG. 30 is a flowchart of the measuring operations. Like reference numerals are allotted to like components in FIG. 30 and FIG. 14 of the first embodiment.

As in the first embodiment, the wheel 3 of the measured vehicle 2 is first driven upward or downward by an actuator (not shown), independently of other wheels. The actuator is then stopped at the empty vehicle weight to maintain a stopped state (step S1).

The holding plate 10 and the image pick-up unit 5 are driven in the Z-axis direction, so that they face to the measuring surface 4S of the measuring plate 4. Then, the optical axes of the color CCD cameras 5A and 5B that constitute the image pick-up unit 5 are arranged in line with the origin O of the measuring surface 4S (step S2A).

Because of this, the virtual line connecting the laser irradiation points P1 and P2 of the laser displacement gauges 6-1 and 6-2 includes the origin O.

As a result, the arithmetic operation unit 28 can calculate the distance from the first circular mark MC1 on the measuring surface 4S of the measuring plate 4, based on the output signals DLD1 and DLD2 of the laser displacement gauges 6-1 and 6-2.

More specifically, assuming that the distance from the distance measuring area MLA of the measuring plate 4 corresponding to the output signal DLD1 of the laser displacement gauge 6-1 is LY1, and that the distance from the distance measuring area MLA of the measuring plate 4 corresponding to the output signal DLD2 is LY2, the distance LMC1 from the first circular mark MC1 can be expressed as:

$$LMC1=(LY1+LY2)/2$$

As in the first embodiment, the following operations are carried out: picking up an image of the measuring surface 4S of the measuring plate 4 by the image pick-up unit 5 (step S3); outputting the first picked-up image data DGG1 and the second picked-up image data DGG2 to the color separation circuit 27 of the data processing control unit 8A (step S4); performing color separation on the first picked-up image data DGG1 and the second picked-up image data DGG2 by the color separation circuit 27 (step S5); detecting the first circular mark MC1 by conducting a rough search at DN-dot intervals (step S6); detecting the first circular mark MC1 by conducting a fine search with a scan in the positive direction of the X-axis at 1-dot intervals (step S7); calculating the Z-axis center coordinate Z0 (step S8); detecting the first circular mark MC1 by conducting a rough search at CN-dot intervals with a scan in the positive direction of the Z-axis (step S9); and detecting the first circular mark MC1 by conducting a fine search in the positive direction of the X-axis at 1-dot intervals (equivalent to intervals of L5A/NN mm) until the first circular mark MC1 can no longer be detected, storing the dot number M1(=1 to NN) in the X-axis direction when the first circular mark MC1 is detected for the last time, and conducting a fine search of the first circular mark MC1 in the negative direction of the X-axis (step S10).

In step S10, when the first circular mark MC1 becomes undetectable again, the X-axis center coordinate X0 is calculated by the following formula (step S11A):

$$X0=(M1+M2)/2$$

based on the dot number M2 (=1 to NN) in the X-axis direction when the first circular mark MC1 is detected for the last time. As a result, the accuracy of the X-axis center coordinate X0 is ±L5A/NN mm.

Meanwhile, as shown in FIG. 18 of the first embodiment, the focal length of the lens of the color CCD camera 5B is set as f=f5B mm, and the number of pixels of the color CCD camera 5B is set as the same as that of the color CCD camera 5A, which is Nx×Nz dots. The color CCD camera 5B is disposed at a distance of Lf5b corresponding to the focal length f5B from the measuring surface 4S, so that the visual field $A_{RB}$ can cover the area of L5B×L5B mm. If Nx=Nz= NN (NN is a natural number), one pixel corresponds to a pitch of L5B/NN mm.

As shown in FIG. 19 of the first embodiment, the correction lines CL are subjected to sampling based on the white image obtained by adding the second red picked-up image data DR2, the second green picked-up image data DG2, and the second blue picked-up image data DB2 outputted from the color CCD camera 5B, and the inclination θ of the correction lines CL is calculated from the positional data by the method of least squares (step S12A).

Based on the image picked up by the color CCD camera 5A, the distance LL between the center coordinates of the first circular mark MC1 determined in steps S8 and S11 and the center coordinates CCB of the visual field ARB of the color CCD camera 5B is calculated (step S13A).

By doing so, the correction lines CL surrounding the center coordinates of the visual field ARB can be specified, and the position of the visual field ARB can be roughly detected.

Besides the calculation of the center coordinates (X0, Z0) of the first circular mark MC1 and the distance LL, the arithmetic operation unit 28 calculates the distance from the middle point between the irradiation points P1 and P2 on the measuring surface 4S of the measuring plate 4 (i.e., the distance from the optical axis position of the color CCD camera 5B) based on the output signals DLD1 and DLD2 of the laser displacement gauges 6-1 and 6-2 (step S14A).

The following is a detailed description of the calculation of the distance from the optical axis position.

As shown in FIG. 31, the laser emitting portions P6-1 and P6-2 (the reference numerals P6-1 and P6-2 also indicate the positions of the emitting portions) of the laser displacement gauges 6-1 and 6-2 are disposed on a virtual plane VPL which contains a virtual line VL in parallel with the vertical direction of the measured vehicle. The emitting portions P6-1 and P6-2 are situated on a line perpendicular to the virtual line VL and at the same distance from the virtual line VL.

In FIG. 31, the distance from the irradiation point Pa on the distance measuring area MLA of the measuring plate 4 corresponding to the output signal DLD1 of the laser displacement gauge 6-1 is LP1, and the distance from the irradiation point P2 on the distance measuring area MLA of the measuring plate 4 corresponding to the output signal DLD2 of the laser displacement gauge 6-2. Here, the distance LPP from the middle point between the irradiation points P1 and P2, i.e., from the optical axis position of the color CCD camera 5B is expressed as:

$$LPP = (LP1 + LP2)/2$$

As a result, the magnification of the picked-up image can be detected depending on the distance between the color CCD camera B and the measuring plate 4, and the real size of the image can be easily detected and corrected in image processing.

Toe Angle Measurement

While calculating the distance from the optical axis position, the arithmetic operation unit 28 also measures the toe angle (step S15A).

Figure 32:
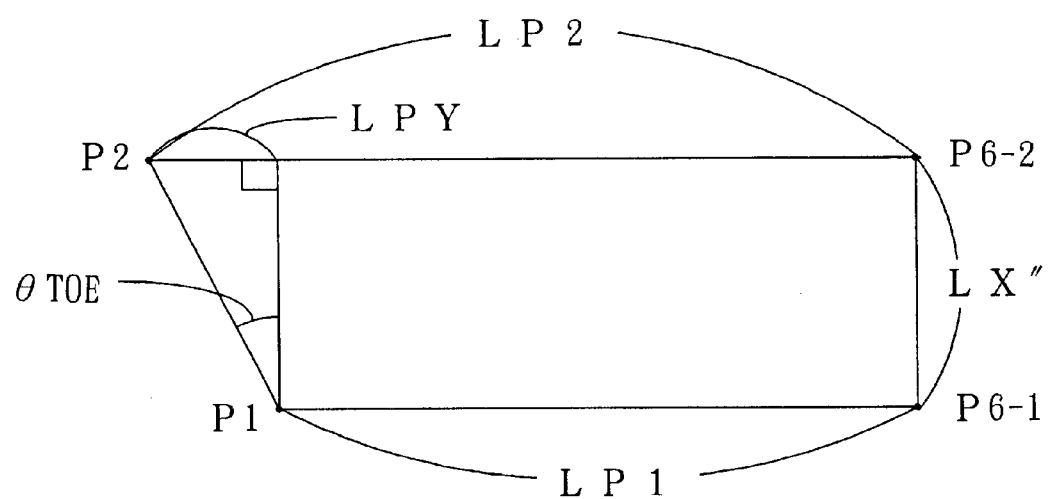
FIG. 32 illustrates the toe angle $\theta$TOE measurement.

More specifically, as shown in FIG. 32, the relationship with respect to the toe angle θTOE is expressed as:

$$\tan(\theta TOE) = LPY/LX''$$

wherein LX" is the distance between the measuring light irradiating point of the laser displacement gauge 6-1 and the measuring light irradiating point of the laser displacement gauge 6-2.

Accordingly, the toe angle θTOE is expressed as:

$$\theta TOE = \tan^{-1}(LPY/LX'')$$

Here, LPY is |LP1−LP2|, so the toe angle θTOE can be expressed as:

$$\theta TOE = \tan^{-1}(|LP1-LP2|/LX'')$$

Since the distance X" between the irradiation points P1 and P2 can be long on the measuring plate of this embodiment, the accuracy in measuring the toe angle θTOE can be improved.

As in the first embodiment, the following steps are then carried out: calculating the distance da between the center coordinates CCA of the visual field ARA and the center coordinates (X0, Z0) of the first circular mark MC1 (step S16); calculating the angle θa formed by a virtual line in parallel with the correction line CL extending through the center coordinates of the visual field ARA with respect to the line connecting the center coordinates of the visual field ARA and the center coordinates of the first circular mark MC1 (step S17); calculating the distance Xa and the distance Ya (step SI 8); calculating the position of the second circular mark MC2$n$ closest to the center coordinates of the visual field ARA by counting the number (nx) of second circular marks situated between the closest second circular mark MC2$n$ and the first circular mark MC1 in the X direction, and the number (ny) of the second circular marks in the Z direction (step S19); calculating the distances Xb and Yb between the center coordinates (X0, Z0) of the second circular mark MC2$n$ closest to the center coordinates of the visual field ARA and the center coordinates of the first circular mark MC1 (step S20); and calculating the angle θi(low accuracy) formed by the X-axis of the visual field ARA and the distance dd (low accuracy) between the center coordinates of the second circular mark MC2$n$ closest to the center coordinates of the visual field ARA and the center coordinates of the visual field ARA (step S21).

Further steps are carried out as in the first embodiment: calculating the low accuracy distances Xi and Yi between the center coordinates of the visual field ARA and the center coordinates of the second circular mark MC2$n$ closest to the center coordinates of the visual field ARA (step S22); converting the center coordinates of the second circular mark MC2$n$ closest to the center coordinates of the visual field ARB of the color CCD camera 5B into a dot address (IX, IY) (step S23); calculating the angle θb (high accuracy) formed by the X-axis of the visual field ARA and the distance Db (high accuracy) between the center coordinates of the visual field ARB and the center coordinates of the closest second circular mark MC2$n$ on the visual field ARB of the color CCD camera 5B (step S24); calculating the high accuracy distances Xc and Yc between the center coordinates of the visual field ARB and the center coordinates of the second circular mark MC2$n$ closest to the center coordinates of the visual field ARB (step S25); converting the center coordinates of the second circular mark MC2$n$ closest to the center coordinates of the visual field ARBof the color CCD camera SB into a dot address (X, Y) (step S26); and transforming the dot address (X, Y) into the system of coordinates including the X-axis and Z-axis on the measuring surface 4S of the measuring plate 4, so as to calculate a dot address (x, y) in the system of coordinates including the X-axis and Z-axis on the measuring surface 4S (step S27).

The arithmetic operation unit 28 next calculates the caster angle θCAS based on the second inclination data $D_{SL2}$ outputted from the caster angle measuring inclination gauge S$_{CAS}$ (step S28A), and calculates the camber angle θCAM based on the first inclination data D$_{SL1}$ outputted from the camber angle measuring inclination gauge S$_{CAM}$ (step S29A).

As described so far, in the second embodiment, the Y-direction distance from the measuring plate can be accurately calculated with the laser displacement gauges being secured. As there is no need to employ an X-Y stage or the like for driving the laser displacement gauges, the structure of the device can be simplified, and manufacturing costs can be reduced as well.

Although the distance measuring area MLA extends in longitudinal direction of the measured vehicle 2 with respect to the measuring mark area MRK, it may be situated only one side of the measuring mark area MRK. In such a case, however, the measurement accuracy becomes lower, because the irradiation points cannot be separated.

C: Third Embodiment

The following is a description of a third embodiment of the present invention.

Structure of the Wheel Alignment Measuring Device

Figure 33:
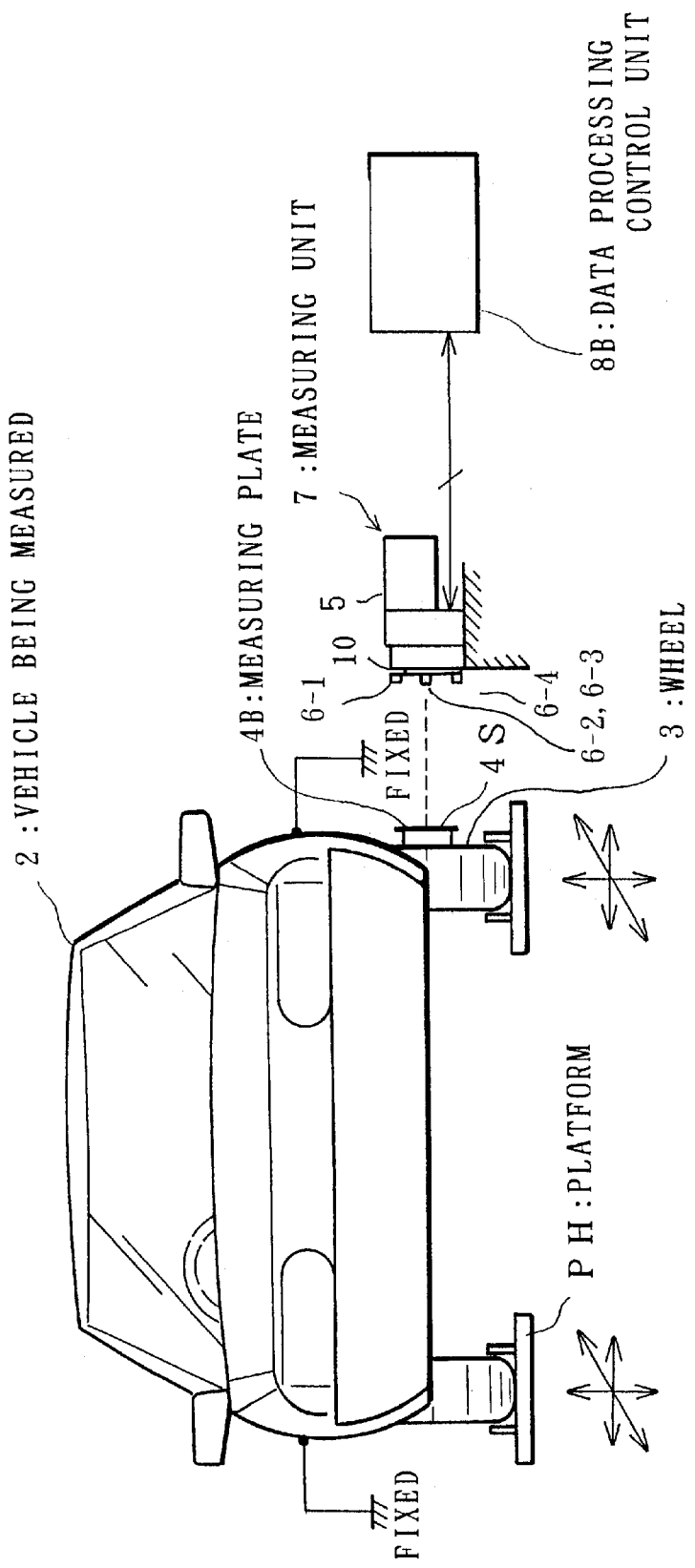
FIG. 33 is a block diagram illustrating the structure of the wheel alignment measuring device of the third embodiment.

FIG. 33 is a block diagram illustrating the structure of the wheel alignment measuring device. Like reference numerals are allotted to like components in FIG. 33 and FIG. 1 of the first embodiment.

The wheel alignment measuring device 1B comprises: a measuring plate 4B to be attached to a wheel 3 of a measured vehicle 2; a measuring unit 7 which picks up the image of the measuring surface 4S of the measuring plate 4 with an image pick-up unit 5 equipped with two CCD cameras capable of picking up color images, and measures the distance from the measuring surface 4S of the measuring plate with four laser displacement gauges 6-1 to 6-4; and a data processing control unit 8B which performs alignment operations based on output signals from the measuring unit 7, and controls the measuring unit 7.

Structure of the Measuring Plate

Figure 34:
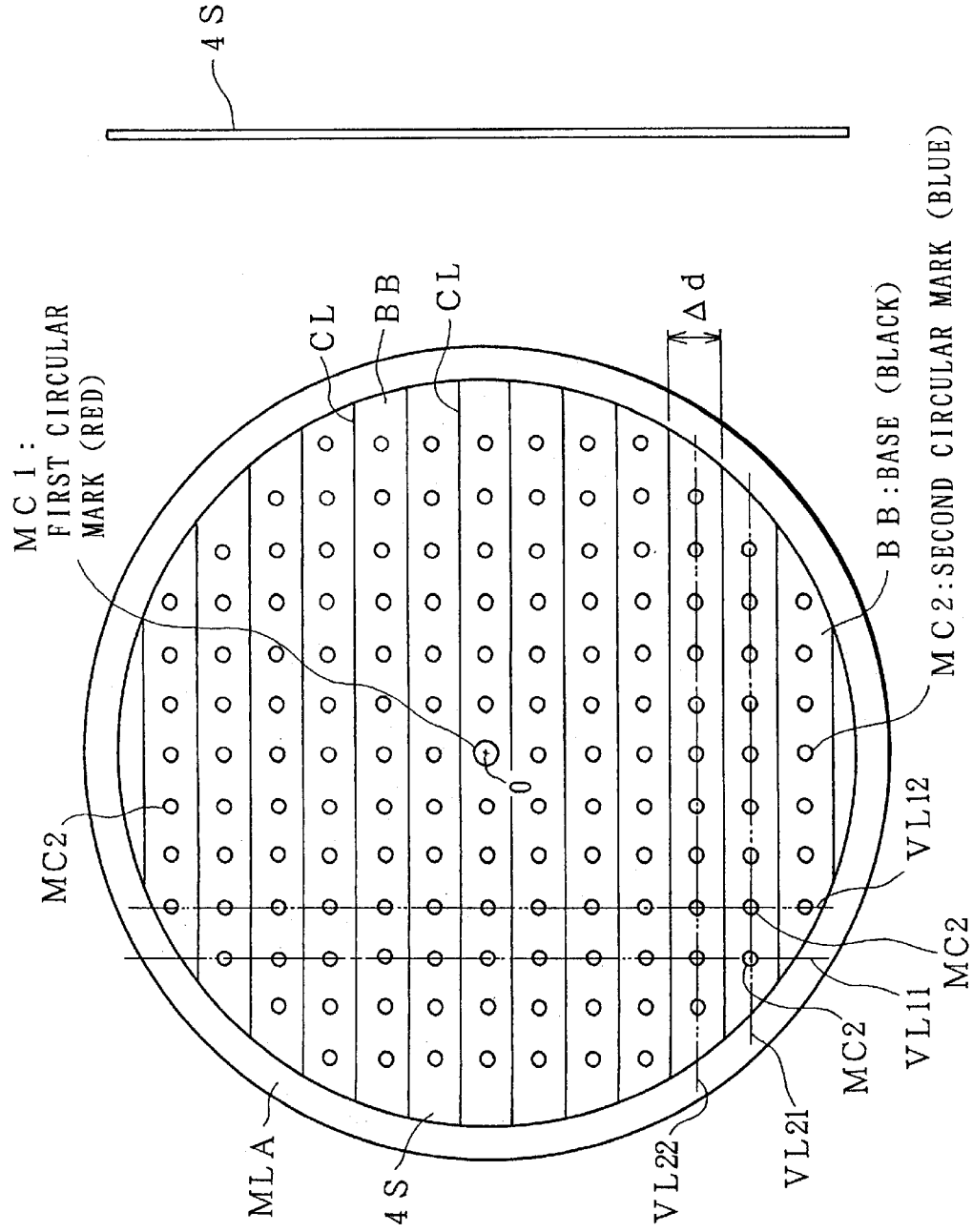
FIGS. 34A and 34B illustrate the measuring plate.

FIGS. 34A and 34B show the measuring plate. FIG. 34A is a front view of the measuring plate, and FIG. 34B is a side view of the measuring plate.

The measuring surface 4S of the measuring plate 4B is flat, and as shown in FIGS. 34A and 34B, it consists of: a base BB which is colored black; a first circular mark MC1 which is colored red and serves as a reference mark with the origin O of the measuring surface 4S in its center; a plurality of second circular marks MC2 which are colored blue; a plurality of correction lines CL which are colored white; and a distance measuring area MLA which is optically uniform (i.e., uniform in reflectance). The plurality of second circular marks MC2 have center coordinates at the intersections of first parallel virtual lines (only two first virtual lines VL11 and VL12 are shown in FIG. 34A) and second parallel virtual lines (only two second virtual lines VL21 and VL22 are shown in FIG. 34A). The plurality of correction lines CL are in parallel with either the first virtual lines or the second virtual lines (they are in parallel with the second virtual lines VL21 and VL22 in FIG. 34A), and their interval distances Δd are uniform. Measuring light emitted from the laser displacement gauges 6-1 to 6-3 irradiates the distance measuring area MLA.

As the circular marks MC1 and MC2, and the correction lines CL serve as measuring scales, they should be drawn with a certain precision so that desired accuracy can be achieved in measurement.

The measuring surface 4S of the measuring plate 4 of this embodiment is the same as in FIG. 4 of the first embodiment.

Structure of the Measuring Unit

Figure 35:
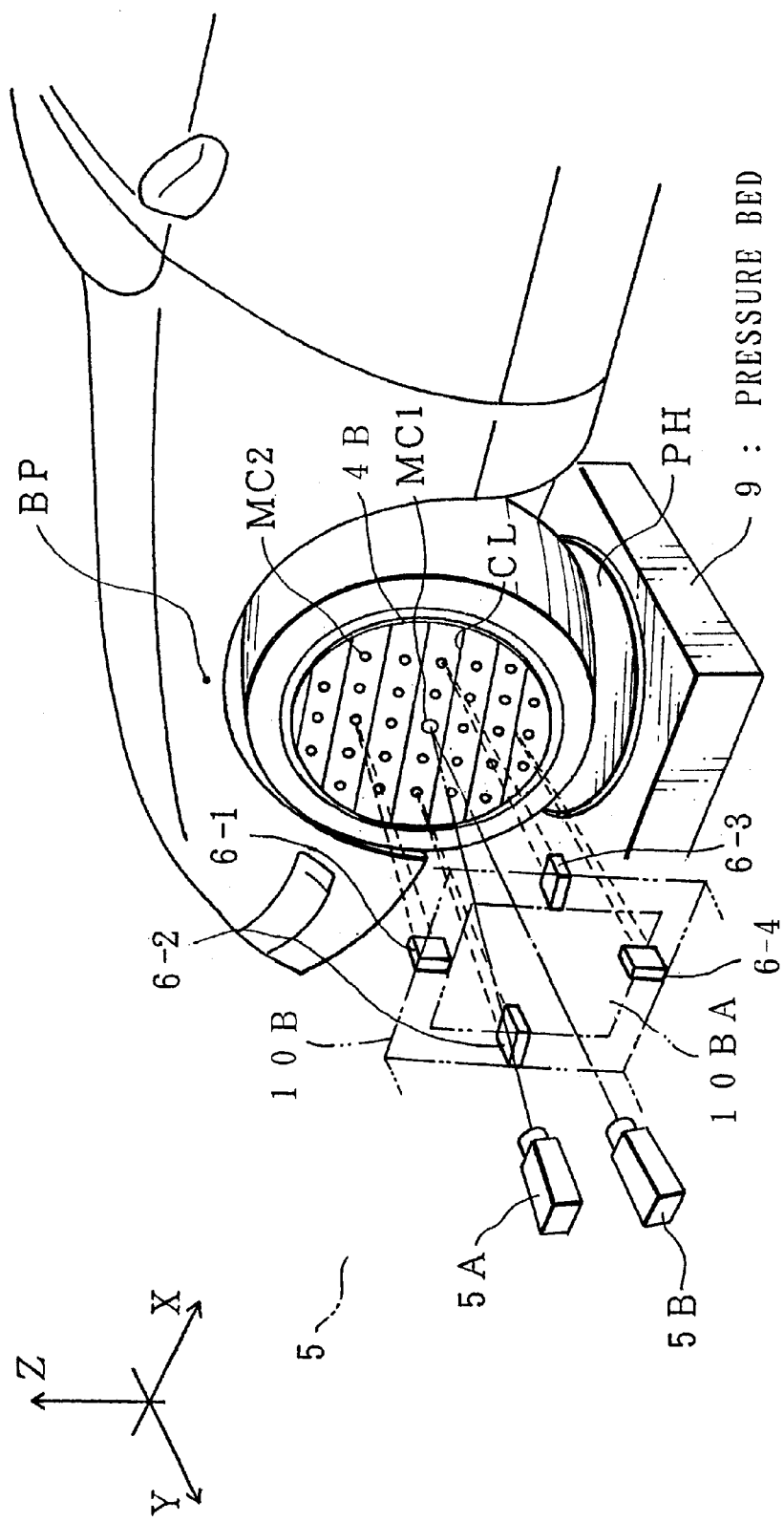
FIG. 35 is a partial perspective view of the measuring unit.
Figure 36:
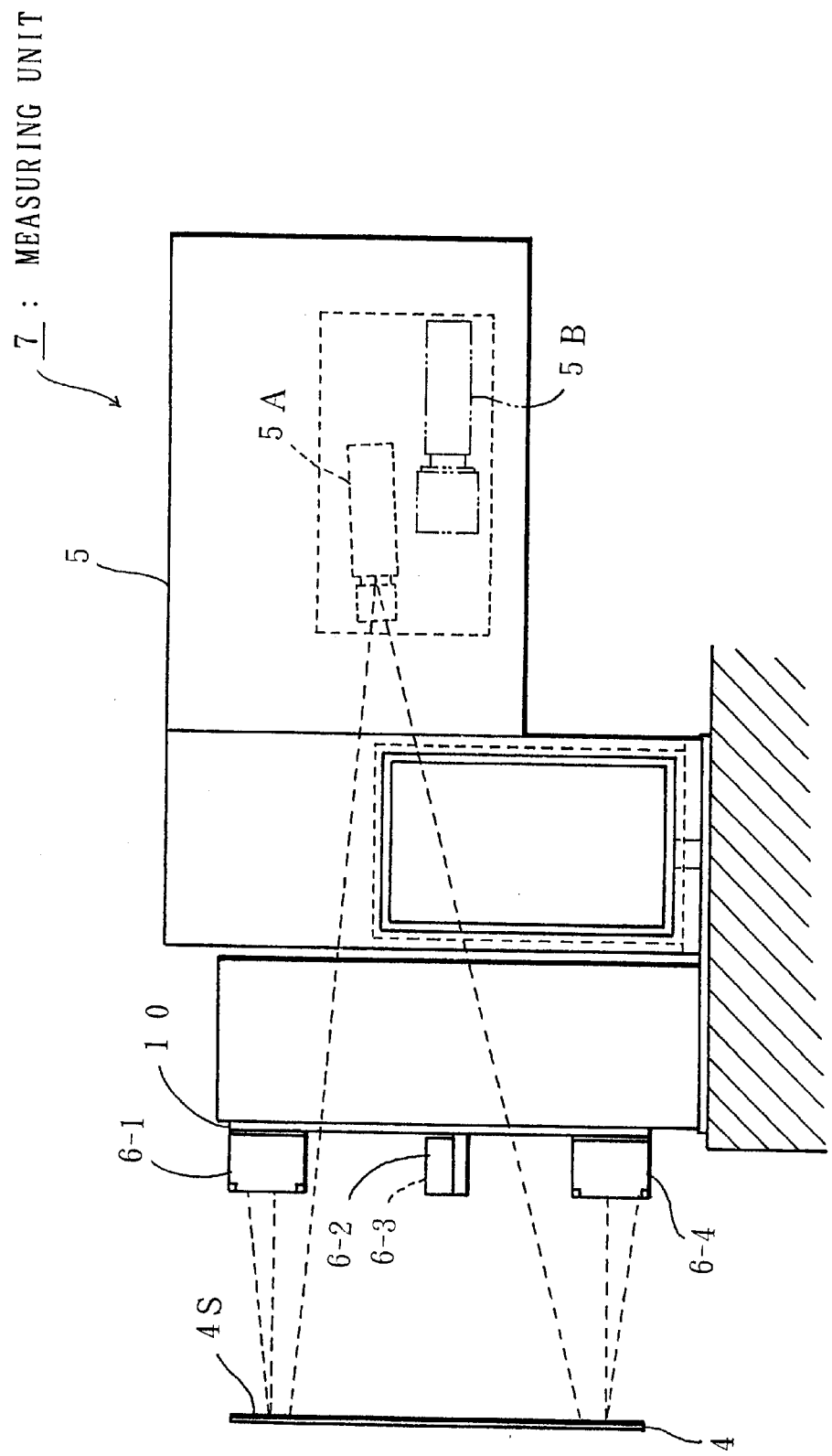
FIG. 36 is a side view of the measuring unit.
Figure 37:
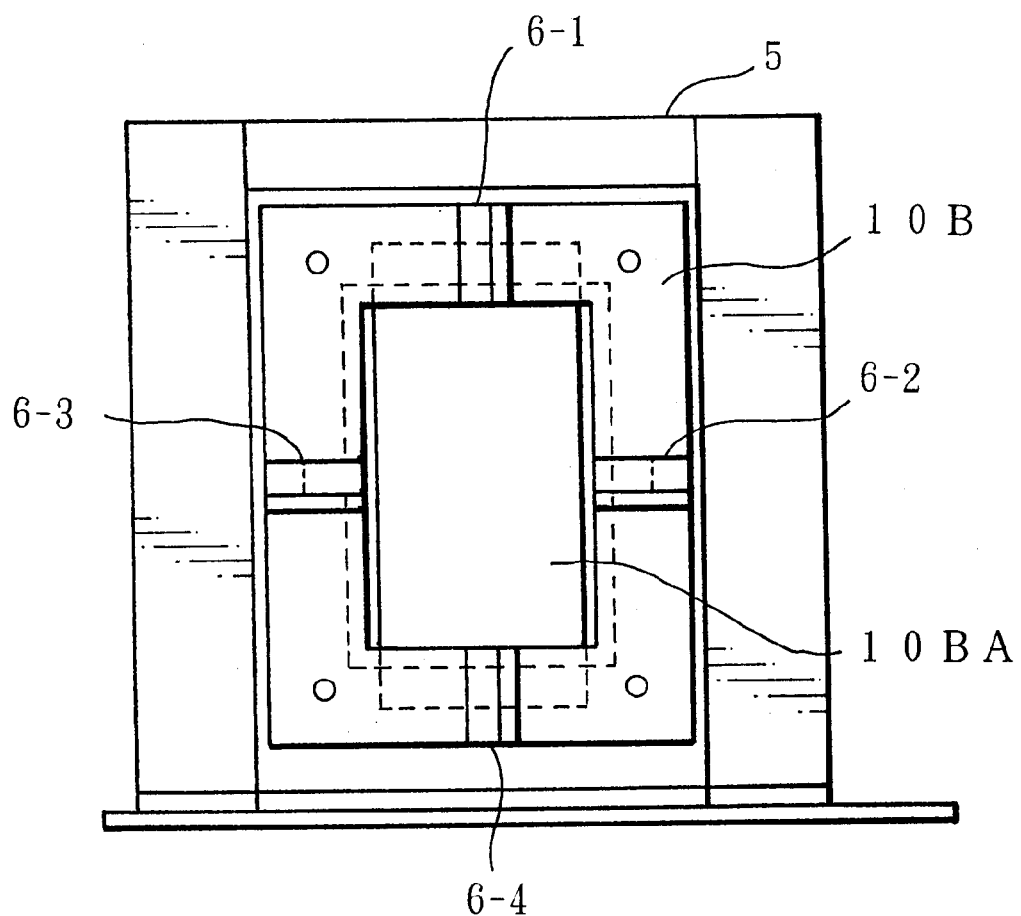
FIG. 37 is a front view of the measuring unit.

FIG. 35 is a partial perspective view of the measuring unit, FIG. 36 is a side view of the measuring unit, and FIG. 37 is a front view of the measuring unit.

The measuring unit 7 comprises: a holding plate 10B which is rectangular and holds the four laser displacement gauges 6-1 to 6-4; and the image pick-up unit 5 which is provided on the rear side of the holding plate 10B and picks up images of the measuring plate 4 through an opening 10BA.

Structure of the Data Processing Control Unit

Figure 38:
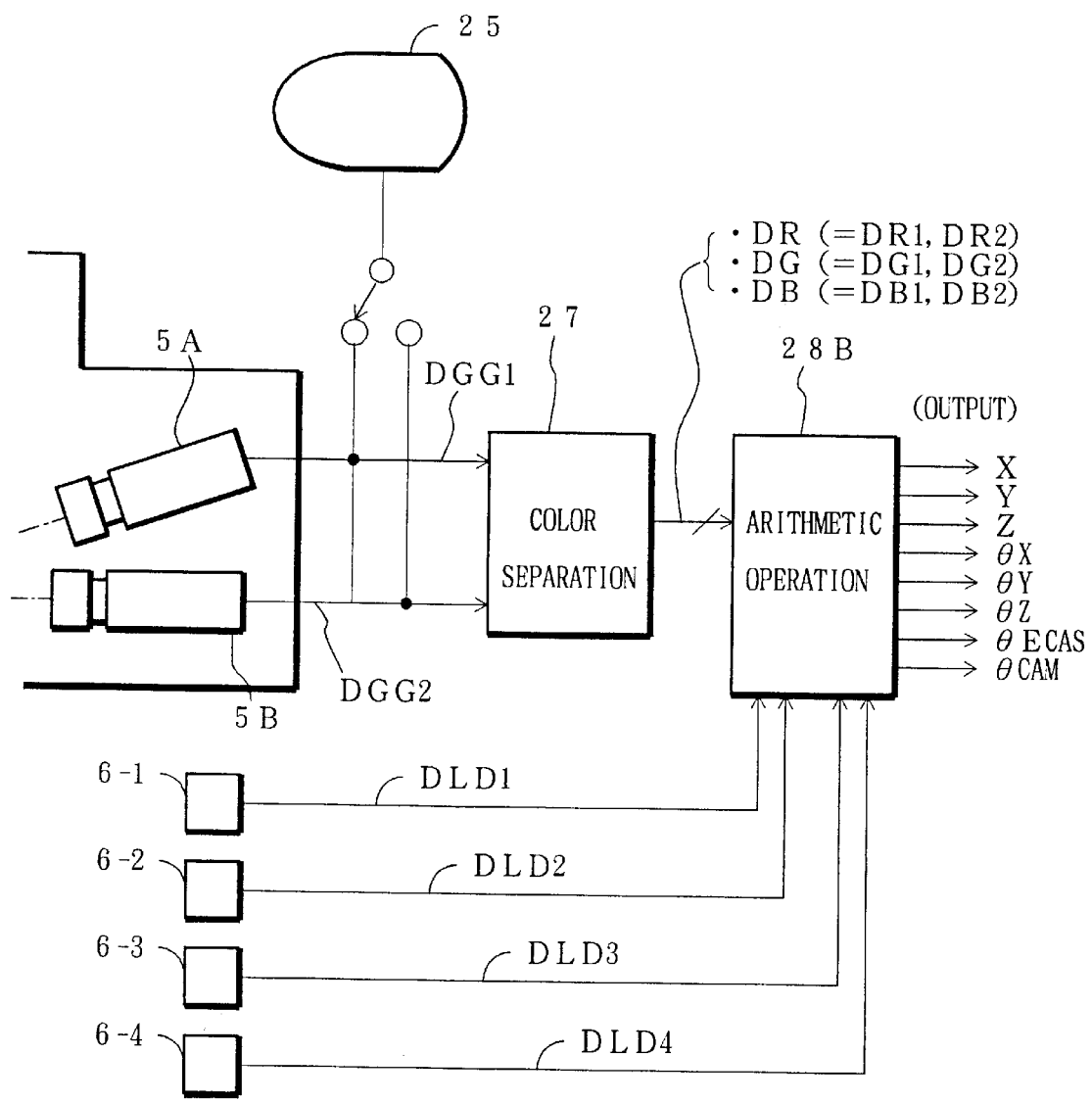
FIG. 38 is a block diagram illustrating the structure of the data processing control unit.

FIG. 38 is a block diagram illustrating the structure of the data processing control unit 8B.

The data processing control unit 8B comprises a display 25, a color separation circuit 27, and an arithmetic operation unit 28. The display 25 displays an image based on first picked-up image data DGG1 outputted from a color CCD camera 5A (mentioned later) or second picked-up image data DGG2 outputted from a color CCD camera 5B. The color separation circuit 27 performs color separation based on the first picked-up image data DGG1 and the second picked-up image data DGG2 outputted from the image pick-up unit 5, and outputs red picked-up image data DR corresponding to red, green picked-up image data DG corresponding to green, and blue picked-up image data DB corresponding to blue. The arithmetic operation unit 28 outputs: X-coordinate data X on the measuring surface 4S of the measuring plate 4 in a predetermined position in a high-resolution picked-up image (for instance, the center of the picked-up image); Y-coordinate data Y of the measuring surface 4S; Z-coordinate data Z on the measuring surface 4S of the measuring plate 4 in a predetermined position in a high-solution picked-up image; an inclination θx with respect to the X-axis on the measuring surface 4S; an inclination θy with respect to the Y-axis on the measuring surface 4S; an inclination θz with respect to the Z-axis on the measuring surface 4S (these inclination data are used as a basis in spin angle data DSP operations); and position control data DPC, based on output signals DLD1 to DLD4 from the four laser displacement gauges 6-1 to 6-4, the red picked-up image data DR, the green picked-up image data DG, and the blue picked-up image data DB.

Here, the red picked-up image data DR include first red picked-up image data DR1 corresponding to the first picked-up image data DGG1 and second red picked-up image data DR2 corresponding to the second picked-up image data DGG2, the green picked-up image data DG include first green picked-up image data DG1 corresponding to the first picked-up image data DGG1 and second green picked-up image data DG2 corresponding to the second picked-up image data DGG2, and the blue picked-up image data DB include first blue picked-up image data DB1 corresponding to the first picked-up image data DGG1 and second blue picked-up image data DB2 corresponding to the second picked-up image data DGG2.

The structure and arrangement of the image pick-up unit 5 are the same as in FIGS. 9 to 12 of the first embodiment.

Arrangements of the Laser Displacement Gauges

Figure 39A:
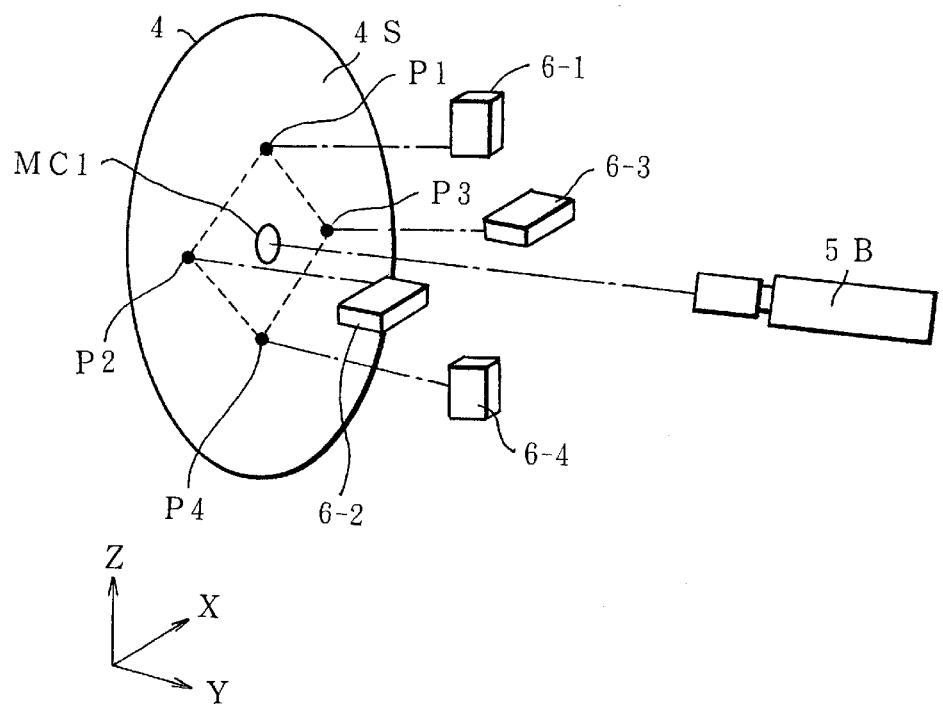
FIGS. 39A to 39C illustrate the arrangements of the laser displacement gauges.
Figure 39B:
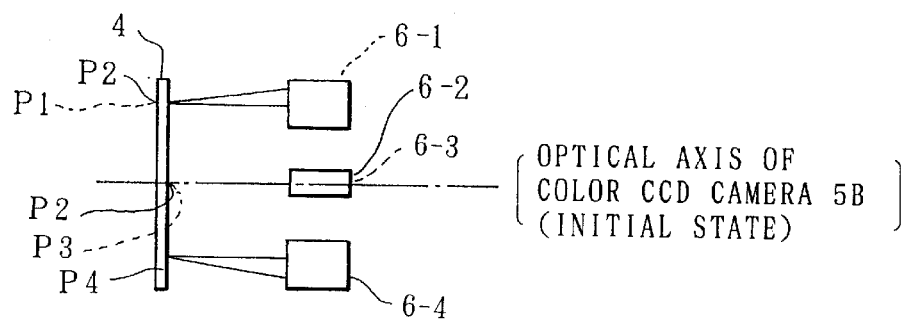
Figure 39C:
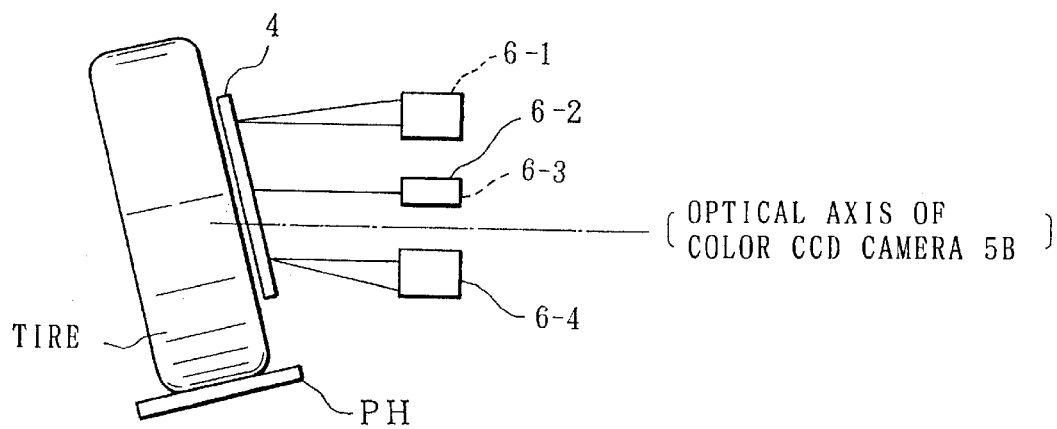

FIGS. 39 show the arrangements of the laser displacement gauges. FIG. 39A is a perspective view illustrating the arrangements of the laser displacement gauges, FIG. 39B is a side view of the laser displacement gauges in the initial state, and FIG. 39C is a side view of the laser displacement gauges in a measuring state.

As shown in FIGS. 39A and 39B, the laser displacement gauges 6-1 to 6-4 in the initial state are arranged so that the measuring laser irradiation points P1 to P4 are situated at the corners of a virtual parallelogram whose diagonal lines cross at the center point of the first circular mark MC1.

Figure 40:
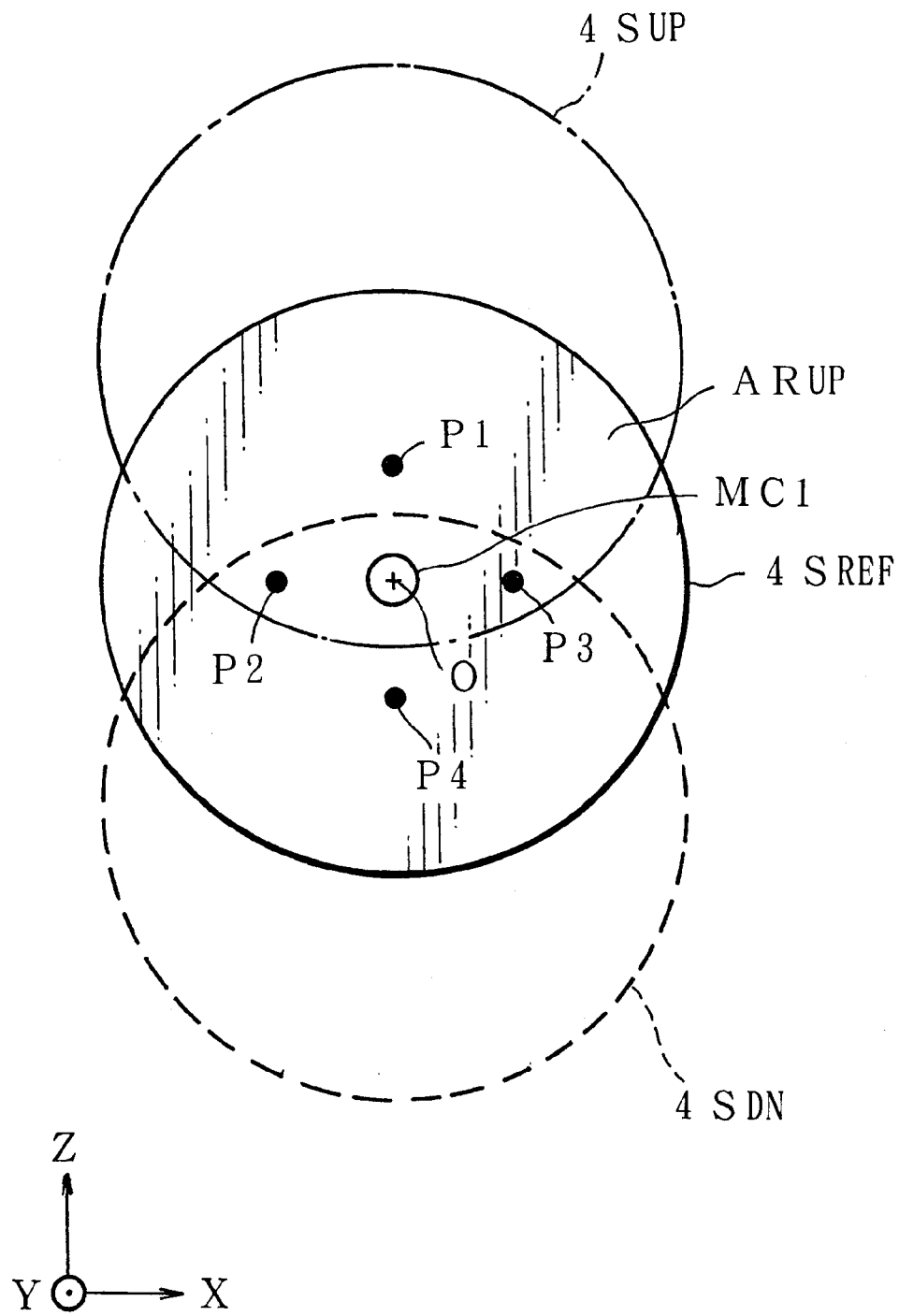
FIG. 40 illustrates the arrangements of the laser displacement gauges.

Here, as shown in FIG. 40, the laser displacement gauges 6-1 to 6-3 are disposed so that the irradiation points P1 to P3 are situated within the common area ARUP (surrounded by a solid line and a dashed line) between a measuring surface 4SUP corresponding to the measuring plate 4 in the furthest position in the positive direction of the Z-axis and a measuring surface 4SREF corresponding to the measuring plate 4 in the reference position (in the initial state). The laser displacement gauges 6-2 to 6-4 are arranged so that the irradiation points P2 to P4 are situated within the common area ARDN (surrounded by a solid line and a chain line) between the measuring surface 4SREF and the measuring surface 4SDN corresponding to the measuring plate 4 in the furthest position in the negative direction of the Z-axis.

Figure 41A:
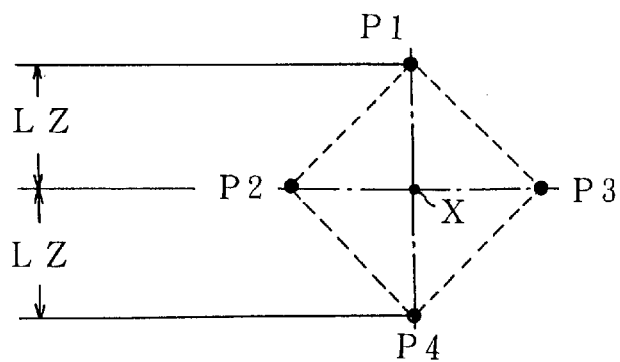
FIGS. 41A and 41B illustrate the arrangements of the laser displacement gauges.

As shown in FIG. 41A, the irradiation points P1 to P4 are situated at the corners of the virtual parallelogram P1P2P3P4. Assuming the intersection X of the diagonal lines P1P4 and P2P3, the distance LZ between the intersection X and the irradiation point P1 and the distance LX between the intersection X and the irradiation point P4 are made as long as possible so as to improve the accuracy of the camber angle θCAM In the initial state, the intersection X is made equal to the center point O of the first circular mark MC1.

Figure 41B:
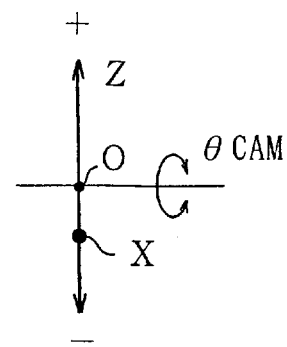

The arithmetic operation unit 28B judges whether the intersection X is in the positive direction or in the negative direction of the Z-axis with respect to the center point O of the first circular mark MC1 (see FIG. 41B). If the intersection X is situated in the position direction of Z-axis with respect to the center point O, the arithmetic operation unit 28B calculates the camber angle θCAM from the output signals DLD1 to DLD3 of the laser displacement gauges 6-1 to 6-3 corresponding to the irradiation points P1 to P3. If the intersection X is situated in the negative direction of the Z-axis with respect to the center point O of the first circular mark MC1, the arithmetic operation unit 28B calculates the camber angle θCAM from the output signals DLD2 to DLD4 of the laser displacement gauges 6-2 to 6-4 corresponding to the irradiation points P2 to P4. To judge whether the intersection X is situated in the positive direction or in the negative direction of the Z-axis with respect to the center point O of the first circular mark MC1, the distance from the measuring surface 4S corresponding to the output signal DLD1 or the output signal DLD4 is judged as to whether it exceeds the measurable range (i.e., whether one of the laser lights does not irradiate the measuring surface 4S), and the optical axis of the color CCD camera 5B is judged as to where it is situated on the measuring surface 4S based on the image processing result of the color CCD camera 5B.

If the intersection X is situated in the positive direction of the Z-axis with respect to the center point o of the first circular mark MC1, the camber angle θCAM is calculated from the output signals DLD1 to DLD3 of the laser displacement gauges 6-1 to 6-3 corresponding to the irradiation points P1 to P3. If the intersection X is situated in the negative direction of the Z-axis with respect to the center point O of the first circular mark MC1, the camber angle θCAM is calculated from the output signals DLD2 to DLD4 of the laser displacement gauges 6-2 to 6-4 corresponding to the irradiation points P2 to P4.

The number of the laser displacement gauges may be larger than four, as long as three or more laser irradiation points are secured when the measuring plate 4 is in the measurement area.

Measuring Operations

Figure 44:
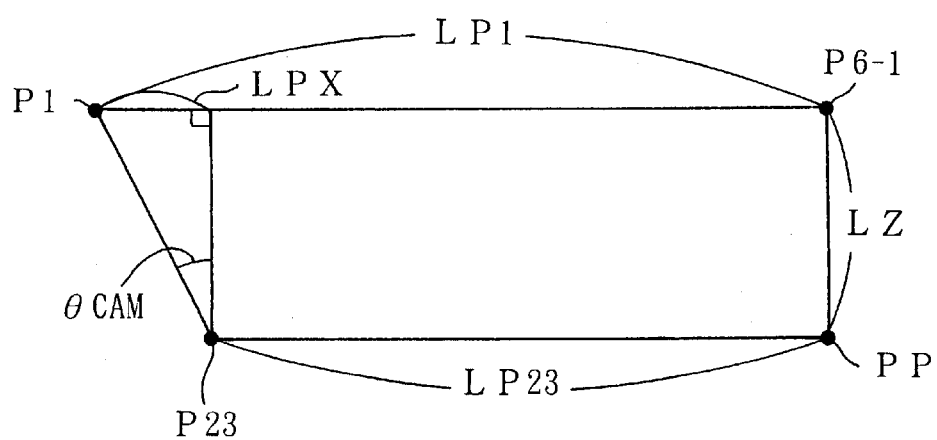
FIG. 44 illustrates the calculation of the camber angle.
Figure 42:
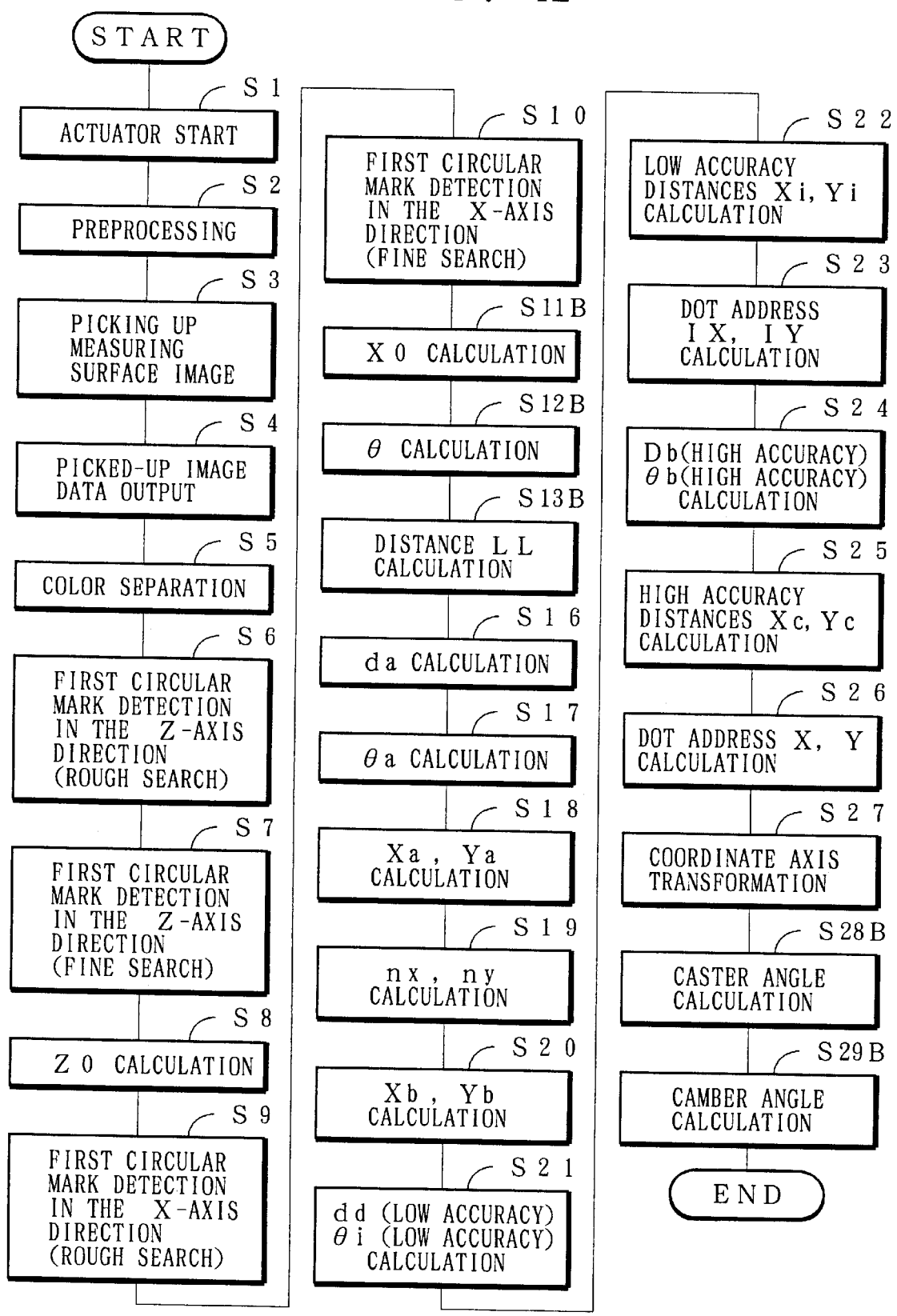
FIG. 42 is a flowchart of the measuring operation of the third embodiment.
Figure 43:
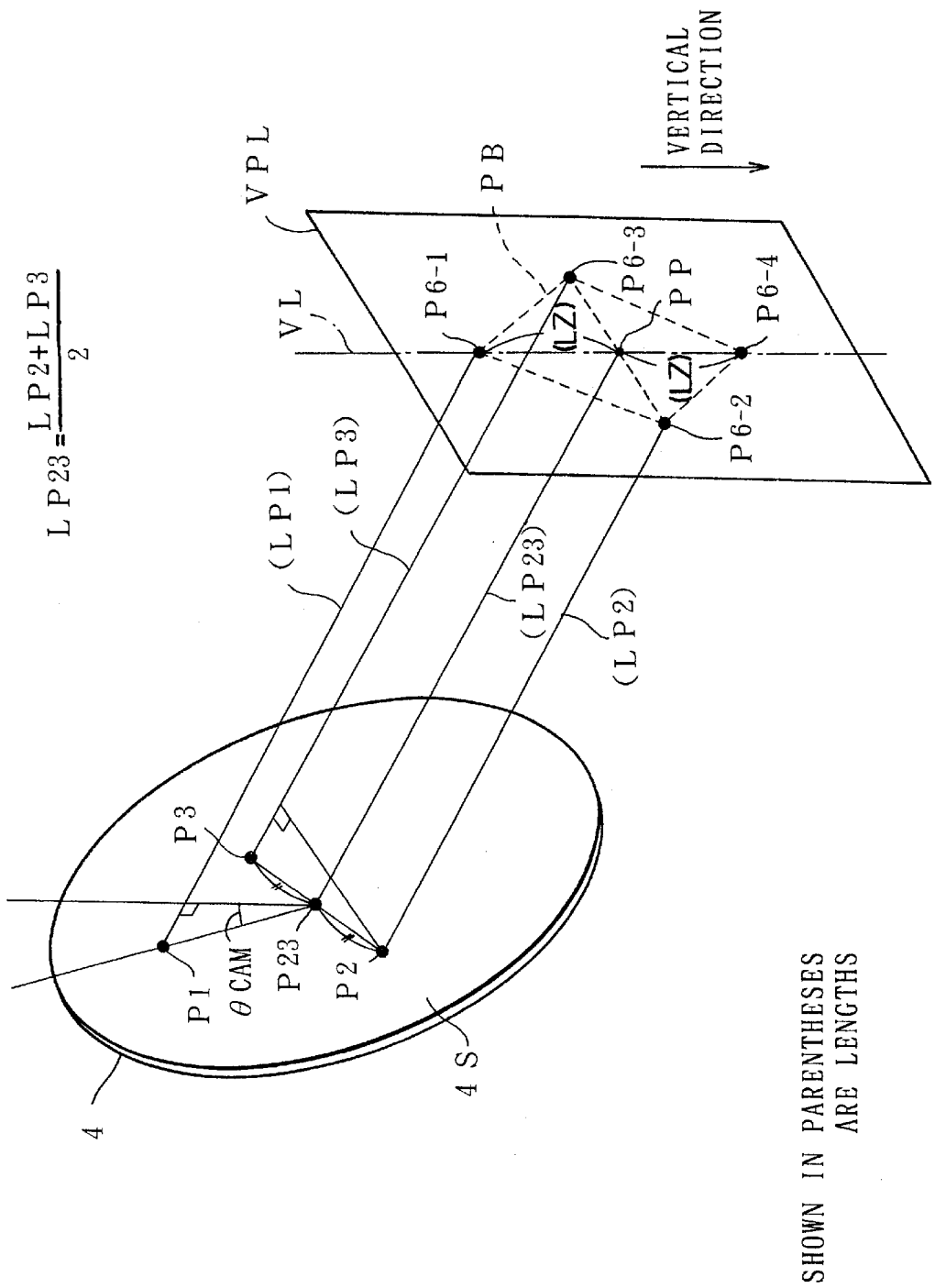
FIG. 43 illustrates the calculation of the camber angle.

The following is a description of measuring operations, with reference to FIGS. 42 to 44.

Here, the first circular mark MC1 should be always included in an image picked up by the color CCD camera 5A that constitutes the image pick-up unit 5, and the measuring plate 4 is attached to the wheel 3 of the measured vehicle 2 so that the origin O of the measuring surface 4S corresponds to the rotational center axis of the wheel 3.

FIG. 42 is a flowchart of the measuring operations. Like reference numerals are allotted to like components in FIG. 42 and FIG. 14 of the first embodiment.

As in the first embodiment, the wheel 3 of the measured vehicle 2 is first driven upward or downward by an actuator (not shown), independently of other wheels. The actuator is then stopped at the empty vehicle weight to maintain a stopped state (step S1).

The holding plate 10 and the image pick-up unit 5 are disposed so that they face to the measuring surface 4S of the measuring plate 4, and the optical axes of the color CCD cameras 5A and 5B that constitute the image pick-up unit 5 are arranged in line with the origin O of the measuring surface 4S (step S2).

Because of this, the intersection of the laser irradiation points P1 to P4 of the laser displacement gauges 6-1 to 6-4 corresponds to the origin O.

As in the first embodiment, the following operations are carried out: picking up an image of the measuring surface 4S of the measuring plate 4 by the image pick-up unit 5 (step S3); outputting the first picked-up image data DGG1 and the second picked-up image data DGG2 (step S4); performing color separation by the color separation circuit 27 (step S5); detecting the first circular mark MC1 by conducting a rough search at DN-dot intervals (step S6); detecting the first circular mark MC1 by conducting a fine search with a scan in the positive direction of the X-axis at 1-dot intervals (step S7); calculating the Z-axis center coordinate Z0 (step S8); detecting the first circular mark MC1 by conducting a rough search at CN-dot intervals with a scan in the positive direction of the Z-axis (step S9); and detecting the first circular mark MC1 by conducting a fine search in the positive direction of the X-axis at 1-dot intervals (equivalent to intervals of L5A/NN mm) until the first circular mark MC1 can no longer be detected, storing the dot number M1(=1 to NN) in the X-axis direction when the first circular mark MC1 is detected for the last time, and conducting a fine search of the first circular mark MC1 in the negative direction of the X-axis (step S10).

In step S10, when the first circular mark MC1 becomes undetectable again, the X-axis center coordinate X0 is calculated based on the dot number M2 (=1 to NN) in the X-axis direction at the last detection of the first circular mark MC1 (step S11B).

As shown in FIG. 24, the correction lines CL are subjected to sampling based on the white image obtained by adding the second red picked-up image data DR2, the second green picked-up image data DG2, and the second blue picked-up image data DB2 outputted from the color CCD camera 5B, and the inclination θ of the correction lines CL is calculated from the positional data by the method of least squares (step S12B).

Based on the image picked up by the color CCD camera 5A, the distance LL between the center coordinates (X0, Z0) of the first circular mark MC1 determined in steps S8 and S11B and the center coordinates CCB of the visual field ARB of the color CCD camera 5B is calculated (step S13B).

By doing so, the correction lines CL surrounding the center coordinates of the visual field ARB can be specified, and the position of the visual field ARB can be roughly detected.

While calculating the center coordinates (X0, Z0) of the first circular mark MC1 and the distance LL, the arithmetic operation unit 28 also calculates the distance from the first circular mark MC1 on the measuring surface 4S of the measuring plate 4, based on the output signals DLD1 to DLD4 of the laser displacement gauges 6-1 to 6-4.

As in the first embodiment, the following steps are then carried out: calculating the distance da between the center coordinates CCA of the visual field ARA and the center coordinates (X0, Z0) of the first circular mark MC1 (step S16); calculating the angle θ a formed by a virtual line in parallel with the correction line CL extending through the center coordinates of the visual field ARA with respect to the line connecting the center coordinates of the visual field ARA and the center coordinates of the first circular mark MC1 (step S17); calculating the distance Xa and the distance Ya (step S18); calculating the position of the second circular mark MC2n closest to the center coordinates of the visual field ARA by counting the number (nx) of second circular marks situated between the closest second circular mark MC2n and the first circular mark MC1 in the X direction, and the number (ny) of the second circular marks in the Z direction (step S19); calculating the distances Xb and Yb between the center coordinates (X0, Z0) of the second circular mark MC2n closest to the center coordinates of the visual field ARA and the center coordinates of the first circular mark MC1 (step S20); and calculating the angle θi(low accuracy) formed by the X-axis of the visual field ARA and the distance dd (low accuracy) between the center coordinates of the visual field ARA and the center coordinates of the second circular mark MC2n closest to the center coordinates of the visual field ARA (step S21).

Further steps are carried out as in the first embodiment: calculating the low accuracy distances Xi and Yi between the center coordinates of the visual field ARA and the center coordinates of the second circular mark MC2n closest to the center coordinates of the visual field ARA (step S22); converting the center coordinates of the second circular mark MC2n closest to the center coordinates of the visual field ARB of the color CCD camera 5B into a dot address (IX, IY) (step S23); calculating the angle θb (high accuracy) formed by the X-axis of the visual field ARA and the distance Db (high accuracy) between the center coordinates of the visual field ARB and the center coordinates of the closest second circular mark MC2n on the visual field ARB of the color CCD camera 5B (step S24); calculating the high accuracy distances Xc and Yc between the center coordinates of the visual field ARB and the center coordinates of the second circular mark MC2n closest to the center coordinates of the visual field ARB (step S25); converting the center coordinates of the second circular mark MC2n closest to the center coordinates of the visual field ARB of the color CCD camera 5B into a dot address (X, Y) (step S26); and transforming the dot address (X, Y) into the system of coordinates including the X-axis and Z-axis on the measuring surface 4S of the measuring plate 4, so as to calculate a dot address (x, y) in the system of coordinates including the X-axis and Z-axis on the measuring surface 4S (step S27).

The arithmetic operation unit 28 next calculates the caster angle based on the inclination of the scale line with respect to the horizontal direction (or the vertical direction) of the picked-up image (step S28B).

In this case, at least three irradiation points among the measuring laser irradiation points P1 to P4 of the laser displacement gauges 6-1 to 6-4 are always situated on the measuring surface 4S of the measuring plate 4. Because of that, the output signals DLD1 to DLD4 of the laser displacement gauges 6-1 to 6-4 are secure, providing accurate distance information.

Based on the secure output signals DLD1 to DLD4, the camber angle θCAM can be accurately calculated from the differences in geometric distance from the measuring laser irradiation points P1 to P4 on the measuring surface 4S of the measuring plate 4 corresponding to the laser displacement gauges 6-1 to 64, respectively (step S29B).

Calculation of the Camber Angle

The following is a description of the calculation of the camber angle θCAM with reference to FIGS. 43 and 44.

The laser irradiating emitting portions P6-1 to P6-4 of the laser displacement gauges 6-1 to 6-4 (the reference numerals P6-1 to P6-4 also indicates the position of the emitting portions) are situated on a virtual plane VPL containing a virtual line VL in parallel with the vertical direction of the measured vehicle. The emitting portions P6-1 to P6-4 are arranged at the corners of a virtual parallelogram PB which is located so that the virtual line VL overlaps with the diagonal line P6-1 P6-4 of the virtual parallelogram PB on the virtual plane VPL.

FIG. 43 shows the measuring plate 4 in the positive direction of the Z-axis. In such a case, the camber angle θCAM is calculated based on the output signals DLD1 to DLD3 of the laser displacement gauges 6-1 to 6-3.

More specifically, the distance LP23 from the middle point P23 between the irradiation points P2 and P3 to the intersection PP of the diagonal lines of the virtual parallelogram PB is expressed as:

$$LP23=(LP2+LP3)/2$$

wherein: LP1 is the distance from the irradiation point P1 corresponding to the output signal DLD1; LP2 is the distance from the irradiation point P2 corresponding to the output signal DLD2; and LP3 is the distance from the irradiation point P3 corresponding to the output signal DLD3.

Here, the relationship with the camber angle θCAM can be expressed as shown in FIG. 44:

$$\tan(\theta cam)=LPX/LZ$$

Accordingly, the camber angle θCAM can be expressed as:

$$\theta CAM=\tan^{-1}(LPX/LZ)$$

Since LPX is expressed as: LPX=|LP1−LP23|, θCAM can also be expressed as:

$$\theta CAM=\tan^{-1}(|LP1-LP23|/LZ)$$
$$=\tan^{-1}(|LP1-((LP2+LP3)/2)|/LZ)$$
$$=\tan^{-1}(|(2LP1-LP2-LP3)/2|/LZ)$$

As a result, the arithmetic operation unit 28B outputs the dot address x as X-coordinate data DX, the dot address y as Z-coordinate data DZ, and the camber angle as inclination data DSP and camber angle data DCB.

As described so far, according to the third embodiment, the camber angle θCAM can be accurately calculated with the laser displacement gauges in a fixed state. As there is no need for employing an X-Y stage or the like for driving the laser displacement gauges, the whole structure can be simplified, and the manufacturing costs can be lowered.

Based on the picked-up images of the two color CCD cameras 5A and 5B, the position and spin angle corresponding to the center coordinates of the first circular mark MC1 on the measuring surface 4S of the measuring plate 4 situated in a predetermined position (in the center in the above description) within the image picked up by the color CCD camera 5B can be calculated speedily and accurately, which improves reproducibility of the measurement.

Thus, wheel alignment measurements can be taken speedily and accurately, while its reproducibility and reliability can be improved as well.

D: Fourth Embodiment

The following is a description of a fourth embodiment of the present invention, with reference to the accompanying drawings.

Prior to describing the fourth embodiment in detail, the object of this embodiment will be given below.

In a conventional optical wheel alignment measuring device of a non-contact type, a measuring unit provided with a plurality of laser displacement gauges is disposed on each platform. The measuring unit moves in the longitudinal direction of the vehicle to optically measure the distance from a predetermined reference position to the measuring plate attached to one side of the wheel. The position Y, the toe angle, and the camber angle of the measuring plate in the transverse direction are thus calculated. Meanwhile, an image of a predetermined measuring pattern drawn on the measuring surface of the measuring plate is picked up by a CCD camera, so that the position X of the measuring plate in the longitudinal direction of the vehicle, the position Z and the caster angle of the measuring plate in the transverse direction can be calculated through image processing.

When measuring the position Y, the toe angle, and the camber angle with the non-contact type wheel alignment measuring device, the reflection strength is varied due to the laser beams emitted onto the measuring pattern on the measuring surface from the laser displacement gauges, which results in an inaccurate displacement measurement.

In order to solve this problem, a laser irradiation area which is optically uniform (i.e., uniform in reflectance) is formed on the measuring plate, and an X-Z driving unit is provided. The X-Z driving unit holds the plurality of laser displacement gauges at intervals, and drives the holding unit, as in the X-Z stage (see FIG. 23), in the X direction and the Z direction on a plane in parallel with a plane containing the measuring surface of the measuring plate set in the reference position. Here, the laser beams always irradiate the laser irradiation area, following the displacement in the X-Z direction of the measuring plate.

If the X-Z stage is driven, a stepping motor (a pulse motor) is generally used.

Such a stepping motor is used in open-loop control, and the rotational angle of the stepping motor corresponds to the pulse number. Thus, the travel distance of the X-Z stage can be specified by the pulse number. Also, since no displacement sensor is required for position return, the structure of the driving unit can be simplified.

In a general operation state of the X-Z stage, the target control value is the rest position, and the driving pulse can be given by a constant frequency, so that the stepping motor is driven at constant rotation speed.

However, if the X-Z stage is employed in a wheel alignment measuring device, the control target becomes the rotational center of the wheel, and the rotational center moves during measurement.

According to a conventional control method, to follow the movement of the rotational center, the stepping motor is driven at a rotational angle several times larger than the smallest rotational angle (0.17°, for instance) corresponding to one pulse of the stepping motor every correction time (every 0.1 second, for instance). However, the variation of the target control value in the wheel alignment measurement by the conventional control method is irregular, and the amount of variation is too large to follow.

As a result, the difference from the target control value gradually becomes larger to the point where the laser beams emitted from the laser displacement gauges no longer irradiate the laser irradiation area, which results in discontinuance of the wheel alignment measurement.

To solve such a problem, the stepping motor should be rotated with larger steps in the correction time so as to avoid a time lag in control.

In such a case, the stepping motor needs to have a large driving force to obtain a high speed without causing step-out (an uncontrollable state).

Also, great inertia force is caused due to the step-like movement of the X-Z stage.

The structure containing the X-Z stage is subjected to impact force that causes vibration to the whole structure. This hinders accurate wheel alignment measurement.

In the prior art, a DC servomotor or an AC servomotor whose number of rotation is proportional to the deviation value is employed in place of a stepping motor so as to prevent vibration of the structure containing the X-Z stage due to impact force.

In the case where a DC servomotor or an AC servomotor is employed, it is necessary to perform closed-loop control using an X-direction position sensor and a Y-direction position sensor for position control of the X-Z stage. This, however, only makes the structure more complicated.

A DC servomotor or an AC servomotor is larger than a stepping motor with the same power generation. This also causes a problem that the device itself becomes larger, and that the complicated structure of a servomotor raises manufacturing costs.

In the conventional optical wheel alignment measuring device described above, when measuring the position Y, the toe angle, and the camber angle, the reflection strength is varied due to the laser beams emitted onto the measuring pattern on the measuring surface from the laser displacement gauges. This also results in inaccurate displacement measurement.

In view of those problems, the object of the fourth embodiment is to provide a stepping motor control device and a wheel alignment measuring device as well as a stepping motor control method and a wheel alignment measuring device, in which a stepping motor can be smoothly controlled at high acceleration without step-out in the wheel alignment measurement, and accurate measurements can be taken with simpler and compact structures at lower manufacturing costs.

The following is a detailed description of the fourth embodiment.

Structure of the Alignment Measuring Device

Figure 45:
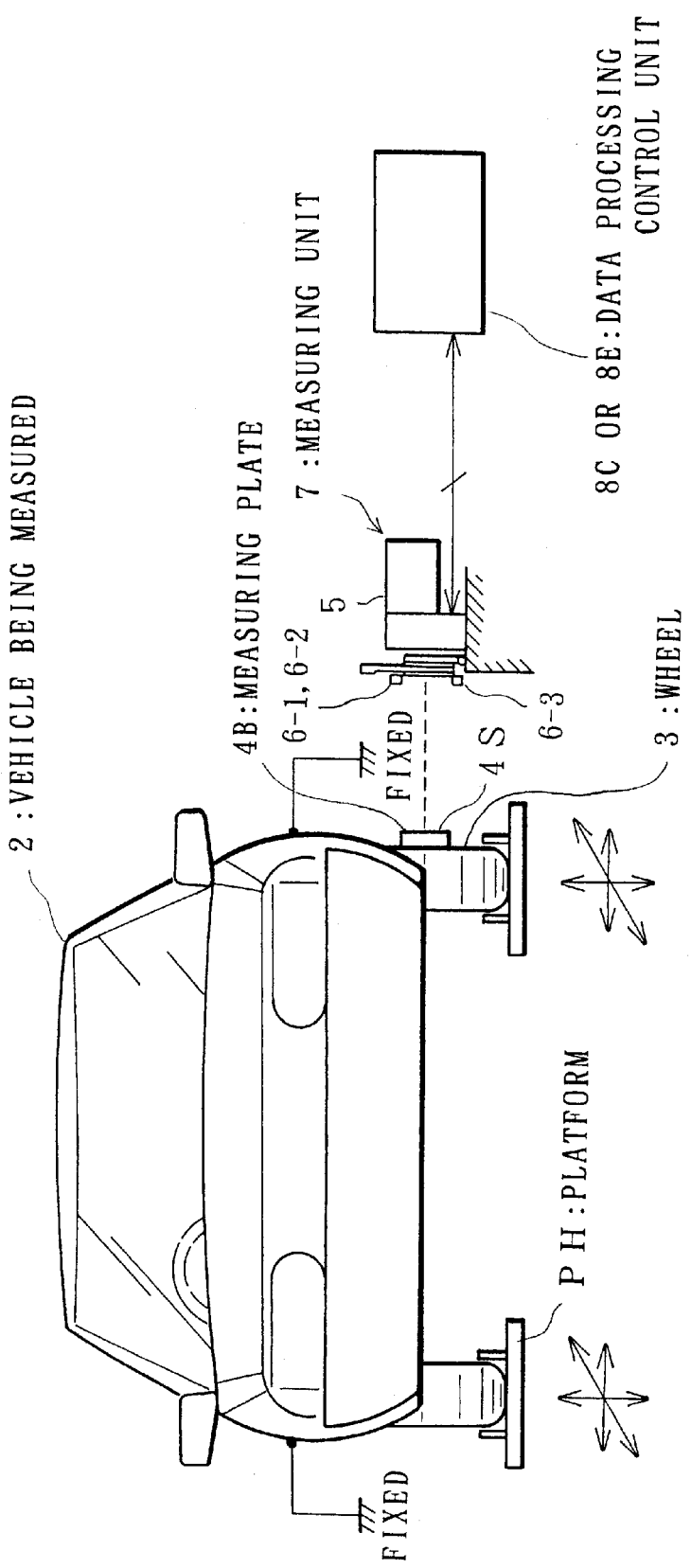
FIG. 45 is a block diagram illustrating the structure of the wheel alignment measuring device of the fourth embodiment.

FIG. 45 is a block diagram illustrating the structure of the wheel alignment measuring device. Like reference numerals are allotted to like components in FIG. 45 and FIG. 1 of the first embodiment.

The wheel alignment measuring device comprises: a measuring plate 4B to be attached to a wheel 3 of a measured vehicle (see FIG. 35); a measuring unit 7 which picks up the image of the measuring surface 4S of the measuring plate 4 with an image pick-up unit 5 equipped with two CCD cameras capable of picking up color images, and measures the distance from the measuring surface 4S of the measuring plate 4 with three laser displacement gauges 6-1 to 6-3; and a data processing control unit 8C which performs alignment operations based on output signals from the measuring unit 7, and controls the measuring unit 7.

Structure of the Measuring Unit

Figure 46:
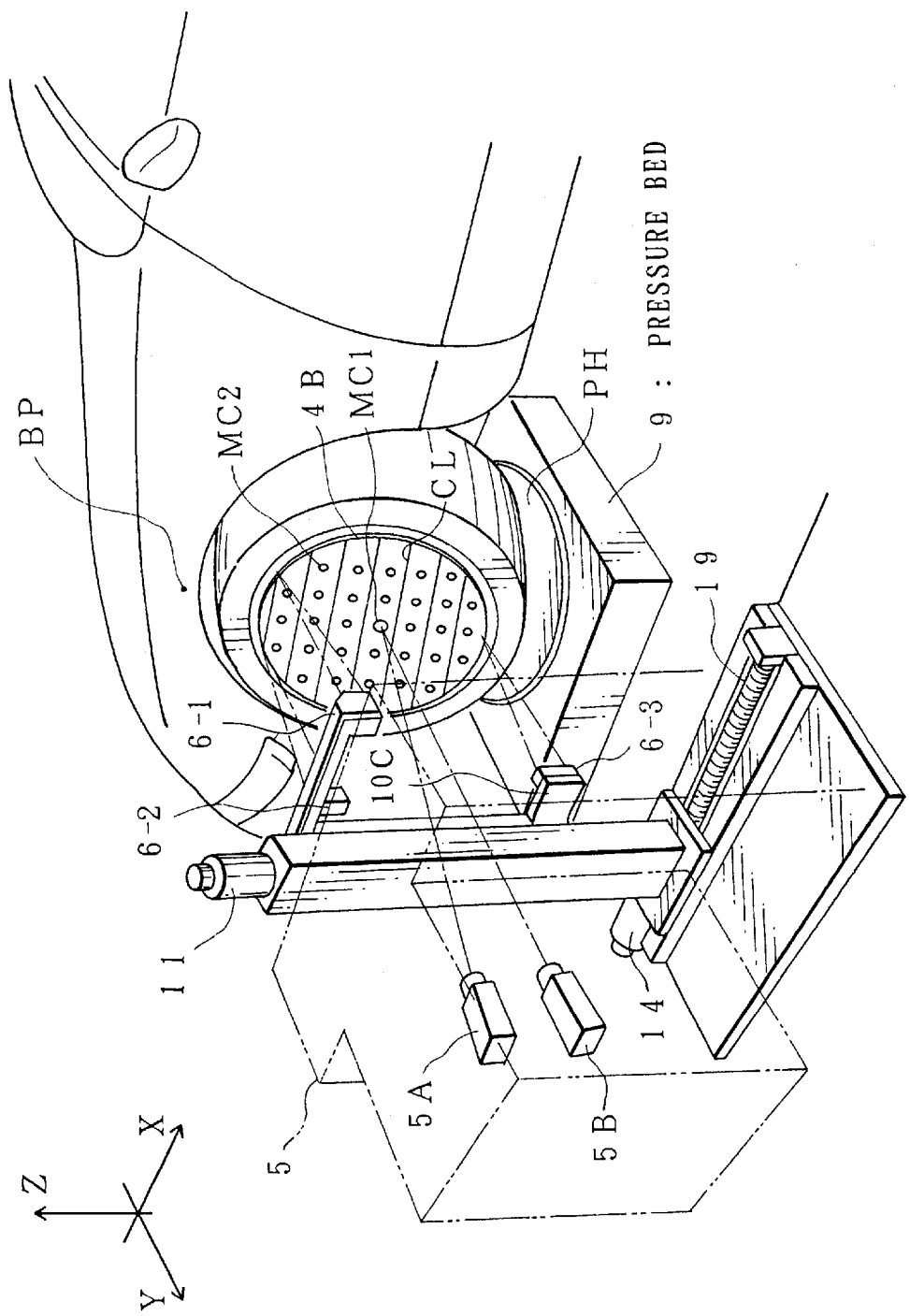
FIG. 46 is an external perspective view of the measuring unit.
Figure 47:
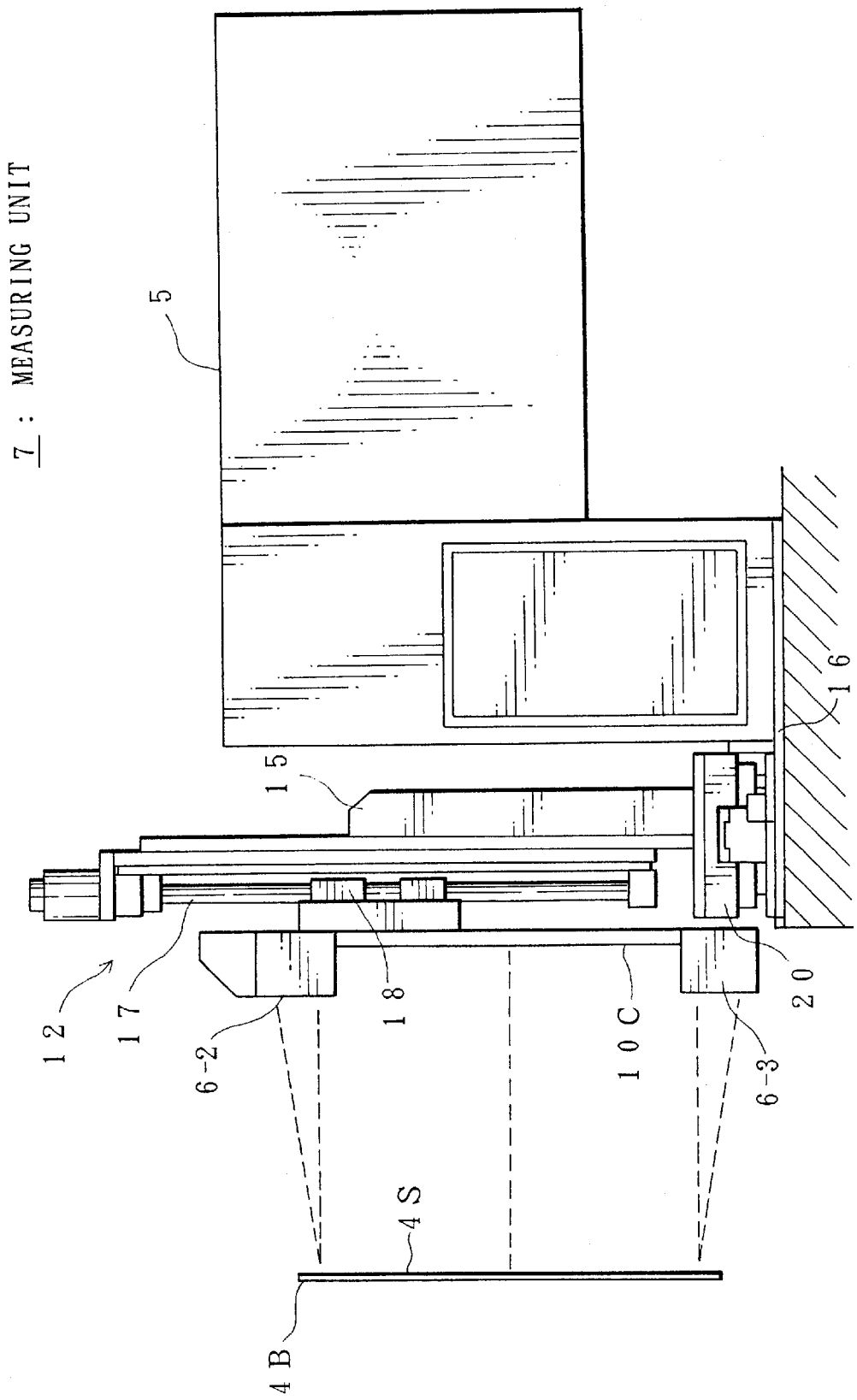
FIG. 47 is a side view of the measuring unit.
Figure 48:
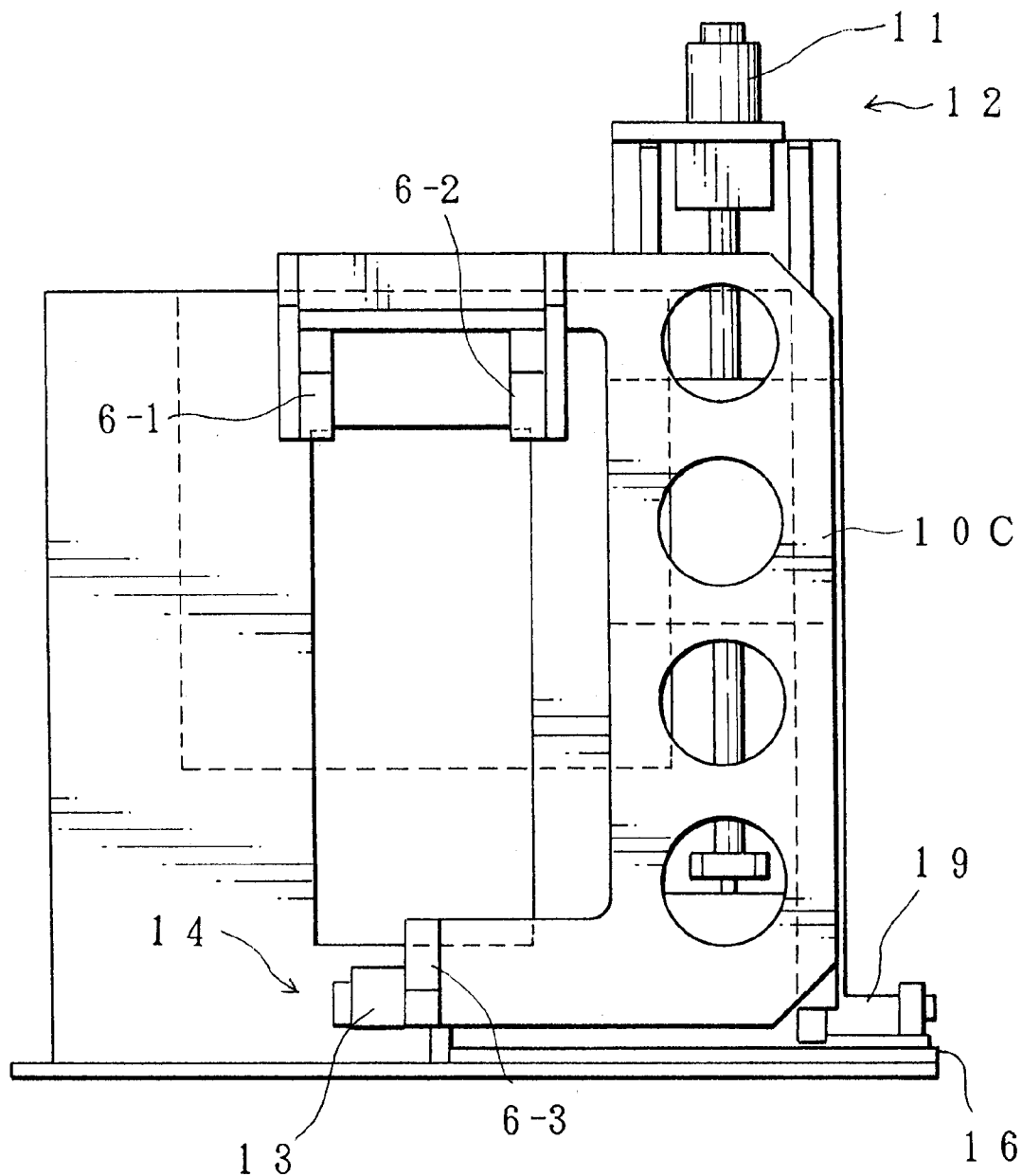
FIG. 48 is a front view of the measuring unit.

FIG. 46 is a partial perspective view of the measuring unit, FIG. 47 is a front view of the measuring unit, and FIG. 48 is a side view of the measuring unit.

The measuring unit 7 comprises: an L-shaped holding plate 10C having three laser displacement gauges 6-1 to 6-3; an image pick-up unit 5 which is provided on the rear side of the holding plate 10C and picks up images of the measuring plate 4B from the rear of the holding plate 10C; a Z-axis direction driving unit 12 which drives a Z-axis direction stepping motor 11 to drive the holding plate 10C in the Z-axis direction; an X-axis driving unit 14 which drives an X-axis direction stepping motor 13 to drive the holding plate 10C in the X-axis direction; a holding arm 15 which holds the holding plate 10C, the image pick-up unit 5, the Z-axis direction driving unit 12, and the X-axis direction driving unit 14, on their rear surfaces; and a base unit 16 which secures the holding arm 15 to the ground.

Figure 49:
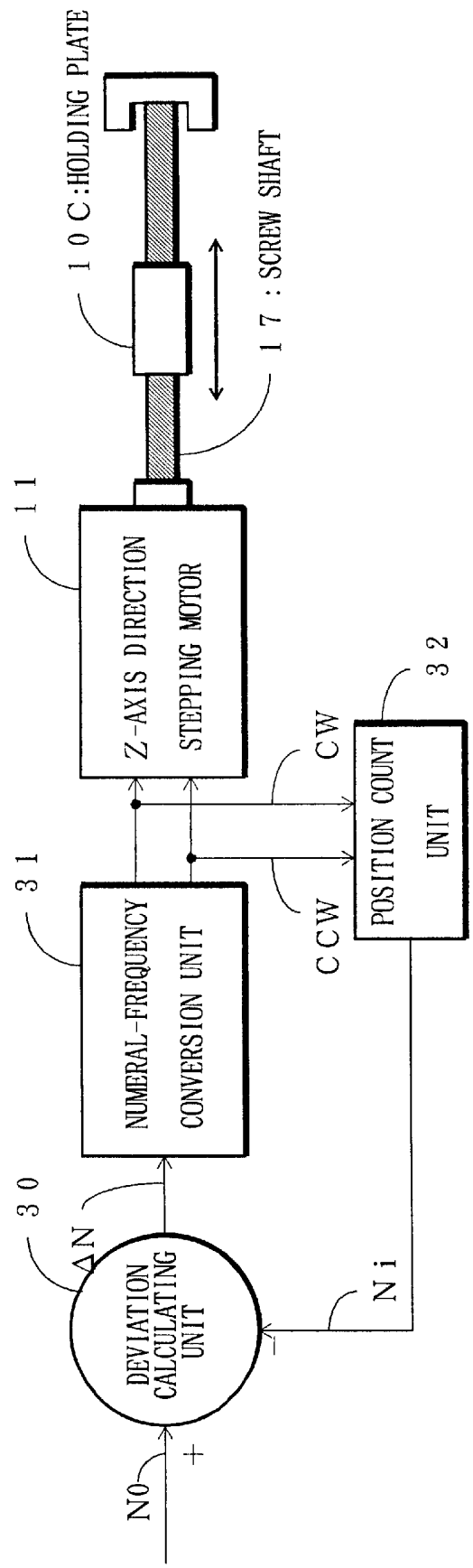
FIG. 49 is a block diagram illustrating the structure of the Z-axis direction controller.

The X-axis direction driving unit 12 comprises: a screw shaft 17 having a feeding groove; a slider unit 18 which is slidably engaged with the screw shaft 17 and holds the holding plate 10C; a Z-axis direction manual driving unit (not shown) having a Z-axis direction driving knob for manual positioning; and a Z-axis direction control unit 12A (shown in FIG. 49) for controlling the entire Z-axis direction driving unit 12.

Figure 50:
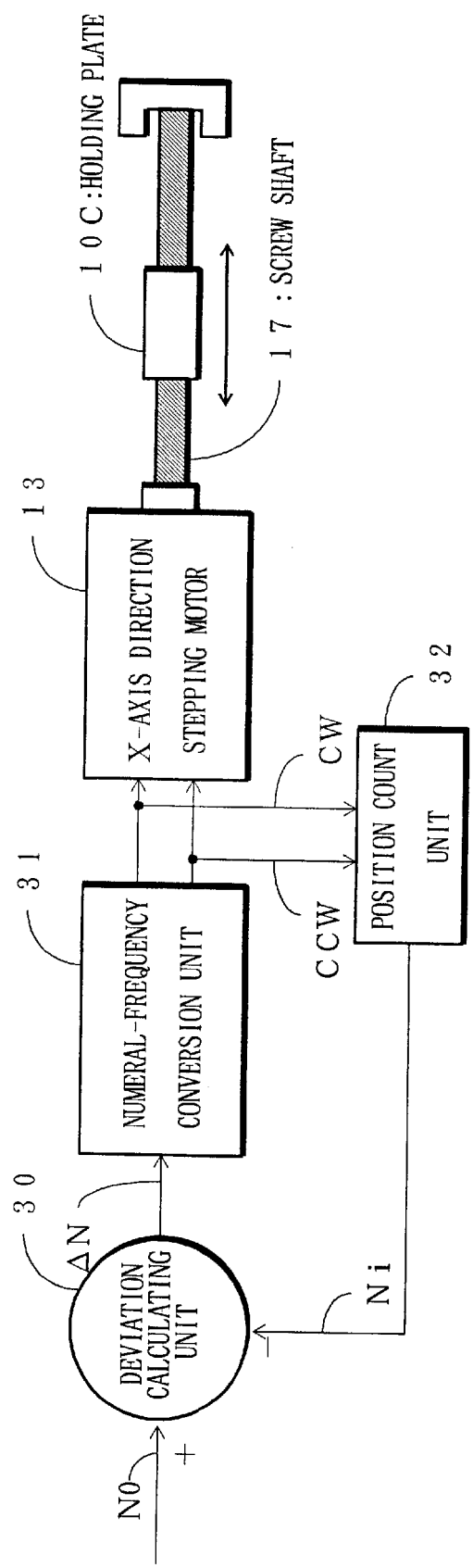
FIG. 50 is a block diagram illustrating the structure of the X-axis direction controller.

The X-axis direction driving unit 14 comprises: a screw shaft 19 having a feeding groove; a slider unit 20 which is slidably engaged with the screw shaft 19 and holds the holding arm 15; and an X-axis direction control unit 14A (shown in FIG. 50) for controlling the entire X-axis direction driving unit 14.

The measuring unit 7 further comprises a Y-axis direction manual driving unit (not shown) having a Y-axis direction driving knob for manual positioning in the Y-axis direction.

The measuring unit 7 also has a body sensor (not shown) for detecting the position and inclination of the body of the measured vehicle 2. The body sensor mechanically detects the position of the detection point BP (shown in FIG. 46), which varies when the platform PH is driven upward and downward by a power applying head 9, to detect the position and inclination of the body of the measured vehicle 2. Based on the detected data, the data processing control unit 8 performs measurement data correction.

Structure of the Z-axis (X-axis) Direction Control Unit

Referring now to FIGS. 49 to 54, the structure of the Z-axis (X-axis) direction control unit will be described. The following description concerns only the Z-axis direction control unit 12A, for the Z-axis direction control unit 12A and the X-axis direction control unit 14A have the same structure.

The Z-axis direction control unit 12A comprises a deviation calculating unit 30, a numeral-frequency conversion unit 31, and a position count unit 32. Control target numerical data N0, which are control target numeric values, are inputted into one input terminal, control result numerical data Ni corresponding to the real position of the control result are then inputted, and the deviation calculating unit 30 outputs the deviation as deviation numerical data $\Delta N$. The numeral-frequency conversion unit 31 converts the deviation numerical data $\Delta N$ and then outputs a forward driving pulse signal CW and a reverse driving pulse signal CCW. The position count unit 32 counts up and down based on either the forward driving pulse signal CW or the reverse driving pulse signal CCW, and then outputs the control result numerical data Ni.

Based on the control target numerical data N0 and the control result numerical data Ni, the deviation numerical data $\Delta N$ is expressed by an equation:

$$\Delta N = |Ni - N0|$$

Figure 51:
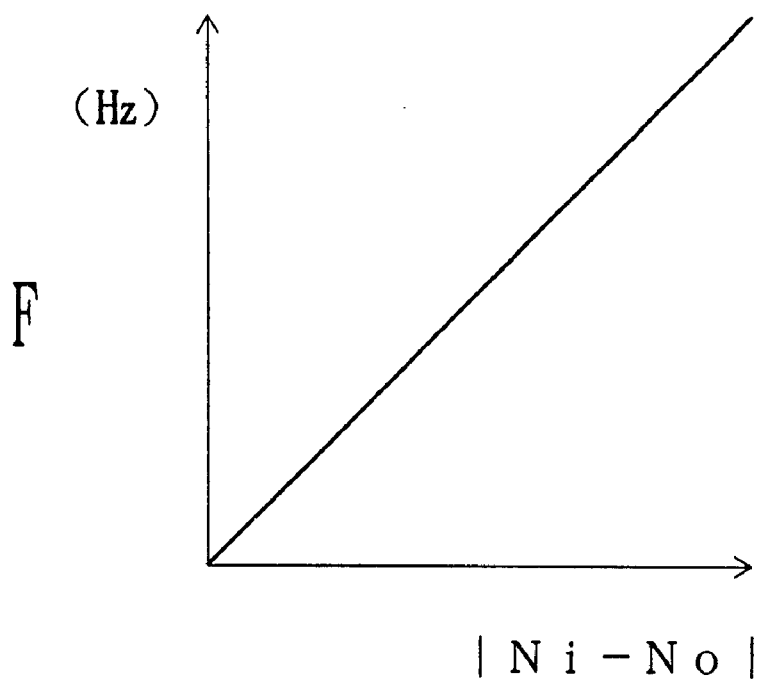
FIG. 51 illustrates the relationship between the deviation and the frequency of the driving pulse signal.

The deviation $\Delta N$ is made proportional to the forward driving pulse signal CW and the reverse driving pulse signal CCW outputted from the numeral-frequency conversion unit 31, as shown in FIG. 51. In the case of $Ni-N0 \geq 0$, the numeral-frequency conversion unit 31 outputs the forward driving pulse signal CW. In the case of $Ni-N0 < 0$, the numeral-frequency conversion unit 31 outputs the reverse driving pulse signal CCW.

Next, the operation of the X-axis direction control unit will be described.

The control target numerical data N0 (actually corresponding to the position of the first circular mark MC1) are inputted from the outside, and the control result numerical data Ni are inputted from the position count unit 32. The deviation is then outputted as the deviation numerical data $\Delta N$ to the numeral-frequency conversion unit 31.

Based on the relationship shown in FIG. 51, the numeral-frequency conversion unit numeral-frequency converts the deviation numerical data $\Delta N$ to output the forward driving pulse signal CW and the reverse driving pulse signal CCW to the Z-axis direction stepping motor 11.

By doing so, the Z-axis direction stepping motor 11 rotates the screw shaft 17 to drive the holding plate 10C to a predetermined position.

At the same time of driving the holding plate 10C, the position count unit 32 counts up based on either the pulse number of the forward driving pulse signal CW or the pulse number of the reverse driving pulse signal CCW, and counts down based on the other. The position count unit 32 then outputs the control results numerical data Ni as position information to the deviation calculating unit 30, thereby forming a feedback loop to perform accurate position control.

Structure of the Data Processing Control Unit

Figure 52:
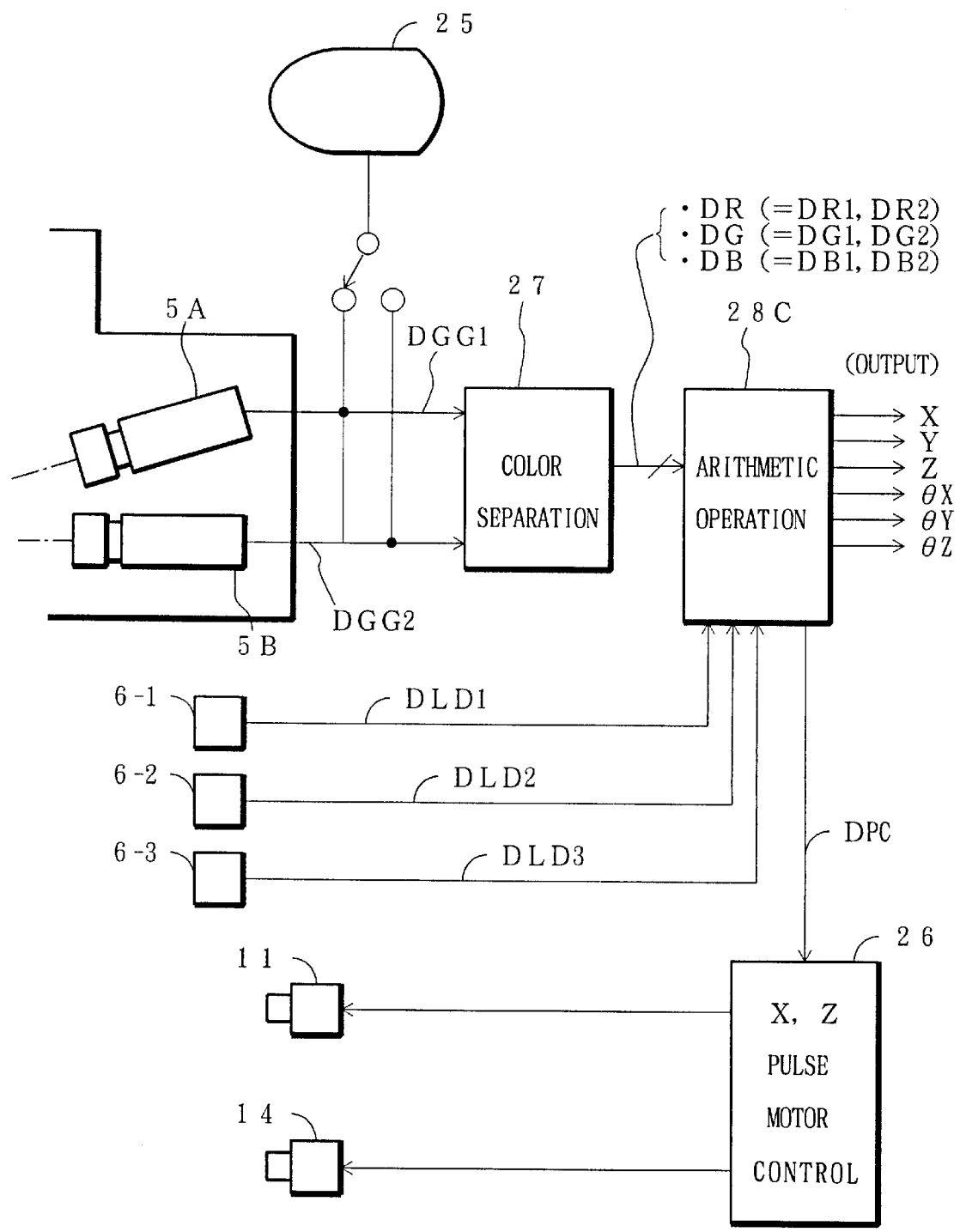
FIG. 52 is a block diagram illustrating the structure of the data processing control unit.

FIG. 52 is a block diagram illustrating the structure of the data processing control unit 8C.

The data processing control unit 8C comprises a display 25, an X-Z stepping motor control unit 26, a color separation circuit 27, and an arithmetic operation unit 28C. The display 25 displays an image based on the first picked-up image data DGG1 outputted from the color CCD camera 5A or the second picked-up image data DGG2 outputted from the color CCD camera 5B. The X-Z stepping motor control unit 26 controls the driving of the Z-axis stepping motor 11 and the X-axis stepping motor 14, based on position control data DPC. The color separation circuit 27 performs color separation based on the first picked-up image data DGG1 and the second picked-up image data DGG2 outputted from the image pick-up unit 5, and outputs red picked-up image data DR corresponding to red, green picked-up image data DG corresponding to green, and blue picked-up image data DB corresponding to blue. The arithmetic operation unit 28C outputs: X-coordinate data X on the measuring surface 4S of the measuring plate 4 in a predetermined position in a high-resolution picked-up image (for instance, the center of the picked-up image); Y-coordinate data Y of the measuring surface 4S; Z-coordinate data Z on the measuring surface 4S of the measuring plate 4 in a predetermined position in a high-solution picked-up image; an inclination $\theta x$ with respect to the X-axis on the measuring surface 4S; an inclination $\theta y$ with respect to the Y-axis on the measuring surface 4S; an inclination $\theta z$ with respect to the Z-axis on the measuring surface 4S (these inclination data are used as a basis in spin angle data DSP operations); and the position control data DPC, based on output signals DLD1 to DLD3 from the three laser displacement gauges 6-1 to 6-3, the red picked-up image data DR, the green picked-up image data DG, and the blue picked-up image data DB.

Here, the red picked-up image data DR include first red picked-up image data DR1 corresponding to the first picked-up image data DGG1 and second red picked-up image data DR2 corresponding to the second picked-up image data DGG2, the green picked-up image data DG include first green picked-up image data DG1 corresponding to the first picked-up image data DGG1 and second green picked-up image data DG2 corresponding to the second picked-up image data DGG2, and the blue picked-up image data DB include first blue picked-up image data DB1 corresponding to the first picked-up image data DGG1 and second blue picked-up image data DB2 corresponding to the second picked-up image data DGG2.

The structure and arrangement of the image pick-up unit 5 are the same as in FIGS. 9 to 12 of the first embodiment.

Arrangements of the Laser Displacement Gauges

Figure 53A:
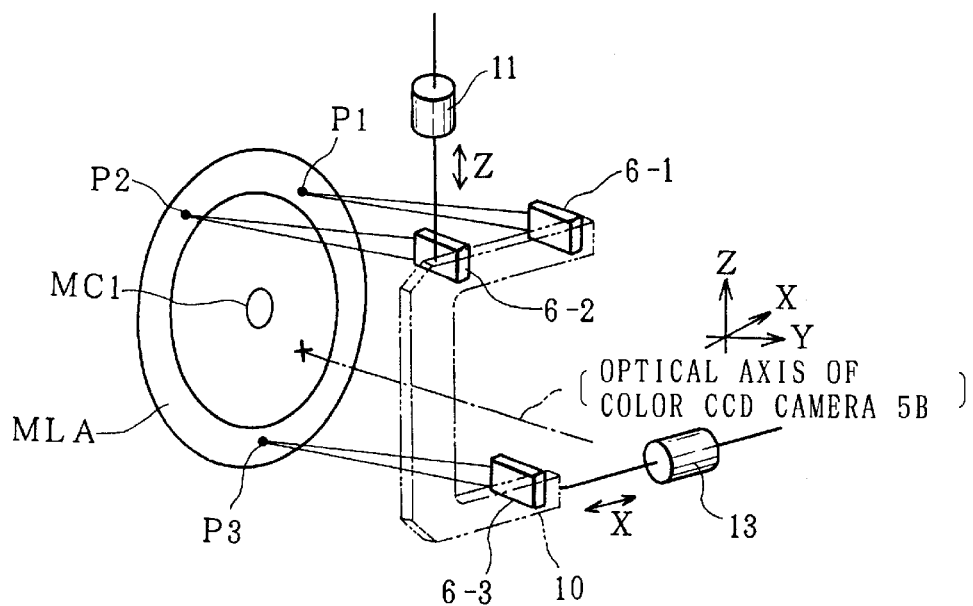
FIGS. 53A to 53C illustrate the arrangements of the laser displacement gauges.
Figure 53B:
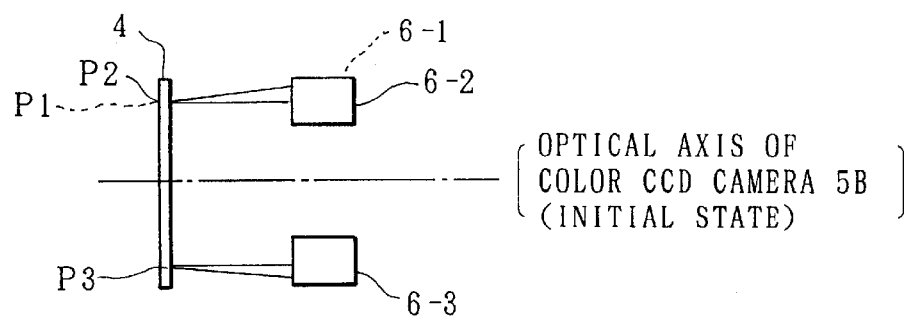
Figure 53C:
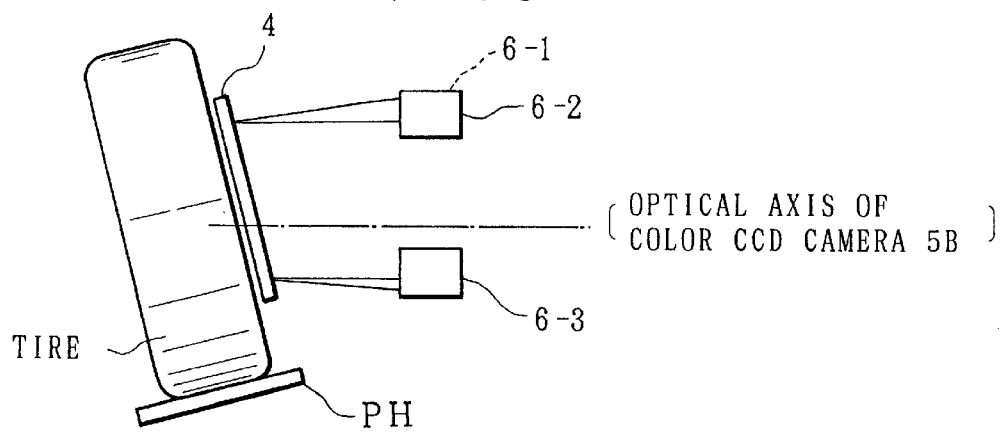

FIG. 53 show the arrangements of the laser displacement gauges. FIG. 53A is a perspective view illustrating the arrangements of the laser displacement gauges, FIG. 53B is a side view of the laser displacement gauges in the initial state, and FIG. 53C is a side view of the laser displacement gauges in a measuring state.

As shown in FIGS. 53A and 53B, the laser displacement gauges 6-1 to 6-3 in the initial state are arranged so that the measuring laser irradiation points P1 to P3 are situated within the distance measuring area MLA.

As described later, servo control is performed by an amount corresponding to the amount of displacement in the X direction (or a first direction) and the Z direction (or a second direction) of the first circular mark MC1 on the measuring surface 4S of the measuring plate 4B, based on the first picked-up image data DGG1 and the second picked-up image data DGG2 outputted from the image pick-up unit 5. The Z-axis direction stepping motor 11 of the Z-axis direction driving unit 12 is driven so as to drive the holding plate 10C in the Z-axis direction, while the X-axis direction stepping motor 13 of the X-axis direction driving unit 14 is driven so as to drive the holding plate 10C in the X-axis direction. Even if the measuring surface 4S is inclined during measurement as shown in FIG. 53C, the measuring laser irradiation points P1 to P3 of the laser displacement gauges 6-1 to 6-3 are situated within the distance measuring area MLA, regardless of the position of the optical axis of the color CCD camera 5B.

The number of the laser displacement gauges may be more than three.

Measuring Operations

The following is a description of the measuring operations.

Here, the first circular mark MC1 should be always included in an image picked up by the color CCD camera 5A that constitutes the image pick-up unit 5, and the measuring plate 4B is attached to the wheel 3 of the measured vehicle 2 so that the origin O of the measuring surface 4S corresponds to the rotational center axis of the wheel 3.

Figure 54:
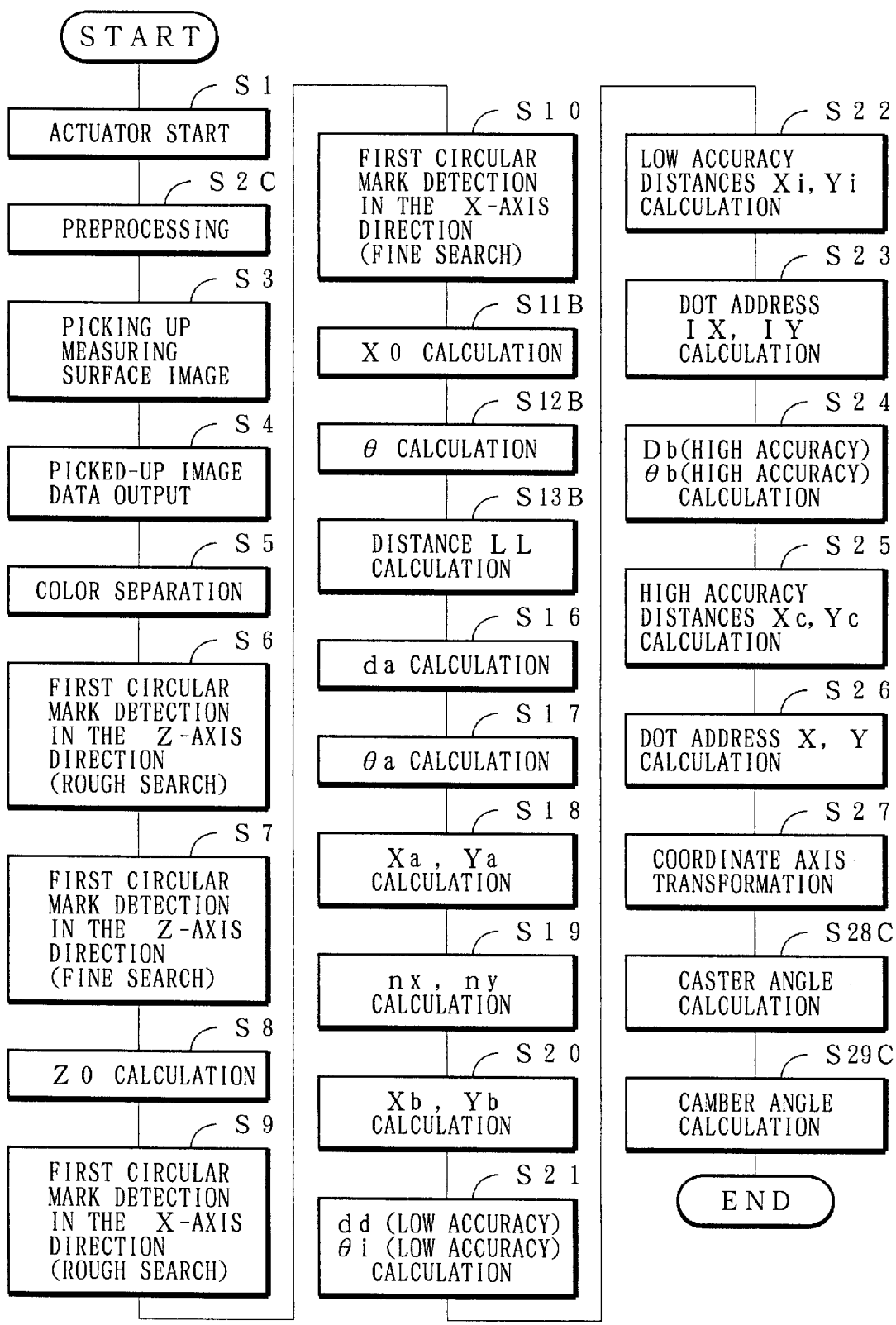
FIG. 54 is a flowchart of the measuring operation of the fourth embodiment.

FIG. 54 is a flowchart of the measuring operations. Like reference numerals are allotted to like components in FIG. 54 and FIG. 14 of the first embodiment.

As in the first embodiment, the wheel 3 of the measured vehicle 2 is first driven upward or downward by an actuator (not shown), independently of other wheels. The actuator is then stopped at the empty vehicle weight to maintain a stopped state (step S1).

The holding plate 10C and the image pick-up unit 5 are driven in the Z-axis direction by hand or by actuating the Z-axis direction driving unit 12 and the X-axis direction driving unit 14 so that they face to the measuring surface 4S of the measuring plate 4, the optical axes of the color CCD cameras 5A and 5B that constitute the image pick-up unit 5 are arranged in line with the origin O of the measuring surface 4S, and the measuring laser irradiation points P1 to P3 (see FIG. 53A) of the laser displacement gauges 6-1 to 6-3 are set within the distance measuring area MLA (step S2C).

As in the first embodiment, the following operations are carried out: picking up an image of the measuring surface 4S of the measuring plate 4 by the image pick-up unit 5 (step S3); outputting the first picked-up image data DGG1 and the second picked-up image data DGG2 (step S4); performing color separation by the color separation circuit 27 (step S5); detecting the first circular mark MC1 by conducting a rough search at DN-dot intervals (step S6); detecting the first circular mark MC1 by conducting a fine search with a scan in the positive direction of the X-axis at 1-dot intervals (step S7); calculating the Z-axis center coordinate Z0 (step S8); detecting the first circular mark MC1 by conducting a rough search at CN-dot intervals with a scan in the positive direction of the Z-axis (step S9); and detecting the first circular mark MC1 by conducting a fine search in the positive direction of the X-axis at 1-dot intervals (equivalent to intervals of L5A/NN mm) until the first circular mark MC1 can no longer be detected, storing the dot number M1 (=1 to NN) in the X-axis direction when the first circular mark MC1 is detected for the last time, and conducting a fine search of the first circular mark MC1 in the negative direction of the X-axis (step S10).

In step S10, when the first circular mark MC1 becomes undetectable again, the X-axis center coordinate X0 is calculated based on the dot number M2 (=1 to NN) in the X-axis direction at the last detection of the first circular mark MC1 (step S11B).

As shown in FIG. 24 of the first embodiment, the correction lines CL are subjected to sampling based on a white image obtained by adding the second red picked-up image data DR2, the second green picked-up image data DG2, and the second blue picked-up image data DB2 outputted from the color CCD camera 5B, and the inclination θ of the correction lines CL is calculated from the positional data by the method of least squares (step S12B).

Based on the image picked up by the color CCD camera 5A, the distance LL between the center coordinates (X0, Z0) of the first circular mark MC1 determined in steps S8 and S11B and the center coordinates CCB of the visual field ARB of the color CCD camera 5B is calculated (step S13B).

By doing so, the correction lines CL surrounding the center coordinates of the visual field ARB can be specified, and the position of the visual field ARB can be roughly detected.

While calculating the center coordinates (X0, Z0) of the first circular mark MC1 and the distance LL, the arithmetic operation unit 28C also calculates the distance from the first circular mark MC1 on the measuring surface 4S of the measuring plate 4, based on the output signals DLD1 to DLD3 of the laser displacement gauges 6-1 to 6-3.

The distance LL is then converted into the amount of displacement (travel distance) of the first circular mark MC1 on the measuring surface 4S. To cancel the amount of displacement, the Z-axis direction stepping motor 11 of the Z-axis direction driving unit 12 and the X-axis direction stepping motor 13 of the X-axis direction driving unit 14 are driven so as to drive the holding plate 10C in the X-axis direction and the Z-axis direction following the track of the first circular mark MC1. Even if the measuring surface 4S is inclined during measurement as shown in FIG. 53C, the measuring laser irradiation points P1 to P3 of the laser displacement gauges 6-1 to 6-3 are situated within the distance measuring area MLA, regardless of the position of the optical axis of the color CCD camera 5B.

As a result, the measuring laser irradiation points P1 to P3 of the laser displacement gauges 6-1 to 6-3 are always situated within the distance measuring area MLA, so that a position Y as displacement information in the Y direction can be surely obtained, and that highly reliable wheel alignment measurements can be taken in the Y direction as well.

While calculating the center coordinates (X0, Z0) of the first circular mark MC1 and the distance LL, the arithmetic operation circuit 28C also calculates the distance from the first circular mark MC1 on the measuring surface 4S of the measuring plate 4, based on the output signals DLD1 to DLD3 from the laser displacement gauges 6-1 to 6-4.

As in the first embodiment, the following steps are then carried out: calculating the distance da between the center coordinates CCA of the visual field ARA and the center coordinates (X0, Z0) of the first circular mark MC1 (step S16); calculating the angle θa formed by a virtual line in parallel with the correction line CL extending through the center coordinates of the visual field ARA with respect to the line connecting the center coordinates of the visual field ARA and the center coordinates of the first circular mark MC1 (step S17); calculating the distance Xa and the distance Ya (step S18); calculating the position of the second circular mark MC2n closest to the center coordinates of the visual field ARA by counting the number (nx) of second circular marks situated between the closest second circular mark MC2n and the first circular mark MC1 in the X direction, and the number (ny) of the second circular marks in the Z direction (step S19); calculating the distances Xb and Yb between the center coordinates (X0, Z0) of the second circular mark MC2n closest to the center coordinates of the visual field ARA and the center coordinates of the first circular mark MC1 (step S20); and calculating the angle θi (low accuracy) formed by the X-axis of the visual field ARA and the distance dd (low accuracy) between the center coordinates of the visual field ARA and the center coordinates of the second circular mark MC2n closest to the center coordinates of the visual field ARA (step S21).

Further steps are carried out as in the first embodiment: calculating the low accuracy distances Xi and Yi between the center coordinates of the visual field ARA and the center coordinates of the second circular mark MC2n closest to the center coordinates of the visual field ARA (step S22); converting the center coordinates of the second circular mark MC2n closest to the center coordinates of the visual field ARB of the color CCD camera 5B into a dot address (IX, IY) (step S23); calculating the angle θb (high accuracy) formed by the X-axis of the visual field ARA and the distance Db (high accuracy) between the center coordinates of the visual field ARB and the center coordinates of the closest second circular mark MC2n in the visual field ARB of the color CCD camera 5B (step S24); calculating the high accuracy distances Xc and Yc between the center coordinates of the visual field ARB and the center coordinates of the second circular mark MC2n closest to the center coordinates of the visual field ARB (step S25); converting the center coordinates of the second circular mark MC2n closest to the center coordinates of the visual field ARB of the color CCD camera 5B into a dot address (X, Y) (step S26); and transforming the dot address (X, Y) into the system of coordinates including the X-axis and Z-axis on the measuring surface 4S of the measuring plate 4, so as to calculate a dot address (x, y) in the system of coordinates including the X-axis and Z-axis on the measuring surface 4S (step S27).

The arithmetic operation unit 28C next calculates the caster angle based on the inclination of the scale line with respect to the horizontal direction (or the vertical direction) of the picked-up image (step S28C).

Based on the center coordinates (X0, Z0) of the first circular mark MC1, the Z-axis direction stepping motor 11 of the Z-axis direction driving unit 12 and the X-axis direction stepping motor 13 of the X-axis direction driving unit 14 are subjected to servo control, so that the holding plate 10C follows the track of the center of the first circular mark MC1.

The following is a detailed description of the control operation of the Z-axis direction stepping motor 11.

The control target numerical data N0 corresponding to the center coordinates (X0, Z0) of the first circular mark MC1 are inputted, and the control result numerical data Ni corresponding to the real position of the first circular mark MC1 are inputted from the position count unit 32. The deviation calculating unit 30 then outputs the deviation as the deviation numerical data ΔN to the numeral-frequency conversion unit 31.

The numeral-frequency conversion unit 31 converts the deviation numerical data ΔN based on the relationship shown in FIG. 51.

If Ni−N0≧0, the forward driving pulse signal CW having the obtained pulse frequency is outputted to the Z-axis direction stepping motor 11.

If Ni−N0<0, the reverse driving pulse signal CCW having the obtained pulse frequency is outputted to the Z-axis direction stepping motor 11.

The Z-axis direction stepping motor 11 then rotates the screw shaft 17, so that the holding plate 10C follows the track of the center coordinates (X0, Z0) of the first circular mark MC1.

At the same time of the driving of the holding plate 10C, the position count unit 32 counts up based on either the pulse number of the forward driving pulse signal CW or the pulse number of the reverse driving pulse signal CCW, and counts down based on the other, so as to output the control result numerical data Ni as position information to the deviation calculating unit 30. As a result of this, a feedback loop is formed to realize accurate position control to follow the center coordinates (X0, Z0) of the first circular mark MC1.

As for the X-axis direction stepping motor 14, the same control operation is performed.

In this case, the larger the value of |Ni−N0|, the higher the converging speed. However, as it nears the control target value, the speed reduces, and eventually, the Z-axis direction stepping motor 11 and the X-axis direction stepping motor 14 are driven at the limiting resolving angle. Thus, accurate measurements can be taken without causing great acceleration force and vibration to the holding plate 10C.

The stepping motors are used in a step-out prevented area (a pull-in area), so that the pulse numbers accurately correspond to the positions, i.e., the control result numerical data Ni accurately correspond to the positions. Here, no hardware position sensor such as a pulse encoder is necessary.

As a result, the measuring laser irradiation points P1 to P3 of the laser displacement gauges 6-1 to 6-3 are always situated within the distance measuring area MLA. Because of that, the output signals DLD1 to DLD3 of the laser displacement gauges 6-1 to 6-3 become secure, providing accurate distance information.

Based on the secure output signals DLD1 to DLD3, the camber angle θCAM can be accurately calculated from the differences in geometric distance from the measuring laser irradiation points P1 to P3 on the measuring surface 4S of the measuring plate 4 corresponding to the laser displacement gauges 6-1 to 6-3, respectively (step S29C).

The arithmetic operation unit 28C then outputs the obtained dot address x as X-coordinate data DX, the obtained dot address y as Z-coordinate data DZ, the obtained spin angle as inclination data DSP, and the obtained camber angle as camber angle data DCB.

As described so far, according to the fourth embodiment, the stepping motors 11 and 14 are driven without causing large acceleration force so that the laser displacement gauges 6-1 to 6-3 follow the displacement of the center coordinates of the first circular mark MC1, which is the reference mark. The output signals DLD1 to DLD3 of the laser displacement gauges 6-1 to 6-3 are obtained in a driven state in such a direction as to cancel the displacement, and because of this, the displacement in the Y direction (more specifically, the position Y and the camber angle) can be calculated speedily and accurately.

Based on picked-up images of the two color CCD cameras 5A and 5B, the position and the spin angle corresponding to the center coordinates of the first circular mark MC1 on the measuring surface 4S of the measuring plate situated in a predetermined position (in the center in the above example) within the image picked up by the color CCD camera 5B can be calculated speedily and accurately. Thus, reproducibility of the measurement is improved.

As described above so far, according to this embodiment, the wheel alignment can be measured speedily and accurately, and its reproducibility and reliability can be improved in the fourth embodiment.

Although the position count unit 32 is employed to count up and down the forward driving pulse signal CW and the reverse driving pulse signal CCW in the above embodiment, it may be replaced with a first count unit for counting the pulse number of the forward driving pulse signal CW, a second count unit for counting the pulse number of the reverse driving pulse signal CCW, and a subtraction unit for determining the difference between the counts of the first count unit and the second count unit, and outputting the difference as the control result numerical data Ni.

Modifications of the Fourth Embodiment (a) First Modification

A preferred embodiment of the first modification is a pulse motor control device which controls an external pulse motor for driving a device to be controlled based on a forward driving pulse signal and a reverse driving pulse signal. The pulse motor control device comprises: a deviation calculating unit which compares control target data inputted from the outside with control result data, and outputs deviation data; a signal conversion unit which outputs a forward driving pulse signal or a reverse driving pulse signal based on the value of the deviation data; a pulse count unit which counts up based on either the pulse number of the forward driving pulse signal or the pulse number of the reverse driving pulse signal, counts down based on the other, and outputs count data based on the count results; and a control result data generating unit which generates and outputs the control result data based on the count data.

In this modification, the deviation calculating unit compares the control target data inputted from the outside with the control result data, and then outputs the deviation data to the signal conversion unit.

The signal conversion unit outputs a forward driving pulse signal or a reverse driving pulse signal to the pulse motor based on the deviation data, and the pulse motor drives the device to be controlled based on the forward driving pulse signal or the reverse driving pulse signal having a pulse number corresponding to the deviation data.

At the same time of those operations, the pulse count unit counts up based on either the pulse number of the forward driving pulse signal or the pulse number of the reverse driving pulse signal, and counts down based on the other. According to the count results, the pulse count unit outputs the count data to the control result data generating unit. The control result data generating unit generates the control result data based on the count data, and outputs the data to the deviation calculating unit. The pulse motor is thus driven at a pulse number proportional to the deviation amount corresponding to the deviation data, so that it constantly changes in speed. As a result, no great acceleration force is applied to the controlled device, and vibration which might be caused due to great acceleration force can be repressed. Thus, a smooth control operation can be performed.

(b) Second Modification

A preferred embodiment of the second modification is a pulse motor control device which controls an external pulse motor for driving a device to be controlled based on a forward driving pulse signal and a reverse driving pulse signal. The pulse motor control device comprises: a deviation calculating unit which compares control result data with control target data inputted from the outside, and outputs deviation data; a signal conversion unit which outputs a forward driving pulse signal or a reverse driving pulse signal based on the value of the deviation data; a pulse count unit which counts the pulse numbers of the forward driving pulse signal and the reverse driving pulse signal; and a control result data generating unit which generates and outputs the control result data based on the difference between the forward pulse number of the forward driving pulse signal and the reverse pulse number of the reverse driving pulse signal.

In this modification, the deviation calculating unit compares the control result data with the control target data inputted from the outside, and then outputs the deviation data to the signal conversion unit.

The signal conversion unit outputs a forward driving pulse signal or a reverse driving pulse signal to the pulse motor based on the value of deviation data, and the pulse motor drives the device to be controlled based on the forward driving pulse signal or the reverse driving pulse signal having a pulse number corresponding to the deviation data.

At the same time of those operations, the pulse count unit counts the pulse numbers of the forward driving pulse signal and the reverse driving pulse signal. The control result data generating unit then generates the control result data based on the difference between the forward pulse number of the forward driving pulse signal and the reverse pulse number of the reverse driving pulse signal, and outputs the data to the deviation calculating unit. The pulse motor is thus driven at a pulse number proportional to the deviation amount corresponding to the deviation data, so that it constantly changes in speed. As a result, no great acceleration force is applied to the controlled device, and vibrations which might be caused due to great acceleration force can be repressed. Thus, a smooth control operation can be performed.

(c) Third Modification

A preferred embodiment of the third modification includes: a measuring plate attached to a wheel of a vehicle; a vertical direction displacement detection unit which detects the amount of displacement of the reference mark on the measuring surface of the measuring plate in a direction perpendicular to the displacement detecting direction, and outputs vertical direction displacement detection data; a plurality of distance measuring units which measure the distance from the measuring plate by irradiating measuring light onto the measuring plate, and output distance measurement data; a holding unit which holds the plurality of distance measuring units at predetermined intervals; a driving unit which is provided with at least two pulse motors for driving the holding unit in directions perpendicular to each other, and drives the holding unit in a direction perpendicular to the displacement detecting direction; and a driving control unit which is provided with a pulse motor control unit of the first modification, and controls the driving unit to drive the holding unit in such a direction as to cancel the amount of displacement of the reference mark in a direction perpendicular to the displacement detecting direction, based on the vertical direction displacement detection data.

In this modification, the vertical direction displacement detection unit detects the amount of displacement in a direction perpendicular to the displacement detecting direction of the reference mark on the measuring surface of the measuring plate attached to a wheel of the vehicle being measured, and outputs the vertical direction displacement data to the driving control unit. The distance measuring units irradiate measuring light onto the measuring plate to measure the distance from the measuring plate, and then outputs the distance measurement data.

At the same time of those operations, the holding unit holds the distance measuring units at predetermined intervals, and the pulse motor control device of the driving control unit controls the driving unit to drive the holding unit in such a direction as to cancel the amount of displacement of the reference mark in a direction perpendicular to the displacement detecting direction, based on the vertical direction displacement detection data. Since the driving unit drives the holding unit, as well as the distance measuring units, by at least two pulse motors in directions perpendicular to each other and to the displacement detecting direction, the holding unit is driven at constantly varied speed without causing great acceleration force and unwanted vibration. Thus, the distance measuring units can steadily make an accurate distance measurement.

(d) Fourth Modification

A preferred embodiment of the fourth modification includes: a measuring plate attached to a wheel of a vehicle; a vertical direction displacement detection unit which detects the amount of displacement of the reference mark on the measuring surface of the measuring plate in a direction perpendicular to the displacement detecting direction, and outputs vertical direction displacement detection data; a plurality of distance measuring units which measure the distance from the measuring plate by irradiating measuring light onto the measuring plate, and output distance measurement data; a holding unit which holds the plurality of distance measuring units at predetermined intervals; a driving unit which is provided with at least two pulse motors for driving the holding unit in directions perpendicular to each other, and drives the holding unit in a direction perpendicular to the displacement detecting direction; and a driving control unit which is provided with a pulse motor control unit of the second modification, and controls the driving unit to drive the holding unit in such a direction as to cancel the amount of displacement of the reference mark in a direction perpendicular to the displacement detecting direction, based on the vertical direction displacement detection data.

In this modification, the vertical direction displacement detection unit detects the amount of displacement in a direction perpendicular to the displacement detecting direction of the reference mark on the measuring surface of the measuring plate attached to a wheel of the vehicle being measured, and outputs the vertical direction displacement data to the driving control unit. The distance measuring units irradiate measuring light onto the measuring plate to measure the distance from the measuring plate, and then outputs the distance measurement data.

At the same time of those operations, the holding unit holds the distance measuring units at predetermined intervals, and the pulse motor control device of the driving control unit controls the driving unit to drive the holding unit in such a direction as to cancel the amount of displacement of the reference mark in a direction perpendicular to the displacement detecting direction, based on the vertical direction displacement detection data. Since the driving unit drives the holding unit, as well as the distance measuring units, by at least two pulse motors in directions perpendicular to each other and to the displacement detecting direction, the holding unit is driven at constantly varied speed without causing great acceleration force and unwanted vibration. Thus, the distance measuring units can steadily make an accurate distance measurement.

(e) Fifth Modification

A preferred embodiment of the fifth modification is the same as the preferred embodiment of the third modification, except that the vertical direction displacement detection unit comprises: an image pick-up unit which picks up images of the measuring plate to output picked-up image data; and a displacement calculating unit which calculates the amount of displacement of the reference mark in a direction perpendicular to the displacement detecting direction by extracting the image data corresponding to the reference mark from the picked-up image data, and then outputs the vertical direction displacement detection data.

In this modification, the image pick-up unit of the vertical direction displacement detection unit picks up images of the measuring plate to output the picked-up image data to the displacement calculating unit. The displacement calculating unit extracts the image data corresponding to the reference mark from the picked-up image data to calculate the amount of displacement of the reference mark in a direction perpendicular to the displacement detecting direction, and then outputs the vertical direction displacement detection data to the driving control unit. Thus, the amount of displacement can be speedily calculated by non-contact image processing, and control operations which provide excellent following ability can be performed.

(f) Sixth Modification

A preferred embodiment of the sixth modification is the same as the preferred embodiment of the fourth modification, except that the vertical direction displacement detection unit comprises: an image pick-up unit which picks up images of the measuring plate to output picked-up image data; and a displacement calculating unit which calculates the amount of displacement of the reference mark in a direction perpendicular to the displacement detecting direction by extracting the image data corresponding to the reference mark from the picked-up image data, and then outputs the vertical direction displacement detection data.

In this modification, the image pick-up unit of the vertical direction displacement detection unit picks up images of the measuring plate to output the picked-up image data to the displacement calculating unit. The displacement calculating unit extracts the image data corresponding to the reference mark from the picked-up image data to calculate the amount of displacement of the reference mark in a direction perpendicular to the displacement detecting direction, and then outputs the vertical direction displacement detection data to the driving control unit. Thus, the amount of displacement can be speedily calculated by non-contact image processing, and control operations which provide excellent following ability can be performed.

(g) Seventh Modification

A preferred embodiment of the seventh modification is a pulse motor control method for controlling an external pulse motor which drives a device to be controlled based on a forward driving pulse signal and a reverse driving pulse signal. The pulse motor control method comprises: a deviation calculating step of calculating the deviation by comparing the control target with real control results; a signal generating step of generating a forward driving pulse signal and a reverse driving pulse signal based on the deviation; a pulse count step of counting up based on either the pulse number of the forward driving pulse signal or the pulse number of the reverse driving pulse signal, and counting down based on the other; and a control result calculating step of outputting the control results based on the count results obtained in the pulse count step.

According to this modification, the real control results are compared with the control target so as to calculate the deviation in the deviation calculating step; a forward driving pulse signal and a reverse driving pulse signal are generated based on the obtained deviation in the signal generating step; and the external pulse motor drives the device being controlled based on the forward driving pulse signal or the reverse driving pulse signal having a pulse number corresponding to the deviation.

At the same time of those operations, the pulse count unit counts up based on either the pulse number of the forward driving pulse signal or the pulse number of the reverse driving pulse signal, and counts down based on the other in the pulse count step; and control results are obtained based on the count results of the pulse count step. The pulse motor is thus driven at a pulse number proportional to the deviation amount corresponding to the deviation data, so that it constantly changes in speed. As a result, no great acceleration force is applied to the controlled device, and vibration which might be caused due to great acceleration force can be repressed. Thus, a smooth control operation can be performed.

(h) Eighth Modification

A preferred embodiment of the eighth modification is a pulse motor control method for controlling an external pulse motor which drives a device to be controlled based on a forward driving pulse signal and a reverse driving pulse signal. The pulse motor control method comprises: a deviation calculating step of calculating the deviation by comparing the control target with real control results; a signal generating step of generating a forward driving pulse signal and a reverse driving pulse signal based on the obtained deviation; a pulse count step of counting up based on either the pulse number of the forward driving pulse signal or the pulse number of the reverse driving pulse signal, and counting down based on the other; and a control result calculating step of outputting the control results based on the difference between the forward pulse number of the forward driving pulse signal and the reverse pulse number of the reverse driving pulse signal.

According to this modification, the real control results are compared with the control target so as to calculate the deviation in the deviation calculating step; a forward driving pulse signal and a reverse driving pulse signal are generated based on the obtained deviation in the signal generating step; and the external pulse motor drives the device being controlled based on the forward driving pulse signal or the reverse driving pulse signal having a pulse number corresponding to the deviation.

At the same time of those operations, the pulse count unit counts the pulse numbers of the forward driving pulse signal and the reverse driving pulse signal, and control results are obtained based on the difference between the forward pulse number of the forward driving pulse signal and the reverse pulse number of the reverse driving pulse signal. The pulse motor is thus driven at a pulse number proportional to the deviation amount corresponding to the deviation data, so that it constantly changes in speed. As a result, no great acceleration force is applied to the controlled device, and vibration which might be caused due to great acceleration force can be repressed. Thus, a smooth control operation can be performed.

(i) Ninth Modification

A preferred embodiment of the ninth embodiment is a wheel alignment measuring method which utilizes a wheel alignment measuring device comprising: a measuring plate attached to a wheel of the vehicle; a plurality of distance measuring units held by a holding member at predetermined intervals; and a driving unit which is provided with at least two pulse motor for driving the holding member, and drives the holding member in a direction perpendicular to the displacement detecting direction. The wheel alignment measuring method comprises: a vertical direction displacement detecting step of detecting the amount of displacement of the reference mark on the measuring surface of the measuring plate in a direction perpendicular to the displacement detecting direction; a distance measuring step of measuring the distance from the measuring plate by irradiating measuring light onto several spots on the measuring plate; and a driving control step of controlling the pulse motors to drive the holding member in such a direction as to cancel the amount of displacement of the reference mark in a direction perpendicular to the displacement detecting direction, based on the amount of displacement in the direction perpendicular to the displacement detecting direction, by the pulse motor control method of the preferred embodiment of the fifth modification.

According to this modification, the amount of displacement of the reference mark on the measuring surface of the measuring plate in a direction perpendicular to the displacement detecting direction in the vertical direction displacement detecting step; the distance from the measuring plate is measured by irradiating measuring light onto several spots on the measuring plate in the distance measuring step; and the pulse motors are controlled to drive the holding member in such a direction as to cancel the amount of displacement of the reference mark in a direction perpendicular to the displacement detecting direction, based on the amount of displacement in the direction perpendicular to the displacement detecting direction, by the pulse motor control method of the preferred embodiment of the fifth modification in the driving control step. The holding member is thus driven so that it constantly changes in speed, and no great acceleration force is applied to the controlled device, preventing unwanted vibration. Thus, an accurate distance measurement can be surely made in the distance measuring step.

(j) Tenth Modification

A preferred embodiment of the tenth modification is a wheel alignment measuring method which utilizes a wheel alignment measuring device comprising: a measuring plate attached to a wheel of the vehicle; a plurality of distance measuring units which irradiate measuring light onto the measuring plate, and are held by a holding member at predetermined intervals; and a driving unit which is provided with at least two pulse motors for driving the holding member, and drives the holding member in a direction perpendicular to the displacement detecting direction. The wheel alignment measuring method comprises: a vertical direction displacement detecting step of detecting the amount of displacement of the reference mark on the measuring surface of the measuring plate in a direction perpendicular to the displacement detecting direction; a distance measuring step of measuring the distance from the measuring plate by irradiating measuring light upon several spots on the measuring plate; and a driving control step of controlling the pulse motors to drive the holding member in such a direction as to cancel the amount of displacement of the reference mark in a direction perpendicular to the displacement detecting direction, based on the amount of displacement of the reference mark on the measuring surface of the measuring plate in the direction perpendicular to the displacement detecting direction, by the pulse motor control method of the preferred embodiment of the sixth modification.

According to the modification, the amount of displacement of the reference mark on the measuring surface of the measuring plate in a direction perpendicular to the displacement detecting direction is detected in the vertical direction displacement detecting step; the distance from the measuring plate is measured by irradiating measuring light upon several spots on the measuring plate in the distance measuring step; and the pulse motors are controlled to drive the holding member in such a direction as to cancel the amount of displacement of the reference mark in the direction perpendicular to the displacement detecting direction, based on the amount of displacement in the direction perpendicular to the displacement detecting direction, by the pulse motor control method of the preferred embodiment of the sixth modification. The holding member is thus driven so that it constantly changes in speed, and no great acceleration force is applied, which prevents occurrence of vibration. Thus, an accurate distance measurement can be surely made in the distance measuring step.

(k) Eleventh Modification

A preferred embodiment of the eleventh modification is a method of the ninth modification, in which the vertical direction displacement detecting step comprises; an image pick-up step of picking up images of the measuring plate; and a displacement calculating step of calculating the amount of displacement of the reference mark in the direction perpendicular to the displacement detecting direction by extracting an image corresponding to the reference mark from the picked-up images.

According to the modification, images of the measuring plate are picked up in the image pick-up step, and the image corresponding to the reference mark is extracted from the picked-up images so as to calculate the amount of displacement of the reference mark in the direction perpendicular to the displacement detecting direction. Thus, the amount of displacement can be calculated at speed by non-contact image processing, and control operations which provide excellent following ability can be performed.

(l) Twelfth Modification

A preferred embodiment of the twelfth modification is a method of the tenth modification, in which the vertical direction displacement detecting step comprises: an image pick-up step of picking up images of the measuring plate; and a displacement calculating step of calculating the amount of displacement of the reference mark in the direction perpendicular to the displacement detecting direction by extracting the image corresponding to the reference mark from the picked-up images.

According to the modification, images of the measuring plate are picked up in the image pick-up step, and the image corresponding to the reference mark is extracted from the picked-up images so as to calculate the amount of displacement of the reference mark in the direction perpendicular to the displacement detecting direction. Thus, the amount of displacement can be calculated at speed by non-contact image processing, and control operations which provide excellent following ability can be performed.

E: Fifth Embodiment

The following is a description of the fifth preferred embodiment of the present invention, with reference to the accompanying drawings.

The object of the fifth embodiment is to provide a displacement detecting device and a wheel alignment measuring device as well as a displacement detecting method and a wheel alignment measuring method, by which accurate displacement measurements can be taken regardless of the shape of the measuring figure, and accurate non-contact wheel alignment measurements can be taken at high speed.

The structure of the wheel alignment measuring device of the fifth embodiment is the same as in the fourth embodiment.

Measuring Operations

Here, the first circular mark MC1 should be always included in an image picked up by the color CCD camera 5A that constitutes the image pick-up unit 5, and the measuring plate 4B is attached to the wheel 3 of the measured vehicle 2 so that the origin O of the measuring surface 4S corresponds to the rotational center axis of the wheel 3.

Figure 55:
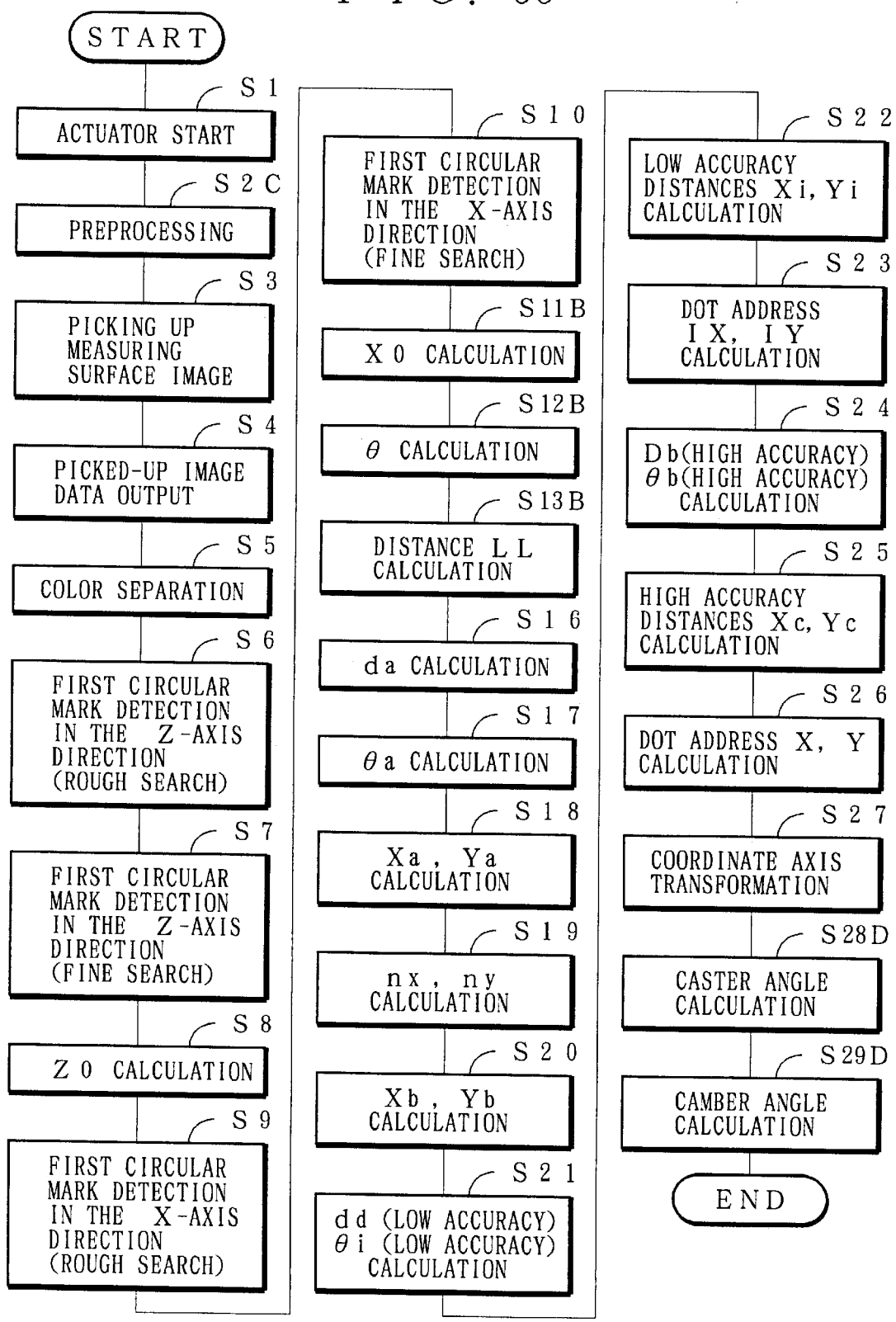
FIG. 55 is a flowchart of the measuring operation of the fifth embodiment.

FIG. 55 is a flowchart of the measuring operations. Like reference numerals are allotted to like components in FIG. 55 and FIG. 14 of the first embodiment.

As in the first embodiment, the wheel 3 of the measured vehicle 2 is first driven upward or downward by an actuator (not shown), independently of other wheels. The actuator is then stopped at the empty vehicle weight to maintain a stopped state (step S1).

The holding plate 10 and the image pick-up unit 5 are driven in the Z-axis direction by hand or by actuating the Z-axis direction driving unit 12 and the X-axis direction driving unit 14 so that they face to the measuring surface 4S of the measuring plate 4, the optical axes of the color CCD cameras 5A and 5B that constitute the image pick-up unit 5 are arranged in line with the origin O of the measuring surface 4S, and the measuring laser irradiation points P1 to P3 (see FIG. 53A) of the laser displacement gauges 6-1 to 6-3 are set within the distance measuring area MLA (step S2C).

As in the first embodiment, the following operations are carried out: picking up images of the measuring surface 4S of the measuring plate 4 by the image pick-up unit 5 (step S3); outputting the first picked-up image data DGG1 and the second picked-up image data DGG2 (step S4); performing color separation by the color separation circuit 27 (step S5); detecting the first circular mark MC1 by conducting a rough search at DN-dot intervals (step S6); detecting the first circular mark MC1 by conducting a fine search with a scan in the positive direction of the X-axis at 1-dot intervals (step S7); calculating the Z-axis center coordinate Z0 (step S8); detecting the first circular mark MC1 by conducting a rough search at CN-dot intervals with a scan in the positive direction of the Z-axis (step S9); and detecting the first circular mark MC1 by conducting a fine search in the positive direction of the X-axis at 1-dot intervals (equivalent to intervals of L5A/NN mm) until the first circular mark MC1 can no longer be detected, storing the dot number M1 (=1 to NN) in the X-axis direction when the first circular mark MC1 is detected for the last time, and conducting a fine search of the first circular mark MC1 in the negative direction of the X-axis (step S10).

In step S10, when the first circular mark MC1 becomes undetectable again, the X-axis center coordinate X0 is calculated based on the dot number M2 (=1 to NN) in the X-axis direction at the last detection of the first circular mark MC1 (step S11B).

As shown in FIG. 24 of the first embodiment, the correction lines CL are subjected to sampling based on a white image obtained by adding the second red picked-up image data DR2, the second green picked-up image data DG2, and the second blue picked-up image data DB2 outputted from the color CCD camera 5B, and the inclination θ of the correction lines CL is calculated from the positional data by the method of least squares (step S12B).

Based on the image picked up by the color CCD camera 5A, the distance LL between the center coordinates (X0, Z0) of the first circular mark MC1 determined in steps S8 and S11B and the center coordinates CCB of the visual field ARB of the color CCD camera 5B is calculated (step S13B).

By doing so, the correction lines CL surrounding the center coordinates of the visual field ARB can be specified, and the position of the visual field ARB can be roughly detected.

While calculating the center coordinates (X0, Z0) of the first circular mark MC1 and the distance LL, the arithmetic operation unit 28 also calculates the distance from the first circular mark MC1 on the measuring surface 4S of the measuring plate 4, based on the output signals DLD1 to DLD3 of the laser displacement gauges 6-1 to 6-3.

The distance LL is then converted into the amount of displacement (travel distance) of the first circular mark MC1 on the measuring surface 4S. To cancel the amount of displacement, the Z-axis direction stepping motor 11 of the Z-axis direction driving unit 12 and the X-axis direction stepping motor 13 of the X-axis direction driving unit 14 are driven so as to drive the holding plate 10 in the X-axis direction and the Z-axis direction following the track of the first circular mark MC1. Even if the measuring surface 4S is inclined during measurement as shown in FIG. 53C, the measuring laser irradiation points P1 to P3 of the laser displacement gauges 6-1 to 6-3 are situated within the distance measuring area MLA, regardless of the position of the optical axis of the color CCD camera 5B.

As a result, the measuring laser irradiation points P1 to P3 of the laser displacement gauges 6-1 to 6-3 are always situated within the distance measuring area MLA, so that a position Y as displacement information in the Y direction can be surely obtained, and that highly reliable wheel alignment measurements can be taken in the Y direction as well.

As in the first embodiment, the following steps are then carried out: calculating the distance da between the center coordinates CCA of the visual field ARA and the center coordinates (X0, Z0) of the first circular mark MC1 (step S16); calculating the angle θa formed by a virtual line in parallel with the correction line CL extending through the center coordinates of the visual field ARA with respect to the line connecting the center coordinates of the visual field ARA and the center coordinates of the first circular mark MC1 (step S17); calculating the distance Xa and the distance Ya (step S18); calculating the position of the second circular mark MC2$n$ closest to the center coordinates of the visual field ARA by counting the number (nx) of second circular marks situated between the closest second circular mark MC2$n$ and the first circular mark MC1 in the X direction, and the number (ny) of the second circular marks in the Z direction (step S19); calculating the distances Xb and Yb between the center coordinates (X0, Z0) of the second circular mark MC2$n$ closest to the center coordinates of the visual field ARA and the center coordinates of the first circular mark MC1 (step S20); and calculating the angle θi (low accuracy) formed by the X-axis of the visual field ARA and the distance dd (low accuracy) between the center coordinates of the visual field ARA and the center coordinates of the second circular mark MC2$n$ closest to the center coordinates of the visual field ARA (step S21).

Further steps are carried out as in the first embodiment: calculating the low accuracy distances Xi and Yi between the center coordinates of the visual field ARA and the center coordinates of the second circular mark MC2$n$ closest to the center coordinates of the visual field ARA (step S22); converting the center coordinates of the second circular mark MC2$n$ closest to the center coordinates of the visual field ARB of the color CCD camera 5B into a dot address (IX, IY) (step S23); calculating the angle θb (high accuracy) formed by the X-axis of the visual field ARA and the distance Db (high accuracy) between the center coordinates of the visual field ARB and the center coordinates of the closest second circular mark MC2$n$ in the visual field ARB of the color CCD camera 5B (step S24); calculating the high accuracy distances Xc and Yc between the center coordinates of the visual field ARB and the center coordinates of the second circular mark MC2$n$ closest to the center coordinates of the visual field ARB (step S25); converting the center coordinates of the second circular mark MC2$n$ closest to the center coordinates of the visual field ARB of the color CCD camera 5B into a dot address (X, Y) (step S26); and transforming the dot address (X, Y) into the system of coordinates including the X-axis and Z-axis on the measuring surface 4S of the measuring plate 4, so as to calculate a dot address (x, y) in the system of coordinates including the X-axis and Z-axis on the measuring surface 4S (step S27).

The arithmetic operation unit 28 next calculates the caster angle based on the inclination of the scale line with respect to the horizontal direction (or the vertical direction) of the picked-up image (step S28D).

Based on the center coordinates (X0, Z0) of the first circular mark MC1, the Z-axis direction stepping motor 11 of the Z-axis direction driving unit 12 and the X-axis direction stepping motor 13 of the X-axis direction driving unit 14 are subjected to servo control, so that the holding plate 10 follows the track of the center of the first circular mark MC1.

Based on the secure output signals DLD1 to DLD3 obtained when the measuring laser irradiation points P1 to P3 of the laser displacement gauges 6-1 to 6-3 are always within the distance measuring area MLA, the camber angle is calculated from the differences in geometric distance from the measuring laser irradiation points P1 to P3 on the measuring surface 4S of the measuring plate 4 corresponding to the laser displacement gauges 6-1 to 6-3, respectively (step S29D).

The arithmetic operation unit 28C then outputs the obtained dot address x as X-coordinate data DX, the obtained dot address y as Z-coordinate data DZ, the obtained spin angle as inclination data DSP, and the obtained camber angle as camber angle data DCB.

As described so far, according to the fifth embodiment, the laser displacement gauges 6-1 to 6-3 follow the displacement of the center coordinates of the first circular mark MC1, which is the reference mark, so that the displacement in the Y direction (more specifically, the position Y and the camber angle) can be calculated speedily and accurately, based on the output signals DLD1 to DLD3 of the laser displacement gauges 6-1 to 6-3 in a driven state in such a direction as to cancel the displacement.

Based on picked-up images of the two color CCD cameras 5A and 5B, the position and the spin angle corresponding to the center coordinates of the first circular mark MC1 on the measuring surface 4S of the measuring plate situated in a predetermined position (in the center in the above example) within the image picked up by the color CCD camera 5B can be calculated speedily and accurately. Thus, reproducibility of the measurement is improved.

As described above so far, according to this embodiment the wheel alignment can be measured speedily and accurately, and its reproducibility and reliability can be improved.

Modifications of the Fifth Embodiment (a) First Modification

A preferred embodiment of the first modification is a displacement detecting device which detects the displacement of the measuring plate in the displacement detecting direction, which is a direction perpendicular to the measuring surface of the measuring plate arranged in a predetermined reference position. The displacement detecting device comprises: a vertical direction displacement detecting unit which detects the amount of displacement of the reference mark on the measuring surface in a direction perpendicular to the displacement detecting direction, and then outputs vertical direction displacement detection data; a plurality of distance measuring units which measure the distance from the measuring area by irradiating measuring light onto the optically uniform measuring area on the measuring plate, and then output distance measurement data; a driving unit which drives the distance measuring units in such a direction as to cancel the amount of displacement of the reference mark in the direction perpendicular to the displacement detecting direction, based on the vertical direction displacement detection data; and a detecting unit which detects displacement of the measuring plate based on the distance measurement data, and then outputs displacement detection data.

In this modification, the vertical direction displacement detecting unit detects the amount of displacement of the reference mark on the measuring surface in the direction perpendicular to the displacement detecting direction, and then outputs the vertical direction displacement detection data to the driving unit; the driving unit drives the distance measuring units in such a direction as to cancel the amount of displacement of the reference mark in the direction perpendicular to the displacement detecting direction; the distance measuring units measure the distance from the measuring area by irradiating the measuring light onto the optically uniform measuring area on the measuring plate, and then output the distance measurement data to the detecting unit; and the detecting unit detects displacement of the measuring plate based on the distance measurement data, and then outputs the displacement detection data. Thus, the measuring light always irradiate the optically uniform measuring area, and accurate displacement detection data can be outputted.

Since the non-contact and accurate displacement detection data can be quickly obtained, accurate wheel alignment measurements can be taken at speed.

(b) Second Modification

A preferred embodiment of the second modification is a displacement measuring device of the first modification, in which the reference mark is situated on an axis extending through the center of the wheel and in parallel with the displacement detecting direction.

Since the reference mark is situated on the axis extending through the center of the wheel and in parallel with the displacement detecting direction, the driving unit drives the distance measuring units in such a direction as to cancel the amount of displacement of the center of the wheel in a direction perpendicular to the displacement detecting direction, so that the amount of displacement can be calculated in line with the center of the wheel. Thus, the amount of displacement can be calculated under certain conditions, and wheel alignment measurements can be steadily taken.

(c) Third Modification

A preferred embodiment of the third modification is a displacement measuring device of the first modification, in which the vertical direction displacement detecting unit comprises: an image pick-up unit which picks up images of the measuring plate and outputs picked-up image data; and a displacement calculating unit which calculates the amount of displacement of the reference mark in a direction perpendicular to the displacement detecting direction by extracting image data corresponding to the reference mark from the picked-up image data, and outputs the vertical direction displacement detection data.

In this modification, the image pick-up unit of the vertical direction displacement detecting unit picks up images of the measuring plate to output the picked-up image data to the displacement calculating unit; the displacement calculating unit extracts the image data corresponding to the reference mark from the picked-up image data to calculate the amount of displacement of the reference mark in the direction perpendicular to the displacement detecting direction, and outputs the vertical direction displacement detection data to the driving unit. Thus, displacement of the reference mark, i.e., displacement of the measuring plate, can be speedily and accurately detected, and the irradiation points of the measuring light can be maintained in fixed positions so as to carry out accurate displacement detection.

(d) Fourth Modification

A preferred embodiment of the fourth modification is a displacement detecting device of the first modification, in which the driving unit comprises: a first driving unit for driving the distance measuring unit in a first direction; a second driving unit for driving the distance measuring unit in a second direction perpendicular to the first direction; and a driving control unit for controlling the first driving unit and the second driving unit based on the vertical direction displacement detection data.

In this modification, the driving control unit of the driving unit controls the first driving unit and the second driving unit based on the vertical direction displacement detection data; the first driving unit drives the distance measuring unit in the first direction; and the second driving unit drives the distance measuring unit in the second direction perpendicular to the first direction. Because of this structure, the displacement of the reference mark can be accurately followed, and the irradiation points of the measuring light remain in the same positions. Thus, accurate displacement detection can be carried out.

(e) Fifth Modification

A preferred embodiment of the fifth modification comprises: a measuring plate which is attached to a wheel of the vehicle and has an optically uniform measuring area; a vertical direction displacement detecting unit which detects the amount of displacement of the reference mark in a direction perpendicular to the displacement detecting direction on the measuring surface of the measuring plate, and outputs vertical direction displacement detection data; a plurality of distance measuring units which measure the distance from the measuring area by irradiating distance measuring light upon the measuring area, and then output distance measurement data; a driving unit which drives the distance measuring units in such a direction as to cancel the amount of displacement of the reference mark in a direction perpendicular to the displacement detecting direction, based on the vertical direction displacement detection data; a detecting unit which detects displacement of the measuring plate based on the distance measurement data, and outputs displacement detection data; and a calculating unit which calculates wheel alignment measurement data based on the displacement detection data.

In this modification, the vertical direction displacement detecting unit detects the amount of displacement in a direction perpendicular to the displacement detecting direction of the reference mark on the measuring surface of the measuring plate which is attached to a wheel of the vehicle and has an optically uniform measuring area, and then outputs the vertical direction displacement detection data to the driving unit; the driving unit drives the distance measuring units in such a direction as to cancel the amount of displacement of the reference mark in a direction perpendicular to the displacement detecting direction, based on the vertical direction displacement detection data; the plurality of distance measuring units measure the distance from the measuring area by irradiating the distance measuring light upon the measuring area, and each of them outputs the distance measurement data to the detecting unit; the detecting unit detects displacement of the measuring plate based on the distance measurement data, and then outputs the displacement detection data to the calculating unit; and the calculating unit calculate the wheel alignment measurement data based on the displacement detection data. With the distance measuring light irradiating the optically uniform measuring area, accurate displacement detection data are obtained. Based on the displacement detection data, non-contact wheel alignment measurements can be taken speedily and accurately.

(f) Sixth Modification

A preferred embodiment of the sixth modification is a wheel alignment measuring device of the fifth modification, in which the vertical direction displacement detecting unit comprises: an image pick-up unit which picks up images of the measuring plate and outputs picked-up image data; and a displacement calculating unit which extracts image data corresponding to the reference mark from the picked-up image data, calculates the amount of displacement of the reference mark in a direction perpendicular to the displacement detecting direction, and outputs the vertical direction displacement detection data.

In this modification, the image pick-up unit picks up images of the measuring plate and outputs the picked-up image data to the displacement calculating unit; and the displacement calculating unit extracts image data corresponding to the reference mark from the picked-up image data, calculates the amount of displacement of the reference mark in a direction perpendicular to the displacement detecting direction, and then outputs the vertical direction displacement detection data to the driving unit. With the distance measuring light always irradiating the optically uniform measuring area, accurate displacement detecting data can be obtained.

Thus, with the non-contact accurate displacement detection data, accurate wheel alignment measurements can be taken speedily and accurately.

(g) Seventh Modification

A preferred embodiment of the seventh modification is a displacement detecting method of detecting displacement of the measuring plate in the displacement detecting direction, which is perpendicular to the measuring surface of the measuring plate placed in a predetermined reference position. The displacement detecting method comprises: a vertical direction displacement detecting step of detecting the amount of displacement of the reference mark on the measuring surface in a direction perpendicular to the displacement detecting direction; a distance measuring step of measuring the distance from each irradiation point by irradiating distance measuring light upon several points on the optically uniform measuring area on the measuring plate; a distance measuring position control step of controlling the irradiating points of the distance measuring light to be within the measuring area on the measuring plate, based on the amount of displacement of the reference mark in a direction perpendicular to the displacement detecting direction; and a detecting step of detecting displacement of the measuring plate based on the distances from the irradiating points.

According to this modification, the amount of displacement of the reference mark on the measuring surface of the measuring plate in a direction perpendicular to the displacement detecting direction is detected in the vertical direction displacement detecting step; the distance measuring light irradiates several points on the optically uniform measuring area on the measuring plate, so that the distance from each irradiation point can be measured in the distance measuring step; based on the amount of displacement of the reference mark in a direction perpendicular to the displacement detecting direction, the irradiation points on the measuring plate are controlled to be in predetermined positions within the measuring area in the distance measuring position control step; and based on the distances from the irradiation points, displacement of the measuring plate is detected in the detecting step. With the distance measuring light always irradiating the optically uniform measuring area, accurate displacement detection data can be obtained.

As the non-contact accurate displacement detection data can be obtained, accurate wheel alignment measurements can be taken at speed.

(h) Eighth Modification

A preferred embodiment of the eighth modification is a displacement measuring method of the seventh modification, in which the reference mark is situated on the axis in parallel with the displacement detecting direction extending through the center of the wheel.

In this modification, with the reference mark situated on the axis in parallel with the displacement measuring direction extending through the center of the wheel, the driving unit drives the distance measuring units in such a direction as to cancel the amount of displacement of the center of the wheel in a direction perpendicular to the displacement detecting direction. Because of this, the amount of displacement can be calculated in line with the movement of the center of the wheel. Thus, the amount of displacement can be detected under certain conditions, and wheel alignment measurements can be steadily taken.

(i) Ninth Modification

A preferred embodiment of the ninth modification is a displacement detecting method of the seventh modification, in which the vertical direction displacement detecting step comprises: an image pick-up step of picking up images of the measuring plate; and a displacement calculating step of calculating the amount of displacement of the reference mark in a direction perpendicular to the displacement detecting direction by extracting a picked-up image corresponding to the reference mark from the picked-up images of the measuring plate.

According to this modification, images of the measuring plate are picked up in the image pick-up step of the vertical direction displacement detecting step; and the amount of displacement of the reference mark in a direction perpendicular to the displacement detecting direction is calculated by extracting the picked-up image corresponding to the reference mark from the picked-up images of the measuring plate in the displacement calculating step. Thus, displacement of the reference mark, i.e., displacement of the measuring plate, can be detected speedily and accurately, and with the irradiation points of the distance measuring light kept in certain positions, accurate displacement detection can be carried out.

(j) Tenth Modification

A preferred embodiment of the tenth modification is a displacement detecting method of the seventh modification, in which the driving step comprises: a first driving step of driving the irradiation points of the distance measuring light in a first direction; a second driving step of driving the irradiation points of the distance measuring light in a second direction perpendicular to the first direction; and a driving control step of controlling the amount of driving in the first direction and the amount of driving in the second direction based on the amount of displacement of the reference mark in a direction perpendicular to the displacement detecting direction.

According to this modification, the amount of driving in the first direction and the amount of driving in the second direction are controlled based on the amount of displacement of the reference mark in a direction perpendicular to the displacement detecting direction in the driving control step; the irradiation points of the distance measuring light is driven in the first direction in the first driving step; and the irradiation points of the distance measuring light is driven in the second direction in the second driving step. With the irradiation points of the distance measuring light maintained in predetermined positions in line with displacement of the reference mark, accurate displacement detection can be carried out.

(k) Eleventh Modification

A preferred embodiment of the eleventh modification comprises: a vertical direction displacement detecting step of detecting the amount of displacement of the reference mark on the measuring surface of the measuring plate in a direction perpendicular to the displacement detecting direction; a distance measuring step of measuring the distances from the irradiation points by irradiating the distance measuring light upon several points in the optically uniform measuring area on the measuring surface; a driving step of driving the irradiation points of the distance measuring light in such a direction as to cancel the amount of displacement of the reference mark in a direction perpendicular to the displacement detecting direction, based on the amount of displacement of the reference mark in a direction perpendicular to the displacement detecting direction; a detecting step of detecting displacement of the measuring plate based on the distances from the irradiation points of the distance measuring light; and a calculating step of calculating the wheel alignment based on the detected displacement of the measuring plate.

According to this modification, in the vertical direction displacement detecting step, the amount of displacement of the reference mark on the measuring surface of the measuring plate in a direction perpendicular to the displacement detecting direction is detected.

In the distance measuring step, the distances from the irradiation points are measured by irradiating the distance measuring light upon several points in the optically uniform measuring area on the measuring surface.

In the driving step, based on the amount of displacement of the reference mark in a direction perpendicular to the displacement detecting direction, the irradiation points of the distance measuring light are driven in such a direction as to cancel the amount of displacement of the reference mark in a direction perpendicular to the displacement detecting direction.

In the detecting step, displacement of the measuring plate is detected in accordance with the result of the driving step and the distances from the irradiation points of the distance measuring light. In the calculating step, the wheel alignment is calculated based on the detected displacement of the measuring plate. With the distance measuring light always irradiating the optically uniform measuring area, accurate displacement detection can be carried out. By measuring the wheel alignment based on the detected displacement, wheel alignment measurements can be taken speedily and accurately in a non-contact manner.

(l) Twelfth Modification

A preferred embodiment of the twelfth modification is a method of the eleventh modification, in which the vertical direction displacement detecting step comprises: an image pick-up step of picking up images of the measuring plate to obtain picked-up images; and a displacement calculating step of calculating the amount of displacement of the reference mark in a direction perpendicular to the displacement detecting direction by extracting the image corresponding to the reference mark from the picked-up images.

According to this modification, images of the measuring plate are picked up to obtain picked-up images in the image pick-up step; and the amount of displacement of the reference mark in a direction perpendicular to the displacement detecting direction is calculated by extracting the image corresponding to the reference mark in the displacement calculating step. With the distance measuring light always irradiating the optically uniform measuring area, accurate displacement detection data can be obtained.

With the non-contact accurate displacement detection data, wheel alignment measurements can be taken speedily and accurately.

F: Sixth Embodiment

The following is a description of the sixth embodiment of the present invention, with reference to the accompanying drawings.

In this embodiment, the structure of the wheel alignment measuring device and the structure of the measuring unit are the same as in the fourth embodiment.

Structure of the Data Processing Control Unit

Figure 56:
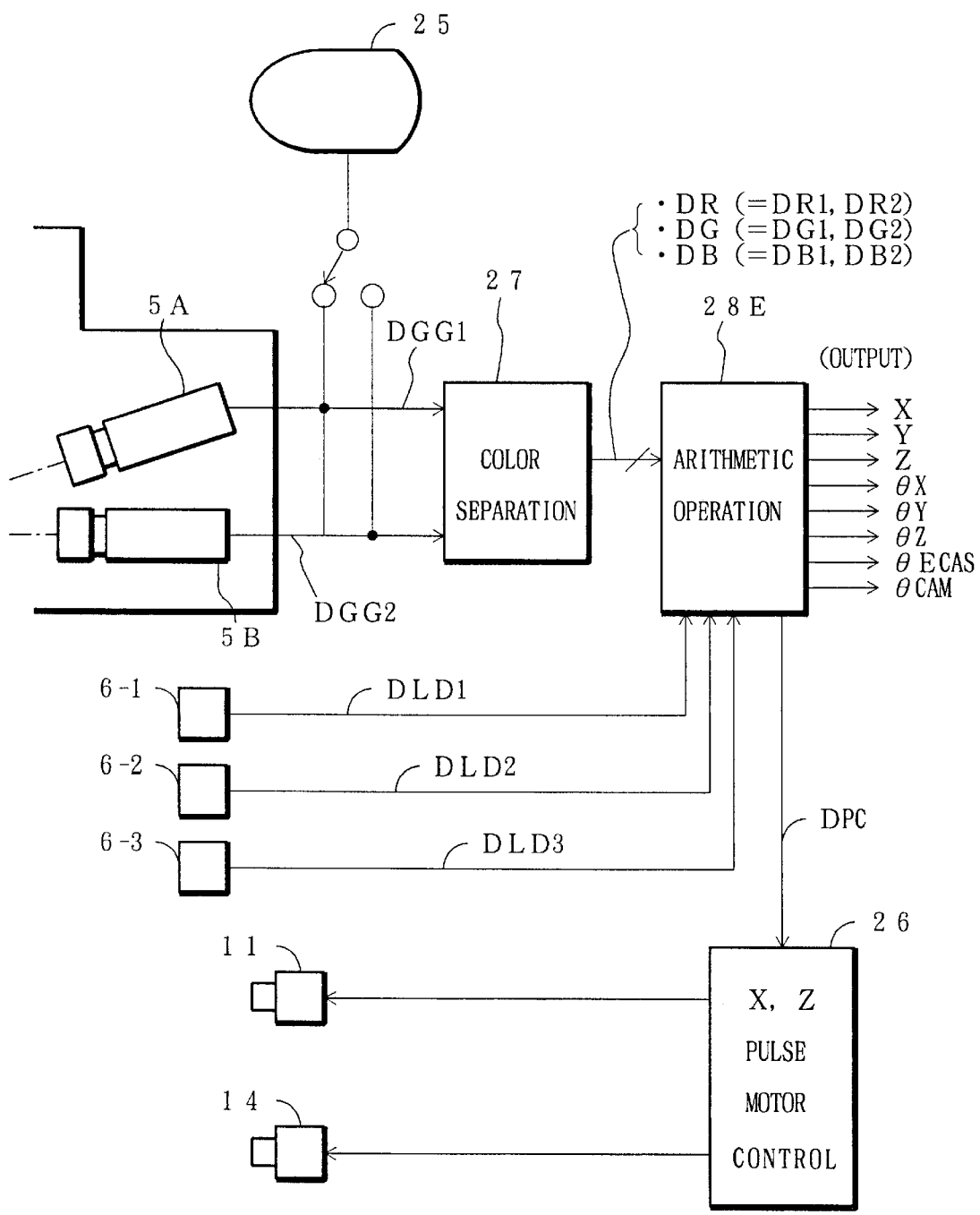
FIG. 56 is a block diagram illustrating the structure of the data processing control unit of the sixth embodiment.

FIG. 56 is a block diagram illustrating the structure of the data processing control unit 8E. Like reference numerals are allotted to like components in FIG. 56 and FIG. 52 of the fourth embodiment.

The data processing control unit 8E comprises a display 25, an X-Z pulse motor control unit 26, a color separation circuit 27, and an arithmetic operation unit 28E. The display 25 displays an image based on either the first picked-up image data DGG1 outputted from the color CCD camera 5A or the second picked-up image data DGG2 outputted from the color CCD camera 5B. The X-Z pulse motor control unit 26 controls the driving of the Z-axis stepping motor 11 and the X-axis stepping motor 14, based on position control data DPC. The color separation circuit 27 performs color separation based on the first picked-up image data DGG1 and the second picked-up image data DGG2 outputted from the image pick-up unit 5, and outputs red picked-up image data DR corresponding to red, green picked-up image data DG corresponding to green, and blue picked-up image data DB corresponding to blue. Based on output signals DLD1 to DLD3 from the three laser displacement gauges 6-1 to 6-3, the red picked-up image data DR, the green picked-up image data DG, and the blue picked-up image data DB, the arithmetic operation unit 28E outputs: X-coordinate data X on the measuring surface 4S of the measuring plate 4 in a predetermined position in a high-resolution picked-up image (for instance, the center of the picked-up image); Y-coordinate data Y of the measuring surface 4S; Z-coordinate data Z on the measuring surface 4S of the measuring plate 4 in a predetermined position in a high-solution picked-up image; an inclination $\theta x$ with respect to the X-axis on the measuring surface 4S; an inclination $\theta y$ with respect to the Y-axis on the measuring surface 4S; an inclination $\theta z$ with respect to the Z-axis on the measuring surface 4S; the effective caster angle $\theta ECAS$ and camber angle data $\theta CAM$ obtained based on the inclinations $\theta x$, $\theta y$, and $\theta z$; and the position control data DPC.

Here, the red picked-up image data DR include first red picked-up image data DR1 corresponding to the first picked-up image data DGG1 and second red picked-up image data DR2 corresponding to the second picked-up image data DGG2, the green picked-up image data DG include first green picked-up image data DG1 corresponding to the first picked-up image data DGG1 and second green picked-up image data DG2 corresponding to the second picked-up image data DGG2, and the blue picked-up image data DB include first blue picked-up image data DB1 corresponding to the first picked-up image data DGG1 and second blue picked-up image data DB2 corresponding to the second picked-up image data DGG2.

Caster Angle Measuring Operation

Prior to describing the wheel alignment measuring operation, the caster angle measuring operation will be described below.

In order to carry out a caster angle measuring operation, the caster angle detecting line CL is extracted by obtaining a logical product (AND) of the first red picked-up image data DR1, the first green picked-up image data DG1, and the first blue picked-up image data DB1, or by obtaining a logical product (AND) of the second red picked-up image data DR2, the second green picked-up image data DG2, and the second blue picked-up image data DB2, based on the first red picked-up image data DR1 corresponding to the first picked-up image data DGG1, the second red picked-up image data DR2 corresponding to the second picked-up image data DGG2, the first green picked-up image data DG1 corresponding to the first picked-up image data DGG1, the second green picked-up image data DG2 corresponding to the second picked-up image data DGG2, the first blue picked-up image data DB1 corresponding to the first picked-up image data DGG1, and the second blue picked-up image data DB2 corresponding to the second picked-up image data DGG2, all outputted by the color separation circuit 27 performing color separation on the image data DGG1 and DGG2 of the color CCD cameras 5A and 5B.

By the method of least squares, the inclination (=b/a) of the caster angle detecting line CL with respect to a virtual reference line LREF (shown by a broken line in FIG. 57) arranged in advance is calculated.

If standard color CCD cameras having 400×400 dots are employed as the color CCD cameras 5A and 5B here, the minimum caster angle data $\theta CASmin$, which are detectable using the caster angle detecting line CL extracted based on the image data DGG1 and DGG2 and the virtual reference line LREF determined in advance, correspond to the case where the gradient of the caster angle detecting line CL changes by 1 dot in every 400 dots, as shown in FIG. 58. This is expressed as:

$$\theta CASmin = \tan^{-1}(1\ dot/400\ dots) = 0.14°$$

Here, a caster angle having a smaller angle than the minimum caster angle data $\theta CASmin$ is undetectable and becomes a dead zone.

Meanwhile, in alignment measurement for a vehicle, the caster angle data need to have a measuring accuracy of ±0.01°.

In view of this, the caster angle data based on the image data DGG1 and DGG2 obtained by the color CCD cameras 5A and 5B are too low in measuring accuracy to be used as data in an alignment measuring operation.

Figure 61:
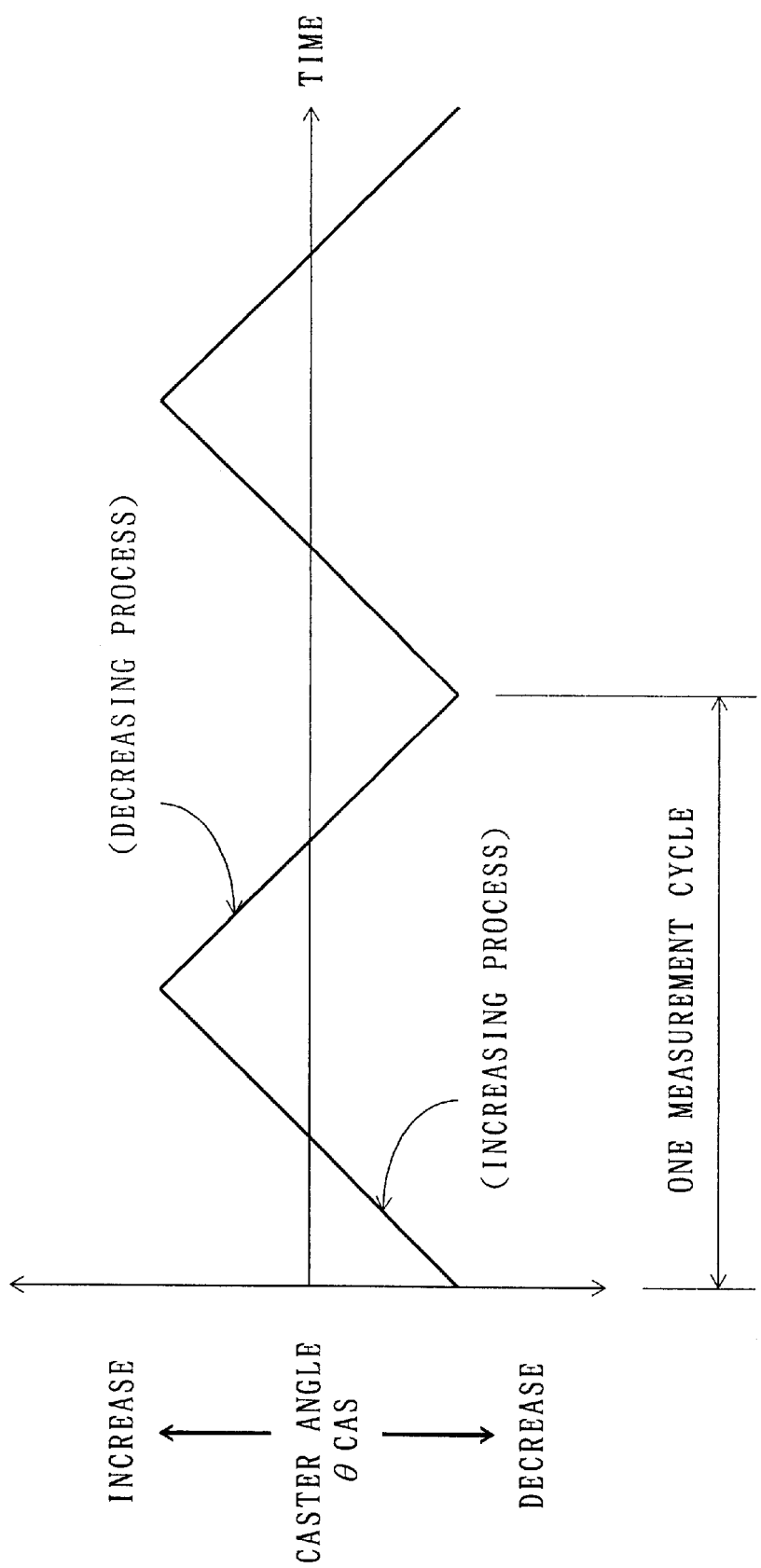
FIG. 61 illustrates the caster angle measuring conditions.

More specifically, the real caster angle varies constantly as shown in FIG. 59A. However, when measured by the color CCD cameras 5A and 5B, the caster angle data vary at certain intervals as shown in FIGS. 59B and 60, changing from 0° to 0.14° to 0.28°, with the maximun error being 0.14° or less. In actual wheel alignment measurement, the caster angle monotonously increases or decreases as shown in FIG. 61. In view of the machine accuracy of the color CCD cameras 5A and 5B, the accuracy of the caster angle data, which are obtained when the value of the caster angle data $\theta$CAS changes, can be maintained in the range of ±0.01°.

The high accuracy caster angle data $\theta$CAS serve as the effective caster angle data $\theta$ECAS, and are compared with the data N4, N9, and N15 (see FIGS. 59 and 60) of the corresponding timing among the data N1 to N15 of other dimensions such as camber angle and toe angle.

As a result, the data pitch becomes 0.14°, but the desired accuracy can be maintained during data processing.

As caster angle measurements can be taken in a non-contact manner through image processing, high durability and speed can be maintained.

Next, the description moves on to the wheel alignment measuring operation.

Measuring Operations

Here, the first circular mark MC1 should be always included in an image picked up by the color CCD camera 5A that constitutes the image pick-up unit 5, and the measuring plate 4 is attached to the wheel 3 of the measured vehicle 2 so that the origin O of the measuring surface 4S corresponds to the rotational center axis of the wheel 3.

Figure 62:
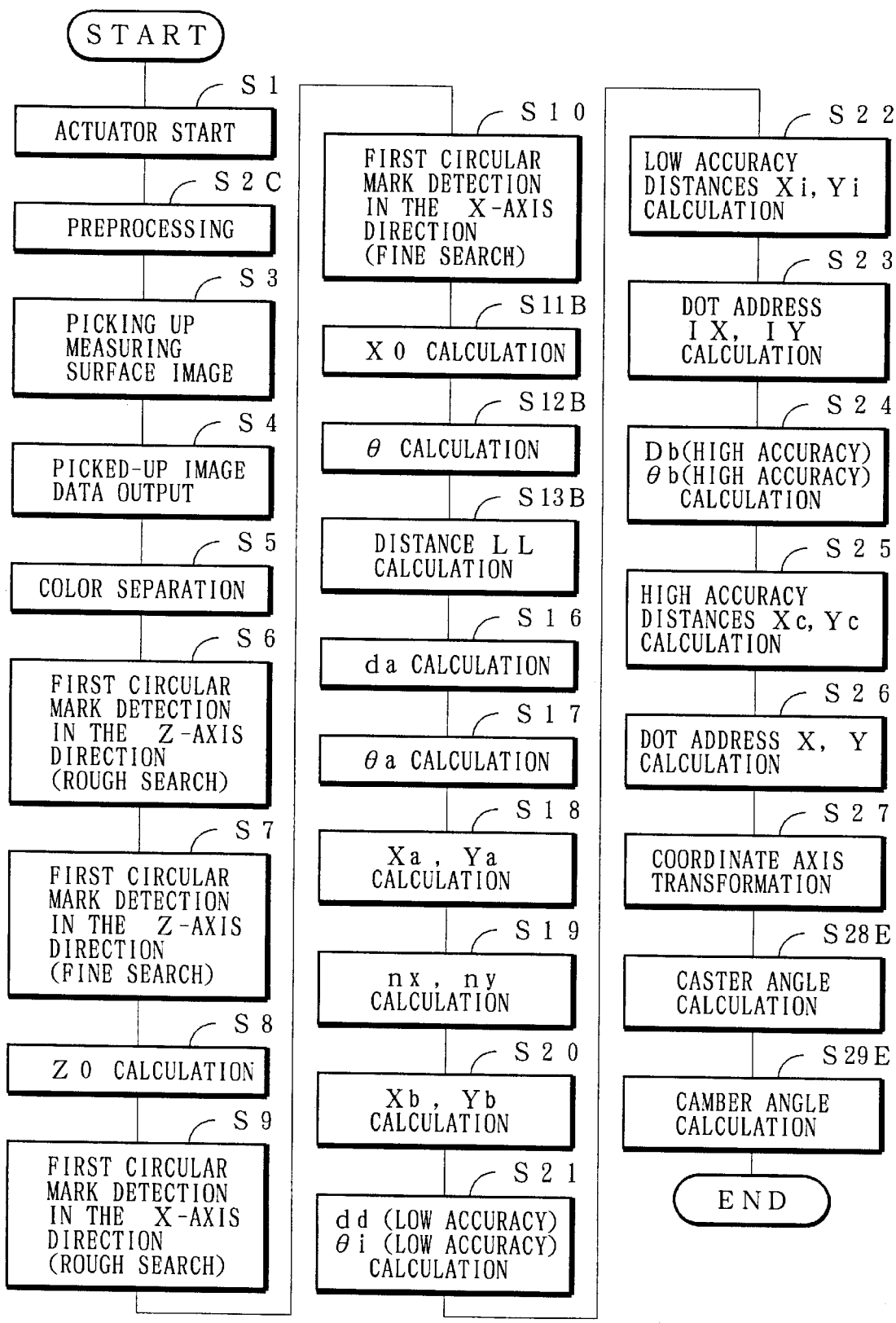
FIG. 62 is a flowchart of the measuring operation.

FIG. 62 is a flowchart of the measuring operations. Like reference numerals are allotted to like components in FIG. 62 and FIG. 14 of the first embodiment.

As in the first embodiment, the wheel 3 of the measured vehicle 2 is first driven upward or downward by an actuator (not shown) independently of other wheels. The actuator is then stopped at the empty vehicle weight to maintain a stopped state (step S1).

The holding plate 10 and the image pick-up unit 5 are driven in the Z-axis direction by hand or by actuating the Z-axis direction driving unit 12 and the X-axis direction driving unit 14 so that they face to the measuring surface 4S of the measuring plate 4, the optical axes of the color CCD cameras 5A and 5B that constitute the image pick-up unit 5 are arranged in line with the origin O of the measuring surface 4S, and the measuring laser irradiation points P1 to P3 (see FIG. 53A) of the laser displacement gauges 6-1 to 6-3 are set within the distance measuring area MLA (step S2C).

As in the first embodiment, the following operations are carried out: picking up images of the measuring surface 4S of the measuring plate 4 by the image pick-up unit 5 (step S3); outputting the first picked-up image data DGG1 and the second picked-up image data DGG2 (step S4); performing color separation by the color separation circuit 27 (step S5); detecting the first circular mark MC1 by conducting a rough search at DN-dot intervals (step S6); detecting the first circular mark MC1 by conducting a fine search with a scan in the positive direction of the X-axis at 1-dot intervals (step S7); calculating the Z-axis center coordinate Z0 (step S8); detecting the first circular mark MC1 by conducting a rough search at CN-dot intervals with a scan in the positive direction of the Z-axis (step S9); and detecting the first circular mark MC1 by conducting a fine search in the positive direction of the X-axis at 1-dot intervals (equivalent to intervals of L5A/NN mm) until the first circular mark MC1 can no longer be detected, storing the dot number M1 (=1 to NN) in the X-axis direction when the first circular mark MC1 is detected for the last time, and conducting a fine search of the first circular mark MC1 in the negative direction of the X-axis (step S10).

In step S10, when the first circular mark MC1 becomes undetectable again, the X-axis center coordinate X0 is calculated based on the dot number M2 (=1 to NN) in the X-axis direction at the last detection of the first circular mark MC1 (step S11B).

As shown in FIG. 24 of the first embodiment, the correction lines CL are subjected to sampling based on a white image obtained by adding the second red picked-up image data DR2, the second green picked-up image data DG2, and the second blue picked-up image data DB2 outputted from the color CCD camera 5B, and the inclination e of the correction lines CL is calculated from the positional data by the method of least squares (step S12B).

Based on the image picked up by the color CCD camera 5A, the distance LL between the center coordinates (X0, Z0) of the first circular mark MC1 determined in steps S8 and S11B and the center coordinates CCB of the visual field ARB of the color CCD camera 5B is calculated (step S13B).

By doing so, the correction lines CL surrounding the center coordinates of the visual field ARB can be specified, and the position of the visual field ARB can be roughly detected.

As in the first embodiment, the following steps are then carried out: calculating the distance da between the center coordinates CCA of the visual field ARA and the center coordinates (X0, Z0) of the first circular mark MC1 (step S16); calculating the angle $\theta$a formed by a virtual line in parallel with the correction line CL extending through the center coordinates of the visual field ARA with respect to the line connecting the center coordinates of the visual field ARA and the center coordinates of the first circular mark MC1 (step S17); calculating the distance Xa and the distance Ya (step S18); calculating the position of the second circular mark MC2$n$ closest to the center coordinates of the visual field ARA by counting the number (nx) of second circular marks situated between the closest second circular mark MC2$n$ and the first circular mark MC1 in the X direction, and the number (ny) of the second circular marks in the Z direction (step S19); calculating the distances Xb and Yb between the center coordinates (X0, Z0) of the second circular mark MC2$n$ closest to the center coordinates of the visual field ARA and the center coordinates of the first circular mark MC1 (step S20); and calculating the angle $\theta$i (low accuracy) formed by the X-axis of the visual field ARA and the distance dd (low accuracy) between the center coordinates of the visual field ARA and the center coordinates of the second circular mark MC2$n$ closest to the center coordinates of the visual field ARA (step S21).

Further steps are carried out as in the first embodiment: calculating the low accuracy distances Xi and Yi between the center coordinates of the visual field ARA and the center coordinates of the second circular mark MC2$n$ closest to the center coordinates of the visual field ARA (step S22); converting the center coordinates of the second circular mark MC2$n$ closest to the center coordinates of the visual field ARB of the color CCD camera 5B into a dot address (IX, IY) (step S23); calculating the angle $\theta$b (high accuracy) formed by the X-axis of the visual field ARA and the distance Db (high accuracy) between the center coordinates of the visual field ARB and the center coordinates of the closest second circular mark MC2$n$ in the visual field ARB of the color CCD camera 5B (step S24); calculating the high accuracy distances Xc and Yc between the center coordinates of the visual field ARB and the center coordinates of the second circular mark MC2n closest to the center coordinates of the visual field ARB (step S25); converting the center coordinates of the second circular mark MC2n closest to the center coordinates of the visual field ARB of the color CCD camera 5B into a dot address (X, Y) (step S26); and transforming the dot address (X, Y) into the system of coordinates including the X-axis and Z-axis on the measuring surface 4S of the measuring plate 4, so as to calculate a dot address (x, y) in the system of coordinates including the X-axis and Z-axis on the measuring surface 4S (step S27).

The arithmetic operation unit 28 next obtains the effective caster angle data θECAS by calculating the inclination of the caster line detecting line CL with respect to the horizontal direction (or the vertical direction) of the picked-up image (step S28E).

Based on the output signals DLD1 to DLD3 of the laser displacement gauges 6-1 to 6-3, the camber angle is calculated from the differences in geometric distance from the measuring surface 4S of the measuring plate 4 (step S29E).

The arithmetic operation unit 28C then outputs the obtained dot address x as X-coordinate data DX, the obtained dot address y as Z-coordinate data DZ, the obtained caster angle as the effective caster angle data θECAS, and the obtained camber angle as camber angle data θcam.

According to this embodiment, the effective caster angle data θECAS can be compared with data of other dimensions, such as the camber angle data θCAM with desired accuracy.

Based on picked-up images of the two color CCD cameras 5A and 5B, the caster angle can be calculated with desired precision and speed, and compared with data of other dimensions (such as the camber angle data). Thus, reproducibility of the measurement is improved.

As described so far, according to this embodiment, the wheel alignment can be measured speedily and accurately, and its reproducibility and reliability can be improved.

G: Seventh Embodiment

The following is a description of the seventh embodiment of the present invention, with reference to the accompanying drawings.

Structure of the Alignment Measuring Device

Figure 63:
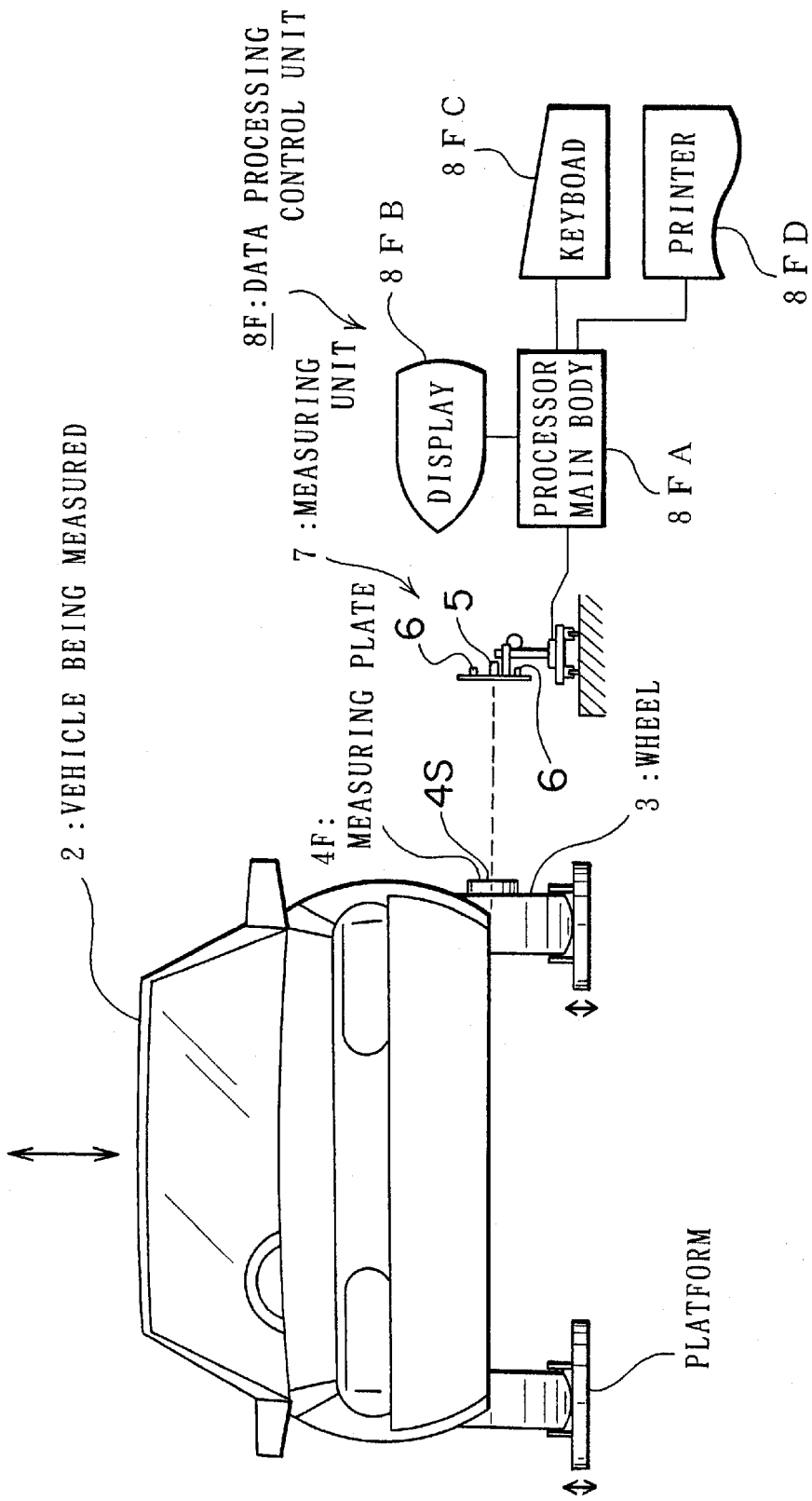
FIG. 63 is a block diagram illustrating the structure of the wheel alignment measuring device.

FIG. 63 is a block diagram illustrating the wheel alignment measuring device. Like reference numerals are allotted to like components in FIG. 63 and in the first embodiment.

The wheel alignment measuring device 1F comprises: a measuring plate 4F attached to a wheel 3 of a measured vehicle 2; a measuring unit 7 which picks up images of the measuring surface 4S of the measuring plate 4F by a color CCD camera 5, and measures the distance from the measuring surface 4S of the measuring plate by a plurality of laser displacement gauges 6; and a data processing unit 8F which performs an alignment calculating operation based on output signals from the measuring unit 7.

The data processing unit 8F comprises: a processor main body 8FA which performs various arithmetic operations based on the output signals from the measuring unit 7; a display 8FB which displays various kinds of information under the control of the processor main body 8FA; a keyboard 8FC for inputting various data into the processor main body 8FA; and a printer 8FD which prints out the data under the control of the processor main body 8FA.

Structure of the Measuring Plate

Figure 64:
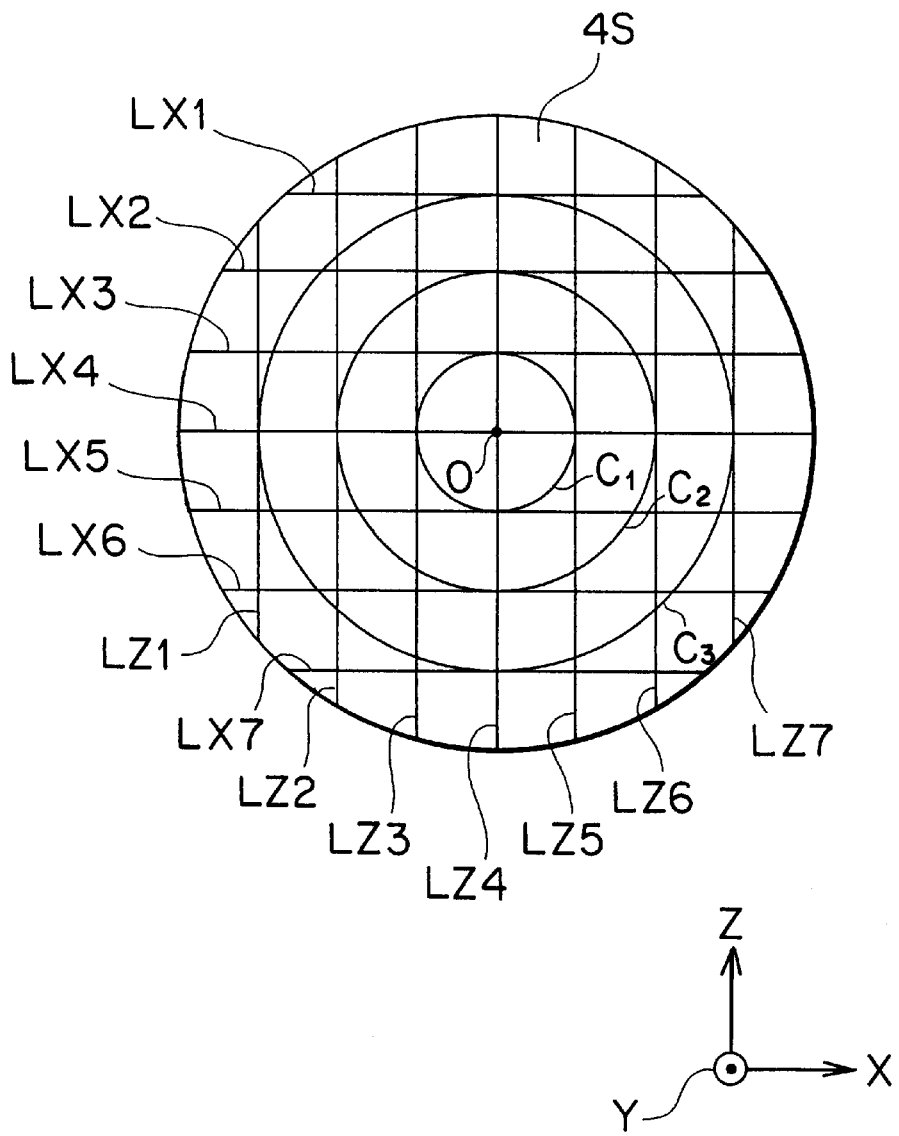
FIG. 64 is a front view of the measuring plate.

FIG. 64 is a front view of the measuring plate.

On the measuring surface 4S of the measuring plate 4F, the base is colored black, and three concentric circles having the same origin O are colored green. The radius ratio of the concentric circles C1 to C3 are set as:

C1:C2:C3=1:2:3

However, the radius ratio of the concentric circles C1 to C3 is not limited to the above example, as long as they can be distinguished from one another based on curvature or the like through image processing.

Scale lines LX1 to LX7 in parallel with the X-axis are colored red and in contact with the corresponding concentric circles C1 to C3.

Scale lines LZ1 to LZ3 in parallel with the Z-axis are colored blue and in contact with the corresponding concentric circles C1 to C3.

In this embodiment, the scale lines LX1 to LX3 are perpendicular to the scale lines LZ1 to LZ3, and they are in contact with the concentric circles C1 to C3. However, if the scale lines are drawn at predetermined intervals and cross each other at a predetermined angle, the same effects can be achieved with more complicated arithmetic operations.

Structure of the Measuring Unit

Figure 65:
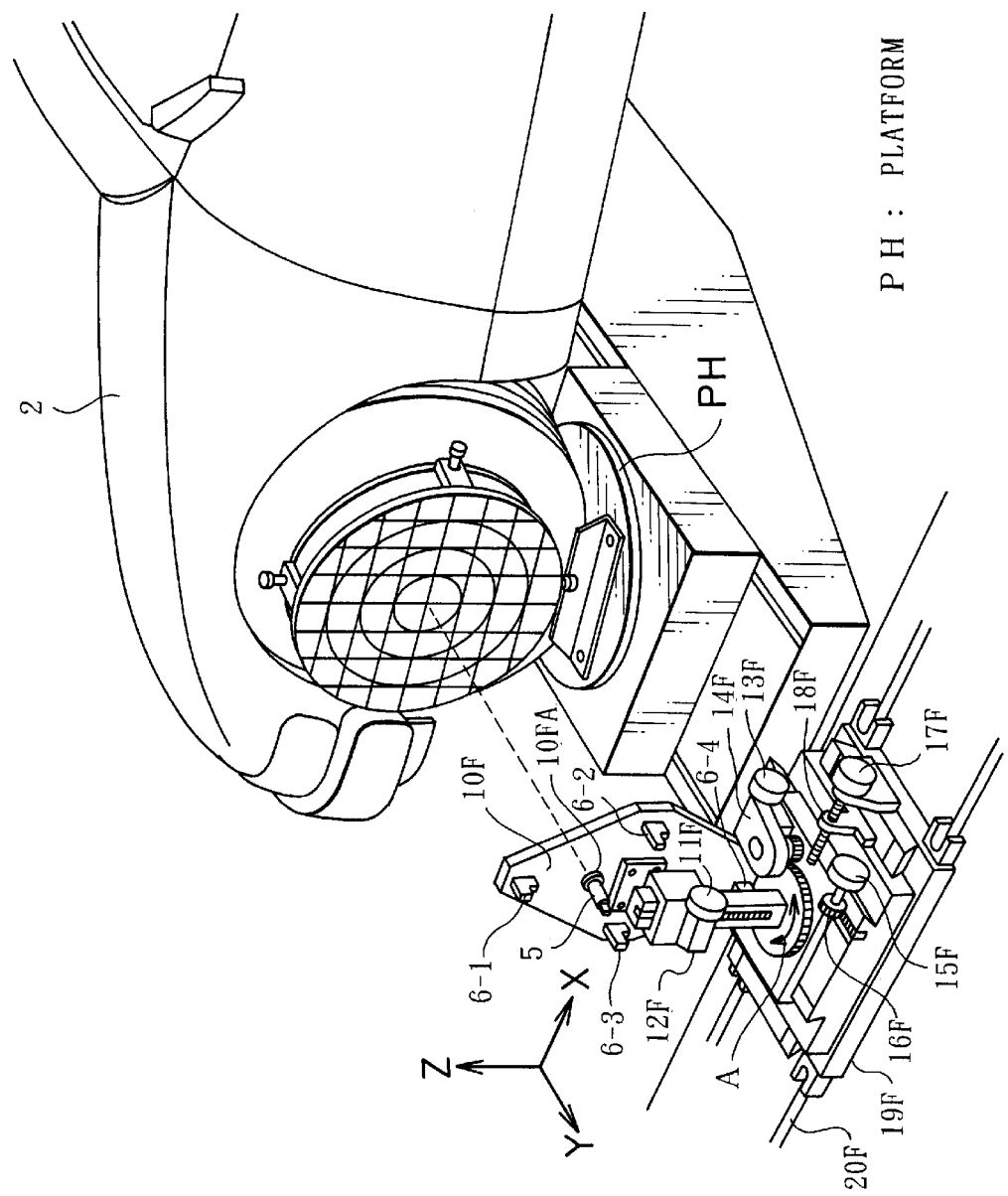
FIG. 65 is an external perspective view of the measuring unit.

FIG. 65 is an external perspective view of the measuring unit.

The measuring unit 7 comprises: a rhombic holding plate 10F having four laser displacement gauges 6-1 to 64; a CCD camera 5 which is provided on the rear side of the holding plate 10F and picked-up images of the measuring plate 4F through an opening 10FA formed in the center of the holding plate 10F; a Z-axis direction driving unit 12F which is provided with a Z-axis direction driving knob 11F and drives the holding plate 10F and the CCD camera 5 in the Z-axis direction when the Z-axis direction driving knob 11F is rotated by the operator; an angle direction driving unit 14F which is provided with an angle direction driving knob 13F and drives the holding plate 10F and the CCD camera 5 in a direction indicated by an arrow A in FIG. 65 when the angle direction driving knob 13F is rotated by the operator; a Y-axis direction driving unit 16F which is provided with a Y-axis direction driving knob 15F and drives the holding plate 10F and the CCD camera 5 in the Y-axis direction when the Y-axis direction driving knob 15F is rotated by the operator; an X-axis driving unit 18F which is provided with an X-axis direction driving knob 17F and drives the holding plate 10F and the CCD camera 5 in the X-axis direction when the X-axis direction driving knob 17F is rotated by the operator; a base unit 19F which holds the holding plate 10F, the CCD camera S, the Z-axis direction driving unit 12F, the Y-axis direction driving unit 16F, and the X-axis direction driving unit 18F; and a guide rail 20F for the base unit 19F to slide in the X-axis direction.

Structure of the Processor Main Body

Figure 66:
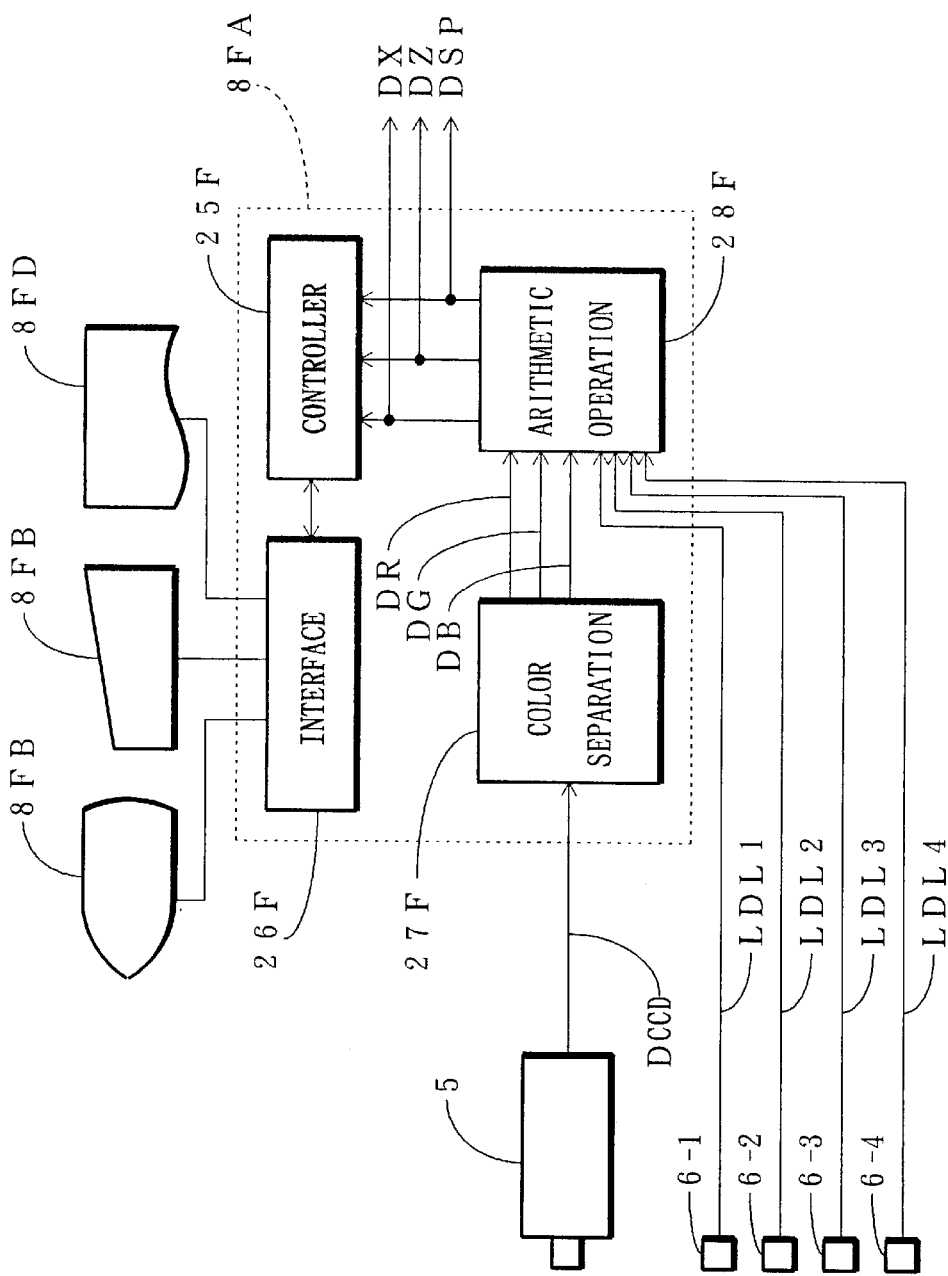
FIG. 66 is a block diagram illustrating the structure of the processor main body.

FIG. 66 is a block diagram illustrating the processor main body of the data processing unit.

The processor main body 8FA comprises: a controller 15F for controlling the entire processor main body 8FA; an interface 26F for interfacing the controller 25F, the display 8FB, the keyboard 8FC, and the printer 8FD with one another; a color separation circuit 27F which performs color separation based on picked-up image data DCCD outputted from the CCD camera 5, and then outputs red picked-up image data DR corresponding to red, green picked-up image data DG corresponding to green, and blue picked-up image data DB corresponding to blue; and an arithmetic operation unit 28F which calculates and outputs X-coordinate data DX and Z-coordinate data DZ on the measuring surface 4S of the measuring plate 4F in a predetermined position of an image picked up by the CCD camera 5 (at the center point of the picked-up image, for instance), and inclination (spin angle) data DSP on the inclination of the X-axis (or Z-axis) with respect to the reference direction, based on the output signals DLD1 to DLD4 of the four laser displacement gauges 6-1 to 6-4, the red picked-up image data DR, the green picked-up image data DG, and the blue picked-up image data DB.

Measuring Operation

Figure 67:
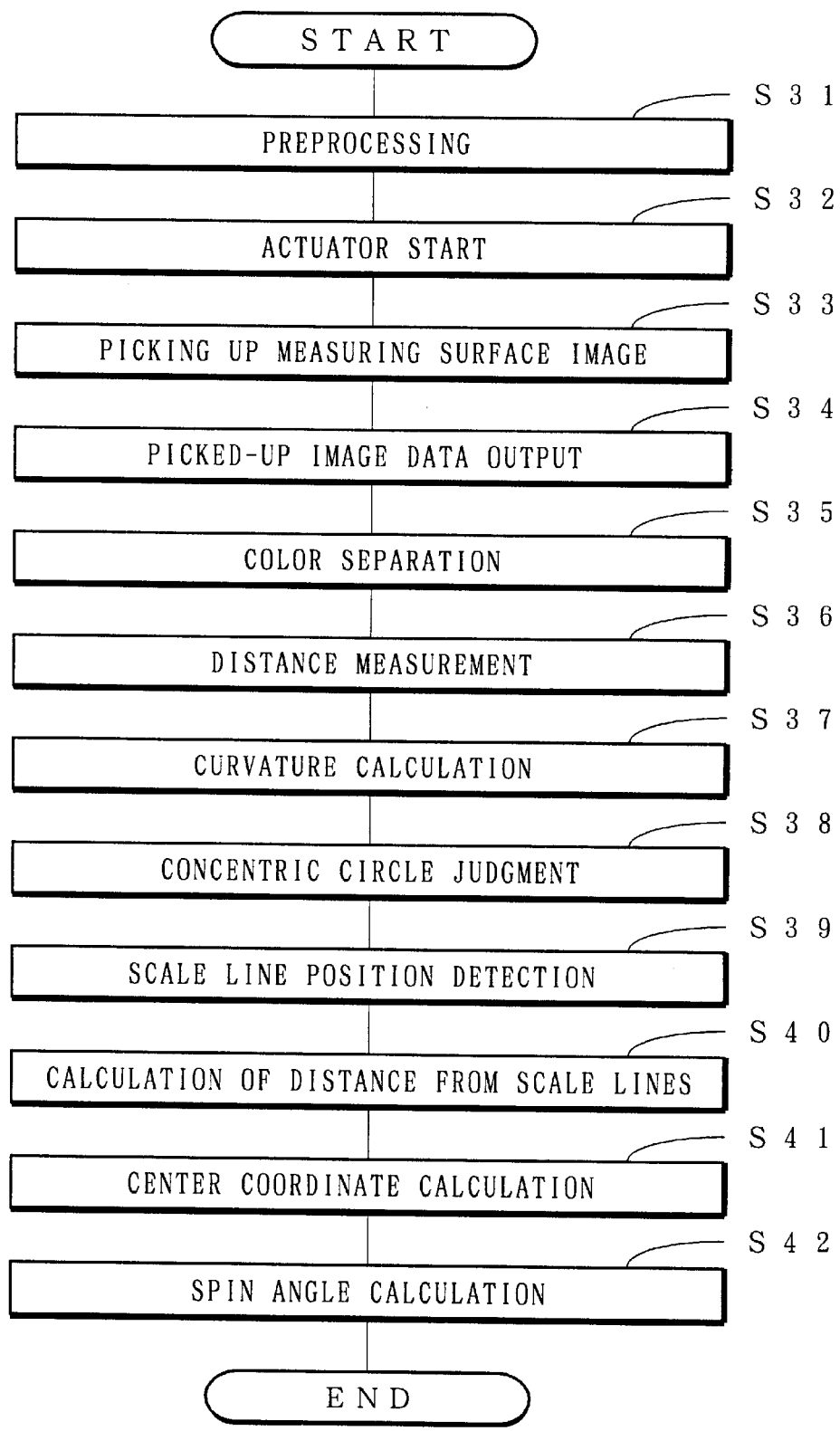
FIG. 67 is a flowchart of the measuring operation.
Figure 68:
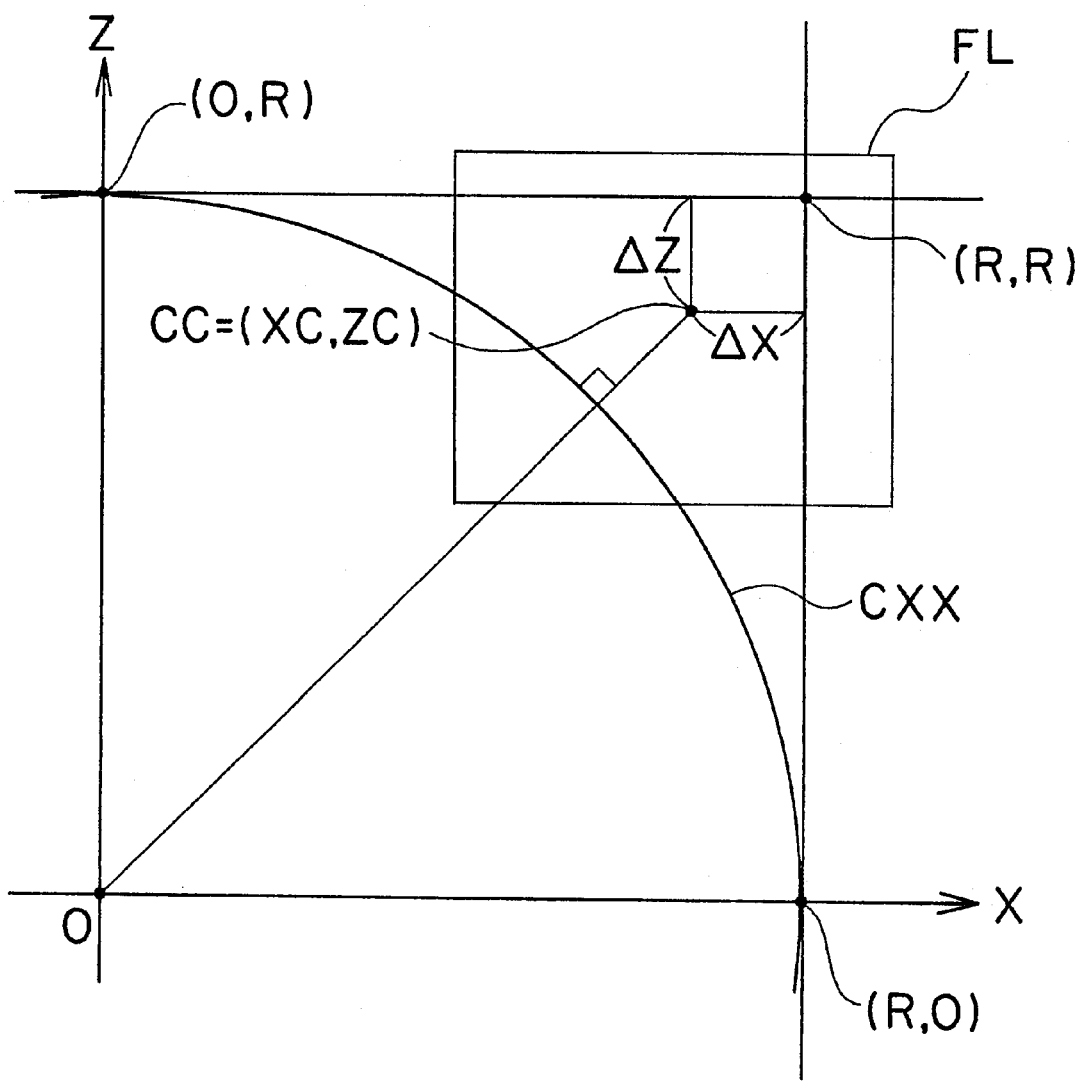
FIG. 68 illustrates the operation in the case where one concentric circle and two scale lines are included in the picked-up image.
Figure 69:
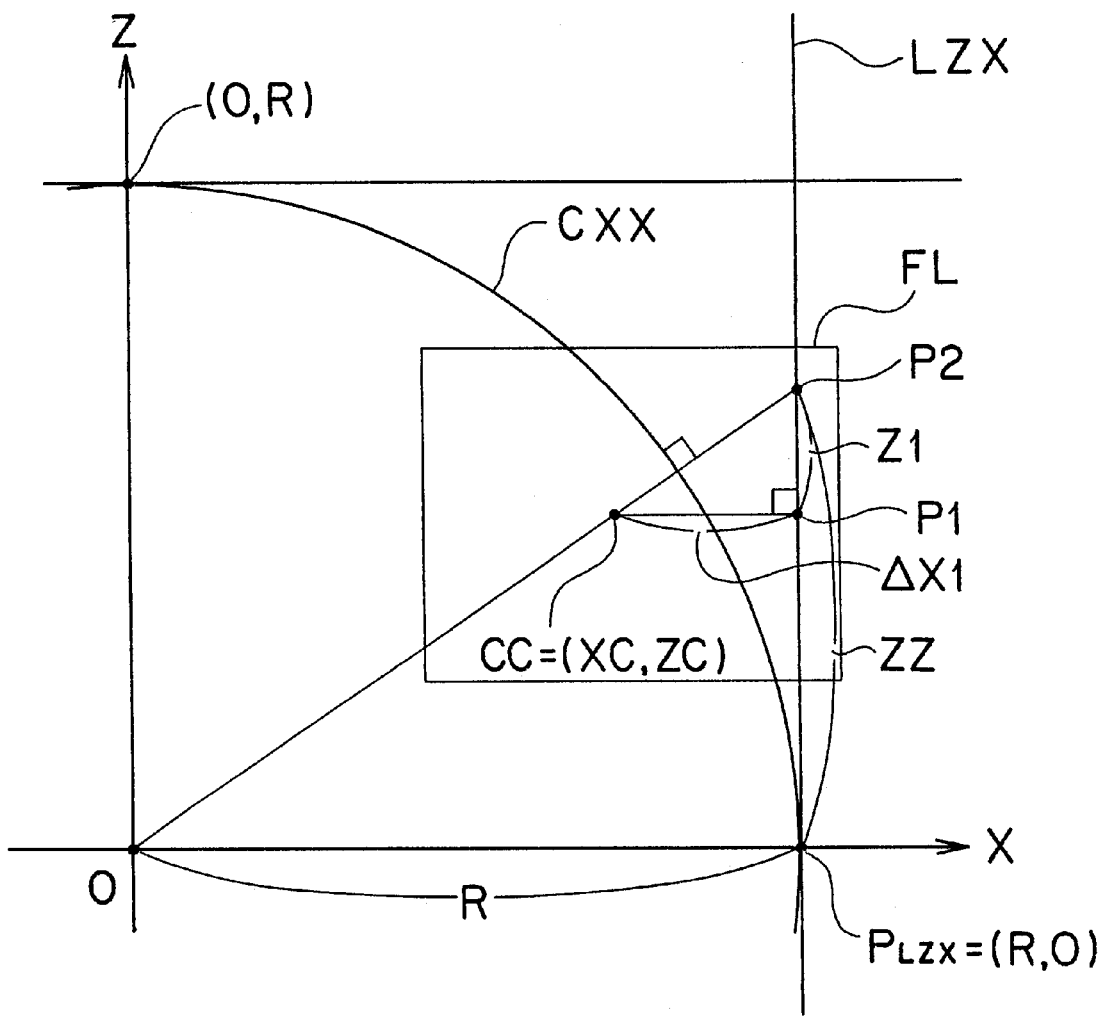
FIG. 69 illustrates the operation in the case where one concentric circle and one scale line are included in the picked-up image.

The following is a description of the measuring operation of this embodiment, referring to FIGS. 67 to 69.

In this embodiment, at least one concentric circle or one scale line should be included in the image picked up by the CCD camera 5, regardless of which part of the measuring surface 4S of the measuring plate 4 is picked up. The measuring plate 4 is attached to the wheel 3 of the measured vehicle 2 so that the origin O of the measuring surface 4S corresponds to the rotational axis of the wheel 3.

FIG. 67 is a flowchart of the measuring operation.

First, the operator slides the base unit 19 on the guide rail 20 in the X-axis direction, or operates the Z-axis direction driving unit 12F (by operating the Z-axis direction driving knob 11F), the angle direction driving unit 14F (by operating the angle direction driving knob 13F), the Y-axis direction driving unit 16F (by operating the Y-axis direction driving knob 15F), and the X-axis direction driving unit 18F (by operating the X-axis direction driving knob 17F). Thus, the holding plate 10F and the CCD camera 5 can face to the measuring surface 4S of the measuring plate 4F, and the center point CC of the image picked up by the CCD camera 5 (see FIG. 68) corresponds to the origin O of the measuring surface 4S (step S3 1).

Next, the wheel 3 of the measured vehicle 2 is driven upward or downward by an actuator (not shown) independently of other wheels. The actuator is then stopped and kept in the stopped state (step S32).

The coordinates of the center point CC of the picked-up image FL are calculated as follows:

A: In the Case Where One Concentric Circle and Two Scale Lines are Contained in a Picked-up Image FIG. 68 illustrates an image which is picked up by the CCD camera 5 and contains one concentric circle and two scale lines.

The processor main body 8FA of the data processing unit 8 controls the CCD camera 5 of the measuring unit 7F to pick up an image of the measuring surface 4S (step S33), and outputs picked-up image data D$_{CCD}$ to the color separation processing circuit 27 of the processor main body 8A (step S34).

By doing so, the color separation circuit 27 performs color separation on the picked-up image data D$_{CCD}$ outputted from the CCD camera 5 under the control of the controller 25, and then outputs red picked-up image data DR corresponding to red, green picked-up image data DG corresponding to green, and blue picked-up image data corresponding to blue to the arithmetic operation unit 28F (step S35).

At the same time of the image pick-up process by the CCD camera 5, the four laser displacement gauges 6-1 to 6-4 irradiate laser on the measuring surface 4S of the measuring plate 4F, and outputs the output signals DLD1 to DLD4 corresponding to the distances from the measuring plate, to the arithmetic operation unit 28F (step S36).

The arithmetic operation unit 28F first extracts the concentric circle CXX (one of the concentric circles C1 to C3) in the picked-up image FL based on the green picked-up image data DG, and performs distance correction in accordance with the output signals DLD1 to DLD4 to calculate the curvature of the concentric circle CXX (step S37). The arithmetic operation unit 28F then compares the obtained curvature with the curvatures of concentric circles stored in advance, and judges which concentric circle is the concentric circle CXX (step S38).

In the following description, the radius of the distinguished concentric circle CXX is R.

The arithmetic operation unit 28F judges the positions of the scale lines included in the picked-up image, based on the red picked-up image data DR and the blue picked-up image data DB (step S39).

With perpendicular lines drawn from the center point CC to the scale lines distinguished in step S39, the distance $\Delta X$ from the center point CC to the scale line in parallel with the Z-axis and the distance $\Delta Z$ from the center point C to the scale line in parallel with the X-axis are calculated (step S40).

If the perpendicular lines from the center point CC cross (or are in contact with) the concentric circle CXX, the scale lines circumscribe the concentric circle CXX. If the perpendicular lines do not cross the concentric circle CXX, the scale lines circumscribe a concentric circle having the largest radius among concentric circles having a smaller radius than that of the concentric circle CXX, or pass through the origin O.

In the case where the perpendicular lines cannot be drawn within the picked-up image FL, they should be drawn toward lines extending from the scale lines on a virtual plane, so that the distances from the scale lines can be calculated.

The arithmetic operation unit 28F then determines the coordinates (XC, ZC) of the center point CC of the picked-up image FL, based on the distances $\Delta X$ and $\Delta Z$, and the coordinates of the scale lines (step S41). Whether the distances $\Delta X$ and $\Delta Z$ should be added or subtracted with respect to the coordinates of the scale lines depends on the quadrant to which the center point CC belongs. Therefore, it is necessary to judge correctly to which quadrant the center point CC belongs, based on the expanding direction of the circumference of the concentric circle and the extending direction of the scale lines.

More specifically, the situation shown in FIG. 68 can be expressed as:

$$(XC, ZC)=(R-\Delta X, R-\Delta Z)$$

The arithmetic operation unit 28F then determines the spin angle by calculating the inclinations of the scale lines with respect to the horizontal direction (or the vertical direction) of the picked-up image (step S42).

As a result, the arithmetic operation unit 28F outputs the center coordinates XC as X-coordinate data DX, the center coordinates DZ as Z-coordinate data DZ, and the spin angle as inclination data DSP.

B: In the Case Where One Concentric Circle and One Scale Line are Contained in a Picked-up Image FIG. 69 shows an image which is picked up by the CCD camera 5 and contains one concentric circle and one scale line.

The processor main body 8FA of the data processing unit 8F controls the CCD camera 5 of the measuring unit 7F to pick up an image of the measuring surface 4S (step S33), and outputs pick-up data DCCD to the color separation circuit 27F of the processor main body 8FA (step S34).

By doing so, the color separating circuit 27F performs color separation on the picked-up image data DCCD outputted from the CCD camera 5 under the control of the controller 25F, and outputs red picked-up image data DR corresponding to red, green picked-up image data DG corresponding to green, and blue picked-up image data DB corresponding to blue, to the arithmetic operation unit 28F (step S35).

At the same time of the image pick-up process by the CCD camera 5, the four laser displacement gauges 6-1 to 6-4 irradiate laser onto the measuring surface 4S of the measuring plate 4F, and outputs the output signals DLD1 to DLD4 corresponding to the distances from the measuring plate, to the arithmetic operation unit 28F (step S36).

The arithmetic operation unit 28F first extracts the concentric circle CXX (one of the concentric circles C1 to C3) in the picked-up image FL based on the green picked-up image data DG, and performs distance correction in accordance with the output signals DLD1 to DLD4 to calculate the curvature of the concentric circle CXX (step S37). The arithmetic operation unit 28F then compares the obtained curvature with the curvatures of concentric circles stored in advance, and judges which concentric circle is the concentric circle CXX (step S38).

In the following description, the radius of the distinguished concentric circle CXX is R.

The arithmetic operation unit 28F judges the positions of the scale line contained in the picked-up image, based on the red picked-up image data DR and the blue picked-up image data DB (step S39).

With a perpendicular line drawn from the center point CC to the scale line in parallel with the Z-axis distinguished in step S39, the distance ΔX1 from the center point CC to the scale line LZX in parallel with the Z-axis is calculated (step S40).

If the perpendicular line drawn from the center point CC crosses (or is in contact with) the concentric circle CXX, the scale line circumscribes the concentric circle CXX. If the perpendicular line does not cross the concentric circle CXX, the scale line circumscribes a concentric circle having the largest radius among concentric circles having a smaller radius than that of the concentric circle CXX, or pass through the origin O.

In the case where the perpendicular line cannot be drawn within the picked-up image FL, it should be drawn toward a line extending from the scale line on a virtual plane, so that the distance from the scale line can be calculated.

The arithmetic operation unit 28F then determines the coordinates (XC, ZC) of the center point CC of the picked-up image FL, based on the distances ΔX1 and the coordinates of the scale line LZX (step S41).

More specifically, with the perpendicular line drawn from the center point CC of the picked-up image FL to the scale line LZX, the intersection is P1, and the distance from the center point CC to the intersection P1 is ΔX1.

The arithmetic operation unit 28F then draws a perpendicular line toward the concentric circle CXX and extends the perpendicular line to the scale line LZX. The intersection of the perpendicular line and the scale line LZX is P2. If extended in the opposite direction from the scale line LZX, the perpendicular line passes through the origin O.

As a result, the triangle defined by CC, P1, and P2 becomes similar to the triangle defined by O, P$_{LZX}$, and P2. With the distance Z1 from the intersection P1 to the intersection P2 and the distance ZZ from the intersection P2 to the point P$_{LZX}$, the relationships shown in FIG. 69 can be expressed as:

$$R:\Delta X1 = ZZ:Z1$$

and $$ZZ = (R \cdot Z1)/\Delta X1$$

Accordingly, the coordinates of the center point CC can be expressed as:

$$(XC, ZC) = (R - \Delta X1, ZZ - Z1)$$

$$= (R - \Delta X1, (R \cdot Z1)/\Delta X1 - Z1)$$

$$= (R - \Delta X1, \{[R/\Delta X1] - 1\} \cdot Z1)$$

The arithmetic operation unit 28F then determines the spin angle by calculating the inclinations of the scale lines with respect to the horizontal direction (or the vertical direction) of the picked-up image (step S42).

As a result, the arithmetic operation unit 28F outputs the center coordinates XC as X-coordinate data DX, the center coordinates DZ as Z-coordinate data DZ, and the spin angle as inclination data DSP.

As described so far, according to this embodiment, based on a picked-up image containing at least one concentric circle and one scale line, the position corresponding to the origin of the measuring surface 4S of the measuring plate 4 in a predetermined position within the picked-up image (for instance, at the center point) can be calculated speedily and accurately, which improves reproducibility of measurement.

Accordingly, wheel alignment measurements can be taken speedily and accurately, and its reproducibility and reliability are improved in this embodiment.

What is claimed is:

1. A measuring plate attached to a wheel so that an origin thereof corresponds to a rotational center of the wheel of a vehicle being measured, comprising:
   a measuring mark area which is formed in an area surrounding and containing the origin, and provided with measuring marks; and
   a distance measuring area on the measuring plate which distance measuring area is optically uniform and extends along an axis that is coaxial with a longitudinal direction of the vehicle being measured, said distance measuring area being irradiated by a measuring light emitted from a measuring unit,
   said measuring mark area containing:
     a first reference mark having center coordinates that are the origin of said measuring plate;
     a plurality of second reference marks having center coordinates that are located at intersections of first virtual lines in parallel and second virtual lines in parallel; and
     a plurality of correction lines which are in parallel with either the first virtual lines or the second virtual lines, and are situated at uniform intervals.

2. A wheel alignment measuring device for measuring wheel alignment using said measuring plate of claim 1, comprising:
   at least two distance measuring means each of which are configured for emitting and receiving the distance measuring light and for outputting distance measuring signals corresponding to the distance from said measuring plate, said means being fixed in predetermined reference positions at a predetermined distance from each other; and distance calculating means for calculating the distance from a predetermined position on said measuring plate corresponding to the predetermined reference positions, based on the distance measuring signals.

3. A wheel alignment measuring device for measuring the distance from and the inclination of the measuring surface of a measured plate which is attached to a wheel of a vehicle being measured so that the origin thereof corresponds to the center of the rotational axis of the wheel, comprising:

said wheel alignment measuring device comprises at least four distance measuring light emitting and receiving means having light emitting portions which are arranged on a same virtual plane at predetermined intervals for emitting distance measuring light onto the measuring surface, receiving the distance measuring light reflected by the measuring surface, and outputting distance measuring signals, said light emitting portions being so arranged on the same virtual plane at intervals that the distance measuring light emitted from at least three of the at least four distance measuring light emitting and receiving means impinges on the measuring surface under predetermined measuring conditions, the virtual plane is arranged so that it contains a straight line substantially in parallel with a vertical direction of the vehicle to be measured, a virtual parallelogram being arranged on the virtual plane so that the straight line includes one of the diagonal lines of the virtual parallelogram, the light emitting portions of the at least four distance measuring light emitting and receiving means are arranged at each corner of the virtual parallelogram, and the virtual parallelogram is arranged so that the distance measuring light is emitted from the two light emitting portions on the other diagonal line not included in the straight line within a common area for a first measuring surface corresponding to a maximum distance moved by the measuring surface in a first direction along the straight line, and a second measuring surface corresponding to a maximum distance moved by the measuring surface in a second direction opposite to the first direction.

4. A wheel alignment measuring method for measuring, by employing a measuring plate attached coaxially with a rotary axis of a wheel, a distance from a measuring surface of the measuring plate, and an angle of inclination of the measuring surface, comprising the steps of:

emitting at least three out of at least four distance measuring light beams spaced at predetermined intervals onto the measuring surface and receiving the distance measuring light beams reflected therefrom; and calculating a camber angle of the measuring surface based on the received distance measuring light beams, a virtual plane being arranged so that it includes a straight line substantially in parallel with the vertical direction of the vehicle to be measured, the step of distance measuring light emitting and receiving being implemented by arranging a virtual parallelogram on the virtual plane so that the straight line includes one of the diagonal lines of the virtual parallelogram, emitting the distance measuring light beams from each apex of the virtual parallelogram and receiving the distance measuring light beams reflected at the measuring surface, the step of calculating camber angle being implemented by receiving reflected distance measuring light beams emitted from two apexes on the other diagonal line not included in the straight line onto a common area for a first measuring surface corresponding to a maximum distance moved by the measuring surface in a first direction along the straight line, and a second measuring surface corresponding to a maximum distance moved by the measuring surface in a second direction opposite to the first direction and by receiving reflected distance measuring light beam emitted from either one of apexes on the diagonal line included in the straight line onto the measuring surface.

5. The wheel alignment measuring method according to claim 4, wherein said camber angle calculating step includes the steps of:

choosing either one of said two distance measuring light beams emitted from the apexes included in the straight line and reflected at the measuring surface; and calculating the camber angle of the measuring surface based on the distance measuring light beam chosen in said choosing step and two distance measuring light beams emitted from the other apexes not included in the straight line.

6. A caster angle measuring device comprising:

a wheel alignment measuring plate having a measuring object thereon;

a CCD camera for picking up an image of the wheel alignment measuring target plate;

original caster angle data calculating means for calculating original caster angle data $\theta$ CAS by quantizing a caster angle formed between a measuring object line and a predetermined reference line based on the image data; and output means for outputting the original caster angle data $\theta$ CAS as the effective caster angle data $\theta$ ECAS when the original caster angle data $\theta$ CAS changes its value.

7. The caster angle measuring device according to claim 6, wherein said original caster angle data calculating means comprises:

line extracting means for extracting the measuring object line based on the image data; and inclination calculating means for calculating the inclination of the extracted measuring object line by applying the method of least squares.

8. A wheel alignment measuring device comprising:

a CCD camera for outputting image data by picking up an image of a caster angle measuring object line provided on a wheel alignment measuring target plate attached to a vehicle;

a caster angle measuring device for outputting effective caster angle data $\theta$ECAS having a desired measuring accuracy based on the image data obtained by picking up an image, with use of the external CCD camera, of the caster angle measuring object line, comprising:

original caster angle data calculating means for calculating original caster angle data $\theta$ CAS by quantizing the caster angle formed between the measuring object line and a predetermined reference line based on the image data; and effective data output means for outputting the original caster angle data $\theta$ CAS as the effective caster angle data $\theta$ ECAS when the original caster angle data $\theta$ CAS changes its value and data comparing means for comparing the effective caster angle data θ ECAS with measured data of a different dimension at substantially the same time when there is said change in the original caster angle data θCAS.

9. A caster angle measuring device for outputting effective caster angle data θ ECAS having a desired measuring accuracy based on image data obtained by picking up an image with use of an external CCD camera, of a caster angle measuring object line provided on a wheel alignment measuring target plate mounted on a vehicle, comprising:
original caster angle data calculating means for calculating original caster angle data θ CAS based on the image data when the caster angle formed between the measuring object line and a predetermined reference line changes continuously in either direction of increasing or decreasing;
comparing means for comparing original caster angle data θ CAS(n−1) measured in a previous measurement timing with original caster angle data θ CAS(n) measured in a current measurement timing; and
effective data output means for outputting the original caster angle data θ CAS(n) of the current measurement as the effective caster angle data θ ECAS when the comparison results in:
θ CAS(n−1)≠θ CAS(n).

10. The caster angle measuring device according to claim 9, wherein said original caster angle data calculating means comprises:
line extracting means for extracting the measuring object line based on the image data; and
inclination calculating means for calculating the inclination of the extracted measuring object line by applying the method of least squares.

11. A wheel alignment measuring device comprising:
a CCD camera for outputting image data by picking up an image of a caster angle measuring object line drawn on a wheel alignment measuring target plate attached to a vehicle;
a caster angle measuring device for outputting effective caster angle data θ ECAS having a desired measuring accuracy based on image data obtained by picking up an image, with use of the external CCD camera, of the caster angle measuring object line, comprising:
original caster agile data calculating means for calculating original caster angle data θ CAS based on the image data when the caster angle formed between the measuring object line and a predetermined reference line changes continuously in either direction of increasing or decreasing;
comparing means for comparing original caster angle data θCAS(n−1) measured in a previous measurement timing with original caster angle data θCAS(n) measured in a current measurement timing; and
effective data output means for outputting the original caster angle data θ CAS(n) of the current measurement as the effective caster angle data θ ECAS when the comparison results in:
θ CAS(n−1)≠θ CAS(n); and
data comparing means for comparing the current original caster angle data θ CAS(n) with measured data of a different dimension at substantially the same time as the measurement of the current original caster angle data θ CAS(n).

12. A caster angle measuring method for calculating an effective caster angle θ ECAS having a desired measuring accuracy based on image data obtained by picking up an image, with use of an external CCD camera of a caster angle measuring object line provided on a wheel alignment measuring target plate attached to a vehicle, comprising the steps of:
calculating an original caster angle θ CAS by quantizing the caster angle formed between the measuring object line and a predetermined reference line based on the image data; and
judging the original caster angle θ CAS to use as the effective caster angle θ ECAS when the original caster angle θ CAS changes its value.

13. The caster angle measuring method according to claim 12, wherein said original caster angle calculating step comprises the steps of:
extracting the measuring object line based on the image data; and
calculating the inclination of the measuring object line extracted by applying the method of least squares.

14. A caster angle measuring method for calculating an effective caster angle θ ECAS having a desired measuring accuracy based on image data obtained by picking up an image, with use of an external CCD camera of a caster angle measuring object line provided on a wheel alignment measuring target plate attached to a vehicle, comprising the steps of:
calculating an original caster angle θ CAS based on the image data when the caster angle formed between the measuring object line and a predetermined reference line changes continuously in either direction of increasing or decreasing;
comparing an original caster angle θ CAS(n−1) measured in a previous measurement timing with an original caster angle θ CAS(n) measured in a current measurement timing; and
judging the current original caster angle θ CAS(n) to use as an effective caster angle θ ECAS when the comparison results in:
θ CAS(n−1)≠θ CAS(n).

15. The caster angle measuring method according to claim 14, wherein said original caster angle calculating step comprises the steps of:
extracting the measuring object line based on the image data; and
calculating the inclination of the measuring object line extracted by applying the method of least squares.

16. A wheel alignment measuring method comprising the steps of:
picking up an image of a caster angle measuring object line provided on a wheel alignment measuring target plate attached to a vehicle;
calculating an original caster angle θ CAS by quantizing the caster angle formed between the picked-up measuring object line and a predetermined reference line;
judging the original caster angle θ CAS to use as the effective caster angle θ ECAS when the caster angle θ CAS changes its value; and
comparing the effective caster angle θ ECAS with measured data of a different dimension at substantially the same time when there is said change in the original caster angle θ CAS.

17. A wheel alignment measuring method comprising the steps of:
picking up an image of a caster angle measuring object line provided on a wheel alignment measuring target plate attached to a vehicle;

calculating an original caster angle θ CAS when the caster angle formed between the picked-up measuring object line and a predetermined reference line changes continuously in either direction of increasing or decreasing;

comparing an original caster angle θ CAS(n−1) measured in a previous measurement timing with an original caster angle θ CAS(n) measured in a current measurement timing;

judging the current original caster angle θ CAS(n) to use as an effective caster angle θ ECAS when the comparison results in:
θ CAS(n−1)≠θ CAS(n); and comparing the current original caster angle θ CAS(n) with measured data of a different dimension at substantially the same time as a timing of the measurement of the current original caster angle θCAS(n).

18. A wheel alignment measuring device for measuring wheel alignment comprising:

a measuring plate configured to be attached to a vehicle wheel with its origin of coordinate being coincide with the center of the wheel, said measuring plate comprising:

a first reference mark having its origin of coordinate at a predetermined position;

a plurality of second reference marks having their origins of coordinates at intersections, except the position of the first reference mark, of first virtual parallel lines provided hypothetically on a measuring surface and second virtual parallel lines provided hypothetically on the measuring surface at right angles to the first virtual lines; and a plurality of correction lines being provided on the measuring surface at regular intervals and in parallel with either the first virtual lines or the second virtual lines;

first image pick-up means for outputting a first picked-up image signal by taking a picture of a first area including said first reference mark and said plurality of second reference marks on said measuring surface of the measuring plate;

second image pick-up means for outputting a second picked-up image signal by taking a picture of a second area which is smaller than the first area and included in the first area, said second image pick-up means having an optical axis positionally related beforehand with an optical axis of said first image pick-up means;

selecting means for selecting one of said second reference marks within said second area as a selected second reference mark based on the second picked-up image signal;

relative reference position calculating means for calculating coordinates of relative reference position on the basis of the position coordinates of the selected second reference mark by specifying said selected second reference mark within said first area based on the first picked-up image signal; and position calculating means for calculating reference position coordinates of the origin of position given by a predetermined position within the second area based on the second picked-up image signal and the relative reference position coordinates.

19. The wheel alignment measuring device according to claim 18, wherein said selecting means selects a second reference mark, which is at the nearest point to the predetermined position within the second area, as said selected second reference mark.

20. The wheel alignment measuring device according to claim 19, further comprising color separation means for outputting by receiving the first picked-up image signal and the second picked-up image signal, a first color separation picked-up image signal consisting of a first red picked-up image signal, a first green picked-up image signal and a first blue picked-up image signal, and that a second color separation picked-up image signal consisting of a second red picked-up image signal, a second green picked-up image signal, and a second blue picked-up image signal, wherein said selecting means specifies the selected second reference mark based on the second color separation picked-up image signal, and said relative reference position calculating means calculates the relative reference position coordinates based on the first color separation picked-up image signal.

21. The wheel alignment measuring device according to claim 19, wherein said relative reference position calculating means further comprising:

center position calculating means for calculating the center position coordinates of the selected second reference mark to use as the relative reference position coordinates based on the second color separation picked-up image signal, and said position calculating means further comprising:

relative position coordinate calculating means for calculating the relative position coordinates of the predetermined position relative to the relative reference position coordinates; and origin reference position coordinate calculating means for calculating the reference position coordinates of the origin of position by adding the relative position coordinates to the center position coordinates of said selected second reference mark.

22. The wheel alignment measuring device according to claim 18, further comprising color separation means for outputting by receiving the first picked-up image signal and the second picked-up image signal, a first color separation picked-up image signal consisting of a first red picked-up image signal, a first green picked-up image signal and a first blue picked-up image signal, and that a second color separation picked-up image signal consisting of a second red picked-up image signal, a second green picked-up image signal, and a second blue picked-up image signal, wherein said selecting means specifies the selected second reference mark based on the second color separation picked-up image signal, and said relative reference position calculating means calculates the relative reference position coordinates based on the first color separation picked-up image signal.

23. The wheel alignment measuring device according to claim 18, further comprising:

a plurality of distance sensors for measuring distances from the sensors to different positions on the measuring surface of said measuring plate, and outputting measured signals; and distance calculating means for calculating the distance from a middle point between the sensors to the measuring surface and the camber angle based on the measuring signals from the plurality of distance sensors.

24. A wheel alignment measuring method for measuring wheel alignment comprising the steps of:
providing a measuring plate configured to be attached to a vehicle wheel with its origin of coordinate being coincide with the center of the wheel, said measuring plate comprising:
a first reference mark having its origin of coordinate at a predetermined position;
a plurality of second reference marks having their origins of coordinates at intersections, except the position of the first reference mark, of first virtual parallel lines provided hypothetically on a measuring surface and second virtual parallel lines provided hypothetically on the measuring surface at right angles to the first virtual lines; and
a plurality of correction lines being provided on the measuring surface at regular intervals and in parallel with either the first virtual lines or the second virtual lines;
picking up an image of a first area containing the first reference mark and the plurality of second reference marks on the measuring surface of said measuring plate;
picking up an image of a second area having smaller area than that of the first area and included in the first area;
selecting any one of the second reference marks within the second area to use as a selected second reference mark;
specifying said selected second reference mark within the first area and calculating position coordinates of said selected second reference mark to use as relative reference position coordinates; and
calculating reference position coordinates of the origin of position which are position coordinates on the basis of the origin of a predetermined position in the second area, based on the relative reference position coordinates.

25. The wheel alignment measuring method according to claim 24, wherein
said selecting step selects a second reference mark, which is at the nearest point to the predetermined position among the second reference marks within the second area, as the selected second reference mark.

26. The wheel alignment measuring method according to claim 24 further comprising the step of:
separating colors of the images picked up by said first image pick-up step and said second image pick-up step so as to generate a first color separated picked-up image and a second color separated picked-up image, wherein the specified second reference mark is specified by said selecting step based on the second color separated picked-up image, and the relative reference position coordinates are calculated by said relative reference position calculating step based on the first color separated picked-up image.

27. The wheel alignment measuring method according to claim 24, wherein said relative reference position calculating step further includes a center position calculating step for calculating coordinates of the center position of said selected second reference mark based on the second color separated picked-up image, and
said position calculating step further includes the steps of:
calculating the relative position coordinates of the predetermined position in reference to the relative reference position coordinates; and
calculating reference position coordinates of the position of origin by adding the relative position coordinates to the coordinates of the center of the selected second reference mark.

28. The wheel alignment measuring method according to claim 24, further comprising the steps of:
measuring the distances from sensors to different positions on the measuring surface of the measuring plate; and
calculating the distance from a middle point between the sensors to the measuring surface and the camber angle based on the distances measured in said step of distance measuring.

29. A measuring plate having a measuring surface provided with a plurality of concentric circles having a predetermined position as their common point of origin and grid scale lines thereon, and being attachable to a wheel of a vehicle to be measured in such that point of origin coincide with the center of the rotational axis of the wheel.

30. The measuring plate according to claim 29, wherein
the scale lines include first parallel scale lines and second parallel scale lines which are perpendicular to the first parallel scale lines,
wherein the concentric circles and the first and second parallel scale lines are different colors from each other.

31. The measuring plate according to claim 30, wherein
the concentric circles, the first parallel scale lines and the second parallel scale lines are colored differently with use of red, green and blue colors.

32. A wheel alignment measuring method for measuring wheel alignment using said measuring plate of claim 30, comprising the steps of:
generating picked-up image data by picking up an image of the measuring surface, said image including at least a part of one concentric circle out of said plurality of concentric circles and at least a part of the scale lines;
outputting color separated picked-up image data by implementing color separating operation to the picked-up image data;
discriminating which concentric circle is included in the image picked up in said image pick-up step by judging from the color separated picked-up image data and a curvature of the concentric circle in the picked-up image;
specifying the scale lines included in the picked-up image based on the result of judgment of said judging step and the color separated picked-up image data; and
calculating the position on said measuring plate which corresponds to a measuring object position based on the positional relationship between the specified scale lines and the measuring object position in the image picked up in said image pick-up step.

33. The wheel alignment measuring method according to claim 32, further comprising the steps of:
calculating a spin angle by measuring the inclination of the scale lines in the picked-up image with respect to a predetermined reference position.

34. A wheel alignment measuring device for measuring wheel alignment using said measuring plate of claim 29, comprising:
image pick-up means for picking up an image of the measuring surface, said image including at least a part of one concentric circle out of said plurality of concentric circles and at least a part of the scale lines;
judging means for discriminating which concentric circle is included in the image picked up by said image pick-up means by judging from a curvature of the concentric circle in the picked-up image;

scale line specifying means for specifying the scale lines included in the picked-up image based on the result of judgment of said judging means; and operation means for calculating the position on said measuring plate which corresponds to a measuring object position based on the positional relationship between the specified scale lines and the measuring object position in the image picked up by said image pick-up means.

35. The wheel alignment measuring device according to claim 34, wherein said judging means comprises:

storing means for storing every curvature of the plurality of the concentric circles in advance;

concentric circle extracting means for extracting the concentric circle contained in the picked-up image based on an output signal of said image pick-up means;

curvature calculating means for calculating the curvature of the extracted concentric circle; and concentric circle specifying means for specifying the concentric circle by comparing the curvature obtained by said curvature calculating means with the curvatures stored in said storing means.

36. The wheel alignment measuring device according to claim 34, wherein said judging means comprises:

storing means for storing every curvature of the plurality of the concentric circles in advance;

concentric circle extracting means for extracting the concentric circle included in the picked-up image based on the color separated picked-up image data;

curvature calculating means for calculating the curvature of the extracted concentric circle; and concentric circle specifying means for specifying the concentric circle by comparing the curvature obtained by said curvature calculating means with the curvatures stored in said storing means.

37. The wheel alignment measuring device according to claim 34, further comprising:

spin angle calculating means for calculating a spin angle by measuring an angle of inclination of the scale lines in the picked-up image with respect to a predetermined reference position.

38. The wheel alignment measuring device for measuring wheel alignment using said measuring plate of claim 29, comprising:

image pick-up means for outputting picked-up image data by picking up an image of the measuring surface, said image including at least a part of one concentric circle out of said plurality of concentric circles and at least a part of the scale lines;

color-separation means for outputting color separated picked-up image data by implementing color separating operation to the picked-up image data;

judging means for discriminating which concentric circle is included in the image picked up by said image pick-up means by judging from the color separated picked-up image data and a curvature of the concentric circle in the picked-up image;

scale line specifying means for specifying the scale lines included in the picked-up image based on the result of judgment of said judging means and the color separated picked-up image data; and operation means for calculating the position on said measuring plate which corresponds to a measuring object position based on the positional relationship between the specified scale lines and the measuring object position in the image picked up by said image pick-up means.

39. A wheel alignment measuring method for measuring wheel alignment using said measuring plate of claim 29, comprising the steps of:

picking up an image of the measuring surface, said image including at least a part of one concentric circle out of said plurality of concentric circles and at least a part of the scale lines;

discriminating which concentric circle is included in the picked-up image by judging from a curvature of the concentric circle included in the picked-up image;

specifying the scale lines included in the picked-up image based on the result of judgment of said judging step; and calculating the position on the measuring plate which corresponds to a measuring object position based on the positional relationship between the specified scale lines and the measuring object position in the picked-up image.

40. The wheel alignment measuring method according to claim 39, wherein said judging means comprises the steps of:

extracting said concentric circle included in the picked-up image based on the picked-up image data;

calculating a curvature of the extracted concentric circle; and specifying the concentric circle having the calculated curvature by comparing the calculated curvature obtained in said step of calculating curvature with the curvatures stored in advance.

* * * * *